United States Patent [19]

Chamoff et al.

[11] 4,266,271

[45] May 5, 1981

[54] RECONFIGURABLE CLUSTER OF DATA-ENTRY TERMINALS

[76] Inventors: Martin E. Chamoff, 2115 NE. 10 Ave., Rochester, Minn. 55901; Irving L. Miller, R.R. #1, Pine Island, Minn. 55963; Donald L. Thorson, 2624 NW. 17 Ave., Rochester, Minn. 55901

[21] Appl. No.: 950,091

[22] Filed: Oct. 10, 1978

[51] Int. Cl.[3] .................................................. G06F 3/04

[52] U.S. Cl. ........................................ 364/200; 364/401

[58] Field of Search ......................... 364/200, 401, 402

[56] References Cited

U.S. PATENT DOCUMENTS

| | | | |
|---|---|---|---|
| 3,237,165 | 2/1966 | Bräunig | 340/147 P |
| 3,768,074 | 10/1973 | Sharp et al. | 364/200 |
| 3,886,524 | 5/1975 | Appelt | 364/200 |
| 3,905,023 | 9/1975 | Perpiglia | 364/200 |
| 4,075,693 | 2/1978 | Fox et al. | 364/200 |
| 4,096,566 | 6/1978 | Borie et al. | 364/200 |

*Primary Examiner*—Errol A. Krass

*Attorney, Agent, or Firm*—Richards, Harris & Medlock

[57] ABSTRACT

A reconfigurable clustered system of data-entry terminals includes a plurality of physically separate data-entry terminals coupled to a communications link in a cluster. Each of the terminals includes a programmable digital processor for transferring data and programs over the communications link. Each of the terminals further includes entry devices for communicating information between an operator and the programmable processor. At least two of the terminals are media terminals further including a storage for containing both data from the terminals and programs for all of the terminals in the cluster. Selection circuitry is provided to designate any one of the media terminals as a primary media terminal, such that all other terminals in the cluster, including others of the media terminals, exchange both data and programs with the primary media terminal. The selection circuitry is operable to designate different ones of the media terminals as the primary media terminal without the requirement of any physical reconfiguration of the cluster of terminals.

21 Claims, 42 Drawing Figures

SATELLITE TERMINAL

| | | | | | | | | |
|---|---|---|---|---|---|---|---|---|
| 0 | 1 | 1 | 0 | 0 | UC | SE | DE | UE |
| 1 | COMMAND BYTE 0 | | | | | | | |
| 2 | COMMAND BYTE 1 | | | | | | | |
| 3<br>4 | DATA ADDRESS | | | | | | | |
| 5 | ERROR CODE | | | | | | | |
| 6 | | | | | | BUSY TIME OUT | LINE ACTIVE | NO RESPONSE |
| 7 | | | | LINE ADDR 01, 10, 11 | | STATION ADDRESS 000-110 (111 = POT) | | |
| 8 | BUSY | LINE PARITY ERROR | | | EXCEPTION STATUS | | | EVEN/ODD RESPONSE LEVEL |
| 9 | QUEUE 0 | QUEUE 1 | QUEUE 2 | QUEUE 3 | QUEUE 4 | QUEUE 5 | QUEUE 6 | QUEUE 7 |
| A | QUEUE ID 000 - 111 | | | | | | | |
| B<br>C | MAX BYTE COUNT | | | | | | | |
| D<br>E | RECEIVED BYTE COUNT | | | | | | | |

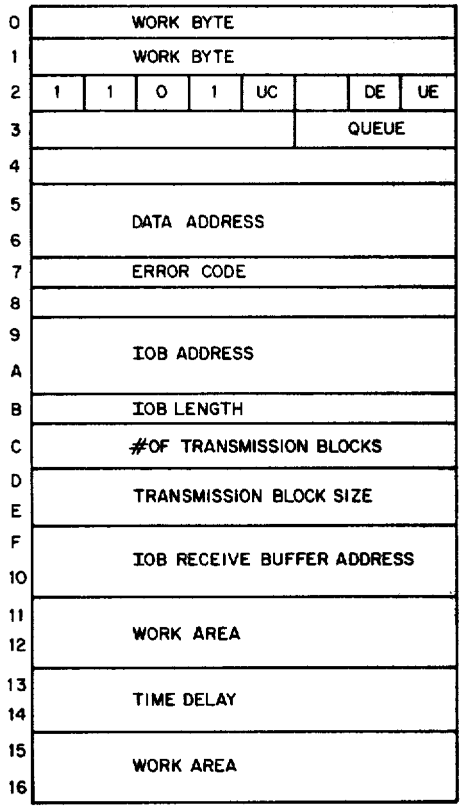

FIG. 30

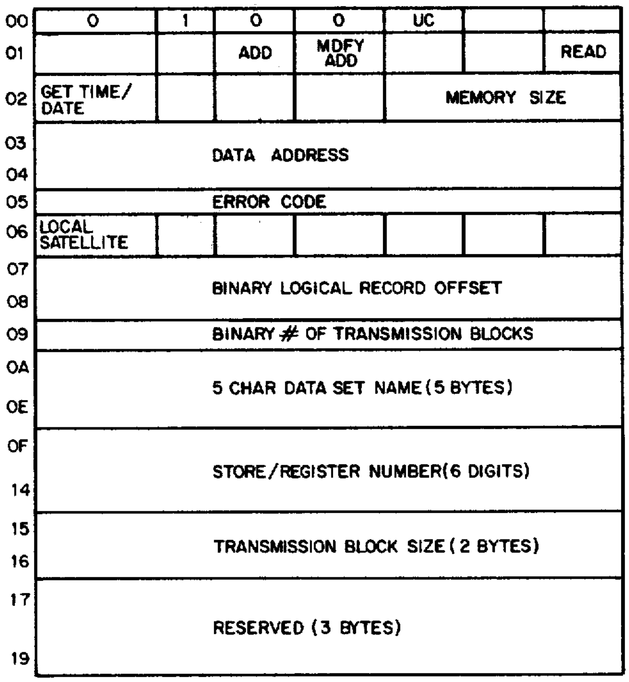

FIG. 31

| | |
|---|---|
| 0 | WORK BYTE |
| 1 | WORK BYTE |
| 2 | 1 1 0 1 UC DE UE |
| 3 | QUEUE |
| 4 | |
| 5 | DATA ADDRESS |
| 6 | |
| 7 | ERROR CODE |
| 8 | |
| 9 | IOB ADDRESS |
| A | |
| B | IOB LENGTH |
| C | #OF TRANSMISSION BLOCKS |
| D | TRANSMISSION BLOCK SIZE |
| E | |
| F | IOB RECEIVE BUFFER ADDRESS |
| 10 | |
| 11 | WORK AREA |
| 12 | |
| 13 | TIME DELAY |
| 14 | |
| 15 | WORK AREA |
| 16 | |

| | |
|---|---|
| 00 | 0  1  0  0  UC |
| 01 | ADD  MDFY ADD  READ |
| 02 | GET TIME/DATE  MEMORY SIZE |
| 03 | DATA ADDRESS |
| 04 | |
| 05 | ERROR CODE |
| 06 | LOCAL SATELLITE |
| 07 | BINARY LOGICAL RECORD OFFSET |
| 08 | |
| 09 | BINARY # OF TRANSMISSION BLOCKS |
| 0A | 5 CHAR DATA SET NAME (5 BYTES) |
| 0E | |
| 0F | STORE/REGISTER NUMBER (6 DIGITS) |
| 14 | |
| 15 | TRANSMISSION BLOCK SIZE (2 BYTES) |
| 16 | |
| 17 | RESERVED (3 BYTES) |
| 19 | |

| | | | | | | | | |
|---|---|---|---|---|---|---|---|---|
| 00 | 1 | 1 | 1 | 0 | UC | | | |
| 01 | | INHIBIT DISK RESET | CANCEL | | | WRITE | READ | SYNC |
| 02 | | INHIBIT CS | | | | | MEDIA CLUSTER RESTART | H FORMAT |
| 03–04 | DATA ADDRESS | | | | | | | |
| 05 | ERROR CODE | | | | | | | |
| 06 | | MEDIA 2D | | | | | DISK IN | |
| 07–08 | WORK AREA ADDRESS | | | | | | | |
| 09–0A | BINARY LOGICAL RECORD OFFSET | | | | | | | |
| 0B | BINARY # OF LOGICAL RECORDS | | | | | | | |
| 0C–10 | 5 CHARACTER DATA SET NAME OR BINARY BOE (5 BYTES) | | | | | | | |
| 11–13 | BINARY EOD (3 BYTES) | | | | | | | |
| 14–16 | BINARY EOE (3 BYTES) | | | | | | | |
| 17–19 | DISK ERROR LOCATION (CCHHRR) | | | | | | | |

FIG. 32

| | | | | | | | | |
|---|---|---|---|---|---|---|---|---|
| 0 | 0 | 0 | 0 | 1 | UC | | DE | UE |
| 1 | ALARM | UPDATE DISPLAY 1 | UPDATE DISPLAY 2 | FLASH DISPLAY | UPDATE PROMT | READ HARD CTR | WRITE HARD CTR | UPDATE TIME |
| 2 | BUFFER RESET | SINGLE KEY MODE | | ENABLE KYBD | ENABLE HALF-PENCE | ENABLE DEC PT | INHIBIT DISPLAY | |
| 3–4 | DATA ADDRESS | | | | | | | |
| | ERROR CODE | | | | | | | |
| 6 | | | | HALF PENCE | | SEC LOCK STATUS | | |
| 7 | MACHINE MODEL | | | | MEMORY SIZE | | | |
| 8 | HARD CTR | WAND | | | | | | |
| 9 | DRUM PROMPT POSITION | | | | | | | |
| A | DECIMAL POINT POSITION | | | | | | | |
| B | AMT DUE | SUB TOTAL | CHANGE | REFUND | COMMU-NICATE | | | |
| C | 1 | 1 | 1 | 1 | TIME (HOURS) | | | |
| D | 1 | 1 | 1 | 1 | TIME (HOURS) | | | |
| E | 1 | 1 | 1 | 1 | TIME (MIN) | | | |
| F | 1 | 1 | 1 | 1 | TIME (MIN) | | | |

FIG. 33

| | | | | | | | | |
|---|---|---|---|---|---|---|---|---|
| 0 | 0 | 0 | 0 | 1 | UC | | DE | UE |
| 1 | ALARM | UPDATE DISPLAY 1 | UPDATE DISPLAY 2 | FLASH DISPLAY | UPDATE PROMPT | | | UPDATE TIME |
| 2 | BUFFER RESET | SINGLE KEY MODE | | ENABLE KYBD | HALF PENCE DISPLAY | ENABLE DEC PT | INHIBIT DISPLAY | |
| 3 | DATA ADDRESS | | | | | | | |
| 4 | | | | | | | | |
| | ERROR CODE | | | | | | | |
| 6 | | | | HALF PENCE | | SEC LOCK STATUS | REPETI-TIVE ALARM | WAIT FOR ACTION CODE KEY |
| 7 | MACHINE MODEL | | | | MEMORY SIZE | | | |
| 8 | | WAND | | | | | | |
| 9 | DRUM PROMPT POSITION | | | | | | | |
| A | DECIMAL POINT POSITION | | | | | | | |
| B | AMT DUE | SUB TOTAL | CHANGE | REFUND | COMMU-NICATE | | | |
| C | 1 | 1 | 1 | 1 | TIME (HOURS) | | | |
| D | 1 | 1 | 1 | 1 | TIME (HOURS) | | | |
| E | 1 | 1 | 1 | 1 | TIME (MIN) | | | |
| F | 1 | 1 | 1 | 1 | TIME (MIN) | | | |

FIG. 34

| | | | | | | | | |
|---|---|---|---|---|---|---|---|---|
| 0 | 0 | 0 | 1 | 0 | UC | | DE | UE |
| 1 | | EJECT | AUTO INSERT | MANUAL INSERT | | PRINT DOC OR R | PRINT JR | USE 2 BUFF |
| 2 | OPEN DRAWER 1 | OPEN DRAWER 2 | | | | | | REC |
| 3 | DATA ADDRESS | | | | | | | |
| 4 | | | | | | | | |
| 5 | ERROR CODE | | | | | | | |
| 6 | CELL A | CELL B | INSERT ATTEMPT | DRAWER STATUS | | | | REC'Y REQ'D |
| 7 | # OF SPACES FOR RECEIPT/SALES SLIP | | | | | | | |
| 8 | # OF SPACES FOR JOURNAL | | | | | | | |
| 9 | FIRST LINE REGISTRATION | | | | | | | |

FIG. 35

RECONFIGURABLE CLUSTER OF DATA-ENTRY TERMINALS

DESCRIPTION

1. Technical Field

This invention relates to data-entry terminals, and more particularly relates to a cluster configuration of data-entry terminals which may be reconfigured in various configurations without the requirement of changing of physical cabling between the terminals.

2. Background Art

Various systems utilizing a plurality of data-entry terminals have been heretofore developed which enable the entry of data for data processing from a plurality of different locations. For example, prior systems have utilized a plurality of point-of-sale terminals in a retail store environment to enable sales data to be entered at a plurality of locations about a retail establishment. In such prior point-of-sale systems, the terminals have often been connected to a common data bus and the data directed to a common computer host which may be located at the retail establishment or at a remote location. Such systems are relatively bulky and expensive due to the requirement of a large and complex separate host data processing computer.

In order to eliminate the requirement of a separate on-line host data processing computer, systems have been previously developed utilizing magnetic storage cassettes which are used to record sales data from a plurality of terminals. Normally, in such a system, one of the terminals is designated a master terminal and data from the remaining terminals is applied through the master terminal for recording on the magnetic tape cassette. The cassette may then be subsequently removed and taken to a remote location for subsequent processing.

In point-of-sale terminal systems, it is necessary to perform arithmetic operations on sales data with the use of various function programs. In one type of point-of-sale system using a magnetic tape cassette, function programs for operating on point-of-sale data are permanently stored in non-volatile memories in each of the terminals. In another type of such prior systems, function programs are input into each of the terminals at the beginning of the day when the system is powered up. In both types of prior systems, there has been a requirement for storage in each of the terminals for function programs which are required to be executed during operation of the terminals. Such prior systems have thus required a plurality of separate storage facilities in each point-of-sale terminal to provide the desired operations.

Moreover, such prior multiple terminal point-of-sale systems have not been completely satisfactory with respect to ease of adaptability to various desired configurations and have not been easily changeable in configuration to accommodate breakdown of one or more portions of the system. For example, in such prior systems, in order to change the inter-connection of a master terminal in the system, extensive cable rearrangements or line switching changes have generally been required.

A need has thus arisen for a point-of-sale data-entry terminal system wherein the data-entry terminals are self-contained in unitary portable housings without the requirement of additional data recording housing and the like. A need has also arisen for a point-of-sale data terminal wherein permanent storage for function programs is not required for each terminal, and wherein the configuration of the system may be easily reconfigured without the requirement of cable rearrangement or line switching. A need also exists for a point-of-sale data-entry terminal system wherein primary bus control and central storage may be easily changed from one terminal to another to provide backup in case of a malfunction. Such changeover should be by simple operator action at the terminal keyboard instead of extensive cable rearrangement or line switching.

In accordance with the present invention, a reconfigurable clustered system of data-entry terminals includes a plurality of physically separate data-entry terminals. Each of the terminals includes entry and display structure for communicating data between an operator and the terminal, along with a processor for operating upon data input to the terminal. A communications link is coupled between the terminals to form a data-entry cluster. One or more of the terminals are media terminals, and includes circuitry for potentially controlling the flow of data via the communications link and also for providing central storage for potential data input between all terminals in the cluster. Circuitry is responsive to operation of the entry structure to designate any one of these terminals as a primary terminal which actually controls data flow on the link and storage in its own central storage. A media terminal which is not at the moment a primary terminal is called a secondary (or backup) terminal. A secondary terminal appears to the current primary terminal as though it were a satellite terminal: i.e., a terminal which does not have central storage or data-control circuitry. Any media terminal can be designated as the primary terminal of the cluster from its own entry means without changing the physical configuration of the data-entry cluster.

In accordance with another aspect of the present invention, a reconfigurable clustered system of data-entry terminals includes a communications link. A plurality of physically separate data-entry terminals are coupled to the link in the cluster. Each of the terminals includes a programmable processor for transferring data and programs over the communications link. Each of the terminals also includes entry devices for communicating information between an operator and the programmable processor. At least two of the terminals are designated media terminals and each includes storage capability for containing both data from the terminals and programs for all of the terminals in the cluster. Selection circuitry is provided to designate any one of the media terminals as a primary media terminal, such that all other terminals in the cluster, including others of the media terminals, exchange both data and programs with the primary media terminal. The selection circuitry is operable to designate different ones of the media terminals as the primary media terminal without any physical reconfiguration of the cluster of terminals.

In accordance with another aspect of the present invention, a reconfigurable clustered system of data-entry terminals includes a plurality of self-contained data-entry terminals, each having entry devices for allowing the input of data by an operator. Each of the terminals further includes a programmable processor for operating upon data input into the terminal according to a plurality of operator selectable programs. A communications link is coupled between the terminals to form a data-entry cluster. One of the terminals is designated a primary media terminal and includes an additional programmable processor and storage for storing the programs. The additional programmable processor is operable to control the reception of data from each of the terminals over the link for storage in the storage. The additional programmable processor is further operable to control the transfer of programs from the storage over the link to each of the terminals when requested by the terminals.

In accordance with yet another aspect of the present invention, the data-entry terminal includes a housing having a keyboard for the entry of data and for the selection of functions by an operator. A display is provided on the housing for displaying information to the operator. A first programmable processor is included for operating upon the data under the control of selected function programs. A first storage is operable in conjunction with the first processor for storing data. A second programmable processor is provided to control the transfer of data from the first storage. A second storage is associated with the second programmable processor for storing data transmitted from the first storage and for storing function programs. The second programmable processor is operable to transfer function programs from the second storage to the first storage to enable operation on the data with the function programs by the first processor.

In accordance with yet another aspect of the invention, a method of data-entry through a plurality of physically separate data-entry terminals includes coupling the data-entry terminals in a cluster with a communications link. Data is received at each of the data-entry terminals through data-entry devices. Data is transferred over the communications link to a designated primary terminal for central storage of the data. The designated primary terminal may be selectively changed by operation of the data-entry device while maintaining the configuration of the cluster.

BRIEF DESCRIPTION OF DRAWINGS

For a more detailed description of the present invention and for other objects and advantages thereof, reference is made to the following description, taken in conjunction with the accompanying drawings, in which:

FIG. 30 illustrates the control block for the secondary intermachine adapter I/O control subroutine;

FIG. 31 illustrates the control block for the virtual file IOB subroutine;

FIG. 32 illustrates the control block for the local satellite disk IOB subroutine;

FIG. 33 illustrates the control block for the keyboard/display I/O control subroutine;

FIG. 34 illustrates the control block for the virtual keyboard/display I/O control subroutine; and FIG. 35 illustrates the control block for the printer I/O control subroutine.

DESCRIPTION OF THE PREFERRED EMBODIMENT

Figure 1:
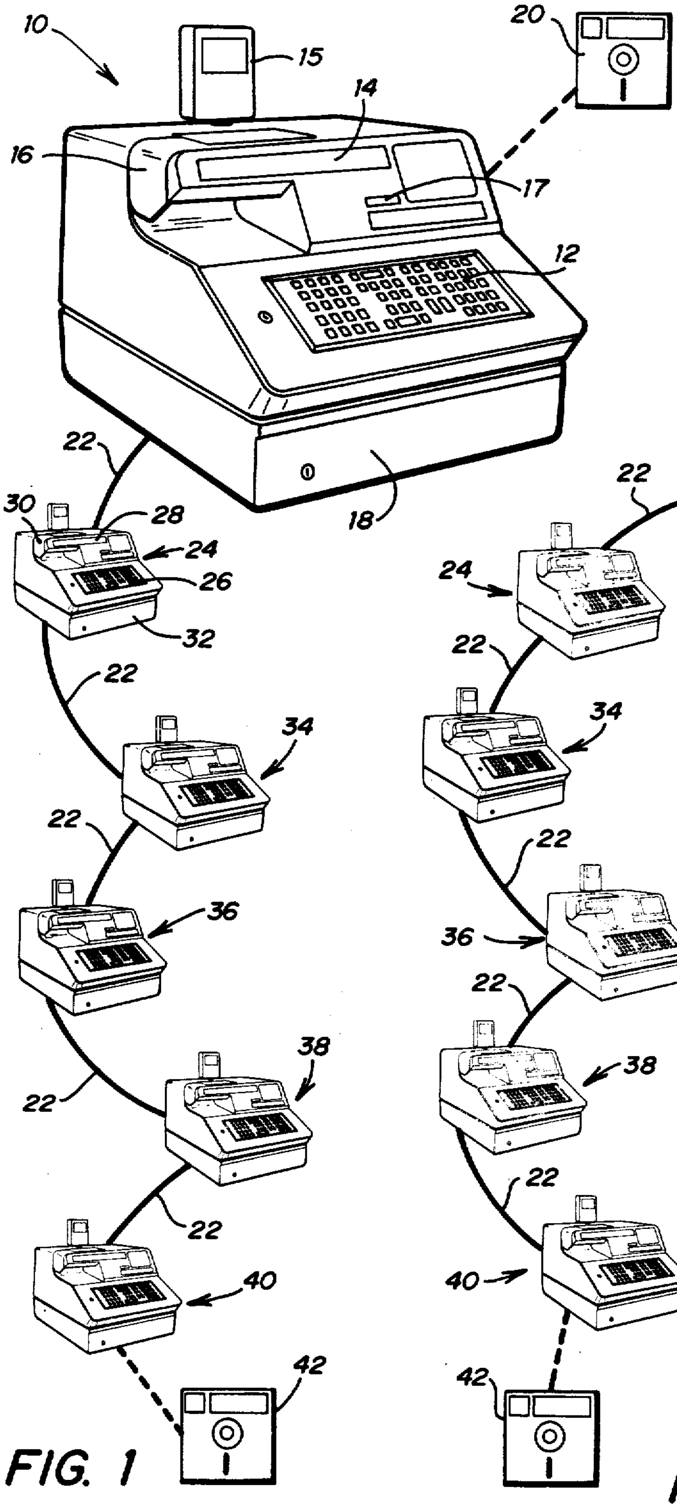
FIG. 1 is a somewhat diagrammatic illustration of one configuration of the present data-entry point-of-sale terminal system utilizing a single media terminal and a plurality of serially connected satellite terminals.

FIG. 1 illustrates a configuration of the present system. A primary media terminal 10 is a data entry terminal configured for use as a point-of-sale terminal in a retail store environment or the like. Media terminal 10 includes a keyboard 12 and a display 14 to display entered data, computed data and instructional prompts to the operator. A customer display 15 displays total data and the like to the customer. Media terminal 10 also includes a printer 16 to print various point-of-sales data for both the operator and the customer. For more detailed information on the construction and operation of the printer 16, reference is made to the copending patent application Ser. No. 948,860, entitled "Shared Document Feed Station", by Theodore H. Anderson, Wallace E. Beuch and Richard E. Lagergren, assigned to the assignee of the present application and filed on Oct. 5, 1978.

An operator guidance or prompt display 17 comprises a rotatable drum for displaying various guidance commands to the operator. A cash register drawer 18 is normally utilized in conjunction with the media terminal 10 to enable deposit of cash, the making of change and the like. A storage diskette unit 20 is incorporated in the housing of the media terminal 10 and is shown in FIG. 1 in a diagrammatic manner. The diskette unit 20 utilizes a conventional thin circular storage diskette which may be selectively inserted and removed from the media terminal 10. Diskette unit 20 may comprise, for example, either the IBM Diskette 1 or Diskette 2D manufactured and sold by the assignee of the present application. Diskette 1 is in the 128-character format and can store 242,944 characters of data.

A twin axial bus or cable 22 connects the primary media terminal 10 with a satellite terminal 24 for bit-serial data transfer. Satellite terminal 24 is housed in a similar housing as media terminal 10 and also includes a keyboard 26, a display 28, a printer 30 and a cash register drawer 32. Satellite terminal 24 is also constructed and operated in a similar manner as media terminal 10, with the exception that the satellite terminal 24 does not include a storage diskette unit.

Similarly, additional satellite terminals 34, 36 and 38 are connected to the twin axial bus 22. Each of the satellite terminals 34–38 are connected identically to the satellite terminal 24.

A backup media terminal 40 is connected at the end of the twin axial bus 22. Conventional terminating resistances, not shown, are normally connected at the primary media terminal 10 and the backup media terminal 40. The backup media terminal 40 is constructed identically to the primary media terminal 10 and includes the capacity to incorporate a diskette 42. However, in the normal operational mode, backup media terminal 40 does not utilize its diskette 42 for storage, and is operated merely as a satellite terminal. Thus, in the normal operational mode, the primary media terminal 10 operates as the primary bus controller and as the data storage center for the system.

As will be subsequently described, in case of malfunction of the primary media terminal 10, the backup media terminal 40 may be simply converted into the primary media terminal for the system and may receive a diskette 42 in order to act as the bus controller and data storage center for the system. The change over of the backup media terminal 40 from a satellite operational mode to a primary media terminal mode may be accomplished by simple operator operations through the keyboard of the backup media terminal 40 and does not require any changing of the twin axial bus 22 configuration of the system and also does not require any line switching of the system.

In operation of the system shown in FIG. 1, the six terminals shown in FIG. 1 are dispersed throughout a retail sales location. Various sales personnel can enter sales data into the system via the keyboards of the various terminals. Various calculations may be made by the system and displayed on the displays of the terminals, such as sales tax computations, discount computations, credit information, arithmetic computations and the like.

Data entered into the satellite terminals is temporarily stored in memory at the satellite terminal. The primary media terminal 10 periodically sequentially polls the various satellite terminals. At polling, a satellite terminal transmits data for permanent storage to the primary media terminal 10 for storage on the diskette 20. The satellite terminals also generate paging requests for various function or application programs and data tables to the primary media terminal 10. For example, if a satellite terminal is operating in a sales mode and the operator desires to transfer to a total readout mode, the satellite terminal requests the function program to accomplish the total readout mode from the primary media terminal 10. The requested program is then obtained from a library of programs and tables stored on the same diskette 20 and transmitted to the requesting satellite terminal for storage in the satellite terminal's memory. A desired total readout function is then performed at the satellite terminal.

The present system thus provides a single storage medium for the entire system which may be periodically removed (or transmitted by conventional teleprocessing means) to enable storage and processing of the sales data from the entire point-of-sale terminal system in a larger, host data processor. Various different functions and additional capabilities may be easily input into the system by insertion of differently programmed diskettes.

If it is desired to transfer control of the system from the primary media terminal 10 to the backup media terminal 40 due to a malfunction or the like, the diskette 20 may be removed from the primary media terminal 10 and inserted into the backup media terminal 40. Through simple instructions entered through the keyboard of the backup media terminal 40, bus control and data storage of the entire system is then transferred to the backup media terminal 40.

Although five satellite terminals have been illustrated with the present invention, it will be understood that greater or smaller numbers of satellite terminals may be utilized in order to provide a great amount of flexibility of the size of the present system. In addition, it will be recognized that any media terminals of the invention may be used as stand alone terminals without any satellite terminals.

Figure 2:
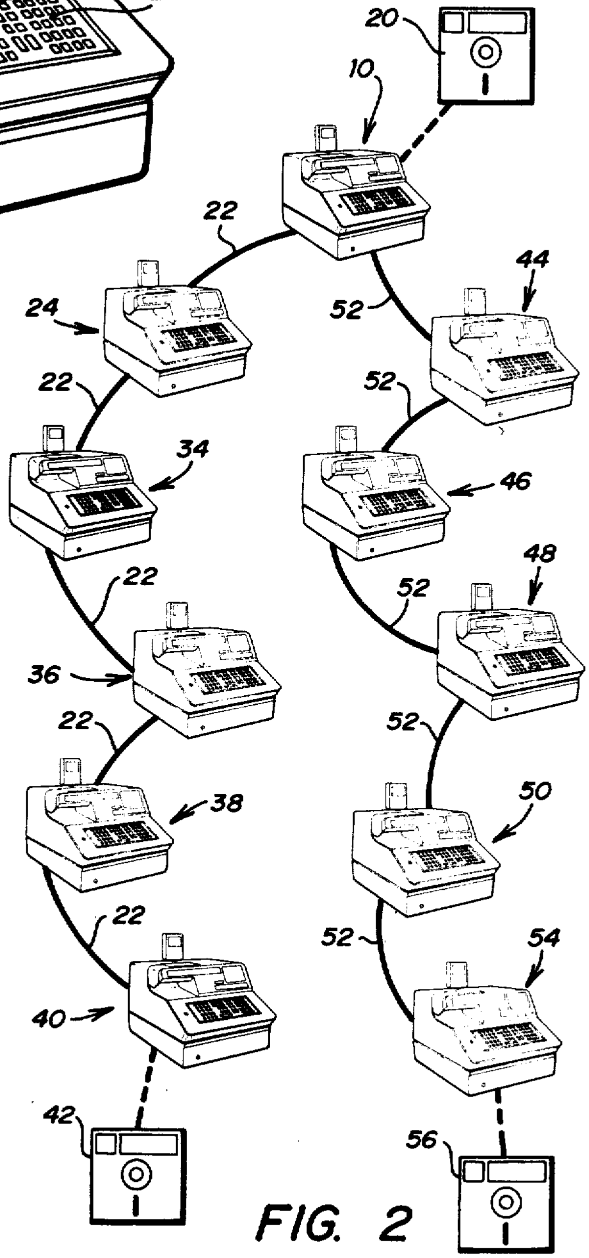
FIG. 2 is a somewhat diagrammatic illustration of a second configuration of the present invention utilizing a primary media terminal interconnected to two links of satellite terminals, each link including a backup media terminal operating as a satellite.

FIG. 2 illustrates a system similar to that shown in FIG. 1 but with expanded capability. Like numerals are utilized in FIG. 2 for like and corresponding parts previously identified in FIG. 1. Thus, it may be seen that the system includes a first link identical to the link shown in FIG. 1 and comprising a primary media terminal 10, four satellite terminals 24, 34, 36 and 38 and a backup media terminal 40. The primary media terminal 10 includes a diskette 20. The backup media terminal 40 also includes a diskette 42 which is not used in normal backup operations.

In addition to the link thus described, FIG. 2 also includes a second link comprising satellite terminals 44, 46, 48 and 50 which are interconnected along a twin axial bus 52. A second backup media terminal 54 is connected at the end of the twin axial bus 52 and includes a diskette 56. In normal operation, the primary media terminal 10 serves as the bus controller and storage medium for the satellite terminals 44–50 and also for the backup media terminal 54 which acts as a satellite terminal. If a malfunction occurs in the primary media terminal 10, the backup media terminals 40 and 54 may be actuated and utilized as primary media terminals to control their respective satellite terminals.

Figure 3:
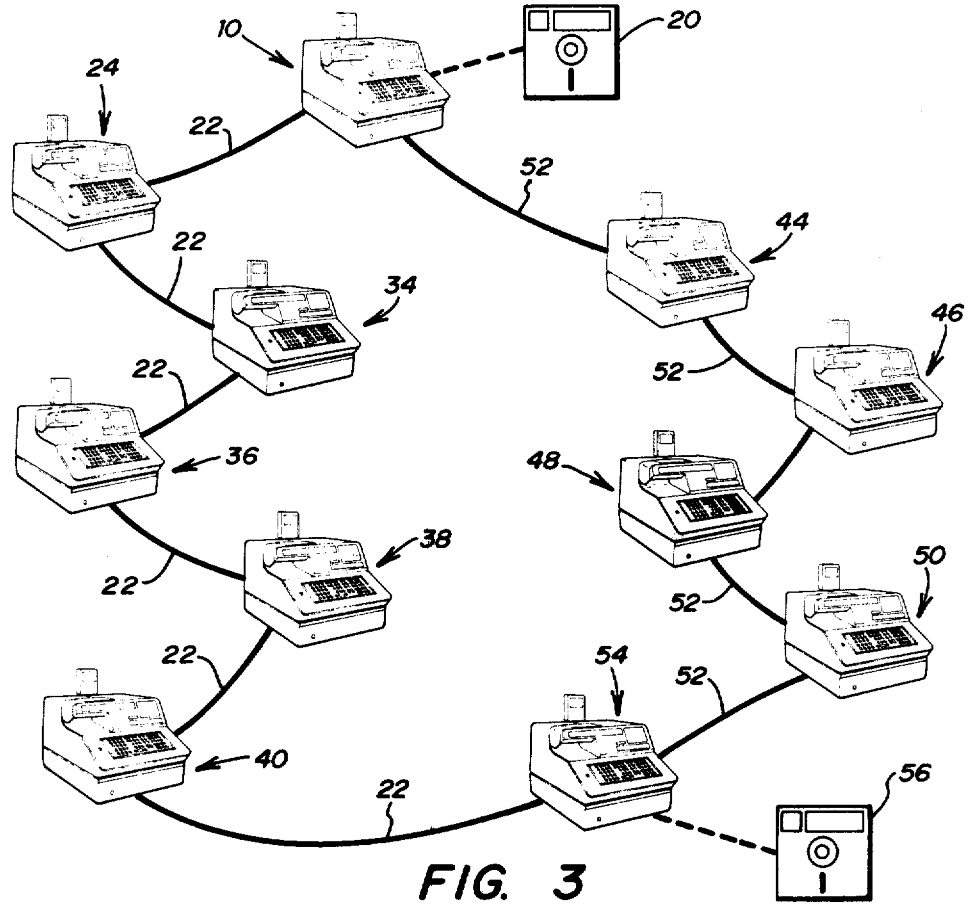
FIG. 3 is a somewhat diagrammatic illustration of another configuration of the present invention including a primary media terminal connected to two links of satellite terminals and including a backup media terminal operating as a satellite terminal and interconnected to both links.

FIG. 3 illustrates yet another system configuration of the present invention, with like numerals being utilized for like and corresponding parts identified in FIGS. 1 and 2. In this configuration, the primary media terminal 10 is connected via twin axial bus 22 with satellite terminals 24, 34, 36, 38 and 40. In this configuration, satellite terminal 40 is not provided with a diskette and thus functions only as a satellite terminal. Primary media terminal 10 includes the diskette 20. Primary media terminal 10 is connected via the twin axial bus 52 with satellite terminals 44, 46, 48 and 50. The backup media terminal 54 is connected to the twin axial bus 52 and also to the twin axial bus 22. In normal operation, the backup media terminal 54 acts as a satellite terminal under the control of the media terminal 10. In case of malfunction of the media terminal 10, the diskette 56 is activated and the backup media terminal 54 is operated as the primary media terminal.

An advantage of the present invention is that all data on a system can be captured on a single diskette even though the primary media terminal malfunctions. In the case of such malfunction, the diskette is merely removed from the primary media terminal and inserted in the backup media terminal. The backup media terminal is then activated through its keyboard to operate as a primary media terminal and additional data is then deposited on the diskette. Thus, all data from the system may be entered on a single diskette even though different media terminals are utilized as the primary media terminal. (In most cases, a suitably initialized diskette may be left in the backup terminal at all times, so that no actual diskette transfer need be made. The host processor then merely splices together the data collected on two different diskettes.)

In operation of one of the terminals of the invention, the operator depresses various keys on the keyboard to request different functions or applications programs and to input data. The display 14 (FIG. 1) is provided, as previously noted, to display the data being entered into the terminal and also to display the resulting computations performed by the system. The prompt display 17 also displays instructions and error code messages to the operator.

Figure 4:
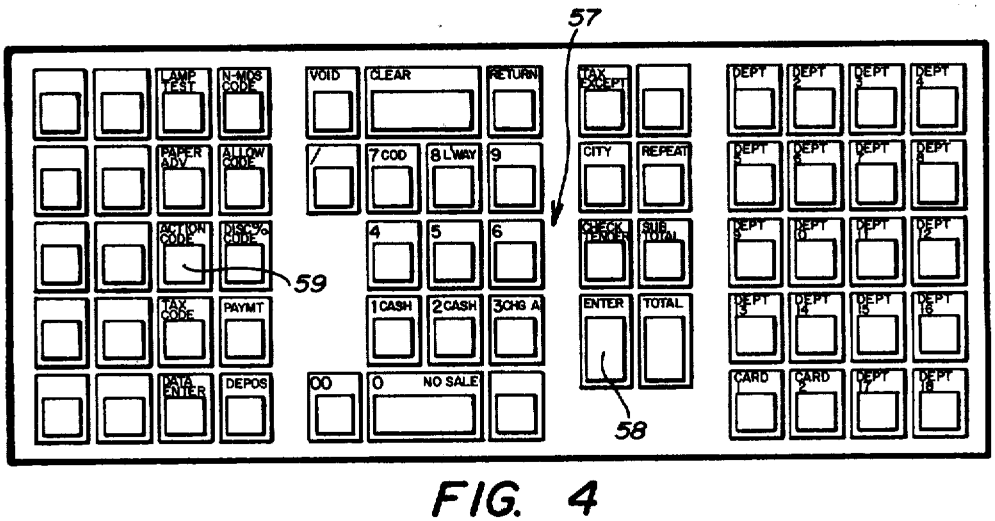
FIG. 4 is a diagram of the keyboard of the present terminal.

FIG. 4 illustrates a typical expanded keyboard for use with the terminal shown in FIGS. 1–3. The keyboard includes a data entry section generally identified by the numeral 57 which comprises a sufficient number of keys for entering digits 0–9. The remaining keys shown in FIG. 4 are function keys in order to command various operating functions in the system. By proper operation of the keyboard shown in FIG. 4, numerical data may be gathered by various transaction accumulators incorporated in the terminals shown in FIGS. 1–3. The transaction accumulators receive numerical data entered through the keyboard shown in FIG. 4 and automatically upgrade the transactional total stored on the machine control totals and the grand totals at the completion of each sales transaction. The accumulated totals thus assist the operator in taking cash and total balances from each terminal during or at the end of a sales period. The transactional accumulator responsive to the keyboard shown in FIG. 4 comprises sales, returns, taxable sales, taxable returns and deposits/payments/accumulators.

To initiate operation in one of the terminals shown in FIG. 1, a prompt instruction appears on the prompt display 17. In response to the prompt information, the operator keys in data through the data keys 57 (FIG. 4). The data appears on the transaction display in a customer transaction display 15 as it is being keyed. The operator then presses one of the function keys in order to enter the data. For example, the operator could depress the enter key 58. If desired, the operator can then press various other of the function keys. Outputs can also be generated for the various accumulators previously noted, or the transaction display, the printer or the transaction log on the diskette. After the selected operation, the next prompt appears on the prompt display 17 in order to instruct the operator on the next steps to be followed.

As noted, an important aspect of the present invention is the ability to quickly and simply change one of the satellite terminals into the primary media terminal by operation through the keyboard and without the requirement of changing cabling. To describe such changeover operation, assume that the media terminal 40 shown in FIG. 1 was being operated in the secondary or satellite mode and that the media terminal 10 was being operated in the primary mode. Assume that an operator is using the terminal 40 in a sales transaction. If an amount due is displayed on the terminal's display, the customer is about to tender the amount due to the operator. If at this time the primary media terminal 10 has a malfunction, the terminal 40 may be easily changed into the primary media mode by pressing the action code key "59" (FIG. 4). After the operator depresses the 9 data key, the display 14 would then display the sequence PO91. This sequence prompts the operator to enter the operational mode desired for the satellite terminal. The operator may then key in a 1, 2 or 3 in order to select primary mode, secondary mode or stand alone mode. Since the terminal was operating in secondary mode, the operator would depress 1 to request the primary mode and would then press the enter key 58. At that time, the terminal 40 would begin operation in the primary mode and would become the primary media station for the system shown in FIG. 1. The amount due which was originally displayed on the display of the satellite terminal would return so that the operator could continue the transaction being entered when an interruption occurred.

Another aspect of the present invention is that the operator has the ability to select the operational mode of the terminal when any of the terminals are first powered on. Upon initial powering up of the terminals 10 and 40 as shown in FIG. 1, the display 14 displays a P711. This prompts the operator to select the desired operational mode 1, 2, or 3 for the terminals. The operator then depresses the desired key to select the mode. Finally, the "enter" key 58 is depressed.

Figure 5:
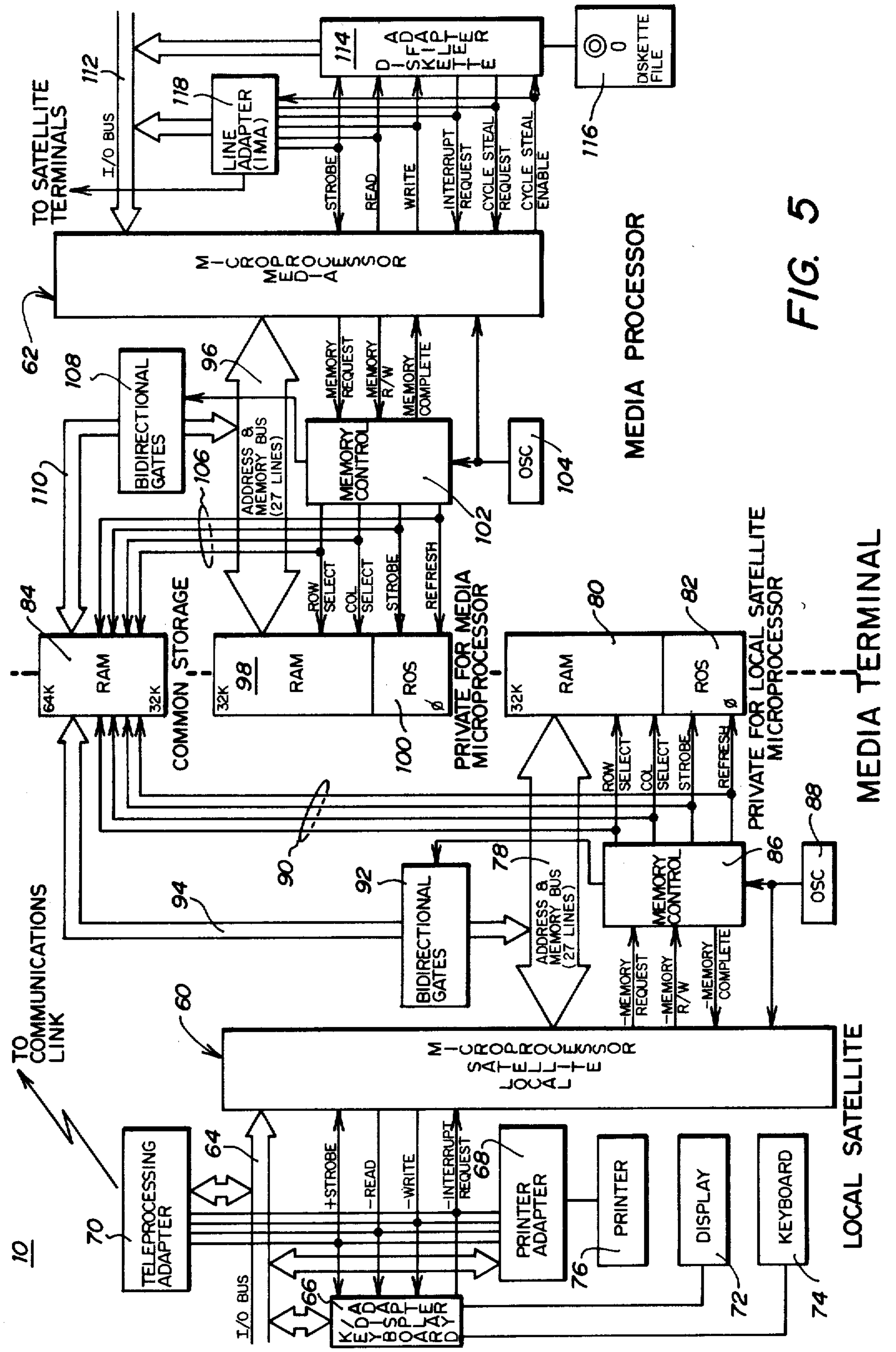
FIG. 5 is a block electrical diagram of a media terminal according to the present invention.

FIG. 5 is a block electrical diagram of the primary media terminal 10. As will be subsequently described, an important aspect of the present invention is that the primary media terminal 10 includes two separate microprocessor circuits which share common memory. The data flow in operation of the media terminal 10 is determined by whether the media terminal 10 is being operated in the primary mode as a primary media terminal or whether the media terminal 10 is being operated in a secondary mode as a backup media terminal or satellite terminal.

Referring to FIG. 5, media terminal 10 may be seen to include a local satellite microprocessor 60 and a media microprocessor 62. Both of these microprocessors may be of conventional design. It is within the skill of the art to map the specific features described herein into the bus and control configurations of other microprocessor architectures. The local satellite microprocessor 60 includes an I/O bus 64 on which are hung a keyboard/display adapter 66, a printer adapter 68 and a teleprocessing adapter 70. The keyboard/display adapter 66 also is connected to terminals of the microprocessor 60 through strobe, read, write and interrupt request lines. The keyboard/display adapter 66 operates to drive a display 72 of the media terminal 10 and a keyboard 74 of the media terminal 10.

The printer adapter 68 is also connected to the strobe, read, write and interrupt request lines of the local satellite microprocessor 60 and serves to drive the I/O printer of the terminal 10 and the printer 76 of the terminal 10. The teleprocessing adapter 70 is also connected to the strobe, read, write and interrupt request lines and serves to enable teleprocessing of the data stored within the media terminal 10 via conventional binary synchronous teleprocessing techniques to a remote location.

The local satellite microprocessor 60 is connected to a random access read/write storage (conventionally denoted by the misnomer "RAM") 80 and a read only storage (ROS) 82 via an address and memory bus 78. Address and memory bus 78 comprises 27 lines.

The RAM 80 and ROS 82 provide storage capability for the local satellite microprocessor 60 at byte addresses 0 to 32K. The RAM 80 and ROS 82 provide private storage capability for the local satellite microprocessor 60.

Additional storage for the local satellite microprocessor 60 is also provided by a RAM 84 which provides storage from addresses 32K to 64K. As will be subsequently described, this storage is shared with the media microprocessor 62.

A memory control 86 receives memory requests and memory read/write signals from the local satellite microprocessor 60. Memory complete signals are applied from the memory control 86 to the local satellite microprocessor 60. An oscillator signal is provided from an oscillator 88 to both the local satellite microprocessor 60 and the memory control 86. The output of the memory control 86 generates row select, column select, strobe and refresh signals which are applied to the RAM 80 and the ROS 82. The row select, column select, strobe and refresh signals are also applied via leads 90 to RAM 84. Control of address and memory exchanged between the address and memory bus 78 and the RAM 84 is controlled by bidirectional gates 92 which control the passage of data on a bus 94.

An address and memory bus 96 extends from the media microprocessor 62 to a private media storage including a RAM 98 and a ROS 100. This private storage provides storage from 0 to 32K for the media microprocessor 62. A memory control circuit 102 receives memory requests and memory read/write signals from the media microprocessor 62 and generates a memory complete signal thereto. An oscillator 104 generates oscillator signals which are applied to both the media microprocessor 62 and to the memory control circuit 102. The memory control circuit 102 generates a row select, column select, strobe and refresh signals to the RAM 98 and ROS 100. Additional common storage is provided for the media microprocessor 62 by use of the RAM 84. Row select, column select, strobe and refresh signals are generated via leads 106 from the memory control circuit 102 to the RAM 84. Bidirectional gates 108 control data flow through a data bus 110 to the common storage RAM 84. RAM 84 provides additional storage for the media microprocessor 62 from 32K to 64K.

The media microprocessor 62 includes an I/O bus 112 on which is hung a diskette file adapter 114. A diskette file 116 is controlled by the diskette file adapter 114 to provide diskette storage for the system. Diskette file 116 may comprise, for example, an IBM Diskette 1 or IBM Diskette 2-D described in U.S. Pat. No. 3,668,658. A line adapter (IMA) 118 also is connected to the I/O bus 112. Line adapter 118 provides line synchronization between the media station and the satellite terminals connected by the twin axial bus shown in FIGS. 1-4. In addition, the line adapter 118 handles the satellite polls, to be subsequently described, generated by the media station to the satellite terminals. Line adapter 118 provides parity reset commands and generates interrupt requests for other commands from the media station. The line adapter 118 can transmit or receive data in either direction upon appropriate command.

Both the diskette file adapter 114 and the line adapter 118 generate strobe, interrupt request and cycle steal request signals to the media microprocessor 62. The media microprocessor 62 applies read, write and cycle steal enable signals to both the diskette file adapter 114 and the line adapter 118 as illustrated.

As will be subsequently described in greater detail, the microprocessors 60 and 62 of the media terminal 10 shown in FIG. 5 enable operation in either primary or secondary modes. When the media terminal 10 shown in FIG. 5 is operating in the primary mode, the media microprocessor 62 provides bus control and data transfer from the satellite terminals. The media microprocessor 62 also handles paging requests from the primary media terminal 10 to the satellite terminals and functions to request data to be stored in the diskette file 116. The media microprocessor 62 also handles requests for data tabled from the satellite terminals.

For example, if a satellite terminal desires to change mode and go from sales mode to a total readout mode, the function program to accomplish the total readout mode is located in the diskette file 116. When this program is requested by the satellite terminal, the program is transmitted from the diskette file 116 under the control of the media microprocessor 62 to the satellite terminal. The total readout function would then be performed at the satellite terminal and the satellite terminal could then request another function such as the sales program back to provide additional sales program functions.

When the media station shown in FIG. 5 is operating in the secondary mode, data received from the keyboard 74 is temporarily stored under the control of the local satellite microprocessor 60 in the RAM 80 and RAM 84. Polled data is then transferred in the manner of a satellite terminal to the primary media terminal for storage in the system's diskette file.

Figure 6:
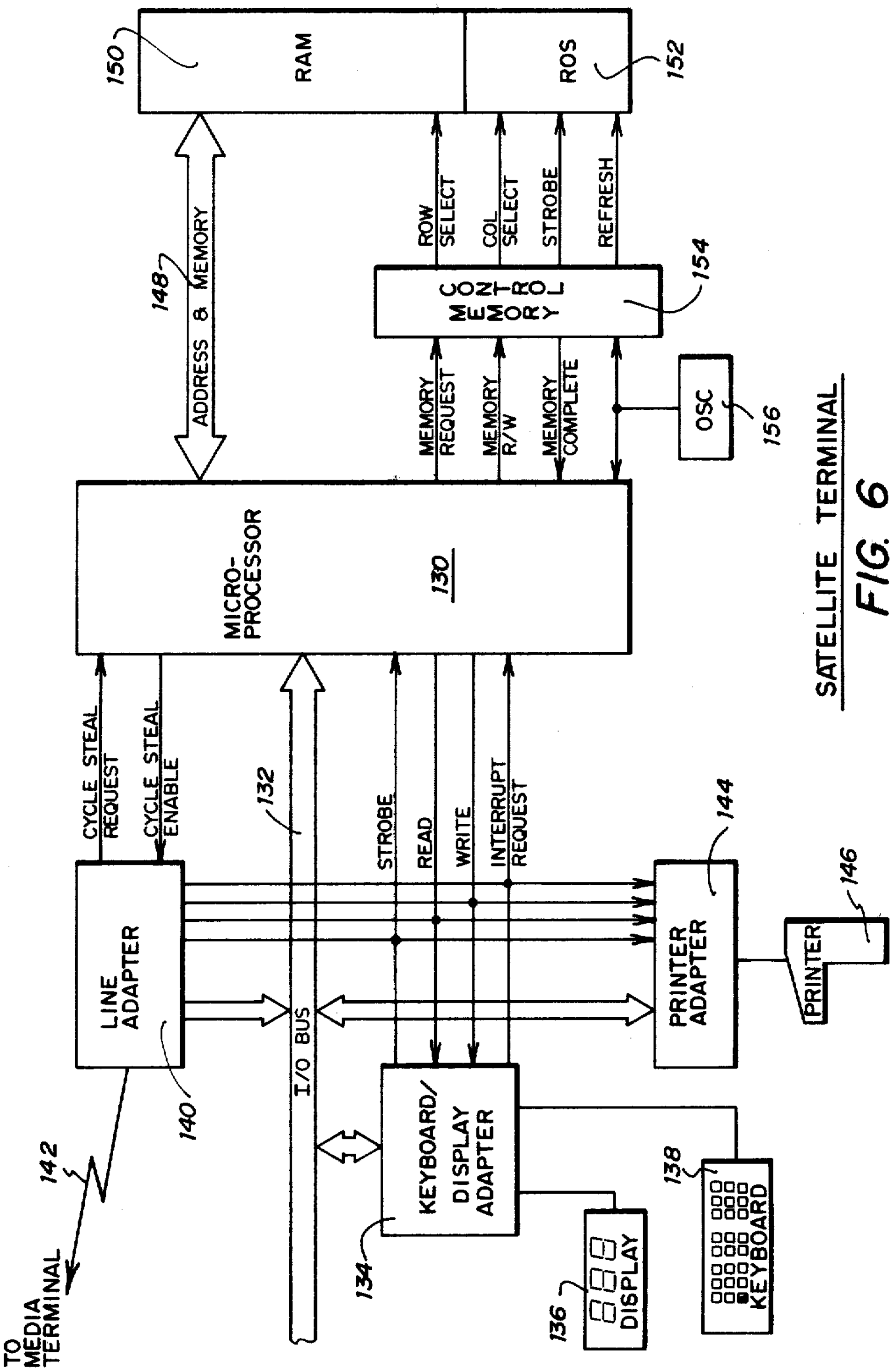
FIG. 6 is a block electrical diagram of a satellite terminal according to the present invention.

FIG. 6 is a block diagram of a typical satellite station or terminal as shown in FIGS. 1-3. The satellite terminal includes a microprocessor 130 including an I/O bus 132. A keyboard/display adapter 134 is connected to the I/O bus 132 which supports an LED display 136 and a keyboard 138. The keyboard/display adapter 134 generates strobe and interrupt request signals to the microprocessor 130 which in turn supplies read and write signals to the keyboard/display adapter 134 for control of the display 136 and keyboard 138.

A line adapter 140 is connected to the I/O bus 132 and is connected by a twin axial bus 142 to the media terminal and to other satellite terminals in a parallel connection, which is conventionally termed a party-line or multi-drop configuration. A twin axial bus merely refers to a pair of conductors for transmitting a balanced electrical signal. Typically, this type of bus also includes a grounded shield displaced symmetrically about the two conductors. Any other bit-serial communications bus or link, such as coaxial or twisted-pair, would also function in this system. The line adapter 140 is connected via the strobe, read, write and interrupt request signals to the microprocessor 130. The line adapter 140 also functions to generate a cycle steal request signal and to receive a cycle steal enable signal from the microprocessor 130.

A printer adapter 144 is connected to the I/O bus 132 and is operable to control a printer 146. The printer adapter 144 also receives the strobe, read, write and interrupt request signals of the microprocessor 130.

An address and memory bus 148 from the microprocessor 130 is connected to a RAM 150 and ROS 152 to provide storage therefor. A memory control 154 receives a memory request and memory read/write signal from the microprocessor 130. A memory complete signal is applied from the memory control 154 to the microprocessor 130. An oscillator 156 applies a signal to both the microprocessor 130 and the memory control 154.

The memory control 154 applies row select, column select, strobe and refresh signals to the RAM 150 and ROS 152 to control the temporary storage for the microprocessor 130.

The microprocessors 60, 62 and 130 shown in FIGS. 5 and 6 preferably (but not necessarily) comprise digital microprocessors each formed on a single semiconductor chip which directly execute the instruction set of an IBM System/3 Digital Processor. The programs implemented in the microprocessors 60 and 62 of the media terminal 10 and microprocessor 130 of the satellite terminal of the invention are set forth in detail on the program listing written in IBM System/3 Assembly Language which will be subsequently set forth. The functions performed by the microprocessors of the invention could be duplicated with the attached processing instructions on an IBM System/3 Digital Processor.

Figure 7:
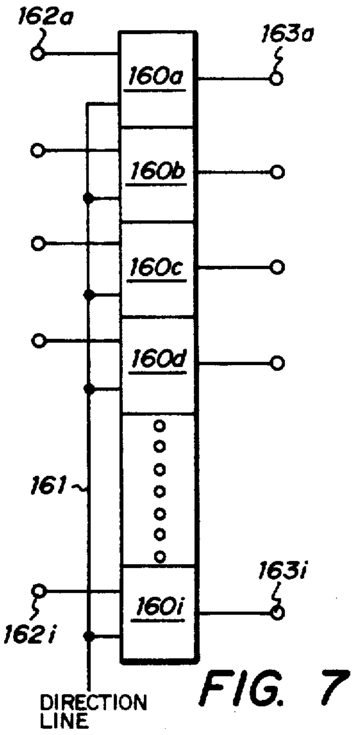
FIG. 7 is a block diagram of the bidirectional gates utilized with the media terminal shown in FIG. 5.

FIG. 7 illustrates a block diagram of the bidirectional gates 92 and 108 utilized to control the storage of data in the common storage RAM 84 in the media terminal 10 of FIG. 5. The bi-directional gates comprise nine gate stages 160*a–i*. A common direction line terminal 161 is connected to control the signal direction provided by the gate stages 160*a–i*. Each gate stage 160*a–i* is provided with a first terminal 162*a–i* and a second terminal 163*a–i*, respectively. These terminals may serve as either input or output terminals depending upon the level applied to the direction line 161.

Figure 8:
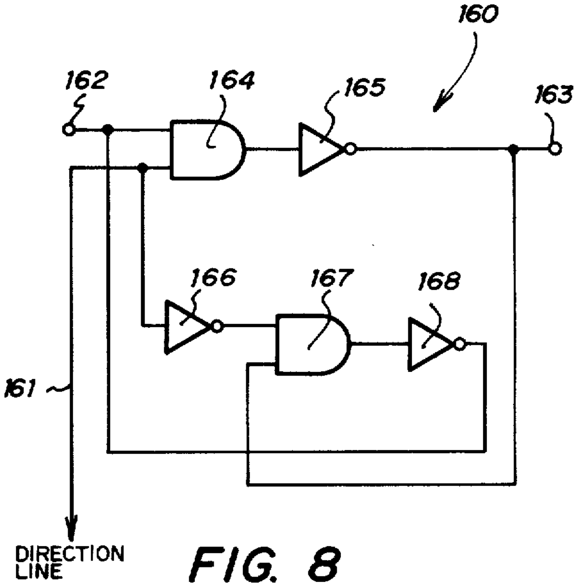
FIG. 8 is a schematic electrical diagram of one stage of the bidirectional gate shown in FIG. 7.

FIG. 8 is a schematic diagram of one of the bidirectional gate stages 160*a–i* shown in FIG. 7. The directional line 161 is illustrated as being applied to one input of an AND gate 164. Terminal 162 is applied as a second input to gate 164. The output of gate 164 is applied through an inverter 165 to terminal 163. The direction line 161 is also applied through an inverter 166 as an input to an AND gate 167. The output of gate 167 is applied through an inverter 168 back to terminal 162. Terminal 163 is connected as an input to an AND gate 167. It will thus be seen that the bidirectional gate stage shown in FIG. 8 enables transfer of data to and from the common storage RAM 84 (FIG. 5) depending upon the direction signal applied to the direction line 161.

Figure 9:
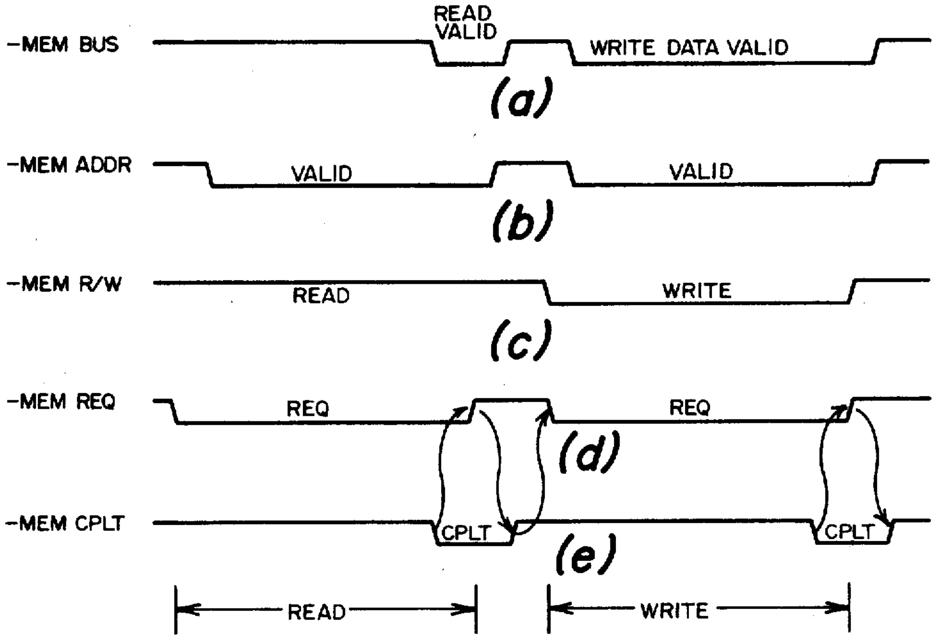
FIGS. 9*a–e* illustrate waveforms indicating the operation of the storage channel for the media terminal shown in FIG. 5.

FIGS. 9*a–e* illustrate various control signals associated with the memory controls 86, 102 (FIG. 5) and memory control 154 (FIG. 6). FIG. 9*a* illustrates the waveforms appearing on the address and memory buses 78 and 96. FIG. 9*b* illustrates the memory address signal, while FIG. 9*c* illustrates the memory read/write signal. FIG. 9*d* illustrates the memory request signal, while FIG. 9*e* illustrates the memory complete signal. The first one-half portion of the waveforms in FIGS. 9*a*–9*e* illustrate the completion of a read cycle. The remaining one-half portion of the waveform illustrates a write cycle.

The operation of the storage channel illustrated by FIGS. 9*a–e* may thus be apparent by referral to the waveforms. In storage read and write operations, the storage address, write data, memory request, and R/W control lines are presented simultaneously. Some skew may be apparent due to circuit delays. Memory control circuits initiate a storage cycle some time later. The microprocessor then waits until a memory complete signal is returned from the memory control circuits. The microprocessor then accepts the byte from the storage or assumes the write operation is complete. The oscillator applied to the memory controls is provided for storage clocking. The memory request, memory read/write and memory complete lines are DC interlocked. In operation, the memory request causes the memory complete line to be activated when the storage is physically complete. This in effect causes the memory request line to go inactive which allows the memory complete line to go inactive. This inactive memory complete line is utilized as a signal to tell the microprocessor to make a new memory request to the storage.

The instruction for the memory controls 86 and 102 is conventional and comprises a series of gates constructed in a well known priority select circuit. The priority select circuits receive common store requests and in response thereto operate the bidirectional gates 92 and 108 in order to selectively utilize the common storage provided by the RAM 84. If an address outside the range of the common storage is requested, the private storage associated with each microprocessor 60 and 62 is utilized.

Figure 10:
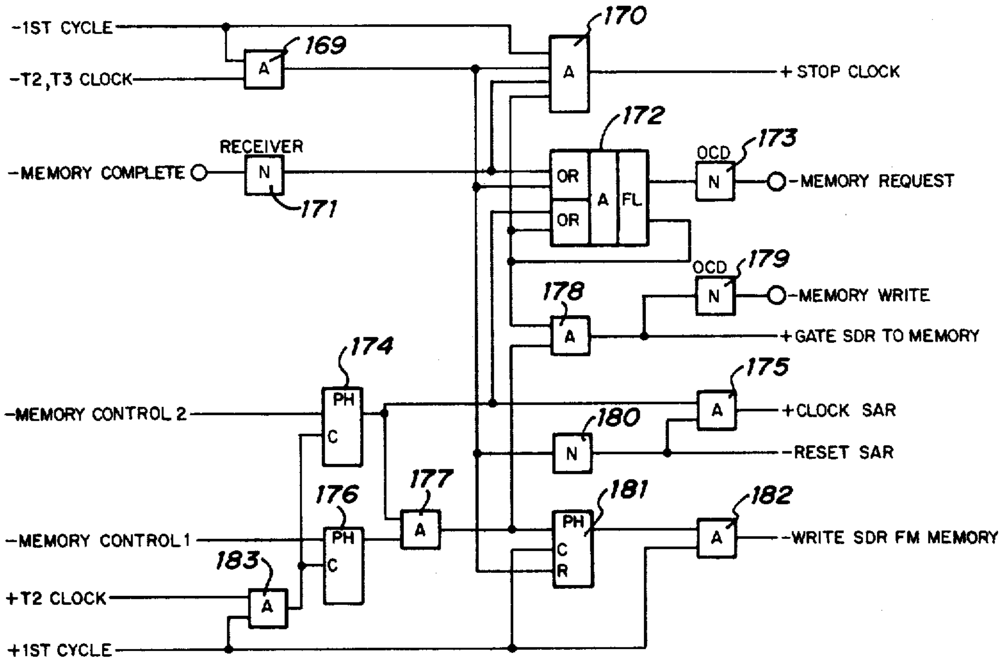
FIG. 10 is a schematic diagram of circuitry of the microprocessor which interfaces with the memory control.

FIG. 10 is a schematic diagram of the sequencing control circuitry for the microprocessors 60 and 62 which provides interfacing between the microprocessors and the memory controls 86 and 102. The 1st cycle signal is applied to an AND gate 169 along with −T2 and −T3 clock signals. The output of AND gate 169 is applied to an input of AND gate 170, the output of which generates the stop clock signal. The Memory Complete signal applied from the memory control 86 (FIG. 5) is applied to an input of a NOT gate 171 whose output is applied to a gate complex 172. Gate complex 172 comprises two OR gates, the outputs of which are applied to an AND gate whose output is applied to an FL (also known as RS) latch. The output of the FL latch is applied through a NOT gate 173 to generate the −Memory Request signal applied from the local satellite microprocessor 60 to the memory control 86 as shown in FIG. 5.

The output of AND gate 169 is applied, along with the output of NOT gate 171, to an input of one of the OR gates of the gate complex 172. The −Memory Control 2 signal is applied to the phase hold input of a double gated (also frequently termed bistable or D-type) latch 174, an output of which is applied as an input to the second OR gate of the gate complex 172. The output of the double gated latch 174 is also applied as an input to an AND gate 175. The −Memory Control 1 signal is applied to the phase hold terminal of a double gated latch 176. The output of double gated latch 174 is applied as an input to an AND gate 177. The output of the double gated latch 176 is also applied as an input to AND gate 177. The output of the double gated latch 174 is applied as an input to the second OR gate of the gate complex 172, along with the output of the RS latch of the gate complex 172. The output of the RS latch is also applied as an input to the AND gate 170 and to an AND gate 178. The output of AND gate 177 is also applied as a second input to AND gate 178.

The output of AND gate 178 is applied to a NOT gate 179 which generates the −Memory Write signal applied to the memory control as shown in FIG. 5. The output of AND gate 178 is applied directly to provide the Plus Gate SDR to Memory signal. The output of AND gate 169 is applied to a NOT gate 180, the output of which is the −Reset SAR signal. The output of gate 180 is also applied as an input to an AND gate 175 to provide the +SAR signal.

The output of AND gate 177 is applied to the phase hold terminal of a double gated latch 181, the output of which is applied as an input to an AND gate 182. The output of AND gate 169 is applied to the reset terminal of the double gated latch 181.

The +T2 Clock signal is applied as an input to an AND gate 183, the output of which is applied to the clock input of the double gated latches 174 and 176. The +1st Cycle signal is applied as a second input to AND gate 183 and also to the clock input of the double gated latch 181. The output of gate 182 generates the −Write SDR FM Memory signal, which is used as a sample clock for data resulting from a storage read operation.

Figure 11:
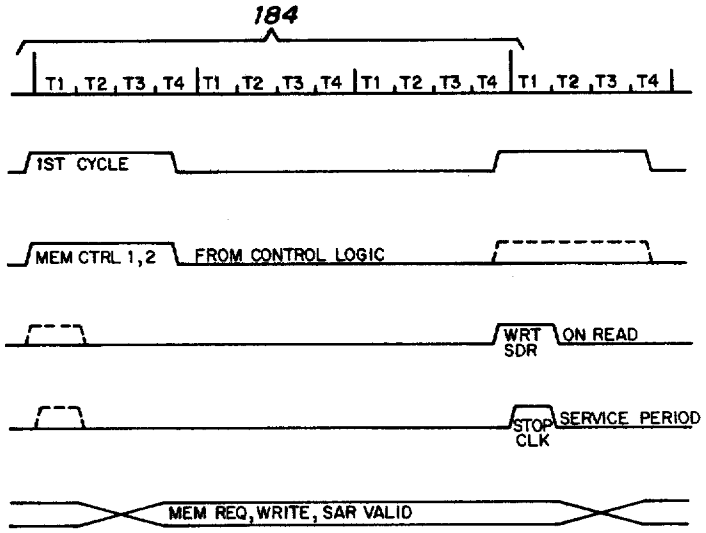
FIG. 11 illustrates waveforms indicating the operation of the circuitry of FIG. 10.

FIG. 11 illustrates timing diagrams of the sequencing control provided by the microprocessors 60 and 62 as shown in FIG. 5. As can be seen, each storage cycle comprises three microinstruction cycles indicated by bracket 184. Each microinstruction cycle includes four clocks T1, T2, T3 and T4. During the first microinstruction cycle, bus turnaround is accomplished with the 1st cycle and memory controls 1 and 2 as shown in FIG. 11. During the second and third microcode cycles, storage and access is accomplished as indicated by the Memory Request, Write and SAR Valid signals as indicated in FIG. 11. The read and write, as well as stop clock signals indicate the timing of the read and write signals sequencing.

Figure 12:
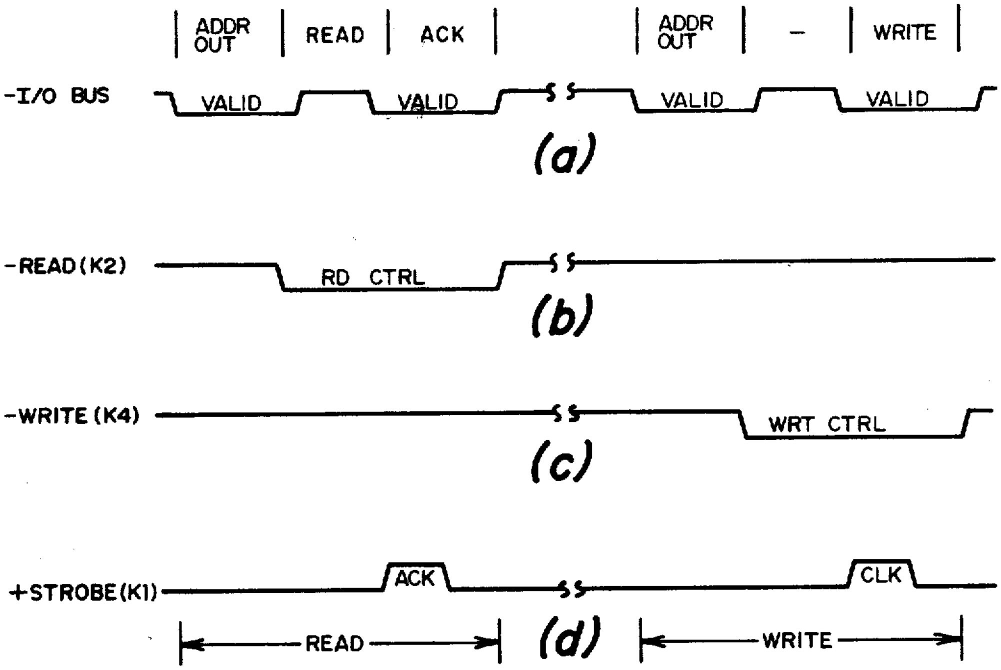
FIGS. 12*a–d* illustrate waveforms indicating the operation of the I/O channel of the media terminal shown in FIG. 5.

FIGS. 12*a*–*e* illustrate various control signals utilized with the I/O channels of the microprocessors 60, 62 and 130 shown in FIGS. 5 and 6. FIG. 12*a* illustrates the operation of the −I/O bus signals. FIG. 12*b* illustrates the −Read commands while FIG. 12*c* illustrates the −Write commands. The +strobe signal is shown on FIG. 12*d*.

The illustrated timing diagrams indicate that the read and write signals according to the present invention use a time-division multiplex technique. On a read operation, the address of the device to be selected is presented on the bidirectional bus. Tag line controls are then activated which cause the particular I/O device to be selected and cause it to present data to the microprocessor. The microprocessor utilizes an implicit acknowledge. The I/O device selected has the capability of overriding the acknowledge if the I/O wishes to halt the microprocessor or to slow the microprocessor down, such as in control problems which are due to an inability to respond in time.

The write sequence to an I/O device is similar to the read in that the microprocessor first presents the address out on the I/O bus. The write data is then presented to the I/O device and a clock line is provided which is a combination clock and acknowledge.

Figure 13:
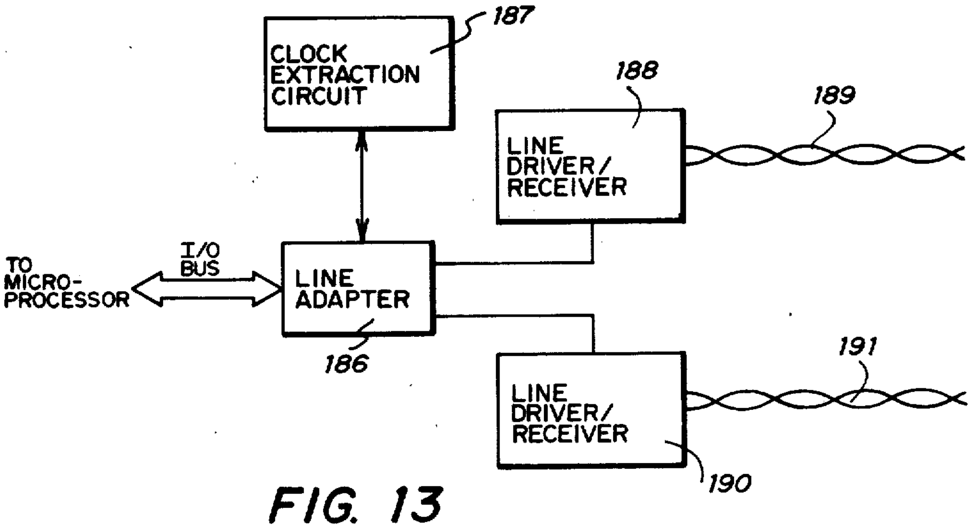
FIG. 13 is a block electrical diagram of the control circuit shown in FIG. 14.

FIG. 13 is a block diagram of the line adapters 118 and 140 shown in FIGS. 5 and 6. The basic line adapter circuitry 186 is connected to the I/O bus leading to the microprocessors 62 and 130 shown in FIGS. 5 and 6. A clock extraction circuit 187 is connected to the line adapter 186. The line adapter 186 is connected through a line driver/receiver 188 to the first link of the twin axial bus 189. The line adapter 186 is connected through a line driver/receiver 190 which is connected to the second link of the twin axial bus 191. The line adapter 186 thus serves to control the line synchronization, polling, parity, address and encoding/decoding of the biphase-coded bit-serial data frames utilized by the system.

Figure 14:
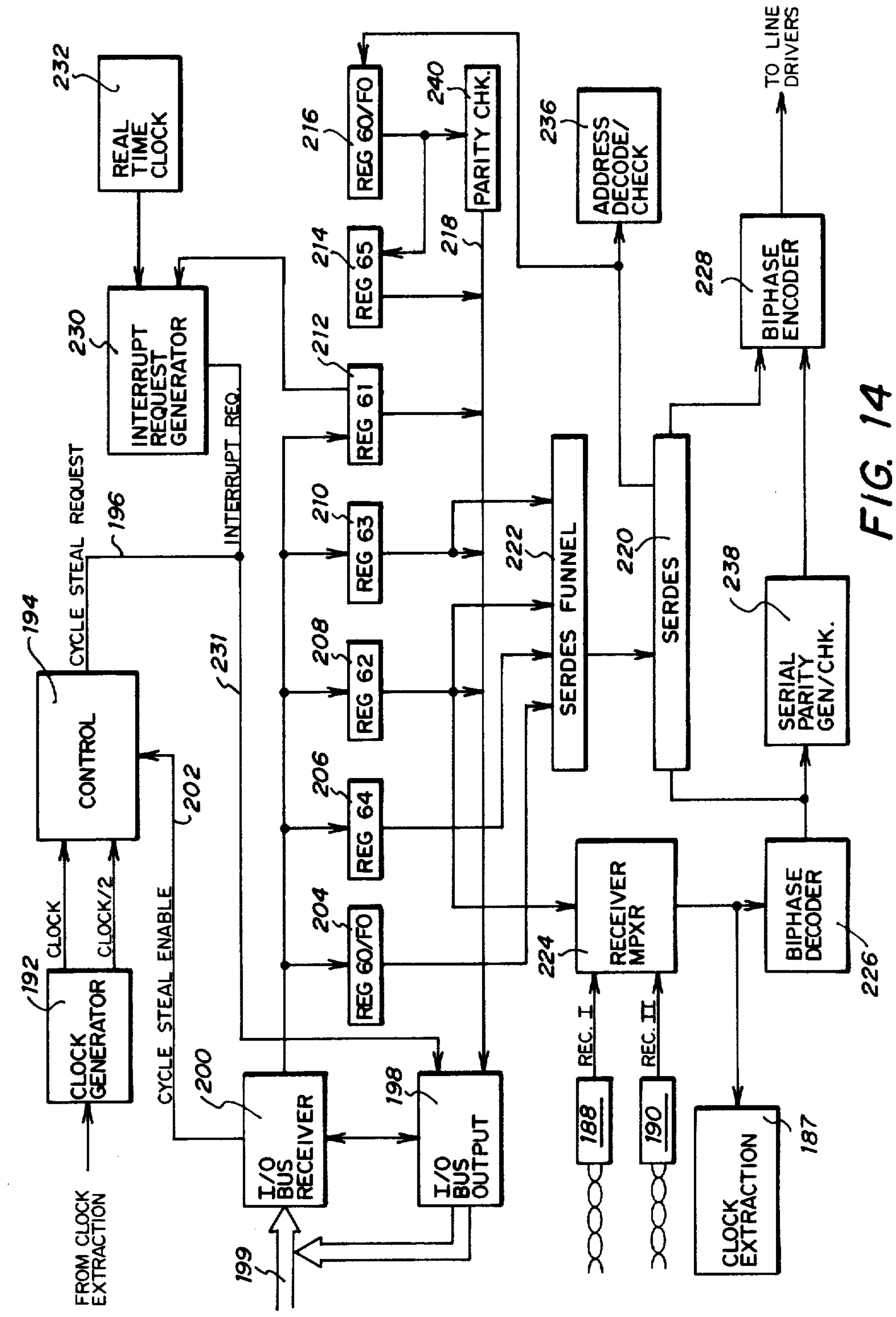
FIG. 14 is a block electrical diagram of the line adapter circuit shown in FIGS. 5 and 6.

FIG. 14 is a more detailed electrical block diagram of the line adapter shown in FIG. 13. The clock extration circuit 187 shown in FIG. 13 applies clock signals to a clock generator 192. The clock extration circuit 187 is a standard biphase clock extractor. The output of the clock generator 192 comprises a clock and a clock divided by two signals which are applied to a control circuit 194. Control circuit 194 will be shown in greater detail in FIG. 15.

Control Circuit 194 generates the Cycle Steal Request Signal which is applied via signal line 196 to the I/O Bus Output 198. As is known, Cycle Steal transfer enables the microprocessor 62 (FIG. 5) to input data at a higher rate than the normal rate to storage. This technique, also called direct memory access, supplies the resources required for address and storage, handling byte counts, and the like without going through a programmed sequence of instructions for each transfer. This capability is provided within the microprocessors 62 and 130 (FIGS. 5 and 6).

The I/O bus 199 is received from one of the microprocessors 62 or 130 shown in FIGS. 5 and 6 and is applied to an I/O Bus Receiver 200. The I/O Bus Receiver 200 selects the Cycle Steal Enable signal generated by the microprocessor and supplies it to the control circuit 194 via signal line 202. The data applied on the external I/O bus 199 is converted by the I/O Bus Receiver 200 to an internal representation to enable the data to be input to a series of registers 204, 206, 208, 210 and 212. Registers 214 and 216 are also provided which have their outputs connected via a signal line 218 to the I/O Bus Output 198. Register 204 thus receives data while register 216 transmits data received from a conventional serializer/deserializer (serdes) 220 which comprises a 13 bit serial/parallel offloading shift register. In its parallel loading mode, the serdes 200 is loaded through a serdes funnel 222 which receives data from registers 204, 206, 208 and 210. In the serial mode of the serdes 220, the serdes 220 is loaded with data from either of the line/driver receivers 188 or 190 which are connected to a receiver multiplexer 224. The multiplexed data is presented through a biphase decoder 226 and loaded into the serdes 220. The output of the serdes 220 is applied to a biphase encoder 228 which supplies data to the respective line drivers.

The interrupt request generator 230 generates an interrupt request signal via signal line 231 for application to the I/O bus output 198. A real time clock 232 provides a signal to the generator 230 which causes a real time clock interrupt. The address decode/check circuit 236 also receives the output from the serdes 220. A serial parity generator/check circuit 238 is connected between the biphase decoder 226 and the biphase encoder 228, as illustrated. The output of the receiver multiplexer 224 is also applied to the clock extraction circuit 187.

As noted, when the serdes 220 is in its parallel mode, it is loaded from the serdes funnel 222 and then is offloaded to register 216 which in turn may load its content into register 214. A parity generate circuit 240 is connected to register 216 and via signal line 218 to the I/O bus output 198. When the serdes 220 is in the serial mode, it is loaded with data from either of the line driver/receivers 188 or 190 through the receiver multiplexer 224. The particular line driver/receiver 188 or 190 is selected from bits in register 208 and that selection information is placed in the biphase decoder 226 which decodes the information into a series of digital ones and zeros. This data is loaded serially into the serdes 220 and into the serial parity generator check circuit 238 to indicate that the serdes 220 is full. When the serdes 220 is full, this information is offloaded into register 216 and one portion of the serdes 220 is then diverted to the address decode/check circuit 236. The address decode/check circuit 236 checks the address of each received message and allows only those messages addressed to that particular station. When this data has been transmitted the station address is also placed in the serdes 220 for transmission to the primary media terminal to indicate which satellite the data is emanating from.

When data is being transmitted from the line adapter shown in FIG. 14, this information is applied through the serdes funnel 222 into the serdes 220. Address information generally comes from register 208 from which it is brought up to the biphase encoder 228 and transmitted. At the appropriate time, in the preferred embodiment of the present invention at the 13th bit of the frame, a parity bit from the serial parity generator/check circuit 238 is inserted into the frame and the biphase encoder 228 transmits the data via the line driver to the desired station.

Figure 15:
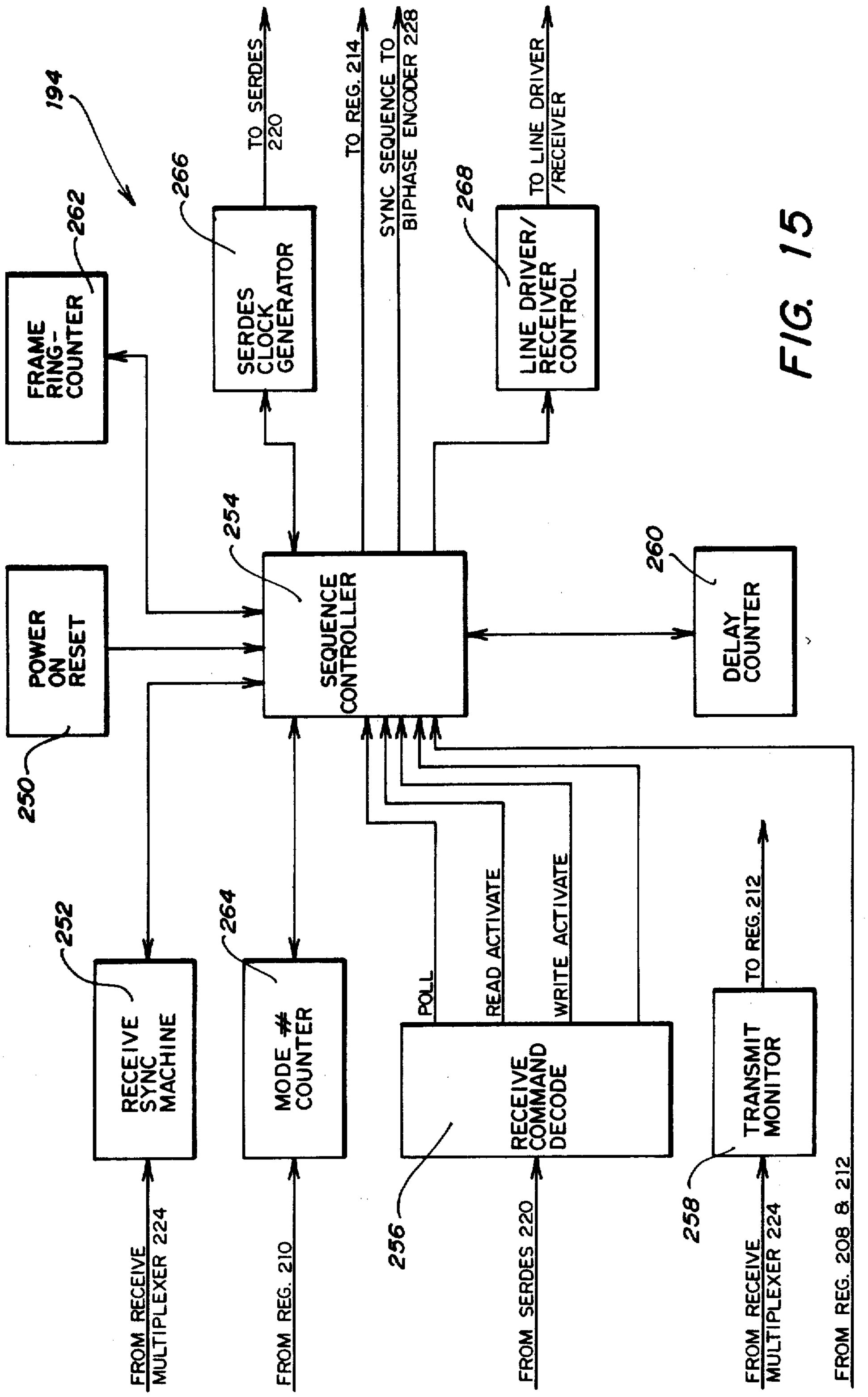
FIG. 15 is a block electrical diagram of the control circuit shown in FIG. 14.

FIG. 15 illustrates an electrical block diagram of the control circuit 194 shown in FIG. 14. The power on reset 250 generates a signal to be sent to the various portions of the control circuit 194 to produce an initial state for the control circuit 194. The receive sync machine 252 receives the signal from the receiver multiplexer 224 previously shown in FIG. 14 and detects a bit pattern on the input to achieve "message and bit synchronization". This synchronization information is then transferred to the sequence controller 254. When a full message has been decoded, the sequence controller 254 inquires from the received command decode 256 as to which type of message has been received.

There are three types of commands that are decoded and handled by the sequence controller 254. The messages include the poll, the read activate and the write activate which are illustrated as being generated from the received command decode 256 and applied to the sequence controller 254. When the sequence controller 254 receives a command, the command is placed in a buffer location in register 214 previously shown in FIG. 14. The sequence controller 254 will then signal the microprocessor that a command has been received. A transmit monitor 258 receives each of the transmissions made from the receiver multiplexer 224 shown in FIG. 14 and determines whether the transmission is properly going out. In case of a malfunction, the transmit monitor 258 applies the signal to register 212.

A delay counter 260 interconnected to sequence controller 254 has a first function of allowing sufficient time for turnaround of the system. When one terminal stops transmitting and another terminal starts to make a response, there must be a sufficient time for the line to quiesce and for reflections to die out. The delay counter 260 provides this time function by waiting 16 microseconds before the delay counter 260 allows the receivers 188 and 190 to be turned on after a transmission. The delay counter 260 also waits for 24 microseconds after reception is completed before the delay counter 260 turns on all the transmitters in order to make a response. In addition, the delay counter 260 produces a 4 microsecond series of pulses to the sequence control 254 which allows the sequence control 254 to generate the sync sequence. The sync sequence is provided to the biphase encoder 228 previously shown in FIG. 14. The sync sequence enables the receiving circuits and the receive sync machine 254 to become synchronized with the incoming messages.

A frame counter 262 interconnected to sequence controller 254 counts out the 16 bits for each transmission and denotes the time when the parity bit is to be inserted for each frame. A mode number counter 264 receives an input from register 210 (FIG. 14) and enables the sequence controller 254 to produce and fill frames in between each data frame. The mode number counter 264 counts the number of the filled frames which are inserted between data frames in order to slow down the line. The serdes clock generator 266 generates the clocks which are used to not only shift the serdes 220, one bit for each bit of incoming or outgoing bit, but also to create the load and unload timings which are necessary to load the serdes 220 from the appropriate register through the serdes funnel 222. The clock generated from the serdes clock generator 266 also creates the line necessary to offload the data from the serdes 220 to register 216 or register 214. The line driver/receiver control 268 receives an output from the sequence controller 254 to control the turning on of the line driver/receivers of the form 188 or 190 previously shown in FIG. 13. The control 268 also controls the turning on of receiver for the particular lines required.

Figure 16:
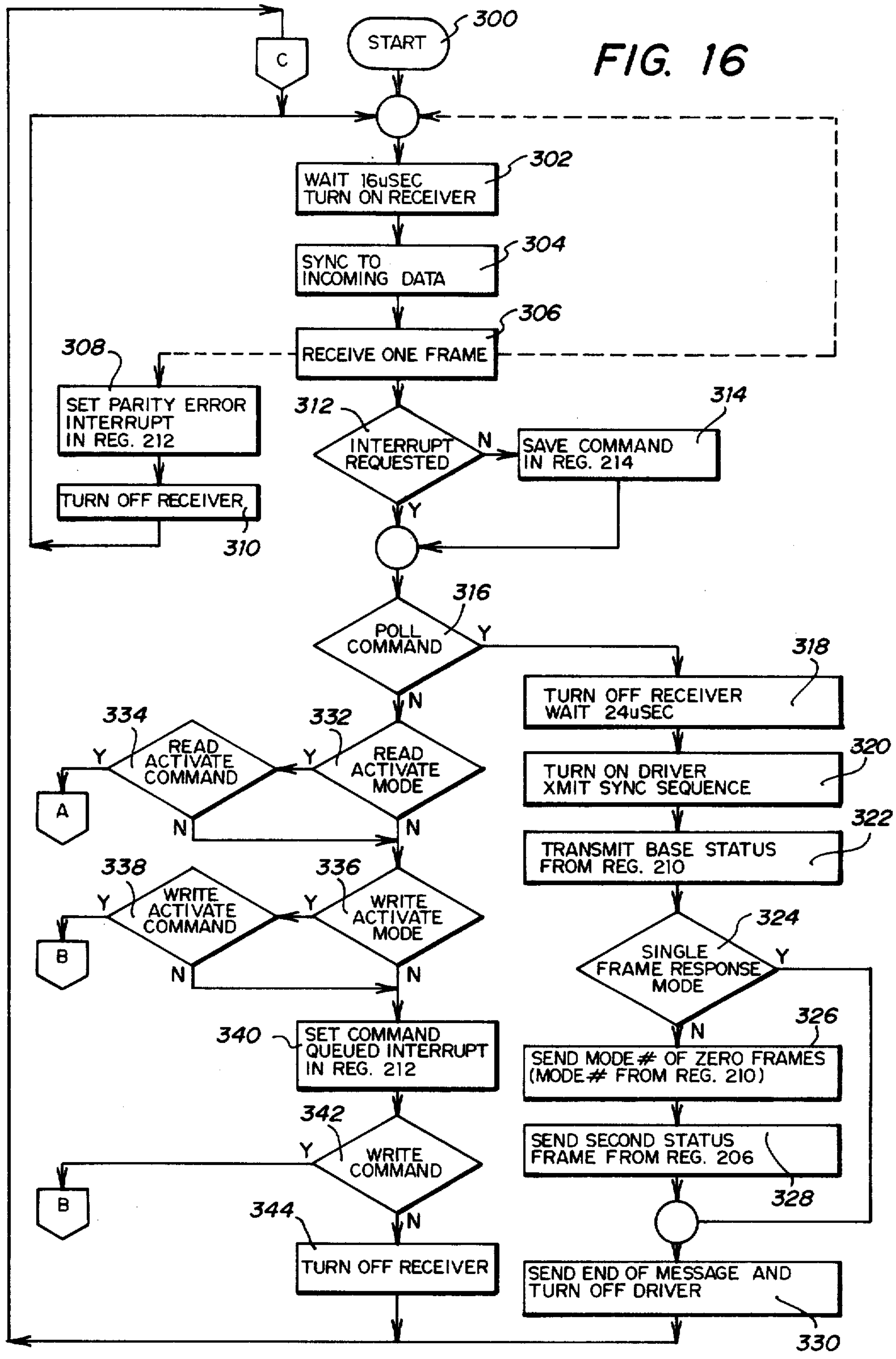
FIGS. 16–19 are flowcharts of operation of the portion of the line adapter circuit shown in FIG. 14.
Figure 17:
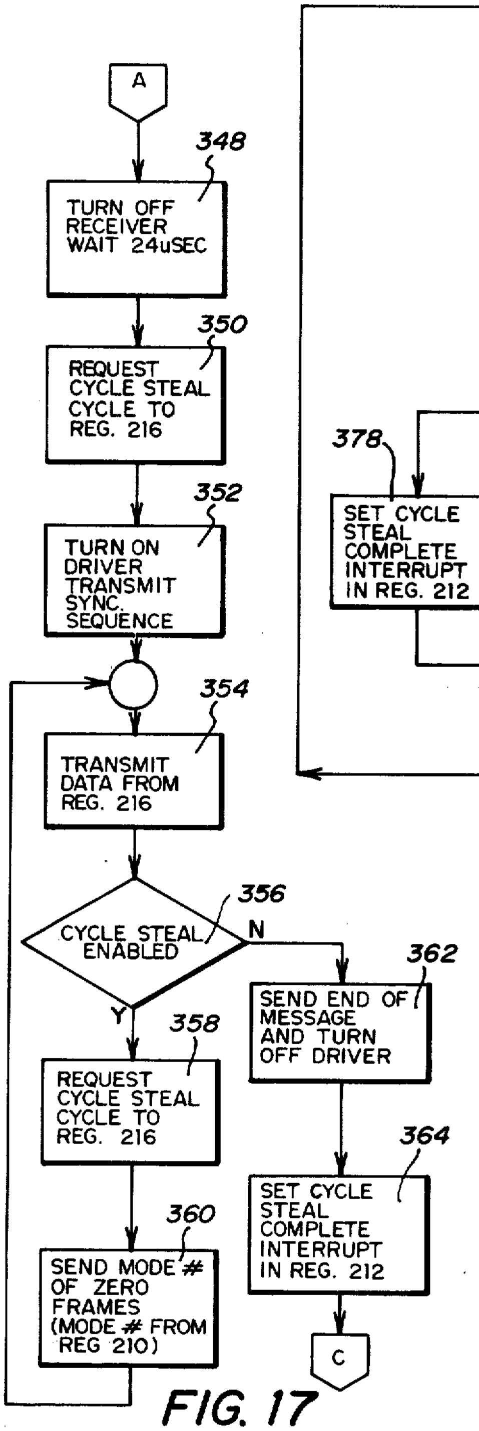
Figure 18:
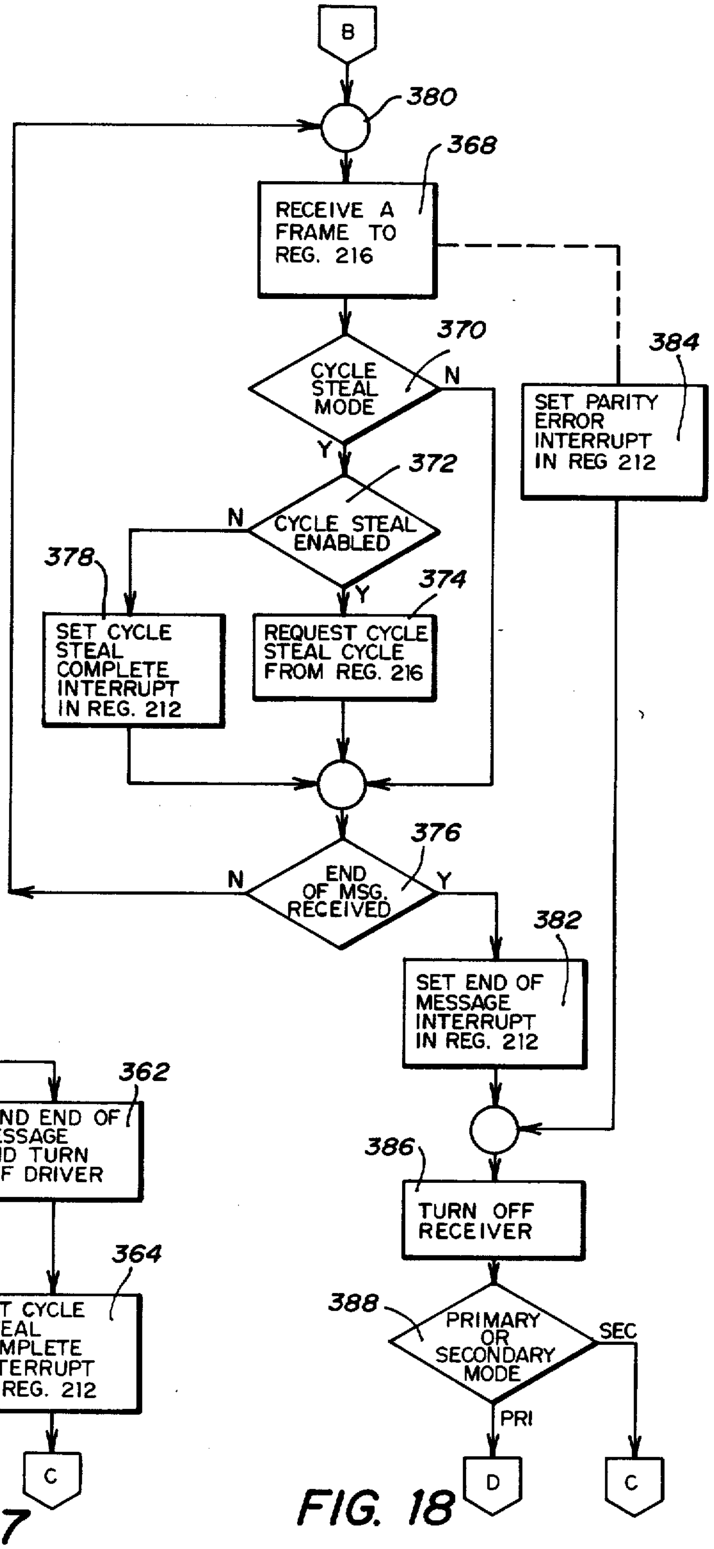
Figure 19:
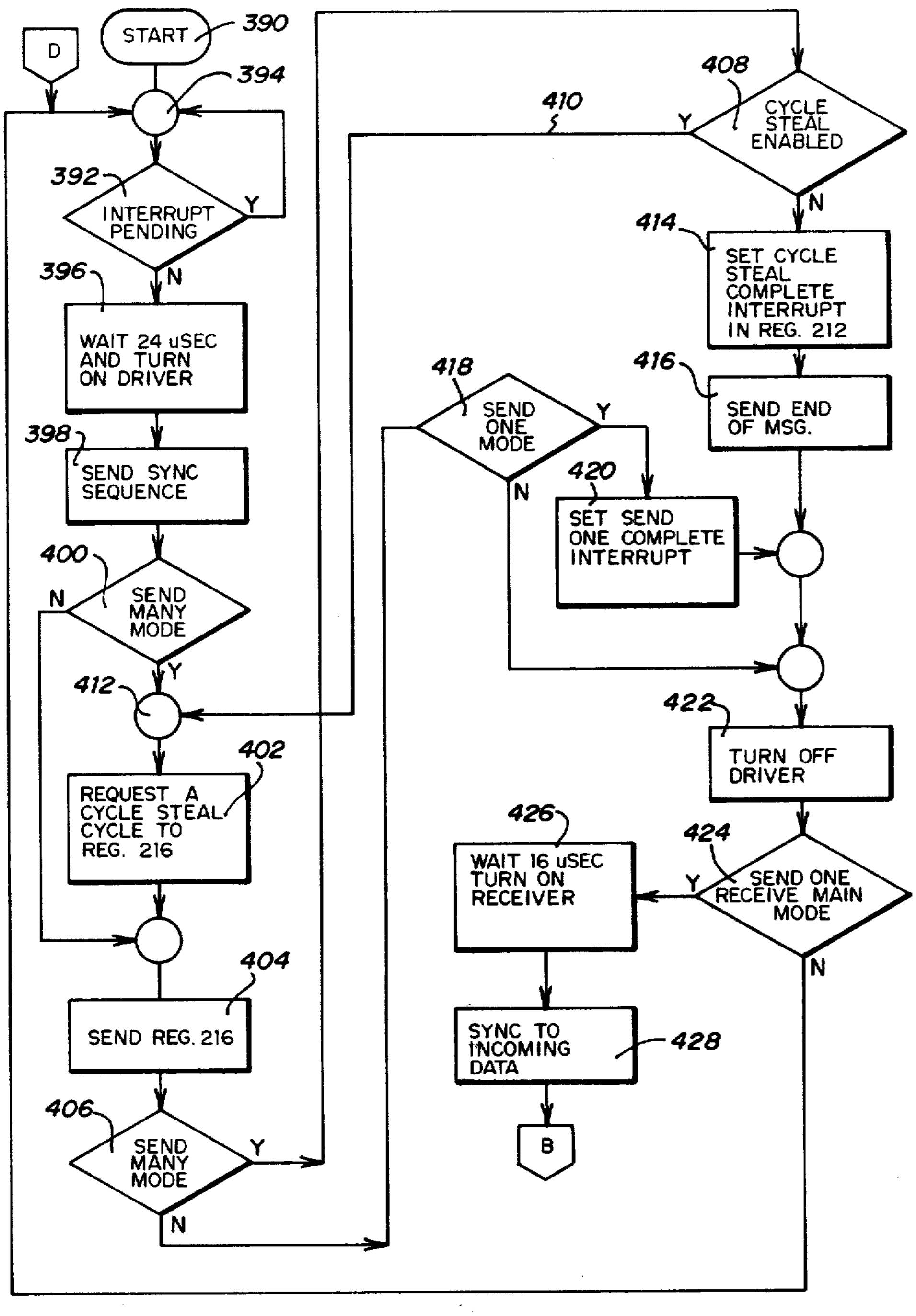

FIGS. 16–19 are flowcharts illustrating the operation of the line adapter circuitry shown in FIGS. 14 and 15. FIGS. 16–18 illustrate the operation of the line adapter in the secondary mode of operation while FIG. 19 illustrates the sequence of operation of the line adapter in the primary mode.

Referring to FIG. 16, the secondary mode sequence is initiated at the start 300. At 302, the system waits 16 microseconds before turning on the receiver. At 304 the system synchronizes to the incoming data in a "line active" that is set in register 212 (FIG. 14). One frame is received at 306 and if a station address mismatch is determined, the program is re-executed. If a parity error is detected, the parity error interrupt is set at 308 in register 212. The receiver is then turned off at 310 and the program re-executed.

After receiving one frame, if the station address is correct and if no parity error is detected, a decision is made at 312 as to whether or not an interrupt has been requested. If not, a command is generated to register 214 and is saved at 314. A decision is made at 316 as to whether or not a poll command is present. If so, the receiver is turned off at 318 and the system waits 24 microseconds before turning on a driver transmit sync sequence at 320. The base status is transmitted at 322 from the contents of register 210. A decision is made at 324 as to whether or not the system is in single frame respond mode. If not, a mode number is transmitted at 326 of zero frames which is the mode number from register 210. At 328, the second status of the frame is sent from the register 206. At 330, the end of message is sent and the driver is turned off and the loop reiterates (returns) to point C after start 300.

If the decision at decision step 316 is negative (no), the decision is made at 332 as to whether or not the system is in the read activate mode. If so, and a read activate command is present at 334, the flow chart moves to point A in FIG. 17 to be subsequently described.

If the read activate mode is not present at 332, the decision is made at 336 as to whether or not the write activate mode is present. If so, and the write activate command is present at 338, the flowchart moves to point B in FIG. 18 to be subsequently described. If the write activate mode is not present at 336, the command gueued interrupt is set at 340 in register 212. If a write command is present at 342, the flow chart moves to point B in FIG. 18. If the write command is not present, the receiver is turned off at 344 and the system reiterates to point C after start 300.

FIG. 17 illustrates that the receiver is turned off at 348 and a wait of 24 microseconds is initiated. At 350, the cycle steal is requested to register 216. At 352, the driver transmit sync sequence is turned on and at 354 data is transmitted from the register 216. A decision is made at 356 as to whether or not a cycle steal is enabled.

The media microprocessor 62 shown in FIG. 5 includes a cycle steal enable line which indicates that additional cycle steal operations are allowable in the sequence of operations. If no more cycle steals are allowable, the system will stop transmitting or receiving data. If additional cycle steals are allowable, the cycle steal request is generated which will be honored by the media microprocessor 62.

The request cycle steal cycle to register 216 is made at 368 and the mode number of zero frame is transmitted at 360 from register 210. If this cycle steal is not enabled at 356, the end of message is transmitted at 362 and the driver is turned off. The cycle steal complete interrupt is set at 364 in register 212 and the cycle reiterates to FIG. 16 at point C.

FIG. 18 illustrates at 368 the reception of a frame to register 216. The base cycle steal mode is available at 370. A decision is made at 372 as to whether or not the cycle steal mode has been enabled. If so, the cycle steal cycle is requested from register 216 at 374. If the cycle steal mode is not available at 370, a decision is made at 376 as to whether or not an end of message has been received. If the cycle steal is not enabled at 372, the cycle steal complete interrupt is set at 378 in register 212. If the end of message has not been received, the flowchart reiterates to a combination point 380 below point B. If the end of message is received at 376, the end of message interrupt is set at 382 in register 212. If a parity error is detected at 368, the parity error interrupt is set at 384 in register 212. The receiver is turned off at 386 and the decision is made at 388 as to whether or not the system is in the primary or the secondary mode and the program continues at either point D or point C.

Referring to FIG. 19, the flow diagram of operation in the primary mode is illustrated. The program is initiated at 390 and a decision is made at 392 as to whether or not an interrupt is pending. If so, the system moves back to combination point 394. If no interrupt is pending at 392, the system waits 24 microseconds at 396 and then turns on the driver. The sync sequence is sent at 398 and a decision is made at 400 as to whether a many mode has been sent. If so, a cycle steal cycle is requested at 402 to register 216. The data from register 216 is sent at 404 and a many mode decision is again made at 406.

If a many mode is sent, the decision is made at 408 as to whether or not the cycle steal is enabled. If yes, the program reiterates via line 410 to combination point 412. If not, the cycle steal complete interrupt is set in register 212 at 414. The end of message is sent at 416.

If many mode has not been sent at 406, the decision is made at 418 as to whether or not one mode has been sent. If yes, a send one complete interrupt is set at 420. The driver is turned off at 422 and the decision is made at 424 as to whether one received main mode has been sent. If yes, 16 microseconds are waited before turning on the receiver at 426. The sync to the incoming data is made at 428 and the program reiterates to point B in FIG. 18. If one received mode is not sent at 424, the system reiterates to point 394. At 428, in order to sync to incoming data, the indication "line active" is set in register 212. At point B, if the station address mismatch occurs in the first frame, the "address mismatch" interrupt in set in register 212.

Figure 20:
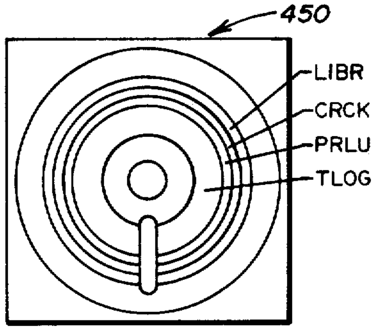
FIG. 20 is a somewhat diagrammatic illustration of the storage portions of the diskette utilized with the present invention.

FIG. 20 illustrates a somewhat diagrammatic view of a diskette 450 for use with the present invention. As is well known, the diskette comprises a flexible magnetic disk that is permanently enclosed in a protective jacket. The disk and jacket assembly, termed the diskette, may be manually inserted and removed from a read and write mechanism located in the terminals of the invention as shown in FIG. 1.

The diskette 450 as shown in FIG. 20 contains four discrete data sets. The first data set is termed the LIBR, or the device micro code program library and contains a paging index and paged function or application programs and user-defined tables. This library contains the various routines and tables for controlling the basic operation of the present system. Certain of the programs are paged when requested and executed in the RAM storage space previously described.

The diskette 450 also includes an area entitled CRCK, or negative credit file exchange data set. In addition, the diskette 450 includes a PRLU, or a price look-up file exchange data set. The CRCK and PRLU store data for additional exchange with a host digital processor. Finally, the diskette 450 includes a TLOG, or transaction log exchange data set, which comprises the basic data captured resulting from entering of transactions and the like through the terminals. The TLOG contains the necessary information which must be communicated between the point-of-sale terminals of the invention and the ultimate data processing system. The diskette 450 may be removed from the terminals and carried or mailed to a remote location wherein the data may be processed by a data processing system. Alternatively, as previously noted, the contents of the transaction of the TLOG may be directly transmitted from the terminal to a host central data processor by known data communications methods and protocols.

Figure 21:
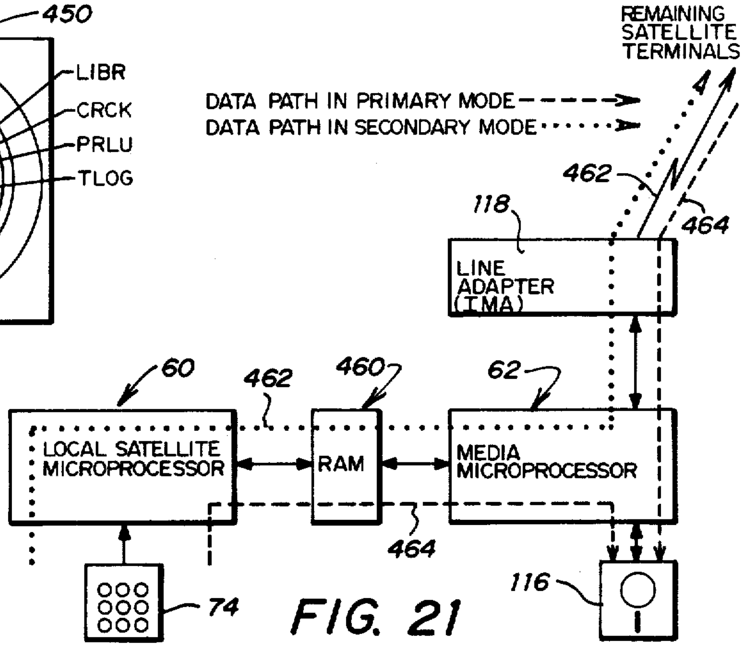
FIG. 21 is a diagrammatic illustration of data paths of a media terminal in both primary and secondary modes of operation.

FIG. 21 is a simplified somewhat diagrammatic view of a media terminal illustrating data flow in both the primary mode and in the secondary mode of operation. Like numerals are used for like and corresponding parts of the system previously identified in FIG. 5. Hence, the local satellite microprocessor 60 is indicated as being connected to the input keyboard 74. The microprocessor 60 is connected via a data bus to the storage 460. It will be understood that storage 460 comprises the private and common storage provided by the RAM's 80, 84 and 98 and ROS's 82 and 100 which are shown in FIG. 5. The media microprocessor 62 is also connected by a data bus to the storage 460. The diskette 116 is connected to the media microprocessor 62. The line adapter 118 is connected to the media microprocessor 62 and is connected via the twin axial bus 462 to remaining cluster satellite terminals in the manner previously described.

The data path when the media terminal shown in FIG. 21 is in the primary mode is indicated by a dashed line. The data path when the media terminal is in the secondary mode of operation is indicated by the dotted line.

When the media terminal is in the primary mode of operation, the diskette 116 serves as the permanent memory for the entire cluster of terminals, including the primary media terminal. Consequently, data coming from satellite terminals is applied through the media microprocessor 62 for storage on the diskette 116 via the data path 464. In addition, data is supplied to the diskette 116 from the keyboard 74 through the local satellite microprocessor 60 and through the media microprocessor 62 via the data path 464. The interfacing hardware of the system masks from the media microprocessor 62 the fact of whether data being transmitted to diskette 116 is coming from a remote satellite or from the local satellite processor 60.

When the system is in the primary mode, the media microprocessor 62 periodically polls the satellite terminals via the line adapter 118 to determine whether or not each satellite terminal has data which needs to be transmitted to the diskette 116. The media microprocessor 62 also periodically polls the local satellite microprocessor 60 in order to receive data input from the keyboard 74 for temporary storage in the storage 460.

In addition to data entered through the keyboard 74 and through the keyboards of the other satellite terminals, media microprocessor 62 handles paging requests for various programs and data tables stored in the diskette 116. For example, assuming a remote satellite terminal is changing from a sales mode to a total readout, the total readout program stored in the diskette 116 is requested by the satellite terminal and is then sent from the media microprocessor 62 through the line adapter 118 to the satellite terminal, wherein the program is loaded into the satellite terminal's memory in order to perform the desired function. At the same time, requests can be made from the local satellite microprocessor 60. In addition, the local satellite microprocessor 60 may request that the diskette 116 be changed.

When the media terminal shown in FIG. 21 is being operated in the secondary mode, the primary control functions of the media station have been transferred to another media station. When the media station is in the secondary mode, the system does not utilize the diskette 116 but acts in a similar manner to the remaining satellite terminals. In this mode, data is transmitted from the keyboard 74 through the local satellite microprocessor 60 to the storage 460. When the terminal is polled, data is transmitted from the storage 460 through the media microprocessor 62 and through the line adapter 118 to the primary media station for storage on the diskette located at that remote station.

When the media microprocessor 62 is in the secondary mode, it no longer polls addresses for satellite terminals but does poll the local satellite microprocessor 60. When the media microprocessor 62 detects a request from the local satellite microprocessor of available data, the media microprocessor 62 makes a request on the cable 462 in a similar manner as other satellite terminals. When the media microprocessor at the primary media terminal sees the request from the media microprocessor 62, that request would be detected and the sequence of commands would then be executed in order to pick up the data from the storage 460.

When the media microprocessor 62 is in the secondary mode, it functions to make two types of requests to the keyboard 74. The first request is a keyboard read command for prompting the operator for specific information, such as, for example, the date or time. Media microprocessor 62 would issue to keyboard 74 a read command to unlock the keyboard 74 for operator entry. This command overrides any commands being routed to keyboard 74 from the local satellite so that the media station request for information gets serviced immediately. The local satellite is then allowed to turn again to keyboard 74 input data.

The second type of request in the media microprocessor 62 secondary mode is a wait for action code request. This wait request is made of the keyboard 74 whenever the media station has not made a direct request to the keyboard 74 in the form of a keyboard unlock type request. The wait for action code request instructs keyboard 74 to service any local satellite keyboard requests until the key sequence action code key 59 and numeral 9 key (FIG. 4) are depressed on keyboard 74. This key sequence alerts the media station to initiate a regular enable keyboard command to request the required additional information to switch from the secondary to the primary operating mode. The wait for action code request does not interfere with the keyboard processing in that local satellites are serviced in the normal manner; however, when the action code 9 request is made by the operator, that request is routed to the media microprocessor 62 which then issues a direct request to the keyboard for an unlock and prompts the operator for information regarding the mode change.

Figure 22:
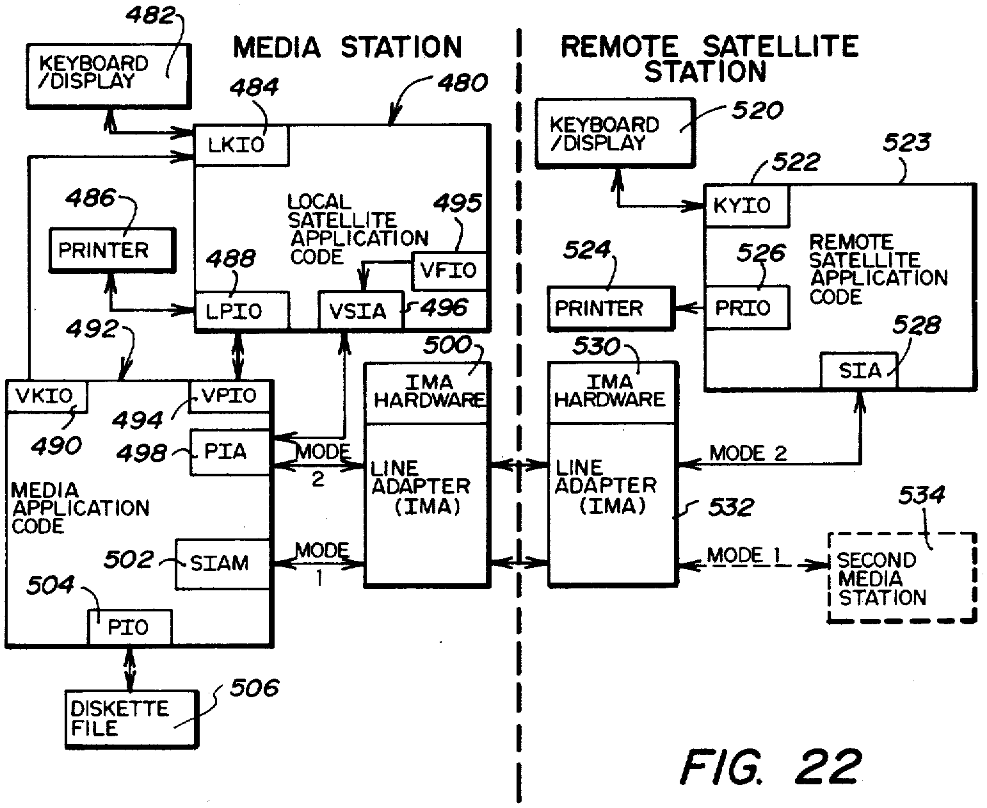
FIG. 22 is a somewhat diagrammatic illustration of various digital processing routines utilized in various modes of operation of a media terminal in conjunction with a remote satellite station.

FIG. 22 illustrates the relationship of various portions of the microcode programs of the present invention in association with the control of various portions of the circuitry of the invention. The local satellite application code 480 provides control from the local satellite microprocessor to the various I/O devices. The LKIO subroutine 484 is used to perform I/O operations on the keyboard/display 482 of the timer. The LKIO subroutine 484 performs I/O operations for the keyboard, the transaction display, the customer display, audible alarm, drum prompt which provides prompting instructions to the operator in front of the terminal, time of day clock, security lock, hard counters and machine type indicators. Similarly, the printer 486 is controlled by the subroutine LPIO 488. The LPIO subroutine 488 also controls operation on the cash drawer utilized with the timer.

The virtual keyboard/display I/O control, termed VKIO 490, comprises a portion of the media application code 492 and operates to accept request for keyboard-/display operations and passes the request to the local satellite or satellite terminal for processing. The virtual printer I/O control subroutine, termed VPIO 494, is also a portion of the media application code 492 and accepts request for printer or cash drawer operations in a media feature and passes the request to the local satellite terminal for processing.

The virtual file I/O block, VFIO 495, is associated with the virtual secondary intermachine adapter subroutine, hereinafter termed VSIA 496, which accepts requests and passes a request directly to the integral media feature for processing. The primary intermachine adapter I/O control subroutine, termed PIA 498, is used to perform requested I/O operations on the intermachine adapter hardware (IMA) or line adapter IMA 500. The PIA subroutine accepts requests from the VSIA in the local satellite application code 480. The PIA 498 is operable to provide the primary media mode of operation previously noted.

The virtual secondary intermachine adapter I/O control subroutine, termed SIAM 502, accepts requests and passes the request directly to the integral media feature for processing in the satellite second mode of operation. The diskette I/O subroutine, termed PIO 504, serves to perform I/O operations on the diskette file 506.

FIG. 22 also illustrates the interrelation of the various subroutines in the operation of the present terminal when used in the remote satellite mode of operation. In this mode of operation, the keyboard display 520 is controlled by the keyboard I/O subroutine, termed KYIO 522, which comprises a portion of the remote satellite application code 523. The printer 524 has its operation and request handled by a printer I/O program subroutine 526. A secondary intermachine adapter subroutine, termed SIA 528, interrelates with the IMA hardware, or line adapter IMA, 530. In the mode of operation as a satellite station, the IMA program 532 interrelates with a second media station 534 in the manner previously described.

In addition to responding to the I/O request as noted above, the code of the invention also includes other subroutines which perform such functions as paper advance of the printer, log out, diskette reset and control, light emitting diode (LED) control, and the like. The LED's provide an indication to the operator of log out functions when displays of various error logs and the like are displayed. The LED's also provide operator indication of diskette availability. The diskette reset function is a logic restart of the RAM programs. In operation, the diskette reset function is caused to initiate by removing the diskette without application program acknowledgement. The LED's are also utilized to display internal machine errors and malfunctions and the like.

Many of the subroutines for use with the present invention are stored in the ROS memory shown in FIG. 5. A program accesses a ROS subroutine by executing a special instruction to the microprocessor termed the supervisor call, denoted by the mnemonic SVC. An SVC instruction, which is in the aforementioned System/3 instruction set, is a 1-byte unconditional branch instruction. A request code byte immediately following the SVC identifies the call subroutine. Memory in the RAM allocated for use in subroutine linkage is in the form of a stack of eight 8-byte entries. The stack, termed CCSTK, has a stack pointer defined as CCSPTR which is used to indicate the active stack entry. CCSPTR points to the left-most byte of an 8-byte stack entry.

Execution of the SVC causes control to be passed to a ROS linkage routine which saves 7 bytes of information pertaining to the calling program. Prior to entry of the 7 stack bytes, the stack pointer is updated to point at the next stack entry location. Control is then passed to a routing routine which branched to the target subroutine based on the request code byte. The branch address is determined by searching a RAM table from a RAM shown in FIG. 5 which is addressed for the request code value. If found, an associated branch address and parameter list length are then used. If not found, the branch address and parameter list length associated with the request code in a ROS table are used. The parameter list length is saved in the stack entry in the 8-byte location. Prior to the branch to the target subroutine, the bytes in the stack entry are then used to restore the XR1 and ARR registers with their values at the time the SVC was executed. One of the registers, XR2, is loaded with the address of the parameter list for the subroutine, or the bytes following the SVC. (XR1, XR2 and ARR are the names of System/3 registers, and therefore of their counterparts in the microprocessors 60 and 62.)

The target subroutine then executes and returns to the calling program via a return linkage subroutine. Multiple entry points are defined for the return linkage subroutine to support variation on return branching and restoring of index register from the stack.

Entry points in the return linkage subroutine cause the return branch address to be developed from the saved registers' values and parameter list length byte. One entry point returns by branching via the address contained in register XR2. In some instances, a single SVC may be used to initiate processing of a series of subroutine requests. This capability is termed chaining and is indicated in the request code byte by a "1" in bit 0. All of the request codes except the last one in the chain must have the chaining bit on.

The ROS subroutines are utilized to support I/O operations, data manipulation, calculations and general processing of terminal functions. These subroutines are of conventional types and are mostly directed to routine data manipulation, and will therefore not be discussed in detail. Other routines which are commonly or frequently performed are also stored in the RAM shown in FIG. 5. Linkage to these subroutines is subroutine specific, not following the subroutine access method described for ROS subroutines.

In the following discussion of subroutines according to the invention, the first two characters of a microcode name being XX indicates a ROS subroutine, while the first two characters on the microcode name being YY indicates a RAM subroutine.

Figure 23:
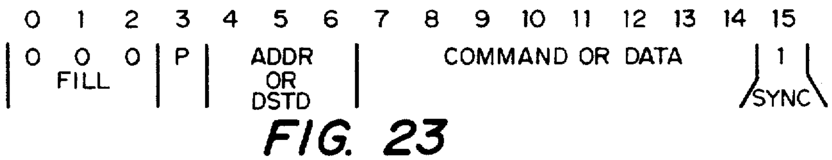
FIG. 23 is an illustration of the frame format for digital processing commands utilizing the present invention.

FIG. 23 illustrates the frame format for use with the XXPIA primary intermachine adapter subroutine. As can be seen, bits 0–3 of the 16-bit frame comprise a fill frame. The third bit comprises the parity bit. The bits 4–6 comprise the address or destination frame. Bits 7–14 comprise the command or data frame, while bit 15 comprises the sync frame.

Figure 24:
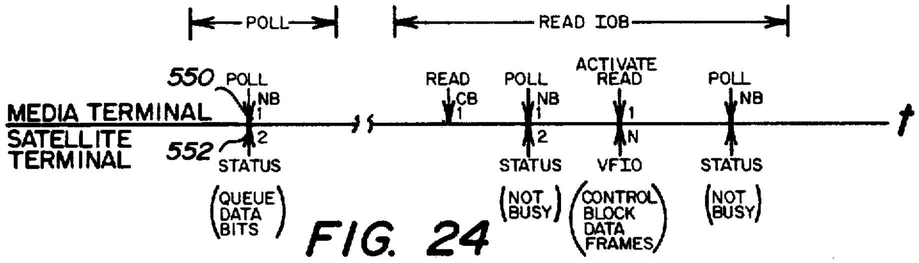
FIG. 24 is a somewhat diagrammatic illustration of polling and transferring control blocks from a satellite terminal by a media terminal.

FIGS. 24–28 comprise sequence diagrams of various command sequences in the XXPIA subroutine. Referring to FIG. 24, the media terminal commands are shown on the upper portion of the diagram, while satellite commands are shown on the lower portion of the diagram. A media satellite periodically polls the line to determine if there is any traffic required to be directed on the line. A poll is then taken by the media signal as indicated at 550. The poll is indicated in one byte or frame. The satellite station responds to the poll by a status indication at 552 which comprises two frames of status data. The poll is then followed by a command from the media terminal, termed a READ command, indicating that the I/O control block from the satellite should be read. The media terminal then generates another poll and the satellite generates a NOT BUSY status command response. The media terminal then generates an ACTIVATE READ command and N frames of VFIO control block data is transmitted from the satellite terminal. The VFIO control block data frames are related to the VSIA subroutine 496 shown in FIG. 22. The media terminal again generates a poll (virtual file I/O control block) and the satellite terminal response with a NOT BUSY status command response to terminate the READ IOB command sequence.

In some cases, the VFIO control block is transferred in the READ IOB command sequence as shown in FIG. 24, invokes the transfer of a program stored in the diskette memory media terminal to the satellite terminal. The paged microcode is transferred from the diskette file of the media terminal through the PIA subroutine 498 into the IMA hardware 500 over the twin axial bus and through the IMA hardware 530 to the SIA subroutine 528 as shown in FIG. 22. The program is then applied to the memory of the satellite for performance of the desired function. The READ IOB sequence provides the addresses within the diskette for the desired program. The media terminal then digests that address information, obtains the desired program from the diskette and initiates a sequence termed WRITE DATA on the line via the PIA and IMA hardware shown in FIG. 22.

Figure 25:
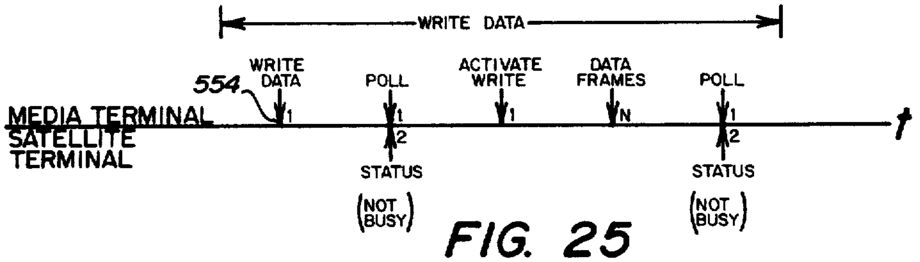
FIG. 25 is a somewhat diagrammatic illustration of the write commands and responses which transfer programs and data from a media terminal to a satellite terminal.

The WRITE DATA command sequence is illustrated in FIG. 25 and is initiated by a WRITE DATA command 554 generated from the media terminal. Following the WRITE DATA command is one frame of a poll command which is followed by two frames of a status NOT BUSY from the satellite terminal. An ACTIVATE WRITE command is then initiated from the media terminal followed by N frames of data from the media terminal. The data frames are written into the memory of the satellite terminal. The media terminal then applies a one frame poll and a NOT BUSY status command response from the satellite terminal terminates the WRITE DATA command sequence.

Figure 26:
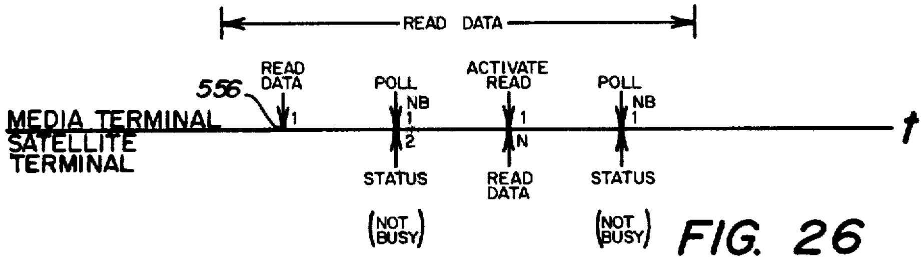
FIG. 26 is a somewhat diagrammatic illustration of commands and responses when data is transferred from a satellite terminal to a media terminal.

In some cases, the VFIO control block data frames shown in FIG. 24 indicate that the satellite terminal has data to be read into and stored on the media terminal's diskette, such as transaction log record or the like. This READ DATA sequence is shown in FIG. 26, and is initiated by a READ DATA command 556 generated from the media terminal. At the next poll from the media terminal, the satellite terminal responds with a NOT BUSY status response. The media terminal then generates the ACTIVATE READ command and the satellite terminal responds with N frames of READ DATA. For example, in the case of transaction log records, well over 100 frames of READ DATA could be transmitted to the media terminal at this point. A poll from the media terminal would then result in a NOT BUSY status response from the satellite terminal indicating that the READ DATA command sequence was complete.

Figure 27:
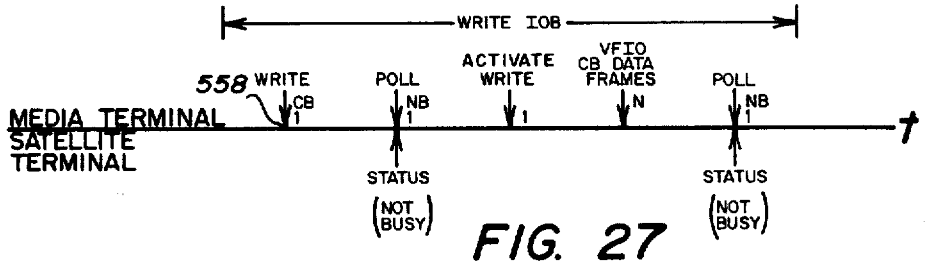
FIG. 27 is a somewhat diagrammatic illustration of commands and responses when transferring control blocks from a media terminal to a satellite terminal.

In order to complete the sequence just described, the control block data frames must be updated and transmitted back to the satellite terminal. This sequence is accomplished by the WRITE IOB command sequence shown in FIG. 27. This command sequence means that the VFIO control block data frames go back to the satellite terminal from which they originated with updated new addresses of the file and any additional updated data required such that the control block data frames are in the current state for subsequent use for the next operation satellite terminal device to perform. The WRITE IOB sequence as shown in FIG. 27 is initiated by a WRITE command generated at 558 by the media terminal. Upon the next poll from the media terminal, the satellite terminal provides a NOT BUSY status command response. The ACTIVATE WRITE command is then generated from the media terminal, followed by N frames of VFIO/CB updated data. This updated data is then stored in the satellite terminal for subsequent use. Following the next poll from the media terminal, the satellite responds with a NOT BUSY status response to terminate the WRITE IOB command sequence.

Figures 28, 29:
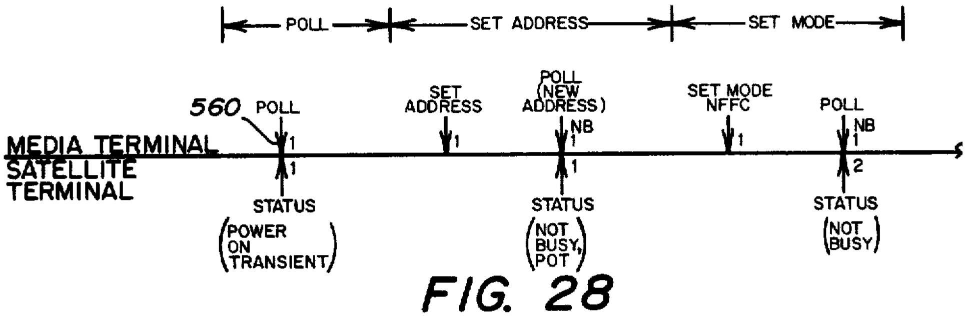
FIG. 28 is an illustration of commands and responses during polling and address setting between a media terminal and a remote satellite terminal.
FIG. 29 illustrates the control block for the primary intermachine adapter control subroutine.

When a satellite terminal comes up from an off state, the media terminal assigns a specific address to the satellite terminal. FIG. 28 illustrates the assignment of the address. The polling sequence is initiated by the poll at 560 from the media terminal followed by a POWER ON TRANSIENT response from the satellite terminal. The SET ADDRESS command is generated from the media terminal and is terminated by a NEW ADDRESS poll subsequently generated by the media terminal which comprises the new address for storage in the satellite terminal.

The SET ADDRESS portion of the command sequence is terminated by a NOT BUSY status command response generated from the satellite terminal. A set mode sequence is initiated by a SET MODE command from the media terminal which indicates the desired mode of operation. The set mode sequence is terminated by a poll from the media followed by a NOT BUSY status command from the satellite terminal.

FIG. 29 comprises a diagram of the PIA control block. The PIA subroutine 498 was indicated in FIG. 22. The control block PIA as shown in FIG. 29 provides the communicating linkage between the primary operations mode microcode of the system and the XXPIA subroutine. As can be seen, the PIA control block comprises 15 bytes 0–E, each of which comprises 8 bits which may be numbered 0–7 from left to right. Description of the bits of the XXPIA control block shown in FIG. 29 follows.

As noted, the media terminal primary intermachine adapter I/O subroutine, termed XXPIA, is used by the media feature to perform I/O operations on the intermachine adapter as a primary terminal. The address of the primary intermachine adapter control block must be loaded into register XR1 prior to the call of XXPIA. XXPIA resets the status bits in the control block byte 0 as shown in FIG. 29 prior to performing the requested operation.

The line adapter and the I/O control subroutine XXPIA form the link between the media and satellite terminals shown in FIGS. 1-3. XXPIA provides primary station control facilities over the line adapter hardware. XXPIA responds to application requests that are to control the various terminals of the system. This enables the sending of data to or from any satellite in the system including the local satellite. FIG. 22, previously described, illustrates the relationship between XXPIA and other I/O subroutines and the line adapter hardware. Referring to FIG. 29, the various bits of the XXPIA control block comprise the following:

Bypte 0 Bits 0-3—X'C'—Device ID—Set up in the control block to identify it as an XXPIA control block.

Byte 0 Bit 4—UC—Unit Check—Set with device end (DE) to indicate an XXPIA detected failure. Unit check indicates that an error code in byte 5 describes the error condition.

Byte 0 Bit 5—SE—Satellite Exception—Set with device end (DE) to indicate a satellite detected exception condition has been reported. The specific satellite exception condition is indicated in "station status byte '1'" (control block byte 8).

Byte 0 Bit 6—DE—Device End—Set by the I/O control code when the I/O request has been serviced. DE may be set with UC, SE, or UE to indicate an exception completion. Only one exception bit may be set with DE.

Bypte 0 Bit 7—UE—Unit Exception—Set with device end to indicate that some condition set in byte 6 has been detected.

UE is used when a satellite station does not respond to a command, ie, terminal is offline. In this situation, byte 6, bit 7 is set. This exception condition is reported only after the I/O control code has retired the operation that received no response sufficiently to ensure that the terminal is offline.

Byte 1—Command Byte 0—Specifies the operation that is to be performed. The valid command byte values are described below. Line frame formats are specified in the following Table I.

TABLE I

| Frame | Bit 0 1 2 | 3 | 4 5 6 | 7 8 9 10 11 12 13 14 | 15 |
|---|---|---|---|---|---|
| SET MODE | 0 0 0 | X | G-POST | 0 0 0 1 0 0 1 1 | 1 |
| | FILL | P | ADDR | | S |
| SET ADDRESS | 0 0 0 | X | / / / | X X X 0 0 1 0 0 | 1 |
| | FILL | P | POT ADDR | NEW ADDR | S |
| RESET | 0 0 0 | X | G-POST | 0 0 0 0 0 0 1 0 | 1 |
| | FILL | P | ADDR | | S |
| MODE CONTROL | 0 0 0 | X | / / / | X X X X X 0 0 0 | 1 |
| | FILL | P | | FILL COUNT | S |
| READ DEVICE | 0 0 0 | X | G-POST | X X X 0 1 1 0 0 | 1 |
| ID | FILL | P | ADDR | QUEUE | S |
| ACTIVATE | 0 0 0 | X | G-POST | 0 0 0 0 0 0 0 0 | 1 |
| READ | FILL | P | ADDR | | S |
| ACTIVATE | 0 0 0 | X | G-POST | 0 0 0 0 0 0 0 1 | 1 |
| WRITE | FILL | P | ADDR | | S |
| ID | 0 0 0 | X | / / / | X X X X X X X X | 1 |
| RESPONSE | FILL | P | | ID DATA | S |
| READ IOB | 0 0 0 | X | G-POST | X X X 0 1 0 0 0 | 1 |
| | FILL | P | ADDR | QUEUE | S |
| READ | 0 0 0 | X | G-POST | X X X X X X X X | 1 |
| RESPONSE | FILL | P | ADDR | READ DATA | S |
| READ BUFFER | 0 0 0 | X | G-POST | X X X 1 1 0 0 0 | 1 |
| | FILL | P | ADDR | QUEUE | S |
| WRITE IOB | 0 0 0 | X | G-POST | X X X 0 1 1 1 0 | 1 |
| | FILL | P | ADDR | QUEUE | S |
| WRITE DATA | 0 0 0 | X | G-POST | X X X X X X X X | 1 |
| | FILL | P | ADDR | DATA BYTE | S |
| WRITE BUFFER | 0 0 0 | X | G-POST | X X X 1 1 1 1 0 | 1 |
| | FILL | P | ADDR | QUEUE | S |
| POLL | 0 0 0 | X | G-POST | 0 0 0 1 0 0 0 0 | 1 |
| | FILL | P | ADDR | | S |
| POLL ACK | 0 0 0 | X | G-POST | 0 0 1 1 0 0 0 0 | 1 |
| | FILL | P | ADDR | | S |
| POLL RESET | 0 0 0 | X | G-POST | 0 1 0 1 0 0 0 0 | 1 |
| | FILL | P | ADDR | | S |
| POLL | 0 0 0 | X | G-POST | X X X X X X X X | 1 |
| RESPONSE 1 | FILL | P | ADDR | STATUS BYTE 1 | S |
| POLL | 0 0 0 | X | G-POST | X X X X X X X X | 1 |
| RESPONSE 2 | FILL | P | | STATUS BYTE 2 | S |
| CLEAR | 0 0 0 | X | G-POST | X X X 1 0 0 1 0 | 1 |
| | FILL | P | ADDR | QUEUE | S |
| RESET IMA | 0 0 0 | X | G-POST | 0 0 1 0 0 0 1 0 | 1 |
| | FILL | P | ADDR | QUEUE | S |

Data is transmitted bit 15 first

P=Even parity on bits 3-15

S=Sync=1

G-POST ADDR=The 3-bit address of a specific (general point-of-sale) terminal in the cluster Referring to Table I, X' 01' Command—Set Mode—initiates a set mode sequence.

A set mode command frame is transmitted to the addressed terminal station followed by a mode control byte frame. The fill count field (bits 7-11) in the mode control byte frame is supplied by the application. Bits 3-7 in the byte pointed to by the data address control block field contains the fill count. The fill count specifies in binary the number of times an 8-bit fill byte (X'00') is repeated between consecutive frames. Since only 16-bit frames are sent, the fill count must be even. An odd specification will be rounded up by one. The present terminals run at full speed, therefore, the fill count is X'00'. Following the transmission of the mode control byte frame, XXPIA will poll the addressed secondary station until non busy status is returned. The last status bytes received are stored in control block bytes 8 and 9. The set mode command is used in the power on transition sequence. Device end is set when the set mode sequence is complete. The set mode command cannot be issued to the local satellite (address X'00').

X'02' Command—Set Address—Initiates a set address sequence.

A set address command frame is transmitted on the port specified by a function or application program in bits 3 and 4 in control block byte 7. Station address X'7' appears in bits 5-7, Table I. The address assigned (frame bits 7, 8 and 9) is specified in bits 0, 1 and 2 in control block byte A. Following the transmission of the set address command frame, XXPIA will poll the new address until non busy status is returned. The last status bytes received are stored in control block bytes 8 and 9.

If the addressed secondary station does not respond to the poll for non busy status or a parity error is detected on the response to the poll, XXPIA will transmit a reset IMA command to the address just assigned. XXPIA will then poll address X'7' until power on transition status is returned. When power on transition status is returned, XXPIA will transmit a set of address command and the above sequence will be repeated. If a parity error is detected on the response from address X'7', a reset IMA command is transmitted to address X'7' and address X'7' is polled for power on transition status. XXPIA retries the set address sequence for up to 5 seconds before error status is reported to the application.

The set address command assigns an address to the secondary station on the addressed line that most recently transmitted power on transition status. The first nonbusy poll response following a set address command must be a power on transition response. The set address command is used in the power on transition sequence. Device end is set when the set address sequence is complete. The set address command cannot be issued to the local satellite (address X'00').

X'03' Command—Reset—Initiates a reset satellite station command sequence.

A reset command frame is transmitted to the addressed secondary station. Following the transmission of the set address command frame, XXPIA will poll the addressed secondary station until non busy status is returned or there is no response. The last status bytes received are stored in control block bytes 8 and 9. When a secondary station receives a reset command, it will operate as it does following a power on reset. The reset command is used for error recovery purposes. Device end is set when the reset sequence is complete.

X'04' Command—Read ID—Initiates a read ID sequence.

The one byte ID received from the satellite station is stored at the address contained in control block bytes 3 and 4. A read device ID command frame is transmitted to the addressed secondary station. The queue frame field (bits 7, 8 and 9) is supplied by the application in control block byte A bits 0, 1 and 2. The queue field in a read device ID frame is currently ignored by a satellite terminal. Following the transmission of the read device ID command, XXPIA will poll the addressed terminal until non busy status is returned.

When non busy status is returned, XXPIA transmits an activate read command frame to the addressed terminal. The addressed terminal will return an ID response frame to XXPIA. XXPIA will move the data portion of the ID response (bits 7-14) to the address pointed to by control block bytes 3 and 4. Following receipt of the ID response, XXPIA will poll the addressed terminal until non busy status is received. The last status bytes received are stored in control block bytes 8 and 9.

The read ID command can be used to identify the type of terminal that has just powered on. A terminal satellite is identified by the code X'78'. A media station operating in media secondary mode is identified by the code X'79'. The read device ID command is used in the power on transition sequence.

X'05' Command—Read IOB—Initiates a read IOB sequence.

A read IOB command frame is transmitted to the addressed secondary station. The queue frame field (bits 7, 8 and 9) is supplied by the application in control block byte A bits 0, 1 and 2. The queue field specifies to a secondary station the specific IOB that is to be transmitted to the primary station.

Following the transmission of the read IOB command, XXPIA will poll the addressed terminal until non busy status is returned. When non busy status is returned, XXPIA transmits an activate read command frame to the addressed terminal. The addressed terminal will return multiple read response frames each containing a byte of IOB data until the entire IBO Is transmitted. The last read response frame will have the G-POST address field (bits 4, 5 and 6) set to 111. As each byte is received, it is placed by XXPIA sequentially in ascending memory locations starting at the data address in control block bytes 3 and 4.

Therefore, a copy of the IOB that was pointed to by the queued XXSIA, YYSIAM, or XXVSIA request in the secondary station would appear in the media features memory starting at the data address. Following receipt of the IOB, XXPIA will poll the addressed terminal until non busy status is received. The last status bytes received are stored in control block bytes 8 and 9. Note that it is not the XXSIA, YYSIAM, or XXVISA IOB that is transmitted by the IOB that is pointed to by the XXSIA, YYSIAM, or XXVSIA IOB.

The read IOB command is used in the poll service routine. The read IOB is issued to determine the type of service a terminal is requesting. A read IOB command causes the data buffer pointer in the addressed satellite to be set to the beginning of the data buffer. Any subsequent read or write commands will cause data to be transferred starting at the beginning of the data buffer. The resetting effect of the read IOB command is used during error recovery to retransmit the contents of the data buffer.

X'06' Command—Read Buffer—Initiates a read buffer sequence.

A read buffer command frame is transmitted to the addressed secondary station. The queue frame field (bits 7, 8 and 9) is supplied by the application in control block byte A bits 0, 1 and 2. The queue field specifies to a secondary station the IOB whose associated data is to be transmitted.

Following the transmission of the read buffer command, XXPIA will poll the addressed terminal until non busy status is returned. When non busy status is returned, XXPIA transmits an activate read command frame to the addressed terminal. The addressed terminal will return multiple read response frames each containing a byte of buffer data until one transmission block is transmitted. The last read response frame in a block will have the address field (bits 4, 5 and 6) set to 111.

As each byte is received, it is placed by XXPIA sequentially in ascending memory locations starting at the data address in control block bytes 3 and 4. Following receipt of the buffer data, XXPIA will poll the addressed terminal until non busy status is received. The last status bytes received are stored in control block bytes 8 and 9. The read buffer command is used in the poll service routine. When a request is determined to be of a "write" type (ie, data transferred from secondary to primary) a read buffer command is issued to transfer the data. One read buffer command is required for each block of the data to be transmitted from secondary to primary station (see XXSIA).

X'07' Command—Write IOB—Initiates a write IOB sequence.

A write IOB command frame is transmitted to the addressed secondary station. The queue frame field (bits 7, 8 and 9) is supplied by the application in control block byte A bits 0, 1 and 2. The queue field specifies to a secondary station the IOB that will be transmitted by the media station. Following the transmission of the write IOB command, XXPIA will poll the addressed terminal until non busy status is returned. When non busy status is returned, XXPIA transmits an activate write command frame to the addressed terminal.

XXPIA will then transmit multiple write data frames each containing a byte of IOB data until the entire IOB is transmitted. The last write data frame will have the address field (bits 4, 5 and 6) set to 111. The leftmost byte of the IOB to transmit is stored at the address in control block bytes 3 and 4. Following the last IOB byte transmission, XXPIA will poll the addressed terminal until non busy status is received. The last status bytes received are stored in control block bytes 8 and 9. The write IOB command is used in the poll service routine. It is used to return the completed IOB (with DE set) to the terminal initiating the request.

X'08' Command—Write Buffer—Initiates a write buffer sequence.

A write buffer command frame is transmitted to the addressed secondary station. The queue frame field (bits 7, 8 and 9) is supplied by the application in control block byte A bits 0, 1 and 2. The queue field specifies to a secondary station the IOB whose associated data will be transmitted by the media station. Following the transmission of the write buffer command, XXPIA will poll the addressed terminal until non busy status is returned. When non busy status is returned, XXPIA transmits an activate write command frame to the addressed terminal.

XXPIA will then transmit multiple write data frames each containing a byte of data until the entire data buffer is transmitted. The last write data frame will have the terminal address field (bits 4, 5 and 6) set to 111. The leftmost byte of the data to transmit to the secondary station is stored at the address in control block bytes 3 and 4. Following the last data byte transmission, XXPIA will poll the addressed terminal until non busy status is received. The last status bytes received are stored in control block bytes 8 and 9. The write buffer command is used in the poll service routine. It is used to transfer data to a secondary station when a "read" type (data transfer from primary to secondary) request is received. At a secondary station, the data transmitted by a write buffer command will constitute one transmission block. One write buffer command is required for each transmission block expected by the secondary station.

X40 09' Command—Poll—Initiates a poll sequence.

A poll command frame is transmitted to the addressed secondary station. The addressed station will return one or two status response frames. If the addressed station has received a set mode command, two status response frames will be returned, otherwise only one will be returned. Responses to "busy" status will cause XXPIA to repeat the poll command until a non busy response is received.

The status bytes are contained in bits 7-14 of the poll response frames, one byte per frame. The last status byte(s) received is stored in the control block bytes 8 and 9. If no byte 2 was received, byte 9 is set to X'00' by XXPIA. Poll response 1 bits 4, 5 and 6 are set to 111 if only one poll response frame is transmitted.

X'OA' Command—Poll Reset—Initiates a poll and reset parity error sequence.

A poll reset command frame is transmitted to the addressed secondary station. One or two status frames will be returned by the addressed station. If the returned status indicates a busy condition. XXPIA will transmit poll (non reset) frames and continue to analyze the returned status until non busy status is returned. The last status bytes received will be stored in the control block bytes 8 and 9. The poll reset command is issued to reset a previously indicated parity error status bit. The poll reset command cannot be issued to the local satellite (address X'OO').

X'OB' Command—Poll Ack—Initiates a poll and ACK (acknowledge) status sequence.

A poll ACK command frame is transmitted to the addressed secondary station. One or two status frames will be returned by the addressed station. If the returned status indicates a busy condition, XXPIA will transmit poll (non ACK) frames and continue to analyze the returned status until non busy status returned. The last status bytes received will be stored in the control block bytes 8 and 9. The poll ACK command is issued to acknowledge exception status transmitted by a secondary station. The poll ACK command cannot be issued to the local satellite (address X'OO').

X'OC' Command—Clear—Initiates a clear command sequence.

A clear command frame is transmitted to the addressed secondary station. The queue to be cleared is specified in control block byte A. Following the transmission of the clear command, XXPIA will poll the addressed terminal until non busy status is returned. The last status received is stored in control block bits 8 and 9. This command causes any currently pending requests in the specified queue to be flushed without being executed. Appropriate status is presented to the secondary application by the flushed requests.

X'OD' Command—Line Activate—XXPIA polls the indicated satellite station but does not wait for a response. This command is used to keep terminals on a particular line from timing out when another line requires more than 15 seconds of continuous service.

The line activate command cannot be issued to the local satellite (address X'OO').

X'OE' Command—Reset IMA—Initiates a reset IMA command sequence.

A reset IMA command frame is transmitted to the addressed secondary station. Following the transmission of the reset IMA command, XXPIA will poll the addressed terminal until non busy status is returned or there is no response. The last status received is stored in control block bits 8 and 9. This command causes the addressed secondary station to return to power on transition state and request a new address. Requests that are pending at the secondary station are not affected and will be presented after the address assignment sequence has been completed.

The reset IMA command cannot be issued to the local satellite (address X'OO').

X'OF' Command—Monitor Line—XXPIA monitors the specified line (station address) for activity.

The monitor period is 5 seconds $+-10\%$. Device end is set at the end of the monitor period. Sense byte 6 bit 6 is set if activity is detected. Activity is defined as any signals on the line. The monitor line command cannot be issued to the local satellite (address X'OO').

Referring again to the control block shown in FIG. 29, Byte 2—Command Byte 1—Reserved for system expansion.

Bytes 3 and 4—Provides a pointer to a data buffer for the following commands:

SET MODE—MODE BYTE
READ ID—ID BYTE
READ IOB—IOB
READ DATA—DATA

WRITE IOB—IOB
WRITE DATA—DATA
The address points to the leftmost byte of the data buffer.

Byte 5—Error Code—Used to indicate the failure detected when UC is set with DE status.

Byte 6 Bit 5—Busy Time Out—The addressed station has been reporting busy status to a poll for more than 5 seconds.

Byte 6 Bit 6—Line Active—At device end time of a monitor line command, this bit indicates if any line activity was detected.

Byte 6 Bit 7—No Response—This bit is set with UE to indicate that a polled terminal did not respond.

Byte 7—Station Address—Contains the station to be addressed for all command sequences.

The format of the station address is as follows:

Bits 0–2—Reserved

Bits 3–4—Line address 01-11

Bits 5–7—Satellite address

The address X'00' is reserved for the local satellite.

Satellite address 111 is used by terminals that have just powered on and have not received a set address command. The local satellite (address X'00') does not report power on transition status to an integral media feature because the local satellite is not connected to its integral media feature through the IMA hardware. At power on or when a disk is inserted, the media feature assumes that the local satellite has completed its power on transition sequence. The media feature views the local satellite as address X'00'.

Bytes 8 and 9—Station Status Byte 1 and 2—These bytes contain the status returned by a satellite terminal to the last poll of any sequence.

Status byte 1 is defined as follows:

| | |
|---|---|
| Bit 0 | Busy |
| 1 | Line parity error |
| 2 | Reserved |
| 3 | Reserved |
| 4–6 | Exception status |
| 7 | Even/Odd response level |

Status Bit 0—Busy 0=Not Busy, 1=Busy

A terminal reporting busy status is in the process of servicing a previously issued command. No further commands will be accepted until non busy status is reported. Busy is a real time response updated by a secondary station without changing bit 7 (response level).

Status Bit 1—Line Parity 0=No parity error detected 1=Line parity error detected Line parity error is reported by a secondary station that detects a parity error in a received frame. The media station must reset the parity indication in a secondary station by issuing a poll reset command before any other commands are issued.

Status Bits 4–6—Exception Status—Exception status is encoded as follows:

| Bit | | | |
|---|---|---|---|
| 4 | 5 | 6 | |
| 0 | 0 | 0 | No exception status |
| 0 | 0 | 1 | Activate lost |
| 0 | 1 | 0 | Invalid activate |
| 0 | 1 | 1 | Reserved |
| 1 | 0 | 0 | Invalid command |
| 1 | 0 | 1 | Storage overrun |
| 1 | 1 | 0 | Queue empty |
| 1 | 1 | 1 | Power on transition |

When an exception condition is detected, processing of the current command will be discontinued, and only poll, poll ACK, poll reset, set mode, reset and reset IMA will be processed until the exception status is reset. Exception status other than power on transition must be reset by the media station by issuing a poll ACK command. Power on transition status is reset by issuing a set mode command.

001—Activate Lost—A line error was detected between a read command and an activate read, or between a write command and an activate write.

010—Invalid Activate—An activate read command was received following a write buffer or write IOB command, or an activate write command was received following a read buffer, read IOB, or read ID command.

100—Invalid Command—The secondary station received a command bit combination that is not defined in the command set.

101—Storage Overrun—An attempt was made to read or write data beyond allowed storage limits.

110—Queue Empty—The queue that was referenced in a media request to read or write data, or read or write an IOB did not have an outstanding request (IOB's).

111—Power on Transition—This status is transmitted by a secondary station immediately following a power on, after receiving a reset or reset IMA command, or when a no service or media unavailable time-out occurs. Power on transition status must be reset by the media station by transmitting a set mode command. XXSIA contains a discussion of the power on transition sequence.

Status Bit 7—Even/Odd Response Level—The even/odd response level bit is used by the media station to differentiate between new status and retransmitted status. Status is retransmitted by a secondary station on each poll it receives until a poll ACK command is received and new status is available. The first status response after power up will be on level 0; therefore, the first new status report will be on level 1.

Real time response status bits (bits 0 and 1) are changed by a secondary station without updating the even/odd response level.

Status byte 2 is defined as follows:

| | |
|---|---|
| Bit 0 | Request pending in queue 0 |
| 1 | Request pending in queue 1 |
| 2 | Request pending in queue 2 |
| 3 | Request pending in queue 3 |
| 4 | Request pending in queue 4 |
| 5 | Request pending in queue 5 |
| 6 | Request pending in queue 6 |
| 7 | Request pending in queue 7 |

Status byte 2 is not transmitted while power on transition status is being reported in status byte 1. A secondary terminal queue represents a stack of requests that have the same service priority. Queue 0 is the highest priority, queue 7 is lowest priority; the queue structure allows the media station to identify the priority of a request without reading the request control block (IOB). The bits in status byte 2 indicate the queues in the secondary station that have requests awaiting media station service.

When a terminal is polled, status byte 2 is checked for any request. If a request is found, the IOB in the highest priority queue requesting service is read into the media station. The request is analyzed and a read or write buffer is issued. The IOB is then written back to the secondary station, with completion status.

Two queues are used by a satellite terminal. Queue 3 is used for logging requests with an VFIO type IOB and for all requests with a LDIO IOB. Queue 6 is used for paging requests with a VFIO type IOB.

Byte A—Station Queue—Indicates to the satellite station queue that a sequence is directed.

There are eight secondary station queues (0-7). Each queue represents a stack of secondary station requests having the same service priority. Queue 0 is highest priority; queue 7 is lowest priority. The queue structure allows the media station to identify the priority of a request without reading the request control block (IOB). Requests are serviced FIFO within a queue.

Control block byte A contains the queue, in binary, in bits 0, 1, and 2. Byte A specifies the queue to which the command is directed.

This field is required for the following commands:

READ ID
READ IOB
READ BUFFER
WRITE IOB
WRITE BUFFER
CLEAR (QUEUE)

Bytes B and C—Max Byte Count—Contains the maximum byte count for read operations and the transmit byte count for write operations.

If the maximum byte count is exceeded during a read operation an error is indicated.

Bytes D and E—Set by XXPIA following a read operation to indicate the actual number of bytes received.

XXSIA

The Secondary Intermachine Adapter I/O control subroutine, termed XXSIA, is used to perform I/O operations on the intermachine adaptor hardware in a remote satellite terminal. FIG. 30 illustrates the control block for XXSIA. The address of the control block must be loaded into register XR1 prior to the call of XXSIA. XXSIA resets the status bits in control block byte 2 prior to performing the requested operation.

| | | |
|---|---|---|
| Calling Format: | SVC | |
| | DC | SL1 'REQUEST CODE' |

The Secondary Intermachine Adapter I/O control subroutine (XXSIA), together with the line adapter IMA hardware, performs the line control functions required of a secondary station. These functions include responding to application requests made through the SIA I/O control block, and automatically responding to certain line requests made by the remote primary media station. XXSIA transmits power on transition status, accepts set address, reset, reset IMA, and set mode commands, and responds to a read device ID command when required without receiving an application request.

When XXSIA is reset, it assumes "power on transition state". In a satellite station, XXSIA is reset by a no service time-out, a media unavailable time-out, a power on or a reset or reset IMA line command. When in "power on transition state", XXSIA responds to any poll received for address X'7' with Power On Transition status. The primary station responds to POT status from address X'7' with a set address command. The set address command assigns the next unused line address to the secondary station.

If the primary station detects a parity error in response to a poll for address X'7', the primary station assumes that more than one secondary station has responded. The primary station sends a reset IMA command to address X'7' which causes the secondary stations in power on transition state to execute a random time delay routine which will delay the station's next response to a poll for address X'7'.

After an address has been assigned to a secondary station, the primary station will poll the assigned address and expect a POT status response. If a POT status response is not received, the primary station will issue a reset IMA command to the assigned address which will return the secondary station to "power on transition state". When the POT status response is received by the primary station from the secondary station with the assigned address, the primary station will send a set mode command to the secondary station. The set mode command sets the null frame fill count which specifies the number of null frames that must be inserted between each data frame transmitted by the secondary station.

Following the set mode command exchange, the primary station issues a read device ID command to the assigned address. The satellite station responds with a single byte device attribute code. The device attribute code indicates the secondary station's terminal type. XXSIA identifies with a code of X'78'.

Referring to FIG. 30:

Bytes 0 and 1—Work Byte—These bytes are used by XXSIA.

Byte 2 Bits 0-3—X'D'—Code identifies the control block as a satellite intermachine adapter control block.

Byte 2 Bit 4—UC—Unit check bit is set by the SIMA I/O control code with DE to indicate that an error was detected.

Byte 2 Bit 6—DE—Device end bit is set by the SIMA I/O control code to indicate that execution is complete.

Byte 2 Bit 7—UE—Unit exception bit is set when a recovered error occurred during or prior to the execution of the current command. Byte 5 contains the error code.

Byte 3 Bits 5-7—Queue—This field indicates the queue that is used for the request.

There are eight secondary station queues (0-7). Each queue represents a stack of secondary station requests having the same service priority. Queue 0 is highest priority, queue 7 is lowest priority. The queue structure allows the media station to identify the priority of a request without reading the request control block (IOB). Requests are serviced FIFO within a queue.

Bits 5-7 specify the queue in binary where the current request is directed.

Bytes 5 and 6—This field contains the address of the leftmost byte of a data buffer. This field must be specified if the request requires data transmission.

The data pointed to by this field is transmitted to the primary station when a read buffer command is received, or transmitted from the primary station when a write buffer command is received.

Byte 7—Error Code—When unit check status is set. This byte contains a code specifying the error condition.

Bytes 9 and A—IOB Address—Leftmost byte of an IOB that describes the request to the media station. Note the virtual file IOB at the end of the XXSIA section.

The IOB pointed to by this field is transmitted to the primary station when a read IOB command is received, or transmitted from the primary station when a write IOB command is received.

Byte B—IOB Length—Length (in bytes) of the IOB.

Byte C—# of Transmission Blocks—Number of transmission blocks to be transferred.

Bytes D and E—Transmission Block Size—Specifies the number of bytes contained in each transmission block.

A read transmission block consists of N read response frames. A write transmission block consists of N write data frames. The last frame transmitted in each block will have the address field set to 111 to indicate end of block.

The number of transmission blocks that will be required to complete a command can be calculated by dividing the buffer length by the transmission block size and rounding up to the nearest integer. When a portion of a transmission block exceeds the data available in the buffer, X'00' data bytes are transmitted for the remainder of the transmission block. Short blocks are not transmitted.

The media station will issue separate read buffer commands and activate reads (or write buffer commands and activate writes) for each transmission block to be transferred. The first read or write command causes the first N (where N is the length of a transmission block) bytes in the data buffer to be transferred; the next read or write command causes the next N bytes to be transferred. This procedure is repeated until all data is transferred.

A read IOB command causes the data pointer in the satellite to reset to the beginning of the data buffer. The next read or write command will cause the first N bytes in the data buffer to be transferred.

The transmission block size can be specified from 128 to 1024 bytes, in multiples of 128.

Bytes F and 10—IOB Receive Buffer Address—Address of work buffer used by the I/O control code to receive the IOB before moving it to the IOB address.

Bytes 11 and 12—Work area used by XXSIA.

Bytes 13 and 14—No Service Timeout—These bytes specify the time (±10%) XXSIA will wait before a no service timeout error is reported to the application. The time is specified in units of 1/3300 of a min. The following table lists some useful delays in hex:

| Delay (Min) | Hex |
|---|---|
| 1 | X'OCE4' |
| 2 | X'19C8' |
| 3 | X'26AC' |
| 4 | X'3390' |
| 5 | X'4074' |

This field is destroyed by XXSIA.

Bytes 15 through 16—Work area used by XXSIA.

VFIO

The virtual file IOB (VFIO) previously noted in FIG. 22 is used in a satellite station to perform I/O operations on the remote disk file. It is referenced by bytes '9' and 'A' in the XXSIA control block shown in FIG. 30.

The Virtual File IOB control block is shown in FIG. 31, wherein:

Byte 0 bits 0-3—Device ID—X'4' identifies the control block as a Satellite Virtual File interface.

Byte 0 bit 4—Unit Check (UC)—This bit is set at device end time if an error condition was detected.

Byte 1 Bit 2—Add—This command adds a 128-byte record to the file specified in bytes 'A'-'E'.

The transmission block size must be 128 and the number of records must be 1.

Byte 1 Bit 3—Modify Add—This command writes a 128-byte record over the last record added to the file specified in bytes 'A'-'E'.

The transmission block size must be 128 and the number of records must be 1.

Byte 1 Bit 5—Read—Data is read from the file specified in bytes 'A'-'E' into memory at the specified locations.

Byte 2 Bit 0—Get Time/Date—One 128-byte record containing time and data and media code level is transmitted to the satellite station and stored in the data area.

The transmission block size must be 128 and the number of transmission blocks must be 1.

Record Format:

Bytes 0-5—Date in the form MMDDYY or DDMMYY in unpacked decimal

Byte 6—Blank (X'40')

Bytes 7-13—Edited date in the form MM-DD-Y or DD-MM-Y

Byte 14—Blank (X'40')

Bytes 15-18—Unpacked decimal time (HHMM)

Bytes 19-25—7 byte media ROS part number

Bytes 26-32—7 byte media ROS EC number

Bytes 33-39—7 byte media application (disk) part number

Bytes 40-46—7 byte media application (disk) EC number

Bytes 47-127—Reserved.

Byte 2 Bits 4-7—Memory Size—This field is set up by a satellite terminal requesting a VFIO operation. It indicates the amount of memory installed in the satellite requesting the operation. The field value is defined to be the same as the "memory size" field in the KYIO control block.

Bytes 3 and 4—Data Address—Contains the leftmost address of the data buffer used by ADD, MODIFY ADD, WRITE, and GET TIME/DATE operations.

Byte 5—Error Code—The error code is set by the media application code with unit check (UC) when an error is detected.

Byte 6 Bit 0—Local Satellite—This bit is set at device end time to indicate that the requesting application is running in the local satellite.

Bytes 7 and 8—Binary Logical Record Offset—The number of 128-byte logical records past the file BOE that reading or writing is to begin.

Byte 9—Binary Number of Transmission Blocks—The number of transmission blocks to read or write. At device end time of read commands, this byte is set to the number of transmission blocks actually received.

Bytes A-E—Data Set Name—Five-character data set name, left justified. Defines the data set to be operated on.

Bytes F-14—Store/Register Number—Six-character store/register number.

Bytes 15-16—Transmission Block Size—Specifies the transmission block size that is to be used in servicing the request.

For Get Time/Date, Add, or Modify Add commands, the transmission block size must be 128 bytes. For Read commands, the block size can be 128 to 1024 in multiples of 128.

YYSIAM

The Secondary Intermachine Adapter I/O control subroutine, YYSIAM, is a RAM subroutine. The functions performed by YYSIAM are the same as performed by XXSIA, except for the following differences:

Bit 0 of control block command byte 3 is used to enable YYSIAM. This command must be issued before any SIA requests are initiated.

When the initialization command is issued, the data address field (bytes 5 and 6) contains the leftmost address of a table that contains information used by YYSIAM. The table contains a device ID which for a satellite is X'78'.

When YYSIAM is enabled, commands cannot be issued to XXPIA.

Bit 1 of control block command byte 3 indicates that YYSIAM is to be disabled. YYSIAM must be disabled before commands can be issued to XXPIA. (Note a POR or disk reset will also allow commands to be issued to XXPIA.)

An additional error, X'79', is reported by YYSIAM when it receives a request without being enabled.

The address of the control block shown in FIG. 30 must be loaded into XR1 prior to calling YYSIAM.

| | | |
|---|---|---|
| Calling Format: | B | YYSIAM |
| | NSI | |

XXVSIA

The Local Satellite Virtual Secondary Intermachine Adapter I/O control subroutine, XXVSIA, is included in the XXSIA subroutine. XXVSIA accepts requests in the same format as the Secondary Intermachine Adapter I/O control subroutines, but actually passes the request directly to the integral media feature for processing. Refer to FIG. 30 for detailed description of the XXSIA control block. The address of the control block must be loaded into XR1 prior to calling XXVSIA. XXVSIA resets the status bits in control block byte 2 prior to performing the requested operation.

The VFIO IOB described in XXSIA can be used with the XXVSIA control block. An additional IOB (LDIO) can also be used with XXVSIA.

| | | |
|---|---|---|
| Calling Format: | SVC | |
| | DC | XL1 'REQUEST CODE' |

LDIO

The local satellite disk IOB (LDIO) described above is used in a local satellite station to perform I/O operations on the media cluster disk file. This IOB is referenced in bytes 9 and A in the XXVSIA control block.

The local satellite disk IOB control block is shown in FIG. 32. The control block is defined by:

Byte 0 Bits 0-3—Device ID—X'E' identifies the control block as a Satellite Virtual File interface.

Byte 0 Bit 4—Unit Check (UC)—This bit is set at device end time if an error condition was detected.

Byte 1 Bit 1—Inhibit Disk Reset—Inhibits the disk reset function until a cancel is issued.

Byte 1 Bit 2—Cancel—Cancels the inhibit disk reset function.

Byte 1 Bit 5—Write—The indicated data to be written to the media cluster file.

Byte 1 Bit 6—Read—The indicated data is read from the media cluster file.

Byte 1 Bit 7—Sync—A sync operation is performed.

Byte 2 Bit 1—Inhibit CS—Inhibits data Cycle Steal operations; the single byte of data pointed to by the data address is written to all file locations.

Byte 2 Bit 6—Media Cluster Reset—Causes the media cluster processor to execute its initialization program and enter the uninitialized operational state.

Byte 2 Bit 7—H Format—Specifies that the data is recorded on the media cluster file in a conventional format known as "H Format".

Bytes 3 and 4—Data Address—Contains the leftmost address of the data buffer used by read and write operations.

Byte 5—Error Code—The error code is set with unit check (UC) when an error is detected.

Byte 6 Bit 1—Media 2D—Set at command completion to indicate the type of diskette inserted in the Media Cluster File.

Byte 6 Bit 6—Disk In—Set at the completion of the execution of a cancel command to indicate if a diskette as been inserted.

Bytes 7 and 8—Work Area Address—This address points to the leftmost byte of a 256 byte work area used by the I/O control code when an index search is performed.

Bytes 9 and A—Binary Logical Record Offset—The number of 128-byte logical records past the file BOE that reading or writing is to begin.

Byte B—Binary Number of Logical Records—The number of 128 byte logical records to read or write. At device end time of read commands, this byte is set to the number of logical records actually received.

Bytes C-10—Data Set Name or Binary BOE—Five-character data set name, left justified. Defines the location of the beginning of the data set to be operated on.

This field is set to the binary "beginning of extent" (location) on the first command issued to a data set name.

Bytes 11-13-Binary EOD—Contains the binary physical end of data.

Bytes 14-16—Binary EOE—Contains the binary physical "end of extent", i.e., the end of the space allocated for the data set.

Bytes 17-19—Disk Error Location—Contains the packed decimal physical error location when a disk error is detected.

XXKYIO

FIG. 33 illustrates the control block for the keyboard/display I/O control subroutine termed XXKYIO, for standalone and remote satellite terminals. XXKYIO performs I/O operations on the keyboard 12, transaction display 14, customer display 15, drum prompt 17 (FIG. 1) and other elements of a terminal station. The address of the control block must be loaded into register XR1 prior to the call of XXKYIO. XXKYIO resets the status bits in control block byte 0 prior to performing the requested operation.

| Calling Format: | SVC | |
|---|---|---|
| | DC | XL1 'REQUEST CODE' |

XXKYIO

FIG. 33 shows the keyboard/display I/O, XXKYIO, control block, wherein:

Byte O bits 0-3—Device ID—X'1' identifies the control block as a keyboard/display interface control block.

Byte 0 bit 4—Unit Check (UC)—This bit is set by the I/O control subroutine at device end time if an error condition was detected.

Byte 0 bit 6—Device End (DE)—This bit is set by the I/O control subroutine when all commands indicated in the control block have been executed.

The operations performed when a keyboard/display request is made depends on the bits set in command bytes 1 and 2. Multiple operations may be performed with one I/O request. All operations requested will be performed unless inhibited by unit check conditions. After all commands have been executed and I/O operations are complete, device end is set.

The keyboard/display I/O control subroutine sounds the audible alarm if a keyboard key is pressed and there is no outstanding keyboard request.

Byte 0 Bit 7—Unit Exception (UE)—This bit is set by XXKYIO at device end time if an error was detected and corrected by XXKYIO. Byte 5 contains a code that describes the error condition.

Byte 1 bit 0—Alarm—The I/O control subroutine turns on an audible alarm. The alarm sound for a fixed time interval and then stops. The I/O control subroutine does not wait for the alarm to stop before executing other commands, if any, or setting device end.

Byte 1 bit 1—Update Display 1—The transaction display is updated with the data pointed to by the Data Address in bytes 3 and 4 of the control block. This bit must be set when update display 2 is used. Byte 0 of the field pointed to by the data address contains the length of the field to be displayed. Bytes 1-32 of this field contain the data to be displayed. A maximum of nine characters plus decimal point may be displayed at one time. The position of the decimal point in the display is determined by a code in Byte 'A' defined as follows:

X'00'—No decimal point
X'01'—Decimal point with no decimal digits
X'02'—Decimal point with 1 decimal digit
X'03'—Decimal point with 2 decimal digits
X'04'—Decimal point with 3 decimal digits All other decimal point positions are invalid and will cause no decimal display.

The LED's on the transaction display are updated based on the bits in Byte 'B' of the control block. A bit on turns on the corresponding LED on the transaction display.

The amount due, subtotal, change and refund LED's are flashed on and off by XXKYIO when turned on by the application. The LED's specified in byte B are the only transaction dispaly discrete LED's controlled by an application program.

Byte 1 bit 2—Update Display 2—The customer display and the LED's on the customer display are updated with data from the control block in the same way that the Update Display 1 command updates the transaction display and LED's. The Update Display 1 command bit must be set when this command is set.

Byte 1 bit 3—Flash Display—May be set in conjunction with Update Display 1 and/or Update Display 2. If set, this causes the display(s) to be turned on and off at a fixed rate. This flashing continues after device end is set. The flashing is stopped by pressing any key on the keyboard after the enable keyboard command is executed, which may be part of the same I/O request.

Byte 1 bit 4—Update Prompt—Causes the drum prompt device to rotate to the position specified in byte 9 of the control block. The I/O control subroutine does not wait for the drum to rotate to the desired position before continuing with other commands or setting device end status.

Byte 1 bit 5—Read Hard Counter—Non-volatile read/write memory elements, called hard counters, may be installed to retain some data items during powerdown conditions. These counters may be copied into memory starting at the address specified by bytes 3 and 4 of the control block. No other command bits can be set with the read hard counter bit.

Byte 1 bit 6—Write Hard Counter—Causes data from memory at the address specified by bytes 3 and 4 of the control block to be loaded into the hard counters.

The number of bytes transferred in a hard counter Read or Write is determined by the number of counters installed and is handled by the I/O control subroutine.

Byte 1 bit 7—Update Time—The I/O control subroutine updates a hardware time-of-day clock with data from bytes 'C'-'F' of the control block.

If the Update Time command bit is not set, the I/O control subroutine loads bytes 'C'-'F' of the control block with the time from the time-of-day clock.

Byte 2 bit 0—Buffer Reset—The length byte pointed to by the data address is set to zero (X'OO'). The length byte determines where entered data is placed in the keyboard buffer. Entered data is placed at the start of the keyboard buffer plus the length byte plus 1. When data is entered, the length byte is incremented by one.

Byte 2 bit 1—Single Key Mode—Causes device end status to be indicated with any key depression. If this bit is not set, device end is set only after a function key (non data key) is pressed.

Byte 2 bit 3—Enable Keyboard—Allows data to be entered through the keyboard.

Entered data or function codes are stored in the keyboard buffer and the length byte is incremented for each key pressed. The keyboard consists of two classes of keys, data keys and function keys, as shown in FIG. 4. The keyboard code will decode data keys and return to EBÇDIC equivalent (F0-F9). The multiple zero key functions as a double or triple zero key depending on the position of a hardware switch. When operated as a double zero key, it places X'FOFO'in the keyboard buffer and the length byte is incremented by 2. When operated as a triple zero key, it places X'FOFOFO' in the keyboard buffer and the length byte is incremented by 3.

When any key is pressed, the hex code(s) for the key is stored in the keyboard buffer according to the following formula: Data address (control block bytes 3 and 4)

plus the value of the length byte (byte 0 as pointed to by the data address), plus one. If the key was a data key and the single key mode is not enabled, device end is not set. If single key mode is enabled or the key was a function key, device end is set.

The ½ (half-pence) key stores the code X'F5' in the keyboard buffer and sets the 'half-pence' status bit (byte 6 bit 3). The half-pence key must be followed by a function key. If a data key is pressed following the half-pence key, unit check and an error code are set with device end.

When the first key is depressed by the operator (for a control block), the customer display and transaction display are blanked out. The last eight (nine if the half-pence feature is present) characters or less are continuously displayed in the transaction display to allow the operator to monitor the keying of data. When any function key is pressed, the transaction and customer display are blanked. When the half-pence feature is installed, the half-pence display position is used only to display the half-pence amount.

Byte 2 Bit 4—Enable Half-Pence—This bit is used with Update Display 1 or 2 to indicate that data is to be displayed starting with the half-pence (optional) display position. The data to be displayed in this position is checked for being five, and if so, the character five is displayed. If not a five, a blank is displayed. If bit 4 is off, data is displayed starting from the standard positions. See FIGS. 4–12 for display examples.

This bit is also used with Enable Keyboard to allow entry of the half-pence key. If half-pence is pressed but not enabled the Half-Pence error (error code 17) and unit check status are set.

Byte 2 bit 5—Enable Decimal Point—Causes the I/O control subroutine to keep track of the position of the decimal point in a key entered field. This position information is stored in byte 'A' at device end time. The possible values for this data are described under the definition of the update display 1 command. When not set, the decimal point key functions as a function key and causes device end to set.

Data that is keyed in with a decimal point is checked for validity by the I/O control subroutine. If decimal entries contain more than two integer positions, more than three decimal positions or more than one decimal point a "decimal point error" is indicated.

Byte 2 bit 6—Inhibit Display—Inhibits the display of entered data.

Bytes 3 and 4—Data Address—Leftmost address of the keyboard buffer. Keyboard buffer consists of a length byte followed by 32 data bytes in storage. A byte of X'00' must precede the length byte. Entry through the keyboard is limited to 31 data keys and a function key.

Byte 5—Error Code—Set with unit check to indicate the error detected.

Byte 6 bit 3—Half-Pence—Set by the I/O control subroutine to indicate that the ½ key was pressed during a keyboard operation in which Enable Half-Pence (Byte 2 bit 4) was on.

Byte 6 bit 5—Security Lock Status—Set by the I/O control subroutine at device end time to indicate the status of a security lock. When set, it indicates that the security lock is in the unlocked position.

Bytes 7 and 8—Machine Configuration—Updated by the I/O control subroutine at device end time of all requests.

Byte 8 bit 0—If set, indicates the hard counter feature is installed.

Byte 8 Bit 1—Wand—If set, indicates the wand feature is installed. (A wand is an optical scanner for reading printed codes on merchandise or labels.)

Byte 9—Drum Prompt Position—Specifies the position of the drum prompt for update prompt commands.

Byte A—Decimal Point Position—Specifies the position of the decimal point for update display commands and specifies the entered decimal point position for enable keyboard commands. The value in Byte A is described in the update display 1 command bit.

Byte B—Transaction Display LEDs—Corresponds to the LEDs on the customer and transaction display. Used during an update display command. The bits that are set cause the corresponding customer and/or transaction display LED to turn on.

Bytes C-F—Time-of-Day-Clock—Contains the time used to update the time-of-day clock in the update time command. This field is updated by the I/O control subroutine at device end time of all requests to reflect the current value of the time-of-day clock.

XXVKIO

FIG. 34 illustrates the command block for the virtual keyboard/display I/O control subroutine, XXVKIO, for media feature. XXVKIO is used to initiate keyboard/display I/O operations which are indirectly processed by the local satellite keyboard/display subroutine XXLKIO. The address of the virtual keyboard/display control block must be loaded into register XR1 prior to the call of XXVKIO. XXVKIO resets the status bits in control block byte 0 prior to performing the requested operation.

| | | |
|---|---|---|
| Calling Format: | SVC | |
| | DC | XL1 'REQUEST CODE' |

Commands initiated through the Virtual Keyboard/Display interface are executed by the local satellite's keyboard/display I/O control subroutine.

Commands from the Virtual Keyboard/Display interface override commands initiated by the local satellite. When the local satellite receives a command from the Virtual Keyboard/Display interface, device end is set in an outstanding local satellite XXLKIO command. XXLKIO updates the local satellite keyboard buffer with a "1" data key code and a "CLEAR" function key code, as if the operator pressed the "1" key and the Clear key. If the local satellite keyboard request is in single key mode, the buffer is updated with a clear function key code only.

The control block and commands for the Virtual Keyboard/Display interface XXVKIO are identical to the keyboard/display control block shown in FIG. 33 and commands with the exception of the "Wait for Action Code Key", the "Repetitive Alarm" and the hard counter commands.

The "Wait for Action Code Key" command modifies the servicing of the Action Code key by the keyboard/display I/O control subroutine in the local satellite. The "Wait for Action Code Key" command must be issued alone.

The "Wait for Action Code Key" command causes XXVKIO to wait until the action code key is pressed (with no preceding digits) followed by the 9 key. When this sequence is keyed, Device End is set in the control block. No buffer updating occurs as a result of the "Wait for Action Code Key" command.

Issuing a "Wait for Action Code Key" command does not prevent keyboard/display commands, issued by the local satellites, from executing while the keyboard/display I/O control subroutine is waiting for the Action Code 9 depression.

The repetitive alarm command causes the audible alarm to sound repetitively. The alarm sounds at the same rate as a display prompt is flashed. A depression of the Clear key terminates the sounding of the audible alarm and if an enable keyboard command is pending, causes device end to set for the outstanding keyboard enable command.

XXPRIO

FIG. 35 illustrates the control block for the Printer I/O control subroutine, XXPRIO, for standalone and remote satellite terminals. XXPRIO is used to perform I/O operations on the two-station matrix printer 16 and the cash drawers 18 (FIG. 1). The address of the control block must be loaded into register XR1 prior to the call of XXPRIO. XXPRIO resets the status bits in control block byte 0 prior to performing the requested operation.

| | | |
|---|---|---|
| Calling Format: | SVC | |
| | DC | XL1 'REQUEST CODE' |

The printer, not shown in detail in FIG. 1, comprises a combined document/receipt station and a separate journal station. Two rolls of paper supply forms for receipt and journal printing. A switch detects either roll empty or journal take-up roll full. The combined document/receipt station allows a form to be inserted between the print mechanism and the receipt paper when document printing is required. Two detector cells, one above and one below the print line, sense the presence or absence of a document in the combined print station.

The combined document/receipt station can print on the receipt paper or on an inserted document. When printing on the receipt paper, the printer is in "receipt mode". When printing on an inserted document, the printer is in "document mode". When the print microcode receives a print command, the status of the two cells is checked for consistency with the printer mode.

For example, if the printer is in receipt mode and receives a print command, both cells must be uncovered (ie, no document inserted), or an error will be indicated to the application microcode. If the printer is in document mode, both cells must be covered or an error will be indicated to the application microcode.

When the machine is powered up, the printer defaults to receipt mode. Document mode is entered by issuing an autoinsert or manual insert command to the printer.

The printer I/O control code can queue up to three requests before the print operations become synchronous.

The printer control block is shown in FIG. 35, as follows:

Byte 0 Bits 0-3—Device ID—X'2' identifies the control block as a printer interface control block.

Byte 0 Bit 4—Unit Check (UC)—This bit is set by the I/O control subroutine at deviced end time if an error condition was detected.

Byte 0 Bit 6—Device End (DE)—This bit is set by the I/O control subroutine when all commands indicated in the control block have been executed.

The operations performed when a printer request is made depends on the bits set in command bytes 1 and 2. Multiple operations may be performed with one I/O request. All operations requested will be performed unless inhibited by unit check conditions. After all I/O operations are complete, device end is set.

Byte 0 Bit 7—Unit Exception (UE)—This bit indicates that an error was detected that did not prevent the line from being printed. The error code is indicated in Byte 5.

Byte 1 bit 1—Eject—The eject command is used to return to receipt mode from document mode. If the printer is in document mode and receives an eject command, the document in the combined document/receipt station will be fed out of the print station and the printer will return to receipt mode. If the printer is in receipt mode and receives an eject command, no operation is performed.

Byte 1 bit 2—Auto Inser—An autoinsert command will cause the printer I/O control subroutine to wait for a document to cross the lower cell. When a document crosses the lower cell, the auto feeding mechanism will start trying to feed the document into position. When the document crosses the upper cell, the auto feeding mechanism will feed the document the number of lines specified in the control block and stop. If both upper and lower cells are still covered, the document is in position to print the first line. The command is complete and device end is indicated in the control block. The printer is now in document mode.

During execution of the autoinsert command, the lower cell may uncover before the top cell covers or the bottom cell may uncover after the top cell covers but before the prescribed line spacing has been performed. In the first case, where the bottom cell uncovers before the top cell covers, the feeding will stop and the printer will wait for the lower cell to cover. In the second cell case where the bottom cell uncovers after the top cell covers, the feed mechanism would continue to feed the document out of the print station and stop. The printer would wait for the lower cell to cover and the operation would be repeated. In either case the command is not complete and no error status is reported to the application.

The first line registration byte (byte 9) is used during the execution of an auto insert command. It specifies the number of 0.02 inch steps from the covering of the upper cell to line 1.

The operation of the auto insert command is not affected by the status of the paper roll full/empty sensor.

Byte 1 bit 3—Manual Insert—A manual insert command will cause the printer I/O control subroutine to check the upper and lower cell. If both cells are covered, the printer enters document mode and returns device end status to the application. If both cells are uncovered, the printer remains in receipt mode and returns device end status to the application. If one cell is covered and one is uncovered, a unit check-device end status is returned to the application, indicating an invalid manual insert.

The operation of the manual insert command is not affected by the status of the paper roll full/empty sensor.

Byte 1 bit 5—Print DOC or R—The print document/receipt command is used to print a line on the document/receipt station. Device end is set when the print operation is complete.

Byte 1 bit 6—Print JR—The print journal command is used to print a line on the journal station. Device end is set when the print operation is complete.

Byte 1 bit 7—Use 2 Buffers—This modifier bit instructs the printer I/O control subroutine to use separate buffers for document/receipt and journal station printing. If the bit is not set, the data buffer is 31 bytes long and contains data that is printed in both stations. If the bit is set, the data buffer is 63 bytes long. The first 31 bytes are printed on the document/receipt station and the last 31 bytes are printed on the journal station.

Byte 2 bit O—Open Drawer 1—This command causes cash drawer 1 (18, FIG. 1) to open.

Byte 2 bit 1—Open Drawer 2—This command causes cash drawer 2 (not shown) to open, if an optional second drawer is installed.

Byte 2 bit 7—Recovery—After unit check status is reported, the print I/O control subroutine will not accept any commands until one is received with the recovery bit. This allows all commands in the print queue to be flushed after an error occurs. Commands encountered after a unit check condition and before a recovery bit is set will be returned with device end-unit check status with the error code (byte 5) zero and the recovery required sense bit set (bit 7 byte 6). When a command is received with the recovery bit set, the printer I/O control subroutine will reset the recovery bit in the control block and resume command execution starting with the control block that contained the recovery bit.

Bytes 3 and 4—Data Address—Contains the leftmost address of the print buffer. The print buffer is 31 or 63 bytes long depending on the setting of the Use 2 Buffers bit (byte 2 bit 7).

Byte 5—Error Code—The error code is set by the I/O control subroutine with unit check (UC) or unit exception (UE) when an error is detected.

Byte 6 bit O—Cell A—This bit is set by the I/O control subroutine to indicate the status of the upper sales slip sensor cell. If the sensor is covered, the bit is set. This bit is updated at all device end times.

Byte 6 bit 1—Cell B—This bit is set by the I/O control subroutine to indicate the status of the lower sales slip sensor cell. See byte 6 bit 0.

Byte 6 bit 2—Insert Attempted—After requesting an auto insert operation, the requesting program may issue a cancel request to terminate the auto insert operation. If the operator has not started to insert the document when the cancel request is received, the auto insert command execution will terminate and device end status will be set. If the insert operation has been started (ie, the document is feeding into position), the cancel request is delayed. If the document feeds into position without error, device end is set. If an insert error is rejected, device end-unit check is set and the "insert attempted" sense bit is set. This indicates that an insert was in process and failed when the cancel request was received. The "insert attempted" bit is set only if the cancel was detected while the feeding of the document occurred, not if it followed an aborted insert operation.

Byte 6 bit 3—Drawer Status—At each device end time, this sense bit is updated to indicate if the cash drawers are open or closed. If any cash drawer is open (or both are open), the bit is set on by XXPRIO. If both drawers are closed, the bit is reset.

Byte 6 bit 7—Recovery Required—See byte 2 bit 7—Recovery.

Byte 7—Number of Receipt/Document Spaces—The number of lines to space the document if in document mode or the receipt paper if in receipt mode. Spacing is performed after auto insert and after printing in combined commands.

Byte 8—Number of Journal Spaces—The number of lines to space the journal paper. Spacing is performed after auto insert and after printing in combined commands.

Byte 9—First Line Registration—This parameter is used in the execution of an auto insert command. It contains the number of 0.020 inch steps between upper cell cover and logical line 1 on the form.

XXVPIO

The virtual printer I/O control subroutine for the integral media feature, XXVPIO, is used to initiate printer I/O operations from the media processor which are indirectly processed by the local satellite printer subroutine XXLPIO. The address of the virtual printer control block must be loaded into register XR1 prior to the call of XXVPIO. XXVPIO resets the status bits in control block byte 0 prior to performing the requested operation.

| | | |
|---|---|---|
| Calling Format: | SVC | |
| | DC | XL1 'REQUEST CODE' |

Printer I/O operations initiated through XXVPIO are defined in detail by a control block identical in format to the control block described in XXPRIO and shown in FIG. 35.

XXLPIO

The local satellite printer I/O control subroutine, XXLPIO, is used to perform I/O operations on the two-station matrix printer and cash drawers which are initiated either directly through XXLPIO or indirectly through XXVPIO. Direct requests are accepted from the local satellite processor and required XR1 to be loaded with the address of the local satellite printer control block prior to the subroutine call. On these requests, XXLPIO resets the status bits in control block byte 0 prior to performing the requested operation.

Both indirect requests initiated through XXVPIO and direct requests through XXLPIO are defined in detail by the same format of printer control block XXPRIO shown in FIG. 35.

The following set of program listings for performing the functions of the present invention described above, in the microprocessors of the terminals, is written in publicly available IBM System/3 Assembler language.

Included below are program listings for the RAM application program for primary operational mode (MOM) and the RAM application program for secondary operational mode (MSOCC). In addition are included ROS subroutines XXPIA and XXSIA, as well as RAM subroutine YYSIAM.

MOM MEDIA OPERATIONAL MODE

ERR LOC OBJECT CODE ADDR STMT SOURCE STATEMENT

```
*************************************************************************
*
* MODULE-NAME        = BGNMOM     (GPOST-WREN)
*
* DESCRIPTIVE-NAME = MEDIA OPERATIONAL MODE
*
*
*
* STATUS             = OPERATIONAL
*
* FUNCTION           = 1. ENABLE ACTION CODE 9, WHICH ALLOWS A MODE OF
*                         OPERATION TO BE SELECTED.
*
*                      2. A CALL TO YYMSEL CHECKS FOR MODE SELECTION
*                         AND VALIDITY OF THAT SELECTION.
*
*                      3. IF SECONDARY MODE WAS SELECTED REPEAT STEP
*                         TWO.
*
*                      4. IF SECONDARY MODE WAS NOT SELECTED MOM READS
*                         THE CONFIGURATION TABLE, BY A CALL TO XXDRWM
*                         AND INITIALIZES PERTINENT COMMON DATA AREAS.
*
*                      5. AT THIS POINT THE POLL ADDRESS POINTER
*                         (CCPADR) IS INITIALIZED TO X'00' TO DISABLE
*                         ALL PHYSICAL ADDRESSES EXCEPT THE LOCAL
*                         SATELITE, IF STANDALONE MODE WAS SELECTED,
*                         WITH A X'FF' IMMEDIATELY FOLLOWING IT TO
*                         INDICATE END OF POLL LIST. IF MEDIA FEATURE
*                         OR PRIMARY MODE WAS SELECTED ALL ADDRESSES
*                         SHOULD REMAIN VALID IN THE POLL LIST.
*
*                      6. YYPOLL IS CALLED TO POLL A PHYSICAL ADDRESS
*                         POINTED AT BY CCPADR.
*
*                      7. YYMSEL IS CALLED ONCE MORE TO CHECK IF
*                         THE OPERATIONAL MODE HAS BEEN CHANGED DURING
*                         THE PREVIOUS STEPS. IF OPERATION IS SAME
*                         GO BACK TO STEP ONE AND CONTINUE THERE.
*                         IF THE MODE SELECTED IS THE SAME AS PREVIOUS
*                         MODE SELECTED ENABLE ACTION CODE NINE
*                         FUNCTION AN CONTINUE.
*
*                      8. BUMP POLL ADDRESS POINTER TO NEXT PHYSICAL
*                         ADDRESS.
*
*                         IF THIS IS THE END OF THE POLL LIST, CHECK
*                         FOR ANY Q3 REQUESTS WERE MADE THEN CHECK
*                         FOR ANY Q6 REQUESTS PENDING.
*
*                         IF Q3 REQUEST QUE IS EMPTY GO TO STEP 5 AND
*                         CONTINUE 6, 7, 8.
*
*                         IF NO Q6 REQUESTS ARE PENDING ISSUE A CALL
*                         TO YYTPOL TO ISSUE A POWER ON TRANSITION
*                         TO BRING A STATION ONLINE TO THE MEDIA
*                         CONTROL. REPEAT STEP 5, 6, 7, 8.
*
*                         IF THERE WAS A Q6 REQUEST PENDING CALL YYPOLL
*                         AND SERVICE THAT REQUEST, THEN REPEAT STEPS
*                         5, 6, 7, 8.
*
* NOTES              = SEE BELOW
*
*
*
*        RESTRICTIONS            = SOURCE CODE MARGINS ARE 1-76
*
*        REGISTER-CONVENTIONS = XR1 AND XR2 ARE INDEX REGISTERS ONE
*                               AND TWO RESPECTIVELY.  ARR IS THE ADD-
*                               RESS RECALL REGISTER.
*
* MODULE-TYPE        =  RAM PAGED PROGRAM ( MEDIA FEATURE MAINLINE )
*
*        PROCESSOR     = SYSTEM 3 MOD 10 ASSEMBLER.
*
*        MODULE-SIZE = XXXXX DECIMAL BYTES
*
*        ATTRIBUTES   = SERIALLY REUSABLE
*
* ENTRY-POINT        = BGNMOM (ONLY ONE ENTRY POINT)
*
*                      DEFINED ENTRYS AB213 THRU AB239 ARE DEFINED
*                      AS ENTRYS FOR SUBROUTINE REFERANCES.
*
*        PURPOSE      = MEDIA FEATURE CONTROL (SEE FUNCTION ABOVE)
*
*        LINKAGE       = NONE (BGNMOM IS PAGED IN BY THE MEDIA START
*                              PROGRAM)
*
* INPUT              = NONE
*
* OUTPUT             = NONE
*
* EXIT-NORMAL        = OCCURS ONLY WHEN AN AUTHORIZED DISKETTE SWAP
*                      IS MADE.
*
* EXIT-ERROR         = ONLY ON A HARD DISKETTE ERROR WHICH CAUSES A
*                      POWER ON RESET TO BE ISSUED.
*
* EXTERNAL-REFFRENCES = SEE BELOW
*
*        INCLUDED CODE  =  MOM IS THE DATA SET NAME
*
*        ROUTINES          = YYPOLL  MEDIA FEATURE POLLING ROUTINE
*
*                            YYTPOL  SATELLITE BRINGUP ROUTINE FOR THE
*                                    MEDIA FEATURE
*
*                            YYMSEL  THIS ROUTINE IS THE MEDIA FEATURES
*                                    MODE SELECTION HANDLER
*
*        DATA-AREAS        = CONFIGURATION AREA
*                            MEDIA COMMON AREA (SEE MCOM1)
*
*
*        CONTROL-BLOCKS = CCMDCB AND CCMPCB
*
*
*
*
* MACROS             =      MEDIA COMMON EQUATES, DISK EQUATES, COMMON
*                            AREA EQUATES ECT.
*
*
*
*
* DATA SET           = SOURCE CODE AND OBJECT MODULE INFORMATION
*
*        SOURCE CODE LOCATION     = APPLICATIONS TERMINAL DEV. LAB
*                                   CARD FILE
*
*        SOURCE CODE NAME         = BGNMOM
*
*
*
*
*        OBJECT MODULE NAME       = BGNMOM
*
*
*
*************************************************************************
```

```
       MGM  MEDIA OPERATIONAL MODE
ERR LOC  OBJECT CODE      ADDR STMT SOURCE STATEMENT
    0000                         145 MPICC   START
                                 146 *       FTYPE
                                 147+*       STAND ALONE STATION PROGRAM
                                 148+*       WREN PROGRAM
                                 149+*       RAM PROGRAM
                            0001 150         ENTRY CMNSAV
                            0109 151         ENTRY AB250
                            010A 152         ENTRY AB202
                            0114 153         ENTRY AB213
                            012B 154         ENTRY AB233
                            012C 155         ENTRY AB234
                            0133 156         ENTRY AB235
                            013A 157         ENTRY AB236
                            0141 158         ENTRY AB237
                            0148 159         ENTRY AB238
                            014F 160         ENTRY AB239
                            00F5 161         ENTRY CFLAG
                            0001 163         EXTRN YYACOD
                            0002 164         EXTRN YYPOLL
                            0003 165         EXTRN YYTPOL
                            0004 166         EXTRN YYMSEL
                            0005 167         EXTRN YYLMHD
                            0006 168         EXTRN LAC9
    0000 34 01 0001              169         ST    CMNSAV,XR1
    0004 C0 87 0005              170         B     YYLMHD                  LD THE HEADER
                                 171 *-----------------------------------------------------------------
                                 172 *       MEDIA OPERATIONAL MODE                                   *
                                 173 *-----------------------------------------------------------------
    0008 C0 87 0001              175 ISSAC9  B     YYACOD                  ISSUE WAIT FOR ACTION CODE
                            000C 176 WAITAC  EQU   *
    000C C0 87 0004              177         B     YYMSEL
    0010 0008               0011 178         DC    AL2(ISSAC9)
    0012 0008               0013 179         DC    AL2(ISSAC9)
                            0014 181 GOHEAD  EQU   *
    0014 35 02 0001              182         L     CMNSAV,XR2
    0018 80 F2 0C                183         CLI   CCMODE(,XR2),SECMOD      SECONDARY MODE SELECTED
    001B C0 81 0028              184         BE    PAGSEC                  PAGE IN SECONDARY MODE
    001F 80 F4 0C                185         CLI   CCMODE(,XR2),X'F4'      SIGN OFF SELECTED
    0022 C0 01 0030              186         BNE   RDCNF
                                 187 *       SVC
    0026 F5                 0026 188+        DC    XL1'F5'
    0027 05                 0027 189         DC    AL1(XXIPLM)             GO TO MEDIA START
                            0028 190 PAGSEC  EQU   *
    0028 C2 01 0002              191         LA    SECPAG,XR1              POINT XR1 AT DSN OF SEC. MODE PAGE
                                 192 *       SVC
    002C F5                 002C 193+        DC    XL1'F5'
    002D 06                 002D 194         DC    AL1(XXPAGM)
                                 195 *** INCASE OF AN ERROR -- PAGING
                                 197 *       SVC
    002E F5                 002E 198+        DC    XL1'F5'
    002F 08                 002F 199         DC    AL1(XXAERM)
                                 201 ***
                                 202 ***  READ THE CONFIGURATION TABLE
                                 203 ***
                            0030 204 RDCNF   EQU   *
                                 205 *       SVC
    0030 F5                 0030 206+        DC    XL1'F5'
    0031 26                 0031 207         DC    AL1(XXDRWM)
    0032 0000               0033 208         DC    AL2(0)                  ERROR LINKAGE TO XXMERR
    0034 0003               0035 209         DC    AL2(DSKCB)              C.B. ADDRESS
    0036 0000               0037 210         DC    AL2(0)                  LOGICAL RECORD OFFSET
    0038 0200               0039 211         DC    XL2'0200'               READ COMMAND
                                 212 *-----------------------------------------------------------------
                                 213 *       INITIALIZATION OF CCFLAG/CCQ3/CCQ6/IAL1/IAL2             *
                                 214 *-----------------------------------------------------------------
                            003A 215 INTLIZ  EQU   *
    003A 35 02 0001              216         L     CMNSAV,XR2
    003E C2 01 01F5              217         LA    ABPOLL,XR1
    0042 02 01 02                218         LA    2(,XR1),XR1             XR1    1ST ENTRY OF POLL LIST
    0045 B4 01 18                219         ST    CCPADR(,XR2),XR1
    0048 8B 20 07                220         SBF   CCFLAG(,XR2),X'20'      RESET Q3 RESPONSE ALLOWED
    004B BC FF 13                221         MVI   CCQ3(,XR2),X'FF'        SET Q3 TO FF
    004E BC FF 14                222         MVI   CCQ6(,XR2),X'FF'        SET Q6 TO FF
    0051 BC FF 15                223         MVI   CCIAL1(,XR2),X'FF'      SET CCIAL1 TO FF
    0054 BC FF 16                224         MVI   CCIAL2(,XR2),X'FF'      SET CCIAL2 TO FF
    0057 B0 F3 0C                226         CLI   CCMODE(,XR2),STAMOD
    005A F2 01 07                227         JNE   CALPOL
    005D C2 01 01F5              228         LA    ABPOLL,XR1              ELSE, THERE IS ONLY 1 PHY ADR (00)
    0061 7C FF 0D                229         MVI   13(,XR1),X'FF'          SET END OF POLL TABLE
                            0064 231 CALPOL  EQU   *
    0064 C0 87 0002              232         B     YYPOLL                  CALL POLLING ROUTINE
    0068 C0 87 0004              234         B     YYMSEL
    006C 0095               006D 235         DC    AL2(DIFMOD)             SELECTED AN UP MODE
    006E 00C4               006F 236         DC    AL2(SAME)               SELECTED SAME MODE
                            0070 238 INCPTR  EQU   *
    0070 8E 01 18 0008           239         ALC   CCPADR(2,XR2),BUMPTR    BUMP POLL PTR TO NEXT PHY ADR
    0075 B5 01 18                240         L     CCPADR(,XR2),XR1
    0078 7D FF 00                241         CLI   0(,XR1),X'FF'           END OF POLL LIST
    007B C0 01 0064              242         BNE   CALPOL                  IF NO, GOTO CALPOL
    007F BD FF 13                243         CLI   CCQ3(,XR2),X'FF'        Q3 EMPTY
    0082 C0 01 003A              244         BNE   INTLIZ                  IF NO KEEP ON SERVICING Q3
    0086 BD FF 14                245         CLI   CCQ6(,XR2),X'FF'        Q6 EMPTY
    0089 C0 01 00A5              246         BNE   SERVQ6                  IF NO, SERVICE Q6
    008D C0 87 0003              247         B     YYTPOL                  CALL POWER ON TRANSISTION
    0091 C0 87 003A              248         B     INTLIZ
                            0095 250 DIFMOD  EQU   *
    0095 BD F2 0C                251         CLI   CCMODE(,XR2),SECMOD     IS SEC. MODE REQUESTED
    0098 C0 81 0028              252         BE    PAGSEC                  PAGE IN SECONDARY MODE
    009C BD F4 0C                253         CLI   CCMODE(,XR2),X'F4'      SIGN OFF SELECTED
    009F C0 01 0008              254         BNE   ISSAC9
                                 255 *       SVC
    00A3 F5                 00A3 256+        DC    XL1'F5'
    00A4 05                 00A4 257         DC    AL1(XXIPLM)             GO TO MEDIA START
                            00A5 259 SERVQ6  EQU   *
    00A5 35 02 0001              260         L     CMNSAV,XR2
    00A9 8A 20 07                261         SBN   CCFLAG(,XR2),X'20'      SET Q6 RESPONSE ALLOWED
    00AC 2C 00 00DA 14           262         MVC   LO1ADR+1(1),CCQ6(,XR2)
                                 264 *       SVC
    00B1 F5                 00B1 265+        DC    XL1'F5'
    00B2 1A                 00B2 266         DC    AL1(XXVER2)
    00B3 01F5               00B4 267         DC    AL2(ABPOLL)
    00B5 00D9               00B6 268         DC    AL2(LO1ADR)
    00B7 00CC               00B8 269         DC    AL2(SERROR)
    00B9 B4 01 18                271         ST    CCPADR(,XR2),XR1
    00BC C0 87 0002              272         B     YYPOLL
    00C0 C0 87 003A              273         B     INTLIZ
                            00C4 275 SAME    EQU   *
    00C4 C0 87 0001              276         B     YYACOD                  ISSUE WAIT FOR ACTION CODE
    00C8 C0 87 0070              277         B     INCPTR
    00CC C0 87 00CC              280 SERROR  B     SERROR                  SOFTWARE ERROR
```

```
      MOM  MEDIA OPERATIONAL MODE
ERR LOC  OBJECT CODE      ADDR STMT SOURCE STATEMENT
                               282 *      MCOMN
                               283+*--------------------------------------------------------------
                               284+*      MEDIA COMMON EQUATES                                    *
                               285+*--------------------------------------------------------------
                          0001 287+XR1    EQU   X'01'
                          0002 288+XR2    EQU   X'02'
                          0008 289+ARR    EQU   X'08'
                          0008 291+UC     EQU   X'08'                          UNIT CHECK
                          0004 292+SE     EQU   X'04'                          SATELLITE EXCEPTION
                          0002 293+DE     EQU   X'02'                          DEVICE END
                          0001 294+UE     EQU   X'01'                          UNIT EXCEPTION
                          0002 296+ESP    EQU   X'02'                          EXCEPTION STATUS IN PROCESS
                          001A 297+VFLL   EQU   X'1A'                          VIRTUAL FILE LENGTH
                          0001 298+NORESP EQU   X'01'                          NO RESPONSE EXCEPTION STATUS BIT
                          000C 299+QEMPTY EQU   X'0C'                          QUEUE EMPTY STATUS
                          000A 300+OVRUN  EQU   X'0A'                          STORAGE OVERRUN STATUS
                          000E 301+POTEXC EQU   X'0E'                          POT EXCEPTION STATUS
                          0010 302+QUEUE3 EQU   X'10'                          QUEUE 3 STATUS
                          0002 303+QUEUE6 EQU   X'02'                          QUEUE 6 STATUS
                          0004 304+DATADD EQU   X'04'                          DATA ADDRESS PIA CB
                          0080 306+ACTIVE EQU   X'80'
                          0008 307+LINE1  EQU   X'08'
                          0010 308+LINE2  EQU   X'10'
                          0078 309+SATID  EQU   X'78'                          SATELLITE GPOST ID
                          0079 310+MEDID  EQU   X'79'                          MEDIA GPOST ID
                          00F1 311+PRIMOD EQU   X'F1'                          PRIMARY MODE
                          00F2 312+SECMOD EQU   X'F2'                          SECONDARY MODE
                          00F3 313+STAMOD EQU   X'F3'                          STANALONE MODE
                               315+* COMMAND BYTEO ASSIGNMENT
                          0001 316+SETMOD EQU   X'01'                          SET MODE
                          0002 317+SETADR EQU   X'02'                          SET ADDRESS
                          0003 318+RESET  EQU   X'03'                          RESET
                          0004 319+RDID   EQU   X'04'                          READ ID
                          0005 320+RDIOB  EQU   X'05'                          READ IOB
                          0006 321+RDDATA EQU   X'06'                          READ DATA
                          0007 322+WRIOB  EQU   X'07'                          WRITE IOB
                          0008 323+WRDATA EQU   X'08'                          WRITE DATA
                          0009 324+POL    EQU   X'09'                          POLL
                          000A 325+POLRST EQU   X'0A'                          POLL RESET
                          000B 326+POLACK EQU   X'0B'                          POLL ACK
                          000C 327+KLEAR  EQU   X'0C'                          CLEAR
                          000D 328+LINACT EQU   X'0D'                          LINE ACTIVATE
                          000E 329+RSTIMA EQU   X'0E'                          RESET IMA
                          000F 330+MONLIN EQU   X'0F'                          MONITOR LINE
                          0010 331+EMOD1  EQU   X'10'                          ENABLE MODE 1
                          0011 332+EMOD2  EQU   X'11'                          ENABLE MODE 2
                          0012 333+EMOD3  EQU   X'12'                          ENABLE MODE 3
                          0060 334+QUEID3 EQU   X'60'                          QUEUE 3 REQUESTS WILL BE ACCEPTE
                          00C0 335+QUEID6 EQU   X'C0'                          QUEUE 6 REQUESTS WILL BE ACCEPTE
                               337 *      MRCEQ
                               338+****************************************************************
                               339+*                                                              *
                               340+*      REQUEST CODE EQUATES FOR SUBROUTINES MEDIA              *
                               341+*                                                              *
                               342+****************************************************************
                               344+*             MEDIA REQUEST CODE EQUATES
                          0080 346+CHAIN  EQU   X'80'                          INDICATOR BIT FOR CHAINING
                          0000 347+XXPID  EQU   X'00'
                          0001 348+XXVKID EQU   X'01'
                          0002 349+XXVPID EQU   X'02'
                          0004 350+XXCDLX EQU   X'04'
                          0005 351+XXIPLM EQU   X'05'
                          0006 352+XXPAGM EQU   X'06'
                          0007 353+XXKBSM EQU   X'07'
                          0008 354+XXMERM EQU   X'08'
                          0009 355+XXGDCM EQU   X'09'
                          000A 356+XXCNCM EQU   X'0A'
                          000C 357+XXKBRM EQU   X'0C'
                          000D 358+XXSAVE EQU   X'0D'
                          000E 359+XXKMMX EQU   X'0E'
                          000F 360+XXGMMX EQU   X'0F'
                          0010 361+XXCDIA EQU   X'10'
                          0011 362+XXCDIL EQU   X'11'
                          0012 363+XXCDIX EQU   X'12'
                          0013 364+XXPRT3 EQU   X'13'
                          0014 365+XXPRT2 EQU   X'14'
                          0015 366+XXMOVE EQU   X'15'
                          0016 367+XXPERM EQU   X'16'
                          0017 368+XXELGM EQU   X'17'
                          0018 369+XXRCYM EQU   X'18'
                          0019 370+XXVER1 EQU   X'19'
                          001A 371+XXVER2 EQU   X'1A'
                          001B 372+XXVER3 EQU   X'1B'
                          001C 373+XXVER4 EQU   X'1C'
                          001D 374+XXFNK1 EQU   X'1D'
                          001E 375+XXFNK2 EQU   X'1E'
                          0020 376+XXMSGM EQU   X'20'
                          0021 377+XXIEL  EQU   X'21'
                          0022 378+XXNVLM EQU   X'22'
                          0024 379+XXDISM EQU   X'24'
                          0025 380+XXPRSM EQU   X'25'
                          0026 381+XXDRWM EQU   X'26'
                          0027 382+XXLOGM EQU   X'27'
                          002D 383+XXDLSM EQU   X'2D'
                          0036 384+XXDKSM EQU   X'36'
                          003A 385+XXBE   EQU   X'3A'
                          003B 386+XXBNE  EQU   X'3B'
                          003C 387+XXBLT  EQU   X'3C'
                          003D 388+XXBLE  EQU   X'3D'
                          003E 389+XXBGT  EQU   X'3E'
                          003F 390+XXBGE  EQU   X'3F'
                          0040 391+XXSRCH EQU   X'40'
                          0041 392+XXVRI1 EQU   X'41'
                          0042 393+XXVRI2 EQU   X'42'
                          0043 394+XXVRI3 EQU   X'43'
                          0044 395+XXVRI4 EQU   X'44'
                          0045 396+XXVRS1 EQU   X'45'
                          0046 397+XXVRS2 EQU   X'46'
                          0047 398+XXVRS3 EQU   X'47'
                          0048 399+XXVRS4 EQU   X'48'
                          004A 400+XXSER2 EQU   X'4A'
                          004B 401+XXBYA  EQU   X'4B'
                          004C 402+XXMBLA EQU   X'4C'
                          004D 403+XXPIA  EQU   X'4D'
                          004E 404+XXTIME EQU   X'4E'
                               406 *      MCMEQ
                               407+*
                               408+****************************************************************
                               409+*                                                              *
                               410+*      COMMON AREA EQUATES-SEE MCOMI FOR DESCRIPTION OF FIELDS *
                               411+*                                                              *
                               412+****************************************************************
                               413+*
                          0000 414+CCPLEN EQU   X'00'                          RECORDS IN PAGE BUFFER
                          0001 415+CCLINE EQU   CCPLEN+1                       LINE POSISTION OF INSERTED DOC.
                          0003 416+CCIEL  EQU   CCLINE+2                       INPUT ERROR LINKAGE ADDR.
                          0004 417+CCSTA1 EQU   CCIEL+1                        STATUS BYTE 1
                          0005 418+CCSTA2 EQU   CCSTA1+1                       STATUS BYTE 2
                          0006 419+CCFLG1 EQU   CCSTA2+1                       SUBROUTINE FLAGS
                          0007 420+CCFLAG EQU   CCFLG1+1                       MEDIA FLAGS
                          0009 421+CCDERP EQU   CCFLAG+2                       DISK ERROR RECOVERY ADDRESS
```

```
        NON  MEDIA OPERATIONAL MODE

ERR LOC  OBJECT CODE     ADDR STMT SOURCE STATEMENT
                         000B  422+CCLNK   EQU   CCDERP+2      MEDIA LINKAGE ADDR. SAVE AREA
                         000C  423+CCMODE  EQU   CCLNK +1      MEDIA CURRENT MODE
                         000E  424+CCKPT   EQU   CCMODE+2      ADDR. OF KEY TRANSLATION TABLE
                         0010  425+CCNVTL  EQU   CCKPT+2       ADDR. OF THE NON-VOLATILE TOTALS
                         0012  426+CCMCM2  EQU   CCNVTL+2      ADDR. OF SECOND COMMO. AREA (MCO
                         0013  427+CCQ3    EQU   CCMCM2+1      LOGGING REQUEST STATUS
                         0014  428+CCQ6    EQU   CCQ3+1        PAGING REQUEST STATUS
                         0015  429+CCIAL1  EQU   CCQ6+1        PHYS. ADDR. LINE 1
                         0016  430+CCIAL2  EQU   CCIAL1+1      PHYS.ADDR.LINE 2
                         0018  431+CCPADR  EQU   CCIAL2+2      POLL ADDRESS
                         001B  432+CCRSEC  EQU   CCPADR+3        REMAINING SECTORS TL1,
                         001E  433+CCPEW   EQU   CCRSEC+3      PERSONALIZED EARLY WARNING SECTO
                               434+*                           THRESHOLD
                         001F  435+CCDECP  EQU   CCPEW+1       PERSONALIZED DECIMAL POINT POSIS
                         002B  436+CCSUED  EQU   CCDECP+12     PERSONALIZED SUPPRESS EDIT FIELD
                         002C  437+CCVFID  EQU   CCSUED+1      C.B. SAVE AREA
                         0049  438+CCDATE  EQU   CCVFID+29     DATE SAVE AREA
                         0050  439+CCEDAT  EQU   CCDATE+7      EDITED DATE FIELD
                         0058  440+CCCLID  EQU   CCEDAT+8      STORE REGISTER SAVE AREA
                         005F  441+CCACTN  EQU   CCCLID+7      ACTION CODE SAVE AREA
                         0063  442+CCIOWK  EQU   CCACTN+4      ADDR. OF I/O WORK AREA
                         0064  443+CCPCB1  EQU   CCIOWK+1      VITUAL PRINTER C.B.
                         006E  444+CCPCB2  EQU   CCPCB1+10     VITUAL PRINTER C.B.
                         0078  445+CCMDCB  EQU   CCPCB2+10     MEDIA TRANSACTION LOGGING USE
                               446+*                           ONLY DIO CONTROL BLOCK
                         0092  447+CCMPCB  EQU   CCMDCB+26     PAGEING CONTROL BLOCK
                         00AC  448+CCPMCB  EQU   CCMPCB+26     INTER-MACHINE ADAPTER C.B.
                               449+*                           FOR USE WITH XXPIA
                         00BB  450+CCVKCB  EQU   CCPMCB+15     VIRTUAL KEYBOARD/DISPLAY C.B.
                         00CC  451+CCKYBL  EQU   CCVKCB+17     KEYBOARD BUFFER LL
                         00CD  452+CCKYBF  EQU   CCKYBL+1      LEFT MOST BYTE OF KEY/BD BUFFER
                         00ED  453+CCLBUF  EQU   CCKYBF+32     LOG ITEM BUFFER
                               454+* THE FOLLOWING ARE DISPLACED 256 FROM THE COMMON AREA
                         000B  455+CCPBUF  EQU   X'0B'         PRINT BUFFER FOR I/O
                         004A  456+CCPBF1  EQU   CCPBUF+63     PRINT BUFFER 1
                         0089  457+CCPBF2  EQU   CCPBF1+63     PRINT BUFFER 2
                         00C8  458+CCLR1   EQU   CCPBF2+63     LEFT BYTE OF LOG REC. BUFFER
                               459+* THE FOLLOWING ARE DISPLACED 512 FROM THE COMMON AREA
                         00C7  460+CCLR1R  EQU   X'C7'         RIGHTMOST BYTE OF ABOVE
                         00C8  461+CCLR2   EQU   CCLR1R+1      LEFT MOST BYTE OF LOG REC. BUFFE
                               462+* THE FOLLOWING ARE DISPLACED 768 FROM THE COMMON AREA
                         00C7  463+CCLR2R  EQU   X'C7'         RIGHTMOST BYTE OF ABOVE
                         00C8  464+CCERCB  EQU   CCLR2R+1      XXRCVR'S ERROR CONTROL BLOCK
                               465+*
                         00D9  466+CCRMTB  EQU   CCERCB+17     RAM ROUT TABLE ADDRESS
                         00DB  467+CCPBA   EQU   CCRMTB+2      ADDRESS OF THE PAGE ADDRES WITH
                               468+*                           PATCHES IF ANY
                               469+*

                               471 *       ACTEQ
                               472+*
                               473+*********************************************************
                               474+*                                                       *
                               475+*             ACTION CODE EQUATES                       *
                               476+*                                                       *
                               477+*********************************************************
                               478+*
                         0001  479+SGNOFF  EQU   01            SIGN OFF
                         0002  480+LGERAS  EQU   02            LOG ERASE
                         0003  481+DIAGNS  EQU   03            DIAGNOSTIC
                         000B  482+PERS1   EQU   11            OPTIONS 1 PERSONALIZATION
                         000C  483+PERS2   EQU   12            OPTIONS 2 PERSONALIZATION
                         000D  484+PERS13  EQU   13            RESERVED FOR PERSONALIZATION
                         000E  485+PERS14  EQU   14            RESERVED FOR PERSONALIZATION
                         000F  486+STPER   EQU   15            SALES TABLES PERSONALIZATION
                         0010  487+NSTPER  EQU   16            NON-SALES TABLES PERSONALIZATION
                         0011  488+SCRPER  EQU   17            SECURITY REQUIREMENTS PERSONALIZ
                         0012  489+SCCPER  EQU   18            SECURITY CODE PERSONALIZATION
                         0015  490+MTRR    EQU   21            MACHINE CONTROL TOTALS READOUT W
                         0016  491+CD1TRR  EQU   22            CASH DRAWER 1 CONTROL TOTALS REA
                         0017  492+CD2TRR  EQU   23            CASH DRAWER 2 CONTROL TOTALS REA
                         0018  493+RTTRR   EQU   24            REAL-TIME TOTALS READOUT WITH RE
                         0019  494+OPNST   EQU   25            OPEN SALES TRANSACTIONS - CASHIE
                         001A  495+OPNSTN  EQU   26            OPEN SALES TRANSACTIONS - NON-CA
                         0023  496+VOIDPT  EQU   35            VOID PRIOR TRANSACTION
                         0024  497+TRETRY  EQU   36            TRANSACTION RE-ENTRY
                         0025  498+TRNCM   EQU   37            TRAINING - CASHIERING MODE
                         0026  499+TRNNCM  EQU   38            TRAINING - NON-CASHIERING MODE
                         0029  500+DATA41  EQU   41            DATA ENTRY MODE 41
                         002A  501+DATA42  EQU   42            DATA ENTRY MODE 42
                         002B  502+DATA43  EQU   43            DATA ENTRY MODE 43
                         002C  503+MFC     EQU   44            CASH COUNT AND MACHINE
                               504+*                             FINANCIAL CLOSE
                         002D  505+D1FC    EQU   45            CASH COUNT AND CASH DRAWER 1
                               506+*                             FINANCIAL CLOSE
                         002E  507+D2FC    EQU   46            CASH COUNT AND CASH DRAWER 2
                               508+*                             FINANCIAL CLOSE
                         002F  509+CASHC   EQU   47            CASH COUNT
                         0033  510+MTR     EQU   51            MACHINE CONTROL TOTALS READOUT
                         0034  511+CD1TR   EQU   52            CASH DRAWER 1 CONTROL TOTALS REA
                         0035  512+CD2TR   EQU   53            CASH DRAWER 2 CONTROL TOTALS REA
                         0036  513+RTTR    EQU   54            REAL-TIME TOTALS READOUT
                         0037  514+LOAN    EQU   55            LOAN
                         0038  515+WITHDR  EQU   56            WITHDRAWAL
                         003D  516+CLOSE   EQU   61            CLOSE SALES TRANSACTIONS
                         0052  517+TLOGPR  EQU   82            TRANSACTION LOG PRINTOUT
                         0053  518+RGATTL  EQU   83            REGISTER AUXILIARY TOTALS
                         0054  519+CLATTL  EQU   84            CLUSTER AUXILIARY TOTALS
                         0055  520+TSD     EQU   85            TRANSMIT SINGLE DISKETTE
                         0056  521+TMD     EQU   86            TRANSMIT MULTIPLE DISKETTES
                               522+*  NOTE   ACTION CODE 99 IS NOT OPERATOR SELECTABLE
                         0063  523+PUWRES  EQU   99            POWER-ON RESET
                               524+*
                               525+*

                               527 *       PRTEQ
                               528+*
                               529+*********************************************************
                               530+*                                                       *
                               531+*       PRINT SUBROUTINES EQUATES                       *
                               532+*                                                       *
                               533+*********************************************************
                               534+*
                               535+***     COMMAND BYTES
                               536+*
                         4000  537+EJECT   EQU   X'4000'       EJECT
                         2000  538+AUTOIN  EQU   X'2000'       AUTO INSERT
                         1000  539+MANIN   EQU   X'1000'       MANUAL INSERT
                         0800  540+DBLW    EQU   X'0800'       DOUBLE WIDTH
                         0400  541+PRSSR   EQU   X'0400'       PRINT ON SALES SLIP OR RECEIPT
                         0200  542+PRJR    EQU   X'0200'       PRINT ON JOURNAL
                         0100  543+TWOBUF  EQU   X'0100'       USE TWO BUFFERS
                               544+*
                         0080  545+OPEN1   EQU   X'0080'       OPEN DRAWER 1
                         0040  546+OPEN2   EQU   X'0040'       OPEN DRAWER 2
                               547+*
                               548+***     FLAG BYTE
                               549+*
                               550+*       CNCL  EQU IN GDCEQ MACRO   CANCEL OUTSTANDING COMMANDS
                               551+*       WDF   EQU IN GDCEQ MACRO   WAIT FOR DEVICE END
                               552+*

                               554 *       KEYEQ
                               555+*
                               556+*********************************************************
                               557+*                                                       *
                               558+*       PERSONALIZED KEY CODE EQUATES                   *
                               559+*                                                       *
                               560+*********************************************************
                               561+*
                               562+***    PERSONALIZABLE KEYS    ***************************
                               563+*
```

```
                NON MEDIA OPERATIONAL MODE
ERR LOC  OBJECT CODE    ADDR STMT SOURCE STATEMENT
                        0001  564*PAY     EQU   1
                        0001  565*PAYMNT  EQU   PAY                 PAYMENT
                        0002  566*DEP     EQU   2                   DEPOSIT
                        0003  567*NMDS    EQU   3                   NON-MERCHANDISE
                        0004  568*ALW     EQU   4                   ALLOWANCE
                        0005  569*DIS     EQU   5                   DISCOUNT
                        0006  570*TAX     EQU   6                   TAX CODE
                        0007  571*REPEAT  EQU   7                   REPEAT
                        0008  572*RETURN  EQU   8                   RETURN
                        0009  573*DEPT    EQU   9                   DEPARTMENT
                        000A  574*CLASS   EQU   10                  CLASS
                        000B  575*STOCK   EQU   11                  STOCK
                        000C  576*STOT    EQU   12                  SUBTOTAL
                        000D  577*MTAX    EQU   13                  MODIFY TAX
                        000E  578*QTY     EQU   14                  QUANTITY
                        000F  579*TOT     EQU   15
                        000F  580*TOTAL   EQU   TOT                 TOTAL
                        0010  581*SKU     EQU   16                  SKU
                        0011  582*SALEP   EQU   17                  ORIGINAL PRICE
                        0011  583*OPRIC   EQU   17                  ORIGINAL PRICE
                        0012  584*DATA    EQU   18                  DATA
                              585**
                              586**** NON-PERSONALIZABLE KEYS *****************************
                              587**
                        0028  588*ACTION  EQU   40                  ACTION
                        002E  589*CL      EQU   46                  CLEAR
                        002E  590*CLEAR   EQU   46                  CLEAR
                        0030  591*EN      EQU   48                  ENTER
                        0030  592*ENTER   EQU   48                  ENTER
                        0031  593*DECP    EQU   49                  DECIMAL POINT
                        003E  594*SL      EQU   62                  SLASH
                        003E  595*SLASH   EQU   62                  SLASH
                        003F  596*VOID    EQU   63                  VOID
                              598 *       GDCEQ
                              599**
                              600*********************************************************
                              601**
                              602**       GUIDANCE SUBROUTINE EQUATES
                              603**
                              604*********************************************************
                              605**
                              606**
                              607****  DRUM PROMPTS
                              608**
                        0000  609*PRCL    EQU   0                   PRESS CLEAR
                        0001  610*SHR     EQU   1                   CASHIER
                        0002  611*SALP    EQU   2                   SALE-PERSON
                        0003  612*TRANT   EQU   3                   TYPE-TRANSACTION
                        0004  613*AUTH    EQU   4                   AUTHORIZATION
                        0005  614*SCRTY   EQU   5                   SECURITY
                        0006  615*AIN     EQU   6                   AUTO INSERT SLIP
                        0007  616*ACCT    EQU   7                   ACCOUNT NUMBER
                        0008  617*PBAL    EQU   8                   PREVIOUS BALANCE
                        0009  618*DEPAR   EQU   9                   DEPARTMENT
                        000A  619*CLAS    EQU   10                  CLASS
                        000B  620*STK     EQU   11                  STOCK
                        000C  621*SKUNIT  EQU   12                  SKU
                        000D  622*AMT     EQU   13                  AMOUNT
                        000E  623*PCNT    EQU   14                  PERCENT
                        000F  624*FEE     EQU   15                  FEE
                        0010  625*DEPOS   EQU   16                  DEPOSIT
                        0011  626*OSALP   EQU   17                  ORIGINAL SALESPERSON
                        0012  627*MINAT   EQU   18                  MANUAL INSERT/AMOUNT TENDERED
                        0013  628*MIN     EQU   19                  MANUAL INSERT
                        0014  629*MINTOT  EQU   20                  MANUAL INSERT/TOTAL TRANS.
                        0015  630*DISPPR  EQU   21                  SEE DISPLAY
                        0016  631*CLSDRW  EQU   22                  CLOSE CASH DRAWER
                              632**
                              633****  COMMAND BYTES
                              634**
                        8000  635*ALARM   EQU   X'8000'             ALARM
                        0800  636*UPROM   EQU   X'0800'             UPDATE PROMPT
                        0400  637*RHC     EQU   X'0400'             READ HARD COUNTERS
                        0200  638*WHC     EQU   X'0200'             WRITE HARD COUNTERS
                              639**
                        0080  640*BUFRES  EQU   X'0080'             BUFFER RESET
                        0040  641*SKEY    EQU   X'0040'             SINGLE KEY MODE
                        0020  642*ENWND   EQU   X'0020'             ENABLE WAND
                        0010  643*ENKEY   EQU   X'0010'             ENABLE KEYBOARD
                        0004  644*ENDP    EQU   X'0004'             ENABLE DECIMAL POINT
                        0002  645*INHIB   EQU   X'0002'             INHIBIT DISPLAY
                              646**
                              647****  FLAG BYTE
                              648**
                        0040  649*RTFN    EQU   X'40'               RETURN ON ANY FUNCTION KEY
                        0020  650*TRFN    EQU   X'20'               TRANSLATE FUNCTION CODE
                        0002  651*CNCL    EQU   X'02'               CANCEL OUTSTANDING COMMANDS
                        0001  652*WDE     EQU   X'01'               WAIT FOR DEVICE END
                              653**
                              654****  STATUS BYTE
                              655**
                        0080  656*DECFM   EQU   X'80'               DECIMAL FORMAT DATA
                        0040  657*SDE     EQU   X'40'               SOME DIGITS ENTERED
                        0010  658*HPEN    EQU   X'10'               HALF PENCE
                        0008  659*DFWND   EQU   X'08'               DATA FROM WAND
                        0008  660*WAND    EQU   X'08'               DATA FROM WAND
                        0004  661*SECLS   EQU   X'04'               SECURITY LOCK STATUS
                        0001  662*HCFAIL  EQU   X'01'               HARD COUNTER FAILURE
                              663**
                              664**
                              665**
                              666*************** DISPLAY EQUATES ***********************
                              667**
                              668**  COMMAND BYTES
                              669**
                        0080  670*DSALRM  EQU   X'80'               ALARM
                        0040  671*DS1     EQU   X'40'               UPDATE DISPLAY 1
                        0020  672*DS2     EQU   X'20'               UPDATE DISPLAY 2
                        0010  673*DSFLSH  EQU   X'10'               FLASH DISPLAY
                        0002  674*DSSGN   EQU   X'02'               SUPRESS SIGN INDICATOR
                        0001  675*DSSZR   EQU   X'01'               SUPRESS LEADING ZEROS
                        0003  676*DSAUTO  EQU   X'03'               AUTO FORMAT ( SUPRESS BOTH )
                              677**
                              678****  DISPLAY LEDS BYTE
                              679**
                        0080  680*DSAMTD  EQU   X'80'               AMOUNT DUE
                        0040  681*DSSUBT  EQU   X'40'               SUBTOTAL
                        0020  682*DSCHNG  EQU   X'20'               CHANGE
                        0010  683*DSREF   EQU   X'10'               REFUND
                        0008  684*DSCOMM  EQU   X'08'               COMMUNICATION
                        0004  685*DSXTRA  EQU   X'04'               EXTRA LED
                              686**
                              687**      DECIMAL POINT
                              688**
                        00FF  689*DSPDP   EQU   X'FF'               PERSONALIZED DECIMAL POINT
                        00FF  691 EFF     EQU   X'FF'
       0000             0001  692 CMNSAV  DS    XL2
       0002 7C04E20604  0002  693 SECPAG  EQU   *
       0007 0003        0006  694         DC    CL5'MSON'
                        0008  695 BUMPTK  DC    AL2(ABJ06-A8001)    PULL TABLE DISPLACEMENT
       0009 0100        0009  696 LOIADR  EQU   *
                        000A  697         DC    XL2'0100'
                        000B  698 DSKCB   EQU   *
                              699 *      DTFMD ADDR-CFLAG,WORK-CFLAG,NUMR-EFF,DSN-MCT
                              700**     MEDIA FEATURE DISKETTE CONTROL BLOCK
       0028 30          000B  701*       DC    XL1'30'              R75,IDF,M128,R128,B256,F256,SYNC
       0000 00          000C  702*       DC    XL1'00'              LOG ADR,INHIBIT LS
       000E 00F5        000D  703*       DC    AL2(CFLAG)           DATA ADDRESS
       00E0 00          000F  704*       DC    XL1'00'              ERROR CODE
                        00E0  705*       DC    XL1'00'
```

```
      NON MEDIA OPERATIONAL MODE
ERR LOC  OBJECT CODE       ADDR STMT SOURCE STATEMENT
    00E1 00               00E1  706+         DC    XL1'00'               ,RED III,,,POR LATCH,DISK IN
    00E2 00F5             00E3  707+         DC    AL2(CFLAG)            WORK AREA ADDRESS
    00E4 0000             00E5  708+         DC    AL2(0)                LOGICAL RECORD OFFSET
    00E6 FF               00E6  709+         DC    AL1(EFF)              NUMBER OF LOGICAL RECORDS
    00E7 7C04C3E340       00E8  710+         DC    CL5' ACT'             DATA SET NAME OR BOE CCHHRR
    00EC 000000           00EE  711+         DC    XL3'0'                EOD CCHHRR
    00EF 000000           00F1  712+         DC    XL3'0'                EOE CCHHRR
    00F2 000000           00F4  713+         DC    XL3'000000'           DISK ERROR LOCATION
                                715  *       CNFIG
                                716+*************************************************************
                                717+*               SECTOR  1                                   *
                                718+*************************************************************
    00F5 80               00F5  719+CFLAG    DC    XL1'80'               CONFIGURATION TYPE FLAG
                                720+*              BIT 0 OFF= STANDALONE
                                721+*              BIT 0  ON= CLUSTER
    00F6 00               00F6  722+         DC    XL1'00'               LEVEL CODE
    00F7 F2F7F7F5F2F2F3   00F0  723+         DC    CL7'2775223'          PART NUMBER      20  DOMESTIC CLUS
    00FE F0F8F2F5F7F840   0104  724+         DC    CL7'082578 '          EC LEVEL CODE
    0105 01               0105  725+AB8605   DC    XL1'01'               MEMORY SIZE FLAG BYTE
                                726+*              BITS(6 7) = RAM SIZE   '00'B = 16K, '01'B = 24K,  *
                                727+*                                     '10'B = 32K, '11'B = NOT USED.   *
                                728+*************************************************************
                                729+*          COMMON CONFIGURATION TO CLUSTER                  *
                                730+*************************************************************
                          0106  732+         ENTRY ABCOMN
                          0106  733+ABCOMN   EQU   *
                          0106  734+AB201    EQU   *
    0106 F0F2F0           0108  735+         DC    CL3'020'              NUMBER SECTORS FOR EARLY
                                736+*                                    WARNING
    0109 80               0109  738+AB250    DC    XL1'80'               MEDIA OPERATIONAL MODE SELECT
                                739+*          BIT 0 ON = PROMPT FOR MEDIA OPERATIONAL MODE AT SIGN ON
                                740+*          BIT 1 ON = NO PROMPT AND DEFAULT TO PRIMARY
                                741+*          BIT 2 ON = NO PROMPT AND DEFAULT TO SECONDARY
                                742+*          BIT 3 ON = NO PROMPT AND DEFAULT TO STANDALONE
                          010A  744+AB202    EQU   *
    010A 00               010A  745+         DC    XL1'00'               DISKETTE LOGGING FORMAT
                                746+*          BIT 0 ON = LOGGING EXTENDED FORMAT
                                747+*          BIT 0 OFF = LOGGING BASIC FORMAT
                                748+*          BIT 1 ON = PRICE LOOKUP EXTENDED FORMAT
                                749+*          BIT 1 OFF = PRICE LOOKUP BASIC FORMAT
                                750+*          BIT 2 ON = NEGATIVE CREDIT FILE EXTENDED FORMAT
                                751+*          BIT 2 OFF = NEGATIVE CREDIT FILE BASIC FORMAT
                          010B  753+AB203    EQU   *
    010B 80               010B  754+         DC    XL1'80'               TERMINAL PORT ASSIGNMENTS
                                755+*          BIT 0 ON = THERE ARE TERMINALS ON PORT 1
                                756+*          BIT 1 ON = THERE ARE TERMINALS ON PORT 2
                          010C  758+AB204    EQU   *
    010C FF               010C  759+         DC    XL1'FF'               FUNCTION SELECTION (BYTE 1)
                                760+*          BIT 0 ON = OPTIONS PERSONALIZATION FUNCTION IS DESIRED
                                761+*          BIT 1 ON = TABLES PERSONALIZATION FUNCTION IS DESIRED
                                762+*          BIT 2 ON = TRANSACTION RE-ENTRY FUNCTION IS DESIRED
                                763+*          BIT 3 ON = TOTALS READOUT FUNCTION IS DESIRED
                                764+*          BIT 4 ON = LOAN/WITHDRAWAL FUNCTION IS DESIRED
                                765+*          BIT 5 ON = NOT USED
                                766+*          BIT 6 ON = OTHER DATA ENTRY FUNCTION IS DESIRED
                          010D  768+AB205    EQU   *
    010D FF               010D  769+         DC    XL1'FF'               FUNCTION SELECTION (BYTE 2)
                                770+*          BIT 0 ON = VOID PRIOR TRANSACTION FUNCTION IS DESIRED
                                771+*          BIT 1 ON = AUXILLARY TOTALS FUNCTION IS DESIRED
                                772+*          BIT 2 ON = CASH COUNT FUNCTION IS DESIRED
                                773+*          BIT 3 ON = LOG PRINT FUNCTION IS DESIRED
                                774+*          BIT 4 ON = TRANSMIT MULTIPLE OR SINGLE DISKETTE FUNCTION
                                775+*                     IS DESIRED
                                776+*          BIT 5 ON = COPY PERSONALIZATION FUNCTION IS DESIRED
                                777+*          BIT 6 ON = MODIFY CONFIGURATION FUNCTION IS DESIRED
                                778+*          BIT 7 ON = CONFIGURATION FUNCTION IS DESIRED
                          010E  780+AB206    EQU   *
    010E FF               010E  781+         DC    XL1'FF'               FUNCTION SELECTION (BYTE 3)
                                782+*          BIT 0 ON = FILE DATA ENTRY IS DESIRED
                                783+*          BIT 1 ON = SECURITY REQUIREMENTS PERS. IS DESIRED
                                784+*          BIT 2 ON = STORE LEVEL SALES OPTIONS PERSONALIZATION IS
                                785+*                     DESIRED
                                786+*          BIT 3 ON = ENTERPRIZE LEVEL SALES OPTIONS PERSONALIZATION
                                787+*                     IS DESIRED
                                788+*          BIT 4 ON = NON-SALES OPTIONS PERSONALIZATION IS DESIRED
                                789+*          BIT 5 ON = AUXILLIARY TOTALS TABLES PERSONALIZATION IS
                                790+*                     DESIRED
                                791+*          BIT 6 ON = SECURITY CODE PERSONALIZATION IS DESIRED
                                792+*          BIT 7 ON = DATA ENTRY FORMAT TABLES PERSONALIZATION IS
                                793+*                     DESIRED
                          010F  795+AB207    EQU   *
    010F 01               010F  796+         DC    IL1'1'                NUMBER OF TRACKS TO RESERVE
                                797+*                                    FOR PRICE LOOKUP FILE
                          0110  798+AB208    EQU   *
    0110 01               0110  799+         DC    IL1'1'                NUMBER OF TRACKS TO RESERVE
                                800+*                                    FOR NEGATIVE CREDIT FILE
                          0111  802+AB210    EQU   *
    0111 00               0111  803+         DC    XL1'00'               MEDIA FEATURE SIGN-ON LEVEL
                          0112  804+AB211    EQU   *
    0112 00               0112  805+         DC    XL1'00'               TRANSACTION LOG ERASE LEVEL
                          0113  806+AB212    EQU   *
    0113 00               0113  807+         DC    XL1'00'               MEDIA FEATURE DIAGNOSTICS LEVEL
                          0114  808+AB213    EQU   *
    0114 00               0114  809+         DC    XL1'00'               OPERATION MODE LEVEL
                          0115  810+AB214    EQU   *
    0115 00               0115  811+         DC    XL1'00'               ENTERPRIZE SALES OPTIONS
                                812+*                                    PERSONALIZATION LEVEL
                          0116  813+AB215    EQU   *
    0116 00               0116  814+         DC    XL1'00'               STORE SALES OPTIONS
                                815+*                                    PERSONALIZATION LEVEL
                          0117  816+AB216    EQU   *
    0117 00               0117  817+         DC    XL1'00'               NON-SALES OPTIONS
                                818+*                                    PERSONALIZATION LEVEL
                          0118  819+AB217    EQU   *
    0118 00               0118  820+         DC    XL1'00'               MODIFY CONFIGURATION LEVEL
                          0119  821+AB218    EQU   *
    0119 00               0119  822+         DC    XL1'00'               SALES TABLES PERSONALIZATION
                                823+*                                    LEVEL
                          011A  824+AB219    EQU   *
    011A 00               011A  825+         DC    XL1'00'               AUXILLARY TOTALS TABLES
                                826+*                                    PERSONALIZATION LEVEL
                          011B  827+AB220    EQU   *
    011B 00               011B  828+         DC    XL1'00'               SECURITY REQUIREMENTS
                                829+*                                    PERSONALIZATION LEVEL
                          011C  830+AB221    EQU   *
    011C 00               011C  831+         DC    XL1'00'               DATA ENTRY FORMAT TABLES
                                832+*                                    PERSONALIZATION LEVEL
                          011D  833+AB222    EQU   *
    011D 00               011D  834+         DC    XL1'00'               REGISTER AUXILLARY TOTALS LEVEL
                          011E  835+AB223    EQU   *
    011E 00               011E  836+         DC    XL1'00'               CLUSTER AUXILLARY TOTALS LEVEL
                          011F  837+AB224    EQU   *
    011F 00               011F  838+         DC    XL1'00'               TRANSMIT SINGLE DISKETTE LEVEL
                          0120  839+AB225    EQU   *
    0120 00               0120  840+         DC    XL1'00'               TRANSMIT MULTIPLE DISKETTE LEVEL
                          0121  841+AB226    EQU   *
    0121 00               0121  842+         DC    XL1'00'               MULTIPLE DISKETTE TRANSACTION,
                                843+*                                    LOG PRINT LEVEL
                          0122  844+AB227    EQU   *
    0122 00               0122  845+         DC    XL1'00'               COPY PERSONALIZATION LEVEL
                          0123  846+AB228    EQU   *
    0123 00               0123  847+         DC    XL1'00'               MEDIA FEATURE SIGNOFF LEVEL
                          0124  848+AB229    EQU   *
```

```
      MDM  MEDIA OPERATIONAL MODE
ERR LOC  OBJECT CODE      ADDR STMT SOURCE STATEMENT
    0124 00               0124  849+          DC    XL1'00'              VOID FUNCTION LEVEL
                          0125  850+AB230     EQU   *
    0125 00               0125  851+          DC    XL1'00'              FILE DATA ENTRY LEVEL
                          0126  852+AB231     EQU   *
    0126 00               0126  853+          DC    XL1'00'              TRANSMIT SINGLE DISKETTE/RECEIVE
                                                                           LEVEL
                                854+*
                          0127  855+AB232     EQU   *
    0127 00               0127  856+          DC    XL1'00'              TRANSMIT MULTIPLE DISKETTE/
                                                                           RECEIVE LEVEL
                                857+*
                          0128  858+AB240     EQU   *
    0128 00               0128  859+          DC    XL1'00'              RECEIVE LEVEL
                          0129  860+AB241     EQU   *
    0129 00               0129  861+          DC    XL1'00'              SECURITY CODE PERSONALIZATION
                          012A  862+AB242     EQU   *
    012A 00               012A  863+          DC    XL1'00'              CONFIGURATION LEVEL

                          012B  865+AB233     EQU   *
    012B 00               012B  866+          DC    XL1'00'              SECURITY REQUIREMENTS FLAG BYTE
                                867+*         BIT 0 ON = CODE OR KEY REQUIRED FOR SECURITY REQUIREMENTS
                                868+*         BIT 0 OFF = KEY REQUIRED FOR SECURITY REQUIREMENTS
                                869+*         BIT 1 ON = CODE OR KEY REQUIRED FOR LEVEL 1
                                870+*         BIT 1 OFF = KEY REQUIRED FOR LEVEL 1
                                871+*         BIT 2 ON = CODE OR KEY REQUIRED FOR LEVEL 2
                                872+*         BIT 2 OFF = KEY REQUIRED FOR LEVEL 2
                                873+*         BIT 3 ON = CODE OR KEY REQUIRED FOR LEVEL 3
                                874+*         BIT 3 OFF = KEY REQUIRED FOR LEVEL 3
                                875+*         BIT 4 ON = CODE OR KEY REQUIRED FOR LEVEL 4
                                876+*         BIT 4 OFF = KEY REQUIRED FOR LEVEL 4
                                877+*         BIT 5 ON = CODE OR KEY REQUIRED FOR LEVEL 5
                                878+*         BIT 5 OFF = KEY REQUIRED FOR LEVEL 5

                          012C  880+AB234     EQU   *
    012C 01               012C  881+          DC    IL1'1'
    012D F0               012D  882+          DC    CL1'0'               SECURITY CODE FOR LEVEL 1
    012E                  0132  883+          DS    CL5
                          0133  884+AB235     EQU   *
    0133 01               0133  885+          DC    IL1'1'
    0134 F0               0134  886+          DC    CL1'0'               SECURITY CODE FOR LEVEL 2
    0135                  0139  887+          DS    CL5
                          013A  888+AB236     EQU   *
    013A 01               013A  889+          DC    IL1'1'
    013B F0               013B  890+          DC    CL1'0'               SECURITY CODE FOR LEVEL 3
    013C                  0140  891+          DS    CL5
                          0141  892+AB237     EQU   *
    0141 01               0141  893+          DC    IL1'1'
    0142 F0               0142  894+          DC    CL1'0'               SECURITY CODE FOR LEVEL 4
    0143                  0147  895+          DS    CL5
                          0148  896+AB238     EQU   *
    0148 01               0148  897+          DC    IL1'1'
    0149 F0               0149  898+          DC    CL1'0'               SECURITY CODE FOR LEVEL 5
    014A                  014E  899+          DS    CL5
                          014F  900+AB239     EQU   *
    014F 01               014F  901+          DC    IL1'1'
    0150 F0               0150  902+          DC    CL1'0'               SECURITY CODE FOR SECURITY
                                                                           REQUIREMENTS
                                903+*
    0151                  0155  904+          DS    CL5
    0156                  0174  905+          DS    31XL1                SECTOR ALIGNMENT
                                906+*****************************************************************
                                907+*             SECTOR  2                                         *
                                908+*****************************************************************
                                909+*****************************************************************
                                910+*                     CONFIGURATION TABLES                      *
                                911+*****************************************************************

                                915+*****************************************************************
                                916+*       STORE/REGISTER CONFIGURATION                            *
                                917+*****************************************************************
                                918+*                                                               *
                                919+*       THE FOLLOWING IS THE FORMAT OF THE STORE/REGISTER TABLE *
                                920+*       WHERE XXXXXX IS STORE/REGISTER NUMBER AND YY IS THE LAST*
                                921+*       TWO DIGITS OF THE PTAB DATA SET NAME                    *
                                922+*                                                               *
                                923+*           INDEX     FIELD1    FIELD2    FIELD3                *
                                924+*                                                               *
                                925+*           XXXXXX     SSYY      SNYY     FLAG BYTE             *
                                926+*                                                               *
                                927+*                                                               *
                                928+*        FLAG BYTE ASSIGNED AS FOLLOWS                          *
                                929+*             BIT(0) ON = STORE/REGISTER   ALLOCATED TO A TERMINAL. *
                                930+*             BIT(1) ON = CONFIG. USE ONLY (STORE/REG., PTABS LOADED). *
                                931+*             BITS(6 7) = RAM SIZE    '00'B = 16K,   '01'B = 24K,  *
                                932+*                                     '10'B = 32K, '11'B = NOT USED. *
                                933+*                                                               *
                                934+*****************************************************************
                          0175  935+          ENTRY ABSTRG
                          0175  936+ABSTRG    EQU   *
    0175 05               0175  937+          DC    IL1'05'
    0176 0B               0176  938+          DC    IL1'11'
                                939+*****************************************************************
                          0177  940+AB301     EQU   *
    0177 F0F0F0F0F0F1     017C  941+          DC    CL6'000001'          STORE/REGISTER NUMBER
                          017D  942+AB302     EQU   *
    017D F0F1             017E  943+          DC    CL2'01'              SALES PERSONALIZATION FOR ST/RG
                          017F  944+AB303     EQU   *
    017F F0F1             0180  945+          DC    CL2'01'              NONSALES PTAB FOR ST/RG
                          0181  946+AB305     EQU   *
    0181 41               0181  947+AB306     DC    XL1'41'              FLAG BYTE
                                948+*-----------------------------------------------------------*
                          0182  949+AB307     EQU   *
    0182 F0F0F0F0F0F2     0187  950+          DC    CL6'000002'          STORE/REGISTER NUMBER
                          0188  951+AB308     EQU   *
    0188 F0F1             0189  952+          DC    CL2'01'              SALES PERSONALIZATION FOR ST/RG
                          018A  953+AB309     EQU   *
    018A F0F1             018B  954+          DC    CL2'01'              NONSALES PTAB FOR ST/RG
                          018C  955+AB311     EQU   *
    018C 41               018C  956+AB312     DC    XL1'41'              FLAG BYTE
                                957+*-----------------------------------------------------------*
                          018D  958+AB313     EQU   *
    018D F0F0F0F0F0F3     0192  959+          DC    CL6'000003'          STORE/REGISTER NUMBER
                          0193  960+AB314     EQU   *
    0193 F0F1             0194  961+          DC    CL2'01'              SALES PERSONALIZATION FOR ST/RG
                          0195  962+AB315     EQU   *
    0195 F0F1             0196  963+          DC    CL2'01'              NONSALES PTAB FOR ST/RG
                          0197  964+AB317     EQU   *
    0197 41               0197  965+AB318     DC    XL1'41'
                                966+*-----------------------------------------------------------*
                          0198  967+AB319     EQU   *
    0198 F0F0F0F0F0F4     019D  968+          DC    CL6'000004'          STORE/REGISTER NUMBER
                          019E  969+AB320     EQU   *
    019E F0F1             019F  970+          DC    CL2'01'              SALES PERSONALIZATION FOR ST/RG
                          01A0  971+AB321     EQU   *
    01A0 F0F1             01A1  972+          DC    CL2'01'              NONSALES PTAB FOR ST/RG
                          01A2  973+AB323     EQU   *
    01A2 41               01A2  974+AB324     DC    XL1'41'              FLAG BYTE
                                975+*-----------------------------------------------------------*
                          01A3  976+AB325     EQU   *
    01A3 F0F0F0F0F0F5     01A8  977+          DC    CL6'000005'          STORE/REGISTER NUMBER
                          01A9  978+AB326     EQU   *
    01A9 F0F1             01AA  979+          DC    CL2'01'              SALES PERSONALIZATION FOR ST/RG
                          01AB  980+AB327     EQU   *
    01AB F0F1             01AC  981+          DC    CL2'01'              NONSALES PTAB FOR ST/RG
                          01AD  982+AB329     EQU   *
    01AD 41               01AD  983+AB330     DC    XL1'41'
                                984+*-----------------------------------------------------------*
                          01AE  985+AB331     EQU   *
    01AE F0F0F0F0F0F6     01B3  986+          DC    CL6'000006'          STORE/REGISTER NUMBER
                          01B4  987+AB332     EQU   *
    01B4 F0F1             01B5  988+          DC    CL2'01'              SALES PERSONALIZATION FOR ST/RG
                          01B6  989+AB333     EQU   *
    01B6 F0F1             01B7  990+          DC    CL2'01'              NONSALES PTAB FOR ST/RG
                          01B8  991+AB335     EQU   *
```

```
        NON MEDIA OPERATIONAL MODE
ERR LOC  OBJECT CODE      ADDR STMT SOURCE STATEMENT
    01B8 41               01B8  992+AB336   DC    XL1'41'          FLAG BYTE
                                993+*----------------------------------------------------------*
                          01B9  994+AB337   EQU   *
    01B9 F0F0F0F0F0F7     01BE  995+        DC    CL6'000007'      STORE/REGISTER NUMBER
                          01BF  996+AB338   EQU   *
    01BF F0F1             01C0  997+        DC    CL2'01'          SALES PERSONALIZATION FOR ST/RG
                          01C1  998+AB339   EQU   *
    01C1 F0F1             01C2  999+        DC    CL2'01'          NONSALES PTAB FOR ST/RG
                          01C3 1000+AB341   EQU   *
    01C3 01               01C3 1001+AB342   DC    XL1'01'          FLAG BYTE
                               1002+*----------------------------------------------------------*
                          01C4 1003+AB343   EQU   *
    01C4 F0F0F0F0F0F8     01C9 1004+        DC    CL6'000008'      STORE/REGISTER NUMBER
                          01CA 1005+AB344   EQU   *
    01CA F0F1             01CB 1006+        DC    CL2'01'          SALES PERSONALIZATION FOR ST/RG
                          01CC 1007+AB345   EQU   *
    01CC F0F1             01CD 1008+        DC    CL2'01'          NONSALES PTAB FOR ST/RG
                          01CE 1009+AB347   EQU   *
    01CE 01               01CE 1010+AB348   DC    XL1'01'          FLAG BYTE
                               1011+*----------------------------------------------------------*
                          01CF 1012+AB349   EQU   *
    01CF F0F0F0F0F0F9     01D4 1013+        DC    CL6'000009'      STORE/REGISTER NUMBER
                          01D5 1014+AB350   EQU   *
    01D5 F0F1             01D6 1015+        DC    CL2'01'          SALES PERSONALIZATION FOR ST/RG
                          01D7 1016+AB351   EQU   *
    01D7 F0F1             01D8 1017+        DC    CL2'01'          NONSALES PTAB FOR ST/RG
                          01D9 1018+AB353   EQU   *
    01D9 01               01D9 1019+AB354   DC    XL1'01'          FLAG BYTE
                               1020+*----------------------------------------------------------*
                          01DA 1021+AB355   EQU   *
    01DA F0F0F0F0F1F0     01DF 1022+        DC    CL6'000010'      STORE/REGISTER NUMBER
                          01E0 1023+AB356   EQU   *
    01E0 F0F1             01E1 1024+        DC    CL2'01'          SALES PERSONALIZATION FOR ST/RG
                          01E2 1025+AB357   EQU   *
    01E2 F0F1             01E3 1026+        DC    CL2'01'          NONSALES PTAB FOR ST/RG
                          01E4 1027+AB359   EQU   *
    01E4 01               01E4 1028+AB360   DC    XL1'01'          FLAG BYTE
                               1029+*----------------------------------------------------------*
                          01E5 1030+AB361   EQU   *
    01E5 F0F0F0F0F1F1     01EA 1031+        DC    CL6'000011'      STORE/REGISTER NUMBER
                          01EB 1032+AB362   EQU   *
    01EB F0F1             01EC 1033+        DC    CL2'01'          SALES PERSONALIZATION FOR ST/RG
                          01ED 1034+AB363   EQU   *
    01ED F0F1             01EE 1035+        DC    CL2'01'          NONSALES PTAB FOR ST/RG
                          01EF 1036+AB365   EQU   *
    01EF 01               01EF 1037+AB366   DC    XL1'01'          FLAG BYTE
                               1038+*----------------------------------------------------------*
    01F0 FF               01F0 1039+        DC    XL1'FF'          END OF STORE/REGISTER TABLE
    01F1 00000000         01F4 1040+        DC    4XL1'00'         SECTOR ALIGNMENT

                               1042+************************************************************
                               1043+*                    SECTOR 3                              *
                               1044+************************************************************
                               1045+************************************************************
                               1046+*                 POLL LIST                                *
                               1047+************************************************************
                          01F5 1049+        ENTRY ABPOLL
                          01F5 1050+ABPOLL  EQU   *
    01F5 0008             01F6 1051+        DC    XL2'0008'        DISP/LL OF POLL LIST
                               1052+************************************************************
    01F7 00               01F7 1053+AB001   DC    XL1'00'          LOCAL SATELLITE
    01F8 80               01F8 1054+AB002   DC    XL1'80'          LOCAL SATELLITE IS ALWAYS ACTIVE
    01F9 00               01F9 1055+AB003   DC    XL1'00'          ERROR COUNT
                          01FA 1056+AB004   EQU   *
    01FA 4040             01FB 1057+        DC    2CL1' '          OFFSET FOR MODIFY ADD
                          01FC 1058+AB005   EQU   *
    01FC 000000000000     0201 1059+        DC    6XL1'00'         ST/RG
                               1060+*----------------------------------------------------------*
    0202 09               0202 1061+AB006   DC    XL1'09'          LINE 1, STATION   1
    0203 00               0203 1062+AB007   DC    XL1'00'          FLAG BYTE
    0204 00               0204 1063+AB008   DC    XL1'00'          ERROR COUNT
                          0205 1064+AB009   EQU   *
    0205 4040             0206 1065+        DC    2CL1' '          OFFSET FOR MODIFY ADD
                          0207 1066+AB010   EQU   *
    0207 000000000000     020C 1067+        DC    6XL1'00'         ST/RG
                               1068+*----------------------------------------------------------*
    020D 11               020D 1069+AB011   DC    XL1'11'          LINE 2, STATION   1
    020E 00               020E 1070+AB012   DC    XL1'00'          FLAG BYTE
    020F 00               020F 1071+AB013   DC    XL1'00'          ERROR COUNT
                          0210 1072+AB014   EQU   *
    0210 4040             0211 1073+        DC    2CL1' '          OFFSET FOR MODIFY ADD
                          0212 1074+AB015   EQU   *
    0212 000000000000     0217 1075+        DC    6XL1'00'         ST/RG
                               1076+*----------------------------------------------------------*
    0218 0A               0218 1077+AB016   DC    XL1'0A'          LINE 1, STATION   2
    0219 00               0219 1078+AB017   DC    XL1'00'          FLAG BYTE
    021A 00               021A 1079+AB018   DC    XL1'00'          ERROR COUNT
                          021B 1080+AB019   EQU   *
    021B 4040             021C 1081+        DC    2CL1' '          OFFSET FOR MODIFY ADD
                          021D 1082+AB020   EQU   *
    021D 000000000000     0222 1083+        DC    6XL1'00'         ST/RG
                               1084+*----------------------------------------------------------*
    0223 12               0223 1085+AB021   DC    XL1'12'          LINE 2, STATION   2
    0224 00               0224 1086+AB022   DC    XL1'00'          FLAG BYTE
    0225 00               0225 1087+AB023   DC    XL1'00'          ERROR COUNT
                          0226 1088+AB024   EQU   *
    0226 4040             0227 1089+        DC    2CL1' '          OFFSET FOR MODIFY ADD
                          0228 1090+AB025   EQU   *
    0228 000000000000     022D 1091+        DC    6XL1'00'         ST/RG
                               1092+*----------------------------------------------------------*
    022E 0B               022E 1093+AB026   DC    XL1'0B'          LINE 1, STATION   3
    022F 00               022F 1094+AB027   DC    XL1'00'          FLAG BYTE
    0230 00               0230 1095+AB028   DC    XL1'00'          ERROR COUNT
                          0231 1096+AB029   EQU   *
    0231 4040             0232 1097+        DC    2CL1' '          OFFSET FOR MODIFY ADD
                          0233 1098+AB030   EQU   *
    0233 000000000000     0238 1099+        DC    6XL1'00'         ST/RG
                               1100+*----------------------------------------------------------*
    0239 13               0239 1101+AB031   DC    XL1'13'          LINE 2, STATION   3
    023A 00               023A 1102+AB032   DC    XL1'00'          FLAG BYTE
    023B 00               023B 1103+AB033   DC    XL1'00'          ERROR COUNT
                          023C 1104+AB034   EQU   *
    023C 4040             023D 1105+        DC    2CL1' '          OFFSET FOR MODIFY ADD
                          023E 1106+AB035   EQU   *
    023E 000000000000     0243 1107+        DC    6XL1'00'         ST/RG
                               1108+*----------------------------------------------------------*
    0244 0C               0244 1109+AB036   DC    XL1'0C'          LINE 1, STATION   4
    0245 00               0245 1110+AB037   DC    XL1'00'          FLAG BYTE
    0246 00               0246 1111+AB038   DC    XL1'00'          ERROR COUNT
                          0247 1112+AB039   EQU   *
    0247 4040             0248 1113+        DC    2CL1' '          OFFSET FOR MODIFY ADD
                          0249 1114+AB040   EQU   *
    0249 000000000000     024E 1115+        DC    6XL1'00'         ST/RG
                               1116+*----------------------------------------------------------*
    024F 14               024F 1117+AB041   DC    XL1'14'          LINE 2, STATION   4
    0250 00               0250 1118+AB042   DC    XL1'00'          FLAG BYTE
    0251 00               0251 1119+AB043   DC    XL1'00'          ERROR COUNT
                          0252 1120+AB044   EQU   *
    0252 4040             0253 1121+        DC    2CL1' '          OFFSET FOR MODIFY ADD
                          0254 1122+AB045   EQU   *
    0254 000000000000     0259 1123+        DC    6XL1'00'         ST/RG
                               1124+*----------------------------------------------------------*
    025A 0D               025A 1125+AB046   DC    XL1'0D'          LINE 1, STATION   5
    025B 00               025B 1126+AB047   DC    XL1'00'          FLAG BYTE
    025C 00               025C 1127+AB048   DC    XL1'00'          ERROR COUNT
                          025D 1128+AB049   EQU   *
    025D 4040             025E 1129+        DC    2CL1' '          OFFSET FOR MODIFY ADD
                          025F 1130+AB050   EQU   *
    025F 000000000000     0264 1131+        DC    6XL1'00'         ST/RG
```

```
        MOM  MEDIA OPERATIONAL MODE
ERR LOC  OBJECT CODE        ADDR STMT SOURCE STATEMENT

                                 1132+*-------------------------------------------------------------------*
    0265 15                 0265 1133+AB051   DC     XL1'15'                  LINE 2, STATION   5
    0266 00                 0266 1134+AB052   DC     XL1'00'                  FLAG BYTE
    0267 00                 0267 1135+AB053   DC     XL1'00'                  ERROR COUNT
                            0268 1136+AB054   EQU    *
    0268 4040               0269 1137+        DC     2CL1' '                  OFFSET FOR MODIFY ADD
                            026A 1138+AB055   EQU    *
    026A 000000000000       026F 1139+        DC     6XL1'00'                 ST/RG
                                 1140+*-------------------------------------------------------------------*
    0270 FF                 0270 1141+        DC     XL1'FF'                  END OF POLL LIST TABLE
    0271 00000000           0274 1142+        DC     4XL1'00'                 SECTOR ALIGNMENT

                                 1144+*********************************************************************
                                 1145+*                 SECTOR  4
                                 1146+*********************************************************************
                                 1147+*               TELEPROCESSING    MODES                              *
                            0275 1148+AB7101  EQU    *
    0275 02F1F0             0277 1149+        DC     XL3'02F1F0'              MAXIMUM NUMBER OF DISK ERRORS.
                                 1150+*
                            0278 1151+AB7102  EQU    *                        TERMINAL ID USED.
                            0278 1152+AB7104  EQU    *                        HOST ID USED.
                            0278 1153+AB7134  EQU    *
                            0278 1154+AB7135  EQU    *
                            0278 1155+AB7136  EQU    *
    0278 00                 0278 1156+        DC     XL1'00'
                                 1157+*              BIT 0 = ON=TERMINAL ID USED.
                                 1158+*              BIT 1 = ON=HOST ID USED.
                                 1159+*              BIT 2   0 - TTB, 1 - TRS.
                                 1160+*              BIT 3   ON - NULL RECORD AT END OF FILE
                                 1161+*              BIT 4   ON - STATUS MESSAGE TRANSMITTED
                                 1162+*
    0279 00                 0279 1163+AB7103  DC     IL1'0'
    027A 4040404040404040   0288 1164+        DC     CL15' '                  TERMINAL ID.
    0282 40404040404040          1164+
    0289 00                 0289 1165+AB7105  DC     IL1'0'
    028A 4040404040404040   0298 1166+        DC     CL15' '                  HOST ID.
    0292 40404040404040          1166+
    0299 03                 0299 1167+AB7107  DC     IL1'3'                   NUMBER OF RETRIES ENQ FOR
                                 1168+*                                       STATUS MESSAGE.
    029A 04                 029A 1169+AB7111  DC     IL1'4'                   NAKS ACCEPTED IN RESPONSE TO
                                 1170+*                                       TEXT.
    029B 07                 029B 1171+AB7116  DC     IL1'7'                   TTD TIMEOUT COUNT.
    029C 07                 029C 1172+AB7117  DC     IL1'7'                   ENQ RETRIES FOR MISSING RESPONSE
    029D 00                 029D 1173+AB7118  DC     IL1'0'                   NUMBER OF TIMES TO RETURN TO
                                 1174+*                                       WAIT FOR PHONE CALL IF HAVING
                                 1175+*                                       PROBLEMS SENDING DATA IN
                                 1176+*                                       TRANSMIT SINGLE DISKETTE
                                 1177+*                                       FUNCTION.
    029E 01                 029E 1178+AB7119  DC     XL1'01'                  BLOCKING FACTOR.
                            029F 1179+AB7120  EQU    *
                            029F 1180+AB7122  EQU    *
                            029F 1181+AB7123  EQU    *
                            029F 1182+AB7124  EQU    *
                            029F 1183+AB7125  EQU    *
                            029F 1184+AB7127  EQU    *
                            029F 1185+AB7129  EQU    *
                            029F 1186+AB7133  EQU    *
    029F 4B                 029F 1187+        DC     XL1'4B'
                                 1188+*
                                 1189+*              BIT 0 = ON=TERMINAL INITIATES CALL.
                                 1190+*              BIT 1 = ON=BUSINESS MACHINE  CLOCK  INSTALLED.
                                 1191+*              BIT 3 = ON=IBM EXTERNAL MODEM INSTALLED.
                                 1192+*              BIT 4 = ON=INTEGRATED MODEM INSTALLED.
                                 1193+*              BIT 5 = ON=ANSWER TONE GENERATION.
                                 1194+*              BIT 6 = ON=FULL SPEED.
                                 1195+*              BIT 7 = ON= AUTO ANSWER
                                 1196+*                     OFF= MANUAL ANSWER
    02A0 01                 02A0 1197+AB7126  DC     IL1'1'                          1-OTH.
                                 1198+*                                              2-COSTL.
    02A1 01                 02A1 1199+AB7128  DC     IL1'1'                          1-SWITCHED
                                 1200+*                                              2-LEASED.
    02A2 17                 02A2 1201+AB7131  DC     IL1'23'
    02A3 E3D9C1D5E2D4C9E2   02C1 1202+        DC     CL31'TRANSMISSION SUCCESSFUL'
    02AB E2C9D6D540E2E4C3        1202+
    02B3 C3C5E2E2C6E40340        1202+
    02BB 40404040404040          1202+
    02C2 19                 02C2 1203+AB7132  DC     IL1'25'
    02C3 E3D9C1D5E2D4C9E2   02E1 1204+        DC     CL31'TRANSMISSION UNSUCCESSFUL'
    02CB E2C9D6D540E4D5E2        1204+
    02D3 E4C3C3C5E2E2C6E4        1204+
    02DB D3404040404040          1204+
    02E2 14                 02E2 1205+AB7130  DC     IL1'20'                  TIME TO WAIT FOR DISKETTE CHANGE
    02E3 0000000000000000   02F4 1206+        DC     18XL1'00'
    02EB 0000000000000000        1206+
    02F3 0000                    1206+
                            02F5 1207         ENTRY BUFFER
                            02F5 1208 BUFFER  EQU    *
                            FFFF 1209         END
```

```
        MSOCC - SECONDARY OPERATIONAL MODE        BERKLAND
ERR LOC  OBJECT CODE        ADDR STMT SOURCE STATEMENT

                                  3 *********************************************************************
                                  4 *                                                                   *
                                  5 * MODULE-NAME        = MSOCCM      (GPOST-WREN)                     *
                                  6 *                                                                   *
                                  7 * DESCRIPTIVE-NAME = MEDIA SECONDARY MODE                           *
                                  8 *                                                                   *
                                  9 *                                                                   *
                                 10 *                                                                   *
                                 11 * STATUS             = OPERATIONAL                                  *
                                 12 *                                                                   *
                                 13 * FUNCTION           = 1.  POLLS THE LOCAL SATELLITE                *
                                 14 *                                                                   *
                                 15 *                      2.  IF THERE IS A QUEUE 3 OR QUEUE 4 REQUEST, *
                                 16 *                          THE VFID BLOCK WILL BE READ INTO THE MEDIA *
                                 17 *                          PROCESSOR.  A SIAM WILL THEN BE ISSUED.   *
                                 18 *                          WHEN THE SIAM IS COMPLETED, THE VFID BLOCK *
                                 19 *                          WILL THEN BE WROTE BACK TO THE LOCAL SAT.  *
                                 20 *                                                                   *
                                 21 *                      3.  CHECKS FOR CHANGES IN THE OPERATING MODE. *
                                 22 *                          IF THERE IS A CHANGE IN THE OPERATING MODE, *
                                 23 *                          MSOCC WILL PAGE IN THE PRIMARY OPERATIONAL *
                                 24 *                          MODE                                     *
                                 25 *                                                                   *
                                 26 *                      4.  REPEATS STEPS 1, 2 AND 3 UNTIL THE         *
                                 27 *                          OPERATIONAL MODE IS CHANGED.             *
                                 28 *                                                                   *
                                 29 *       REGISTER-CONVENTIONS = XR1 AND XR2 ARE INDEX REGISTERS ONE  *
                                 30 *                              AND TWO RESPECTIVELY.  ARR IS THE ADD- *
                                 31 *                              RESS RECALL REGISTER.                *
                                 32 *                                                                   *
                                 33 *       PROCESSOR    = SYSTEM 3 MOD 10 ASSEMBLER.                   *
                                 34 *                                                                   *
                                 35 *       MODULE-SIZE = XXXXX DECIMAL BYTES                           *
                                 36 *                                                                   *
                                 37 *       MODULE TYPE = RAM PAGED PROGRAM                             *
                                 38 *                                                                   *
                                 39 *       ATTRIBUTES   = SERIALLY REUSABLE                            *
                                 40 *                                                                   *
                                 41 * ENTRY-POINT        = MSOCC  (ONLY ONE ENTRY POINT)                *
                                 42 *                                                                   *
                                 43 *       PURPOSE      = SECONDARY MODE (SEE FUNCTION ABOVE)          *
                                 44 *                                                                   *
                                 45 *       LINKAGE      = NONE.  MSOCC IS PAGED IN BY THE MEDIA START  *
                                 46 *                      PROGRAM OR THE PRIMARY OPERATIONAL MODE.     *
                                 47 *                                                                   *
                                 48 * INPUT              = NONE                                         *
                                 49 *                                                                   *
                                 50 * OUTPUT             = NONE                                         *
                                 51 *                                                                   *
```

```
      MSOCC - SECONDARY OPERATIONAL MODE
ERR LOC  OBJECT CODE        ADDR STMT SOURCE STATEMENT
                                 52 * EXIT-NORMAL       = OCCURS WHEN MODE CHANGE IS SELECTED                *
                                 53 *                                                                        *
                                 54 * EXTERNAL-REFERENCES = SEE BELOW                                        *
                                 55 *                                                                        *
                                 56 *        ROUTINES         = YYSPMS  MODE SELECTION HANDLER               *
                                 57 *                                                                        *
                                 58 *                           YYSIAM  HANDLES INTER-MACHINE COMMUNICATIONS *
                                 59 *                                                                        *
                                 60 *                           YYCDRN  CHECKS FOR ERRORS AFTER POLLING      *
                                 61 *                                                                        *
                                 62 *                           YYWRVF  WRITES VIRTUAL FILE                  *
                                 63 *                                                                        *
                                 64 *                           YYRDVF  READS VIRTUAL FILE                   *
                                 65 *                                                                        *
                                 66 *        DATA-AREAS       = MEDIA COMMON AREA (SEE MCOM1)                *
                                 67 *                                                                        *
                                 68 *        CONTROL-BLOCKS = CCPMCB AND STAMCB                              *
                                 69 *                                                                        *
                                 70 * MACROS            =      MEDIA COMMON EQUATES, COMMON AREA EQUATES     *
                                 71 *                                                                        *
                                 72 *                                                                        *
                                 73 *                                                                        *
                                 74 * DATA SET          = SOURCE CODE AND OBJECT MODULE INFORMATION          *
                                 75 *                                                                        *
                                 76 *                                                                        *
                                 77 *                                                                        *
                                 78 *                                                                        *
                                 79 *                                                                        *
                                 80 *                                                                        *
                                 81 *                                                                        *
                                 82 *                                                                        *
                                 83 *                                                                        *
                                 84 **************************************************************************

    0000                         86 MSOCC    START
                                 87 *        FTYPE
                                 88+*        STAND ALONE STATION PROGRAM
                                 89+*        WHEN PROGRAM
                                 90+*        RAM PROGRAM
                            0130 91          ENTRY STAMCB
                            015A 92          ENTRY CMNSAV
                            0180 93          ENTRY AB213
                            01C7 94          ENTRY AB233
                            01C8 95          ENTRY AB234
                            01CF 96          ENTRY AB235
                            01D6 97          ENTRY AB236
                            01DD 98          ENTRY AB237
                            01E4 99          ENTRY AB238
                            0001 100         EXTRN YYACOD
                            01EB 101         ENTRY AB239
                            0002 102         EXTRN YYSIAM
                            0003 103         EXTRN YYWRVF
                            0004 104         EXTRN YYRDVF
                            0005 105         EXTRN YYCDRN
                            0006 106         EXTRN YYSPMS

    0000 34 01 015A              108         ST    CMNSAV,XR1

                                 110 *  READ THE CONFIGURATION TABLE
                                 111 *       SVC
    0004 F5                 0004 112+        DC    XL1'F5'
    0005 26                 0005 113         DC    AL1(XXORWM)               REQUEST CODE FOR XXORWM
    0006 0000               0007 114         DC    XL2'0000'                 ERROR LINKAGE (XXMERM)
    0008 0177               0009 115         DC    AL2(DISKI)                CONTROL BLOCK ADDRESS
    000A 0000               000B 116         DC    XL2'0000'                 LOGICAL RECORD OFFSET
    000C 0200               000D 117         DC    AL2(RD)                   COMMAND BYTES (READ)

    000E C2 02 0293              119         LA    AB001,XR2                 LOAD ADDRESS OF POLL LIST
    0012 74 02 18                120         ST    CCPADR(,XR1),XR2          STORE IN POLL LIST POINTER
    0015 C2 01 0130              121         LA    STAMCB,XR1
    0019 C2 02 014C              122         LA    SATEID,XR2
    001D 74 02 06                123         ST    6(,XR1),XR2               LOAD SIAM C.B. WITH ADDRESS OF SAT. ID TABLE
    0020 7C 80 04                124         MVI   4(,XR1),X'80'             ENABLE SIAM
    0023 C0 87 0002              125         B     YYSIAM
    0027 78 80 04                126         SBF   4(,XR1),X'80'             TURN OFF ENABLE SIAM BIT

                            002A 129 SAME    EQU   *
    002A C0 87 0001              130         B     YYACOD                    SET WAIT FOR ACTION CODE 9
                            002E 131 BEGIN   EQU   *
    002E 35 02 015A              132         L     CMNSAV,XR2
    0032 C2 01 0293              133         LA    AB001,XR1
    0036 B4 01 18                134         ST    CCPADR(,XR2),XR1          POINT CCPADR TO 1ST POLL LIST ENTRY

                                 136 *  POLL THE LOCAL SATELLITE

    0039 E2 01 AC                138         LA    CCPMCB(,XR2),XR1
    003C 7C 00 07                139         MVI   7(,XR1),X'00'             MOVE ADDRESS OF LOCAL SAT. TO PIA C.B.
    003F 7C 09 01                140         MVI   1(,XR1),POL               MOVE POLL COMMAND TO PIA C.B.
                                 141 *       SVC
    0042 F5                 0042 142+        DC    XL1'F5'
    0043 40                 0043 143         DC    AL1(XXPIAT)               POLL LOCAL SATELLITE

                            0044 145 WT      EQU   *
    0044 78 02 00                146         TBN   0(,XR1),DE                WAIT FOR DE
    0047 C0 90 0044              147         BF    WT
    004B C0 87 0005              148         B     YYCDRN                    CHECK FOR ERRORS
    004F 0108               0050 149         DC    AL2(SKIP2)

                                 151 *  CHECK FOR Q3 AND Q6 REQUESTS

    0051 78 10 09                153         TBN   9(,XR1),QUEUE3            Q3 REQUESTED
    0054 F2 90 10                154         JF    SKIP1
    0057 3C 03 0133              155         MVI   STAMCB+3,X'03'            SET QUEUE TO 3
    005B 0C 01 0144 0149         156         MVC   STAMCB+20(2),T1MIN        SET DELAY TIME TO 1 MINUTE
    0061 7C 60 0A                157         MVI   10(,XR1),QUEID3           MOVE QUEUE ID TO PIA C.B.
    0064 F2 87 13                158         J     CONT1

                            0067 160 SKIP1   EQU   *
    0067 78 02 09                161         TBN   9(,XR1),QUEUE6            Q6 REQUESTED
    006A F2 90 9E                162         JF    SKIP2
    006D 3C 06 0133              163         MVI   STAMCB+3,X'06'            SET QUEUE TO 6
    0071 0C 01 0144 014B         164         MVC   STAMCB+20(2),T3MIN        SET DELAY TIME TO 3 MINUTES
    0077 7C C0 0A                165         MVI   10(,XR1),QUEID6           MOVE QUEUE ID TO PIA C.B.

                            007A 167 CONT1   EQU   *
    007A C0 87 0004              168         B     YYRDVF                    READ IOB

                                 170 *  XR2 NOW POINTING AT VFIO C.B.

    007E 28 00 0147 00           172         MZZ   IOSAV,0(,XR2)             SAVE IOB ID
    0083 30 40 0147              173         CLI   IOSAV,X'40'               IS IT VALID VFIO
    0087 C0 81 0099              174         BE    CONT2
    008B 8A 08 00                175         SBN   0(,XR2),UC                SET UC
    008E 8C 63 05                176         MVI   5(,XR2),X'63'             SET INVALID IOB ERROR CODE
    0091 C0 87 0003              177         B     YYWRVF                    WRITE BACK IOB
    0095 C0 87 0108              178         B     SKIP2

                                 180 *  PASS THE REQUEST ON TO THE REMOTE MEDIA PROCESSOR
```

```
MSDCC - SECONDARY OPERATIONAL MODE
ERR LOC  OBJECT CODE      ADDR STMT SOURCE STATEMENT
    0099 C2 01 0130       0099 182 CONT2  EQU   *
    009D 4C 01 10 015C         183        LA    SIAMCB,XR1
    00A2 6C 00 0C 09           184        MVC   16(2,XR1),IRBA          SET IOB RECEIVE BUFFER ADDRESS
    00A6 6C 01 0E 16           185        MVC   12(1,XR1),9(,XR2)       SET NUMBER OF BLOCKS
    00AA 7C 1A 0B              186        MVC   14(2,XR1),22(,XR2)      SET BLOCK SIZE
    00AD 74 02 0A              187        MVI   11(,XR1),VFLL           SET IOB LENGTH
    00B0 6C 01 06 04           188        ST    10(,XR1),XR2            SET IOB ADDRESS
                               189        MVC   6(2,XR1),4(,XR2)        SET DATA ADDRESS
                          00B4 190 SIA    EQU   *
    00B4 C0 87 0002            191        B     YYSIAM
                          00B8 193 WAITI  EQU   *
    00B8 C0 87 0006            194        B     YYSPMS
    00BC 0117             00BD 195        DC    AL2(EXIT)              CHECK FOR MODE CHANGE
    00BE 00C3             00BF 196        DC    AL2(ACOD)              SELECTED DIFFERENT MODE
    00C0 F2 87 04              197        J     CONTJ                  SELECTED SAME MODE
                          00C3 198 ACOD   EQU   *
    00C3 C0 87 0001            199        B     YYACOD
                          00C7 200 CONTJ  EQU   *
    00C7 78 02 02              201        TBN   2(,XR1),OE             WAIT FOR OE
    00CA C0 90 00B8            202        BF    WAITI

                               205 *  CHECK FOR ERRORS

    00CE 78 01 02              207        TBN   2(,XR1),UE             UE SET
    00D1 F2 10 37              208        JT    SKIP2                  DO NOT READ BACK IOB IF SET
    00D4 78 08 02              209        TBN   2(,XR1),UC             UC SET
    00D7 F2 90 20              210        JF    CONT4                  CONTINUE IF NOT SET
    00DA 7D 72 07              211        CLI   7(,XR1),X'72'          MEDIA UNAVAILABLE
    00DD C0 81 0084            212        BE    SIA
    00E1 7D 79 07              213        CLI   7(,XR1),X'79'          IS YYSIAM BEING CALLED WITHOUT BEING ENABLED
    00E4 F2 01 11              214        JNE   CONT3
    00E7 C2 02 014C            215        LA    SATEID,XR2
    00E8 74 01 06              216        ST    6(,XR1),XR1            LOAD SIAM C.B. WITH ADDRESS OF SAT. ID TABLE
    00EE 7C 80 04              217        MVI   4(,XR1),X'80'          ENABLE SIAM
    00F1 C0 87 0002            218        B     YYSIAM
    00F5 78 80 04              219        SBF   4(,XR1),X'80'          TURN OFF ENABLE SIAM BIT
    00F8 D2 01 06              220 CONT3  LA    6(,XR1),XR1            POINT XR1 AT LENGTH BYTE
    00FB 7C 01 00              221        MVI   0(,XR1),X'01'          MOVE LENGTH BYTE INTO POSITION
                               222 *      SVC
    00FE F5               00FE 223+       DC    XL1'F5'
    00FF 17               00FF 224        DC    AL1(XXELGM)            LOG THE ERROR
    0100 C2 01 0130            225        LA    SIAMCB,XR1
    0104 F2 87 04              226        J     SKIP2
                          0107 228 CONT4  EQU   *
    0107 C0 87 0003            229        B     YYWRVF                 WRITE BACK IOB

                               231 *  CHECK FOR MODE CHANGES

                          010B 233 SKIP2  EQU   *
    010B C0 87 0006            234        B     YYSPMS                 CHECK FOR MODE CHANGE
    010F 0117             0110 235        DC    AL2(EXIT)              SELECTED DIFFERENT MODE
    0111 002A             0112 236        DC    AL2(SAME)              SELECTED SAME MODE
    0113 C0 87 002E            237        B     BEGIN

                               239 *  PAGE IN EITHER MEDIA OPERATIONS MODE OR START PAGE

                          0117 241 EXIT   EQU   *
    0117 35 02 015A            242        L     CMNSAV,XR2
    011B 8D F4 0C              243        CLI   CCMODE(,XR2),X'F4'     SIGN OFF SELECTED
    011E F2 81 0D              244        JE    SIGNOF
    0121 C2 01 0154            245        LA    MSTNAM,XR1             XR1  ADDRESS OF PAGE NAME
                               246 *      SVC
    0125 F5               0125 247+       DC    XL1'F5'
    0126 21               0126 248        DC    AL1(XXIEL)
    0127 0129             0128 249        DC    AL2(NPARTN)
                          0129 250 NPARTN EQU   *
                               251 *      SVC
    0129 F5               0129 252+       DC    XL1'F5'
    012A 06               012A 253        DC    AL1(XXPAGM)            PAGE IN PRIMARY OPERATIONAL MODE
                          012B 254 ERROR  EQU   *
                               255 *      SVC
    012B F5               012B 256+       DC    XL1'F5'
    012C 22               012C 257        DC    AL1(XXNVLM)
    012D 00               012D 258        DC    XL1'00'
                          012F 260 SIGNOF EQU   *
                               261 *      SVC
    012E F5               012E 262+       DC    XL1'F5'
    012F 05               012F 263        DC    AL1(XXIPLM)            GO TO MEDIA START

                               265 *  SIAM CONTROL BLOCK

                          0130 267 SIAMCB EQU   *
                               268 *      DTFSI
                               269+*      SATELLITE IMA INTERFACE CONTROL BLOCK
    0130 0000             0131 270+       DC    AL2(0)                 WORK BYTES
    0132 00               0132 271+       DC    XL1'00'                DEV ID UC,,OE
    0133 00               0133 272+       DC    AL1(0)                  ,QUEUE 4,QUEUE 2,QUEUE 1
    0134 00               0134 273+       DC    AL1(0)
    0135 0000             0136 274+       DC    AL2(0)                 DATA ADDRESS
    0137 00               0137 275+       DC    XL1'00'                ERROR CODE
    0138 00               0138 276+       DC    XL1'00'
    0139 0000             013A 277+       DC    AL2(0)                 IOB ADDRESS
    013B 00               013B 278+       DC    AL1(0)                 IOB LENGTH
    013C 00               013C 279+       DC    AL1(0)                 NUMBER OF TRANSMISSION BLOCKS
    013D 0000             013E 280+       DC    AL2(0)                 TRANSMISSION BLOCK SIZE
    013F 0000             0140 281+       DC    AL2(0)                 ADDRESS OF IOB RECEIVE BUFFER
    0141 000000000000     0146 282+       DC    XL6'00'                WORK AREA
    0147 00               0147 284 IDSAV  DC    XL1'00'                IOB ID SAVE
    0148 0CE4             0149 285 T1MIN  DC    XL2'0CE4'              1 MINUTE DELAY BYTES
    014A 2CA6             014B 286 T3MIN  DC    XL2'2CA6'              3 MINUTE DELAY BYTES
                          014C 287 SATEID EQU   *
    014C 7979797979797979 0153 288        DC    8XL1'79'               SATELLITE ID
                          0154 289 MSTNAM EQU   *
    0154 7CD4D60440       0158 290        DC    CL5' MOM '
    0159                  015A 291 CMNSAV DS    XL2
    015B 015D             015C 292 IRBA   DC    AL2(IOBREC)            IOB RECEIVE BUFFER ADDRESS
                          015D 293 IOBREC EQU   *                      IOB RECEIVE BUFFER
    015D 0000000000000000 0176 294        DC    XL26'00'
                               296 *      MRCEQ
                               297+*******************************************************
                               298+*                                                     *
                               299+*      REQUEST CODE EQUATES FOR SUBROUTINES MEDIA     *
                               300+*                                                     *
                               301+*******************************************************
                               303+*      MEDIA REQUEST CODE EQUATES
                          0080 305+CHAIN  EQU   X'80'                  INDICATOR BIT FOR CHAINING
                          0000 306+XXPIO  EQU   X'00'
                          0001 307+XXVKIO EQU   X'01'
                          0002 308+XXVPIO EQU   X'02'
                          0004 309+XXCDLK EQU   X'04'
                          0005 310+XXIPLM EQU   X'05'
                          0006 311+XXPAGM EQU   X'06'
                          0007 312+XXKBSM EQU   X'07'
                          0008 313+XXMERM EQU   X'08'
                          0009 314+XXGDCM EQU   X'09'
```

```
        MSDCC - SECONDARY OPERATIONAL MODE
ERR LOC  OBJECT CODE       ADDR STMT SOURCE STATEMENT
                           000A  315+XXCNCM EQU   X'0A'
                           000C  316+XXKBRM EQU   X'0C'
                           000D  317+XXSAVE EQU   X'0D'
                           000E  318+XXKMMX EQU   X'0E'
                           000F  319+XXGMMX EQU   X'0F'
                           0010  320+XXCDTA EQU   X'10'
                           0011  321+XXCDIL EQU   X'11'
                           0012  322+XXCDTX EQU   X'12'
                           0013  323+XXPRT3 EQU   X'13'
                           0014  324+XXPRT2 EQU   X'14'
                           0015  325+XXMOVE EQU   X'15'
                           0016  326+XXPERM EQU   X'16'
                           0017  327+XXELGM EQU   X'17'
                           0018  328+XXRCVM EQU   X'18'
                           0019  329+XXVER1 EQU   X'19'
                           001A  330+XXVER2 EQU   X'1A'
                           001B  331+XXVER3 EQU   X'1B'
                           001C  332+XXVER4 EQU   X'1C'
                           001D  333+XXFNK1 EQU   X'1D'
                           001E  334+XXFNK2 EQU   X'1E'
                           0020  335+XXMSGM EQU   X'20'
                           0021  336+XXIEL  EQU   X'21'
                           0022  337+XXNVLM EQU   X'22'
                           0024  338+XXDISM EQU   X'24'
                           0025  339+XXPRSM EQU   X'25'
                           0026  340+XXDRWM EQU   X'26'
                           0027  341+XXLOGM EQU   X'27'
                           002D  342+XXDLSM EQU   X'2D'
                           0036  343+XXDKSM EQU   X'36'
                           003A  344+XXBE   EQU   X'3A'
                           003B  345+XXBNE  EQU   X'3B'
                           003C  346+XXBLT  EQU   X'3C'
                           003D  347+XXBLE  EQU   X'3D'
                           003E  348+XXBGT  EQU   X'3E'
                           003F  349+XXBGE  EQU   X'3F'
                           0040  350+XXSRCH EQU   X'40'
                           0041  351+XXVRI1 EQU   X'41'
                           0042  352+XXVRI2 EQU   X'42'
                           0043  353+XXVRI3 EQU   X'43'
                           0044  354+XXVRI4 EQU   X'44'
                           0045  355+XXVRS1 EQU   X'45'
                           0046  356+XXVRS2 EQU   X'46'
                           0047  357+XXVRS3 EQU   X'47'
                           0048  358+XXVRS4 EQU   X'48'
                           004A  359+XXSER2 EQU   X'4A'
                           004B  360+XXBVA  EQU   X'4B'
                           004C  361+XXMBLA EQU   X'4C'
                           004D  362+XXPIA  EQU   X'4D'
                           004E  363+XXTIME EQU   X'4E'
                                 364 *        MCMEQ
                                 365+*
                                 366+*****************************************************************
                                 367+*                                                               *
                                 368+*       COMMON AREA EQUATES-SEE MCOM1 FOR DESCRIPTION OF FIELDS *
                                 369+*                                                               *
                                 370+*****************************************************************
                                 371+*
                           0000  372+CCPLEN EQU   X'00'                    RECORDS IN PAGE BUFFER
                           0001  373+CCLINE EQU   CCPLEN+1               LINE POSISTION OF INSERTED DOC.
                           0003  374+CCIEL  EQU   CCLINE+2               INPUT ERROR LINKAGE ADDR.
                           0004  375+CCSTA1 EQU   CCIEL+1                STATUS BYTE  1
                           0005  376+CCSTA2 EQU   CCSTA1+1               STATUS BYTE 2
                           0006  377+CCFLG1 EQU   CCSTA2+1               SUBROUTINE FLAGS
                           0007  378+CCFLAG EQU   CCFLG1+1               MEDIA FLAGS
                           0009  379+CCDERP EQU   CCFLAG+2               DISK ERROR RECOVERY ADDRESS
                           000B  380+CCLNK  EQU   CCDERP+2               MEDIA LINKAGE ADDR. SAVE AREA
                           000C  381+CCMODE EQU   CCLNK +1               MEDIA CURRENT MODE
                           000E  382+CCKPT  EQU   CCMODE+2               ADDR. OF KEY TRANSLATION TABLE
                           0010  383+CCNVTL EQU   CCKPT+2                ADDR. OF THE NON-VOLATILE TOTALS
                           0012  384+CCMCM2 EQU   CCNVTL+2               ADDR. OF SECOND COMMON AREA INCO
                           0013  385+CCQ3   EQU   CCMCM2+1               LOGGING REQUEST STATUS
                           0014  386+CCQ6   EQU   CCQ3+1                 PAGING REQUEST STATUS
                           0015  387+CCIAL1 EQU   CCQ6+1                 PHYS. ADDR. LINE 1
                           0016  388+CCIAL2 EQU   CCIAL1+1               PHYS.ADDR.LINE 2
                           0018  389+CCPADR EQU   CCIAL2+2               PULL ADDRESS
                           001B  390+CCRSEC EQU   CCPADR+3                 REMAINING SECTORS TO
                           001E  391+CCPEW  EQU   CCRSEC+3               PERSONALIZED EARLY WARNING SECTO
                                 392+*                                   THRESHOLD
                           001F  393+CCDECP EQU   CCPEW+1                PERSONALIZED DECIMAL POINT POSIS
                           002B  394+CCSUED EQU   CCDECP+12              PERSONALIZED SUPPRESS EDIT FIELD
                           002C  395+CCVFIO EQU   CCSUED+1               C.B. SAVE AREA
                           0049  396+CCDATE EQU   CCVFIO+29              DATE SAVE AREA
                           0050  397+CCEDAT EQU   CCDATE+7               EDITED DATE FIELD
                           0058  398+CCCLIO EQU   CCEDAT+8               STORE REGISTER SAVE AREA
                           005F  399+CCACTN EQU   CCCLIO+7               ACTION CODE SAVE AREA
                           0063  400+CCIOWK EQU   CCACTN+4               ADDR. OF I/O WORK AREA
                           0064  401+CCPCB1 EQU   CCIOWK+1               VITUAL PRINTER C.B.
                           006E  402+CCPCB2 EQU   CCPCB1+10              VITUAL PRINTER C.B.
                           0078  403+CCMOCB EQU   CCPCB2+10              MEDIA TRANSACTION LOGGING USE
                                 404+*                                   ONLY OID CONTROL BLOCK
                           0092  405+CCMPCB EQU   CCMOCB+26              PAGEING CONTROL BLOCK
                           00AC  406+CCPMCB EQU   CCMPCB+26              INTER-MACHINE ADAPTER C.B.
                                 407+*                                   FOR USE WITH XXPIA
                           00BB  408+CCVKCB EQU   CCPMCB+15              VIRTUAL KEYBOARD/DISPLAY C.B.
                           00CC  409+CCKYBL EQU   CCVKCB+17              KEYBOARD BUFFER LL
                           00CD  410+CCKYBF EQU   CCKYBL+1               LEFT MOST BYTE OF KEY/BD BUFFER
                           00ED  411+CCLBUF EQU   CCKYBF+32              LOG ITEM BUFFER
                                 412+* THE FOLLOWING ARE DISPLACED 256 FROM THE COMMON AREA
                           000B  413+CCPBUF EQU   X'0B'                  PRINT BUFFER FOR I/O
                           004A  414+CCPBF1 EQU   CCPBUF+63              PRINT BUFFER 1
                           0089  415+CCPBF2 EQU   CCPBF1+63              PRINT BUFFER 2
                           00C8  416+CCLRI  EQU   CCPBF2+63              LEFT BYTE OF LOG REC. BUFFER
                                 417+* THE FOLLOWING ARE DISPLACED 512 FROM THE COMMON AREA
                           00C7  418+CCLR1R EQU   X'C7'                  RIGHTMOST BYTE OF ABOVE
                           00C8  419+CCLR2  EQU   CCLR1R+1               LEFT MOST BYTE OF LOG REC. BUFFE
                                 420+* THE FOLLOWING ARE DISPLACED 768 FROM THE COMMON AREA
                           00C7  421+CCLR2R EQU   X'C7'                  RIGHTMOST BYTE OF ABOVE
                           00C8  422+CCERCB EQU   CCLR2R+1               XXRCVM'S ERROR CONTROL BLOCK
                                 423+*
                           00D9  424+CCRMTB EQU   CCERCB+17              RAM ROOT TABLE ADDRESS
                           00DB  425+CCPBA  EQU   CCRMTB+2               ADDRESS OF THE PAGE ADDRES WITH
                                 426+*                                   PATCHES IF ANY
                                 427+*
                                 428 *        MCOMN
                                 429+*-----------------------------------------------------------------
                                 430+*        MEDIA COMMON EQUATES                                     *
                                 431+*-----------------------------------------------------------------
                           0001  433+XR1    EQU   X'01'
                           0002  434+XR2    EQU   X'02'
                           0008  435+ARR    EQU   X'08'
                           0008  437+UC     EQU   X'08'                  UNIT CHECK
                           0004  438+SE     EQU   X'04'                  SATELLITE EXCEPTION
                           0002  439+DE     EQU   X'02'                  DEVICE END
                           0001  440+UE     EQU   X'01'                  UNIT EXCEPTION
                           0002  442+ESP    EQU   X'02'                  EXCEPTION STATUS IN PROCESS
                           001A  443+VFLL   EQU   X'1A'                  VIRTUAL FILE LENGTH
                           0001  444+NORESP EQU   X'01'                  NO RESPONSE EXCEPTION STATUS BIT
                           000C  445+QEMPTY EQU   X'0C'                  QUEUE EMPTY STATUS
                           000A  446+OVRUN  EQU   X'0A'                  STORAGE OVERRUN STATUS
                           000E  447+PUTEXC EQU   X'0E'                  PUT EXCEPTION STATUS
                           0010  448+QUEUE3 EQU   X'10'                  QUEUE 3 STATUS
                           0002  449+QUEUE6 EQU   X'02'                  QUEUE 6 STATUS
                           0004  450+DATADD EQU   X'04'                  DATA ADDRESS PTA CB
                           0080  452+ACTIVE EQU   X'80'
                           0008  453+LINE1  EQU   X'08'
                           0010  454+LINE2  EQU   X'10'
                           0078  455+SATID  EQU   X'78'                  SATELLITE GPOST ID
                           0079  456+MEDID  EQU   X'79'                  MEDIA GPOST ID
                           00F1  457+PRIMOD EQU   X'F1'                  PRIMARY MODE
                           00F2  458+SECMOD EQU   X'F2'                  SECONDARY MODE
                           00F3  459+STAMOD EQU   X'F3'                  STANALONE MODE
```

```
        NSOCC - SECONDARY OPERATIONAL MODE
ERR LOC  OBJECT CODE        ADDR STMT SOURCE STATEMENT

                                 461+* COMMAND BYTED ASSIGNMENT
                            0001 462+SETMOD EQU   X'01'                      SET MODE
                            0002 463+SETADR EQU   X'02'                      SET ADDRESS
                            0003 464+RESET  EQU   X'03'                      RESET
                            0004 465+RDID   EQU   X'04'                      READ ID
                            0005 466+RDIOB  EQU   X'05'                      READ IOB
                            0006 467+RDDATA EQU   X'06'                      READ DATA
                            0007 468+WRIOB  EQU   X'07'                      WRITE IOB
                            0008 469+WRDATA EQU   X'08'                      WRITE DATA
                            0009 470+POL    EQU   X'09'                      POLL
                            000A 471+POLRST EQU   X'0A'                      POLL RESET
                            000B 472+POLACK EQU   X'0B'                      POLL ACK
                            000C 473+CLEAR  EQU   X'0C'                      CLEAR
                            000D 474+LINACT EQU   X'0D'                      LINE ACTIVATE
                            000E 475+RSTIMA EQU   X'0E'                      RESET IMA
                            000F 476+MONLIN EQU   X'0F'                      MONITOR LINE
                            0010 477+EMOD1  EQU   X'10'                      ENABLE MODE 1
                            0011 478+EMOD2  EQU   X'11'                      ENABLE MODE 2
                            0012 479+EMOD3  EQU   X'12'                      ENABLE MODE 3
                            0060 480+QUEI03 EQU   X'60'                      QUEUE 3 REQUESTS WILL BE ACCEPTE
                            00C0 481+QUEI06 EQU   X'C0'                      QUEUE 6 REQUESTS WILL BE ACCEPTE
                            0177 482 DISKI  EQU   *
                                 483 *      DTFMD ADDR-CFLAG,WORK-CFLAG,NUMR-01,DSN- MCT
                                 484+*      MEDIA FEATURE DISKETTE CONTROL BLOCK
 0177 90                    0177 485+       DC    XL1'90'                    DEV ID 0C,,0E
 0178 00                    0178 486+       DC    AL1(0)                     R7S,IDR,W128 R128,W256,R256,SYNC
 0179 00                    0179 487+       DC    AL1(0)                      LOG ALL,INHIBIT CS
 017A 0191                  017B 488+       DC    AL2(CFLAG)                 DATA ADDRESS
 017C 00                    017C 489+       DC    XL1'00'                    ERROR CODE
 017D 00                    017D 490+       DC    XL1'00'                    ,NED IID,, ,POR LATCH,DISK IN
 017E 0191                  017F 491+       DC    AL2(CFLAG)                 WORK AREA ADDRESS
 0180 0000                  0181 492+       DC    AL2(0)                     LOGICAL  RECORD OFFSET
 0182 01                    0182 493+       DC    AL1(01)                    NUMBER OF LOGICAL RECORDS
 0183 7CD4C3E340            0187 494+       DC    CL5' MCT'                  DATA SET NAME OR BOE CCHHRR
 0188 000000                018A 495+       DC    XL3'0'                     EOD CCHHRR
 0188 000000                018D 496+       DC    XL3'0'                     EOF CCHHRR
 018E 000000                0190 497+       DC    XL3'000000'                DISK ERROR LOCATION

                                 499 *      DSKEQ
                                 500+***************************************************************
                                 501+*                                                              *
                                 502+*      DISK SUBROUTINE EQUATES                                 *
                                 503+*                                                              *
                                 504+***************************************************************
                                 505+*
                                 506+***    COMMAND BYTES

                            8000 508+RESPU  EQU   X'8000'                    RESET P.O. LATCH
                            4000 509+INDRES EQU   X'4000'                    INHIBIT DISK RESET
                            0400 510+WRT    EQU   X'0400'                    WRITE
                            0200 511+RD     EQU   X'0200'                    READ
                            0100 512+SYNC   EQU   X'0100'                    SYNC
                            0080 513+LOGALL EQU   X'0080'                    LOG ALL
                            0040 514+INCS   EQU   X'0040'                    INHIBIT CS

                                 516+***    OPTIONS BYTE
                            0001 517+WAIT   EQU   X'01'                      WAIT FOR DEVICE END

                                 519 *      CNFIG
                                 520+***************************************************************
                                 521+*                SECTOR  1                                     *
                                 522+***************************************************************
 0191 80                    0191 523+CFLAG  DC    XL1'80'                    CONFIGURATION TYPE FLAG
                                 524+*            BIT 0 OFF= STANDALONE
                                 525+*            BIT 0  ON= CLUSTER
 0192 00                    0192 526+       DC    XL1'00'                    LEVEL CODE
 0193 F2F7F7F5F2F2F3        0199 527+       DC    CL7'2775223'               PART NUMBER      20  DOMESTIC CLUS
 019A F0F8F2F5F7F840        01A0 528+       DC    CL7'082578 '               EC LEVEL CODE
 01A1 01                    01A1 529+AB8605 DC    XL1'01'                    MEMORY SIZE FLAG BYTE
                                 530+*            BITS(6 7) = RAM SIZE    '00'B = 16K,   '01'B = 24K,   *
                                 531+*                                    '10'B = 32K,  '11'B = NOT USED.  *
                                 532+***************************************************************
                                 533+*      COMMON CONFIGURATION TO CLUSTER                         *
                                 534+***************************************************************

                            01A2 536+       ENTRY ABCOMN
                            01A2 537+ABCOMN EQU   *
                            01A2 538+AB201  EQU   *
 01A2 F0F2F0                01A4 539+       DC    CL3'020'                   NUMBER SECTORS FOR EARLY
                                 540+*                                         WARNING

 01A5 80                    01A5 542+AB250  DC    XL1'80'                    MEDIA OPERATIONAL MODE SELECT
                                 543+*            BIT 0 ON = PROMPT FOR MEDIA OPERATIONAL MODE AT SIGN ON
                                 544+*            BIT 1 ON = NO PROMPT AND DEFAULT TO PRIMARY
                                 545+*            BIT 2 ON = NO PROMPT AND DEFAULT TO SECONDARY
                                 546+*            BIT 3 ON = NO PROMPT AND DEFAULT TO STANDALONE

                            01A6 548+AB202  EQU   *
 01A6 00                    01A6 549+       DC    XL1'00'                    DISKETTE LOGGING FORMAT
                                 550+*            BIT 0 ON = LOGGING EXTENDED FORMAT
                                 551+*            BIT 0 OFF = LOGGING BASIC FORMAT
                                 552+*            BIT 1 ON = PRICE LOOKUP EXTENDED FORMAT
                                 553+*            BIT 1 OFF = PRICE LOOKUP BASIC FORMAT
                                 554+*            BIT 2 ON = NEGATIVE CREDIT FILE EXTENDED FORMAT
                                 555+*            BIT 2 OFF = NEGATIVE CREDIT FILE BASIC FORMAT

                            01A7 557+AB203  EQU   *
 01A7 80                    01A7 558+       DC    XL1'80'                    TERMINAL PORT ASSIGNMENTS
                                 559+*            BIT 0 ON = THERE ARE TERMINALS ON PORT 1
                                 560+*            BIT 1 ON = THERE ARE TERMINALS ON PORT 2

                            01A8 562+AB204  EQU   *
 01A8 FF                    01A8 563+       DC    XL1'FF'                    FUNCTION SELECTION (BYTE 1)
                                 564+*            BIT 0 ON = OPTIONS PERSONALIZATION FUNCTION IS DESIRED
                                 565+*            BIT 1 ON = TABLES PERSONALIZATION FUNCTION IS DESIRED
                                 566+*            BIT 2 ON = TRANSACTION RE-ENTRY FUNCTION IS DESIRED
                                 567+*            BIT 3 ON = TOTALS READOUT FUNCTION IS DESIRED
                                 568+*            BIT 4 ON = LOAN/WITHDRAWAL FUNCTION IS DESIRED
                                 569+*            BIT 5 ON = NOT USED
                                 570+*            BIT 6 ON = OTHER DATA ENTRY FUNCTION IS DESIRED

                            01A9 572+AB205  EQU   *
 01A9 FF                    01A9 573+       DC    XL1'FF'                    FUNCTION SELECTION (BYTE 2)
                                 574+*            BIT 0 ON = VOID PRIOR TRANSACTION FUNCTION IS DESIRED
                                 575+*            BIT 1 ON = AUXILLARY TOTALS FUNCTION IS DESIRED
                                 576+*            BIT 2 ON = CASH COUNT FUNCTION IS DESIRED
                                 577+*            BIT 3 ON = LOG PRINT FUNCTION IS DESIRED
                                 578+*            BIT 4 ON = TRANSMIT MULTIPLE OR SINGLE DISKETTE FUNCTION
                                 579+*                       IS DESIRED
                                 580+*            BIT 5 ON = COPY PERSONALIZATION FUNCTION IS DESIRED
                                 581+*            BIT 6 ON = MODIFY CONFIGURATION FUNCTION IS DESIRED
                                 582+*            BIT 7 ON = CONFIGURATION FUNCTION IS DESIRED

                            01AA 584+AB206  EQU   *
 01AA FF                    01AA 585+       DC    XL1'FF'                    FUNCTION SELECTION (BYTE 3)
                                 586+*            BIT 0 ON = FILE DATA ENTRY IS DESIRED
                                 587+*            BIT 1 ON = SECURITY REQUIREMENTS PERS. IS DESIRED
                                 588+*            BIT 2 ON = STORE LEVEL SALES OPTIONS PERSONALIZATION IS
                                 589+*                          DESIRED
                                 590+*            BIT 3 ON = ENTERPRIZE LEVEL SALES OPTIONS PERSONALIZATION
                                 591+*                          IS DESIRED
                                 592+*            BIT 4 ON = NON-SALES OPTIONS PERSONALIZATION IS DESIRED
                                 593+*            BIT 5 ON = AUXILLIARY TOTALS TABLES PERSONALIZATION IS
                                 594+*                          DESIRED
                                 595+*            BIT 6 ON = SECURITY CODE PERSONALIZATION IS DESIRED
                                 596+*            BIT 7 ON = DATA ENTRY FORMAT TABLES PERSONALIZATION IS
                                 597+*                          DESIRED

                            01AB 599+AB207  EQU   *
 01AB 01                    01AB 600+       DC    IL1'1'                     NUMBER OF TRACKS TO RESERVE
                                 601+*                                        FOR PRICE LOOKUP FILE
                            01AC 602+AB208  EQU   *
```

```
        MSOCC - SECONDARY OPERATIONAL MODE
ERR LOC  OBJECT CODE      ADDR STMT SOURCE STATEMENT
    01AC 01               01AC  603+        DC    IL1'1'          NUMBER OF TRACKS TO RESERVE
                                604+*                               FOR NEGATIVE CREDIT FILE

                          01AD  606+AB210   EQU   *
    01AD 00               01AD  607+        DC    XL1'00'         MEDIA FEATURE SIGN-ON LEVEL
                          01AE  608+AB211   EQU   *
    01AE 00               01AE  609+        DC    XL1'00'         TRANSACTION LOG ERASE LEVEL
                          01AF  610+AB212   EQU   *
    01AF 00               01AF  611+        DC    XL1'00'         MEDIA FEATURE DIAGNOSTICS LEVEL
                          01B0  612+AB213   EQU   *
    01B0 00               01B0  613+        DC    XL1'00'         OPERATION MODE LEVEL
                          01B1  614+AB214   EQU   *
    01B1 00               01B1  615+        DC    XL1'00'         ENTERPRIZE SALES OPTIONS
                                616+*                               PERSONALIZATION LEVEL
                          01B2  617+AB215   EQU   *
    01B2 00               01B2  618+        DC    XL1'00'         STORE SALES OPTIONS
                                619+*                               PERSONALIZATION LEVEL
                          01B3  620+AB216   EQU   *
    01B3 00               01B3  621+        DC    XL1'00'         NON-SALES OPTIONS
                                622+*                               PERSONALIZATION LEVEL
                          01B4  623+AB217   EQU   *
    01B4 00               01B4  624+        DC    XL1'00'         MODIFY CONFIGURATION LEVEL
                          01B5  625+AB218   EQU   *
    01B5 00               01B5  626+        DC    XL1'00'         SALES TABLES PERSONALIZATION
                                627+*                               LEVEL
                          01B6  628+AB219   EQU   *
    01B6 00               01B6  629+        DC    XL1'00'         AUXILLARY TOTALS TABLES
                                630+*                               PERSONALIZATION LEVEL
                          01B7  631+AB220   EQU   *
    01B7 00               01B7  632+        DC    XL1'00'         SECURITY REQUIREMENTS
                                633+*                               PERSONALIZATION LEVEL
                          01B8  634+AB221   EQU   *
    01B8 00               01B8  635+        DC    XL1'00'         DATA ENTRY FORMAT TABLES
                                636+*                               PERSONALIZATION LEVEL
                          01B9  637+AB222   EQU   *
    01B9 00               01B9  638+        DC    XL1'00'         REGISTER AUXILLARY TOTALS LEVEL
                          01BA  639+AB223   EQU   *
    01BA 00               01BA  640+        DC    XL1'00'         CLUSTER AUXILLARY TOTALS LEVEL
                          01BB  641+AB224   EQU   *
    01BB 00               01BB  642+        DC    XL1'00'         TRANSMIT SINGLE DISKETTE LEVEL
                          01BC  643+AB225   EQU   *
    01BC 00               01BC  644+        DC    XL1'00'         TRANSMIT MULTIPLE DISKETTE LEVEL
                          01BD  645+AB226   EQU   *
    01BD 00               01BD  646+        DC    XL1'00'         MULTIPLE DISKETTE TRANSACTION
                                647+*                               LOG PRINT LEVEL
                          01BE  648+AB227   EQU   *
    01BE 00               01BE  649+        DC    XL1'00'         COPY PERSONALIZATION LEVEL
                          01BF  650+AB228   EQU   *
    01BF 00               01BF  651+        DC    XL1'00'         MEDIA FEATURE SIGNOFF LEVEL
                          01C0  652+AB229   EQU   *
    01C0 00               01C0  653+        DC    XL1'00'         VOID FUNCTION LEVEL
                          01C1  654+AB230   EQU   *
    01C1 00               01C1  655+        DC    XL1'00'         FILE DATA ENTRY LEVEL
                          01C2  656+AB231   EQU   *
    01C2 00               01C2  657+        DC    XL1'00'         TRANSMIT SINGLE DISKETTE/RECEIVE
                                658+*                               LEVEL
                          01C3  659+AB232   EQU   *
    01C3 00               01C3  660+        DC    XL1'00'         TRANSMIT MULTIPLE DISKETTE/
                                661+*                               RECEIVE LEVEL
                          01C4  662+AB240   EQU   *
    01C4 00               01C4  663+        DC    XL1'00'         RECEIVE LEVEL
                          01C5  664+AB241   EQU   *
    01C5 00               01C5  665+        DC    XL1'00'         SECURITY CODE PERSONALIZATION
                          01C6  666+AB242   EQU   *
    01C6 00               01C6  667+        DC    XL1'00'         CONFIGURATION LEVEL

                          01C7  669+AB233   EQU   *
    01C7 00               01C7  670+        DC    XL1'00'         SECURITY REQUIREMENTS FLAG BYTE
                                671+*             BIT 0 ON = CODE OR KEY REQUIRED FOR SECURITY REQUIREMENTS
                                672+*             BIT 0 OFF = KEY REQUIRED FOR SECURITY REQUIREMENTS
                                673+*             BIT 1 ON = CODE OR KEY REQUIRED FOR LEVEL 1
                                674+*             BIT 1 OFF = KEY REQUIRED FOR LEVEL 1
                                675+*             BIT 2 ON = CODE OR KEY REQUIRED FOR LEVEL 2
                                676+*             BIT 2 OFF = KEY REQUIRED FOR LEVEL 2
                                677+*             BIT 3 ON = CODE OR KEY REQUIRED FOR LEVEL 3
                                678+*             BIT 3 OFF = KEY REQUIRED FOR LEVEL 3
                                679+*             BIT 4 ON = CODE OR KEY REQUIRED FOR LEVEL 4
                                680+*             BIT 4 OFF = KEY REQUIRED FOR LEVEL 4
                                681+*             BIT 5 ON = CODE OR KEY REQUIRED FOR LEVEL 5
                                682+*             BIT 5 OFF = KEY REQUIRED FOR LEVEL 5

                          01C8  684+AB234   EQU   *
    01C8 01               01C8  685+        DC    IL1'1'
    01C9 F0               01C9  686+        DC    CL1'0'                  SECURITY CODE FOR LEVEL 1
    01CA                  01CE  687+        DS    CL5
                          01CF  688+AB235   EQU   *
    01CF 01               01CF  689+        DC    IL1'1'
    01D0 F0               01D0  690+        DC    CL1'0'                  SECURITY CODE FOR LEVEL 2
    01D1                  01D5  691+        DS    CL5
                          01D6  692+AB236   EQU   *
    01D6 01               01D6  693+        DC    IL1'1'
    01D7 F0               01D7  694+        DC    CL1'0'                  SECURITY CODE FOR LEVEL 3
    01D8                  01DC  695+        DS    CL5
                          01DD  696+AB237   EQU   *
    01DD 01               01DD  697+        DC    IL1'1'
    01DE F0               01DE  698+        DC    CL1'0'                  SECURITY CODE FOR LEVEL 4
    01DF                  01E3  699+        DS    CL5
                          01E4  700+AB238   EQU   *
    01E4 01               01E4  701+        DC    IL1'1'
    01E5 F0               01E5  702+        DC    CL1'0'                  SECURITY CODE FOR LEVEL 5
    01E6                  01EA  703+        DS    CL5
                          01EB  704+AB239   EQU   *
    01EB 01               01EB  705+        DC    IL1'1'
    01EC F0               01EC  706+        DC    CL1'0'                  SECURITY CODE FOR SECURITY
                                707+*                                     REQUIREMENTS
    01ED                  01F1  708+        DS    CL5
    01F2                  0210  709+        DS    31XL1                   SECTOR ALIGNMENT
                                710+*********************************************************************
                                711+*             SECTOR  2                                              *
                                712+*********************************************************************
                                713+*********************************************************************
                                714+*                          CONFIGURATION TABLES                      *
                                715+*********************************************************************

                                719+*********************************************************************
                                720+*        STORE/REGISTER CONFIGURATION                                *
                                721+*********************************************************************
                                722+*                                                                    *
                                723+*        THE FOLLOWING IS THE FORMAT OF THE STORE/REGISTER TABLE     *
                                724+*        WHERE XXXXXX IS STORE/REGISTER NUMBER AND YY IS THE LAST    *
                                725+*        TWO DIGITS OF THE PTAB DATA SET NAME                        *
                                726+*                                                                    *
                                727+*            INDEX     FIELD1    FIELD2    FIELD3                    *
                                728+*                                                                    *
                                729+*            XXXXXX     SSYY      SNYY     FLAG BYTE                 *
                                730+*                                                                    *
                                731+*                                                                    *
                                732+*         FLAG BYTE ASSIGNED AS FOLLOWS                              *
                                733+*             BIT(0) ON = STORE/REGISTER   ALLOCATED TO A TERMINAL.  *
                                734+*             BIT(1) ON = CONFIG. USE ONLY (STORE/REG., PTABS LOADED). *
                                735+*             BITS(6 7) = RAM SIZE    '00'B = 16K,   '01'B = 24K,    *
                                736+*                                     '10'B = 32K, '11'B = NOT USED.  *
                                737+*                                                                    *
                                738+*********************************************************************
                          0211  739+        ENTRY ABSTRG
                          0211  740+ABSTRG EQU   *
```

```
      MSOCC - SECONDARY OPERATIONAL MODE
ERR LOC  OBJECT CODE      ADDR STMT SOURCE STATEMENT
    0211 05               0211  741+         DC    IL1'05'
    0212 08               0212  742+         DC    IL1'11'
                                743+*****************************************************************
                          0213  744+AB301    EQU   *
    0213 F0F0F0F0F0F1     0218  745+         DC    CL6'000001'           STORE/REGISTER NUMBER
                          0219  746+AB302    EQU   *
    0219 F0F1             021A  747+         DC    CL2'01'               SALES PERSONALIZATION FOR ST/RG
                          021B  748+AB303    EQU   *
    021B F0F1             021C  749+         DC    CL2'01'               NONSALES PTAB FOR ST/RG
                          021D  750+AB305    EQU   *
    021D 41               021D  751+AB306    DC    XL1'41'               FLAG BYTE
                                752+*-----------------------------------------------------------------*
                          021E  753+AB307    EQU   *
    021E F0F0F0F0F0F2     0223  754+         DC    CL6'000002'           STORE/REGISTER NUMBER
                          0224  755+AB308    EQU   *
    0224 F0F1             0225  756+         DC    CL2'01'               SALES PERSONALIZATION FOR ST/RG
                          0226  757+AB309    EQU   *
    0226 F0F1             0227  758+         DC    CL2'01'               NONSALES PTAB FOR ST/RG
                          0228  759+AB311    EQU   *
    0228 41               0228  760+AB312    DC    XL1'41'               FLAG BYTE
                                761+*-----------------------------------------------------------------*
                          0229  762+AB313    EQU   *
    0229 F0F0F0F0F0F3     022E  763+         DC    CL6'000003'           STORE/REGISTER NUMBER
                          022F  764+AB314    EQU   *
    022F F0F1             0230  765+         DC    CL2'01'               SALES PERSONALIZATION FOR ST/RG
                          0231  766+AB315    EQU   *
    0231 F0F1             0232  767+         DC    CL2'01'               NONSALES PTAB FOR ST/RG
                          0233  768+AB317    EQU   *
    0233 41               0233  769+AB318    DC    XL1'41'
                                770+*-----------------------------------------------------------------*
                          0234  771+AB319    EQU   *
    0234 F0F0F0F0F0F4     0239  772+         DC    CL6'000004'           STORE/REGISTER NUMBER
                          023A  773+AB320    EQU   *
    023A F0F1             023B  774+         DC    CL2'01'               SALES PERSONALIZATION FOR ST/RG
                          023C  775+AB321    EQU   *
    023C F0F1             023D  776+         DC    CL2'01'               NONSALES PTAB FOR ST/RG
                          023E  777+AB323    EQU   *
    023E 41               023E  778+AB324    DC    XL1'41'               FLAG BYTE
                                779+*-----------------------------------------------------------------*
                          023F  780+AB325    EQU   *
    023F F0F0F0F0F0F5     0244  781+         DC    CL6'000005'           STORE/REGISTER NUMBER
                          0245  782+AB326    EQU   *
    0245 F0F1             0246  783+         DC    CL2'01'               SALES PERSONALIZATION FOR ST/RG
                          0247  784+AB327    EQU   *
    0247 F0F1             0248  785+         DC    CL2'01'               NONSALES PTAB FOR ST/RG
                          0249  786+AB329    EQU   *
    0249 41               0249  787+AB330    DC    XL1'41'
                                788+*-----------------------------------------------------------------*
                          024A  789+AB331    EQU   *
    024A F0F0F0F0F0F6     024F  790+         DC    CL6'000006'           STORE/REGISTER NUMBER
                          0250  791+AB332    EQU   *
    0250 F0F1             0251  792+         DC    CL2'01'               SALES PERSONALIZATION FOR ST/RG
                          0252  793+AB333    EQU   *
    0252 F0F1             0253  794+         DC    CL2'01'               NONSALES PTAB FOR ST/RG
                          0254  795+AB335    EQU   *
    0254 41               0254  796+AB336    DC    XL1'41'               FLAG BYTE
                                797+*-----------------------------------------------------------------*
                          0255  798+AB337    EQU   *
    0255 F0F0F0F0F0F7     025A  799+         DC    CL6'000007'           STORE/REGISTER NUMBER
                          025B  800+AB338    EQU   *
    025B F0F1             025C  801+         DC    CL2'01'               SALES PERSONALIZATION FOR ST/RG
                          025D  802+AB339    EQU   *
    025D F0F1             025E  803+         DC    CL2'01'               NONSALES PTAB FOR ST/RG
                          025F  804+AB341    EQU   *
    025F 01               025F  805+AB342    DC    XL1'01'               FLAG BYTE
                                806+*-----------------------------------------------------------------*
                          0260  807+AB343    EQU   *
    0260 F0F0F0F0F0F8     0265  808+         DC    CL6'000008'           STORE/REGISTER NUMBER
                          0266  809+AB344    EQU   *
    0266 F0F1             0267  810+         DC    CL2'01'               SALES PERSONALIZATION FOR ST/RG
                          0268  811+AB345    EQU   *
    0268 F0F1             0269  812+         DC    CL2'01'               NONSALES PTAB FOR ST/RG
                          026A  813+AB347    EQU   *
    026A 01               026A  814+AB348    DC    XL1'01'               FLAG BYTE
                                815+*-----------------------------------------------------------------*
                          026B  816+AB349    EQU   *
    026B F0F0F0F0F0F9     0270  817+         DC    CL6'000009'           STORE/REGISTER NUMBER
                          0271  818+AB350    EQU   *
    0271 F0F1             0272  819+         DC    CL2'01'               SALES PERSONALIZATION FOR ST/RG
                          0273  820+AB351    EQU   *
    0273 F0F1             0274  821+         DC    CL2'01'               NONSALES PTAB FOR ST/RG
                          0275  822+AB353    EQU   *
    0275 01               0275  823+AB354    DC    XL1'01'               FLAG BYTE
                                824+*-----------------------------------------------------------------*
                          0276  825+AB355    EQU   *
    0276 F0F0F0F0F1F0     027B  826+         DC    CL6'000010'           STORE/REGISTER NUMBER
                          027C  827+AB356    EQU   *
    027C F0F1             027D  828+         DC    CL2'01'               SALES PERSONALIZATION FOR ST/RG
                          027E  829+AB357    EQU   *
    027E F0F1             027F  830+         DC    CL2'01'               NONSALES PTAB FOR ST/RG
                          0280  831+AB359    EQU   *
    0280 01               0280  832+AB360    DC    XL1'01'               FLAG BYTE
                                833+*-----------------------------------------------------------------*
                          0281  834+AB361    EQU   *
    0281 F0F0F0F0F1F1     0286  835+         DC    CL6'000011'           STORE/REGISTER NUMBER
                          0287  836+AB362    EQU   *
    0287 F0F1             0288  837+         DC    CL2'01'               SALES PERSONALIZATION FOR ST/RG
                          0289  838+AB363    EQU   *
    0289 F0F1             028A  839+         DC    CL2'01'               NONSALES PTAB FOR ST/RG
                          028B  840+AB365    EQU   *
    028B 01               028B  841+AB366    DC    XL1'01'               FLAG BYTE
                                842+*-----------------------------------------------------------------*
    028C FF               028C  843+         DC    XL1'FF'               END OF STORE/REGISTER TABLE
    028D 00000000         0290  844+         DC    4XL1'00'              SECTOR ALIGNMENT

                                846+*****************************************************************
                                847+*                SECTOR  3                                       *
                                848+*****************************************************************
                                849+*****************************************************************
                                850+*          POLL LIST                                             *
                                851+*****************************************************************

                          0291  853+         ENTRY ABPOLL
                          0291  854+ABPOLL   EQU   *
    0291 0008             0292  855+         DC    XL2'0008'             DISP/LL OF POLL LIST
                                856+*****************************************************************
    0293 00               0293  857+AB001    DC    XL1'00'               LOCAL SATELLITE
    0294 80               0294  858+AB002    DC    XL1'80'               LOCAL SATELLITE IS ALWAYS ACTIVE
    0295 00               0295  859+AB003    DC    XL1'00'               ERROR COUNT
                          0296  860+AB004    EQU   *
    0296 4040             0297  861+         DC    2CL1' '               OFFSET FOR MODIFY ADD
                          0298  862+AB005    EQU   *
    0298 000000000000     029D  863+         DC    6XL1'00'              ST/RG
                                864+*-----------------------------------------------------------------*
    029E 09               029E  865+AB006    DC    XL1'09'               LINE 1, STATION   1
    029F 00               029F  866+AB007    DC    XL1'00'               FLAG BYTE
    02A0 00               02A0  867+AB008    DC    XL1'00'               ERROR COUNT
                          02A1  868+AB009    EQU   *
    02A1 4040             02A2  869+         DC    2CL1' '               OFFSET FOR MODIFY ADD
                          02A3  870+AB010    EQU   *
    02A3 000000000000     02A8  871+         DC    6XL1'00'              ST/RG
                                872+*-----------------------------------------------------------------*
    02A9 11               02A9  873+AB011    DC    XL1'11'               LINE 2, STATION   1
    02AA 00               02AA  874+AB012    DC    XL1'00'               FLAG BYTE
    02AB 00               02AB  875+AB013    DC    XL1'00'               ERROR COUNT
                          02AC  876+AB014    EQU   *
    02AC 4040             02AD  877+         DC    2CL1' '               OFFSET FOR MODIFY ADD
                          02AE  878+AB015    EQU   *
    02AE 000000000000     02B3  879+         DC    6XL1'00'              ST/RG
                                880+*-----------------------------------------------------------------*
```

```
  M3DCC - SECONDARY OPERATIONAL MODE
ERR LOC  OBJECT CODE       ADDR STMT SOURCE STATEMENT

    0284 0A                0284  881+AB016  DC    XL1'0A'              LINE 1, STATION   2
    0285 00                0285  882+AB017  DC    XL1'00'              FLAG BYTE
    0286 00                0286  883+AB018  DC    XL1'00'              ERROR COUNT
                           0287  884+AB019  EQU   *
    0287 4040              0288  885+       DC    2CL1' '              OFFSET FOR MODIFY ADD
                           0289  886+AB020  EQU   *
    0289 000000000000      028E  887+       DC    6XL1'00'             ST/RG
                                 888+*-----------------------------------------------------------*
    028F 12                028F  889+AB021  DC    XL1'12'              LINE 2, STATION   2
    02C0 00                02C0  890+AB022  DC    XL1'00'              FLAG BYTE
    02C1 00                02C1  891+AB023  DC    XL1'00'              ERROR COUNT
                           02C2  892+AB024  EQU   *
    02C2 4040              02C3  893+       DC    2CL1' '              OFFSET FOR MODIFY ADD
                           02C4  894+AB025  EQU   *
    02C4 000000000000      02C9  895+       DC    6XL1'00'             ST/RG
                                 896+*-----------------------------------------------------------*
    02CA 08                02CA  897+AB026  DC    XL1'08'              LINE 1, STATION   3
    02CB 00                02CB  898+AB027  DC    XL1'00'              FLAG BYTE
    02CC 00                02CC  899+AB028  DC    XL1'00'              ERROR COUNT
                           02CD  900+AB029  EQU   *
    02CD 4040              02CE  901+       DC    2CL1' '              OFFSET FOR MODIFY ADD
                           02CF  902+AB030  EQU   *
    02CF 000000000000      02D4  903+       DC    6XL1'00'             ST/RG
                                 904+*-----------------------------------------------------------*
    02D5 13                02D5  905+AB031  DC    XL1'13'              LINE 2, STATION   3
    02D6 00                02D6  906+AB032  DC    XL1'00'              FLAG BYTE
    02D7 00                02D7  907+AB033  DC    XL1'00'              ERROR COUNT
                           02D8  908+AB034  EQU   *
    02D8 4040              02D9  909+       DC    2CL1' '              OFFSET FOR MODIFY ADD
                           02DA  910+AB035  EQU   *
    02DA 000000000000      02DF  911+       DC    6XL1'00'             ST/RG
                                 912+*-----------------------------------------------------------*
    02E0 0C                02E0  913+AB036  DC    XL1'0C'              LINE 1, STATION   4
    02E1 00                02E1  914+AB037  DC    XL1'00'              FLAG BYTE
    02E2 00                02E2  915+AB038  DC    XL1'00'              ERROR COUNT
                           02E3  916+AB039  EQU   *
    02E3 4040              02E4  917+       DC    2CL1' '              OFFSET FOR MODIFY ADD
                           02E5  918+AB040  EQU   *
    02E5 000000000000      02EA  919+       DC    6XL1'00'             ST/RG
                                 920+*-----------------------------------------------------------*
    02EB 14                02EB  921+AB041  DC    XL1'14'              LINE 2, STATION   4
    02EC 00                02EC  922+AB042  DC    XL1'00'              FLAG BYTE
    02ED 00                02ED  923+AB043  DC    XL1'00'              ERROR COUNT
                           02EE  924+AB044  EQU   *
    02EE 4040              02EF  925+       DC    2CL1' '              OFFSET FOR MODIFY ADD
                           02F0  926+AB045  EQU   *
    02F0 000000000000      02F5  927+       DC    6XL1'00'             ST/RG
                                 928+*-----------------------------------------------------------*
    02F6 0D                02F6  929+AB046  DC    XL1'0D'              LINE 1, STATION   5
    02F7 00                02F7  930+AB047  DC    XL1'00'              FLAG BYTE
    02F8 00                02F8  931+AB048  DC    XL1'00'              ERROR COUNT
                           02F9  932+AB049  EQU   *
    02F9 4040              02FA  933+       DC    2CL1' '              OFFSET FOR MODIFY ADD
                           02FB  934+AB050  EQU   *
    02FB 000000000000      0300  935+       DC    6XL1'00'             ST/RG
                                 936+*-----------------------------------------------------------*
    0301 15                0301  937+AB051  DC    XL1'15'              LINE 2, STATION   5
    0302 00                0302  938+AB052  DC    XL1'00'              FLAG BYTE
    0303 00                0303  939+AB053  DC    XL1'00'              ERROR COUNT
                           0304  940+AB054  EQU   *
    0304 4040              0305  941+       DC    2CL1' '              OFFSET FOR MODIFY ADD
                           0306  942+AB055  EQU   *
    0306 000000000000      030B  943+       DC    6XL1'00'             ST/RG
                                 944+*-----------------------------------------------------------*
    030C FF                030C  945+       DC    XL1'FF'              END OF POLL LIST TABLE
    030D 00000000          0310  946+       DC    4XL1'00'             SECTOR ALIGNMENT

                                 948+*************************************************************
                                 949+*                  SECTOR  4                                *
                                 950+*************************************************************
                                 951+*          TELEPROCESSING   MODES
                           0311  952+AB7101 EQU   *
    0311 02F1F0            0313  953+       DC    XL3'02F1F0'          MAXIMUM NUMBER OF DISK ERRORS.
                                 954+*
                           0314  955+AB7102 EQU   *                    TERMINAL ID USED.
                           0314  956+AB7104 EQU   *                    HOST ID USED.
                           0314  957+AB7134 EQU   *
                           0314  958+AB7135 EQU   *
                           0314  959+AB7136 EQU   *
    0314 00                0314  960+       DC    XL1'00'
                                 961+*            BIT 0 = ON=TERMINAL ID USED.
                                 962+*            BIT 1 = ON=HOST ID USED.
                                 963+*            BIT 2   0 - ITB, 1 - IRS.
                                 964+*            BIT 3   ON - NULL RECORD AT END OF FILE
                                 965+*            BIT 4   ON - STATUS MESSAGE TRANSMITTED
                                 966+*
    0315 00                0315  967+AB7103 DC    IL1'0'
    0316 404040404040404040 0324 968+       DC    CL15' '              TERMINAL ID.
    031E 40404040404040          968+
    0325 00                0325  969+AB7105 DC    IL1'0'
    0326 404040404040404040 0334 970+       DC    CL15' '              HOST ID.
    032E 40404040404040          970+
    0335 03                0335  971+AB7107 DC    IL1'3'               NUMBER OF RETRIES ENQ FOR
                                 972+*                                 STATUS MESSAGE.
    0336 04                0336  973+AB7111 DC    IL1'4'               NAKS ACCEPTED IN RESPONSE TO
                                 974+*                                 TEXT.
    0337 07                0337  975+AB7116 DC    IL1'7'               TTD TIMEOUT COUNT.
    0338 07                0338  976+AB7117 DC    IL1'7'               ENQ RETRIES FOR MISSING RESPONSE
    0339 00                0339  977+AB7118 DC    IL1'0'               NUMBER OF TIMES TO RETURN TO
                                 978+*                                 WAIT FOR PHONE CALL IF HAVING
                                 979+*                                 PROBLEMS SENDING DATA IN
                                 980+*                                 TRANSMIT SINGLE DISKETTE
                                 981+*                                 FUNCTION.
    033A 01                033A  982+AB7119 DC    XL1'01'              BLOCKING FACTOR.
                           033B  983+AB7120 EQU   *
                           033B  984+AB7122 EQU   *
                           033B  985+AB7123 EQU   *
                           033B  986+AB7124 EQU   *
                           033B  987+AB7125 EQU   *
                           033B  988+AB7127 EQU   *
                           033B  989+AB7129 EQU   *
                           033B  990+AB7133 EQU   *
    033B 48                033B  991+       DC    XL1'48'
                                 992+*
                                 993+*            BIT 0 = ON=TERMINAL INITIATES CALL.
                                 994+*            BIT 1 = ON=BUSINESS MACHINE  CLOCK  INSTALLED.
                                 995+*            BIT 3 = ON=IBM EXTERNAL MODEM INSTALLED.
                                 996+*            BIT 4 = ON=INTEGRATED MODEM INSTALLED.
                                 997+*            BIT 5 = ON=ANSWER TONE GENERATION.
                                 998+*            BIT 6 = ON=FULL SPEED.
                                 999+*            BIT 7 = ON= AUTO ANSWER
                                1000+*                  OFF= MANUAL ANSWER
    033C 01                033C 1001+AB7126 DC    IL1'1'               1-DTR.
                                1002+*                                 2-COSIL.
    033D 01                033D 1003+AB7128 DC    IL1'1'               1-SWITCHED
                                1004+*                                 2-LEASED.
    033E 17                033E 1005+AB7131 DC    IL1'23'
    033F E3D9C1D5E2D4C9E2  0350 1006+       DC    CL31'TRANSMISSION SUCCESSFUL'
    0347 E2C9D6D540E2E4C3       1006+
    034F C3C5E2E2C6E4D340       1006+
    0357 40404040404040         1006+
    035E 19                035E 1007+AB7132 DC    IL1'25'
    035F E3D9C1D5E2D4C9E2  0370 1008+       DC    CL31'TRANSMISSION UNSUCCESSFUL'
    0367 E2C9D6D540E4D5E2       1008+
    036F E4C3C3C5E2E2C6E4       1008+
    0377 D3404040404040         1008+
    037E 14                037E 1009+AB7130 DC    IL1'20'              TIME TO WAIT FOR DISKETTE CHANGE
    037F 0000000000000000  0390 1010+       DC    18XL1'00'
    0387 0000000000000000       1010+
    038F 0000                   1010+
                           FFFF 1011        END
TOTAL STATEMENTS IN ERROR IN THIS ASSEMBLY =      0
```

```
XXPIA - PRIMARY INTERMACHINE ADAPTER ROUTINE
ERR LOC  OBJECT CODE      ADDR STMT SOURCE STATEMENT
                          0000    7         ENTRY XXPIA              PRIMARY INTERMACHINE ADAPTER
                                  8 *
                          0001    9         EXTRN CBPROC             CONTROL BLOCK PROCESSING
                          0002   10         EXTRN CMDPIA             COMMAND GLOBAL VARIABLE
                          0003   11         EXTRN CMDPTB             CMND PROC TIME BOMB CONTROL BLOCK
                          0004   12         EXTRN CMDPTP             COMMAND PROCESSOR TEMPORARY
                          0005   13         EXTRN CMDTBA             CMD TABLE ADDRESS
                          0200   14         ENTRY CMDTBL             COMMAND TABLE ADDRESS
                          0006   15         EXTRN INASK              INTERRUPT MASK
                          0007   16         EXTRN INTON              TURN ON INTERUPTS ROUTINE
                          0008   17         EXTRN STATE              RAM STATE VALUE
                          0009   18         EXTRN SYSFLG             SYSTEM FLAG
                          000A   19         EXTRN SYSFG2             MEDIA SYSTEM FLAG
                          000B   20         EXTRN SYSMSK             SYSTEM MASK
                          000C   21         EXTRN TCMND              SHIFT BITS WORK AREA
                          000D   22         EXTRN TCMNDF             REFERENCE POINTER
                          000E   23         EXTRN TMPADD             CYCLE STEAL TEMPORARY ADDRESS
                          000F   24         EXTRN TMPLEN             CYCLE STEAL TEMPORARY LENGTH
                          0010   25         EXTRN XMDE               DEVICE END ROUTINE
                          0011   26         EXTRN XMEUP              END OF PROCESS ROUTINE
                          0012   27         EXTRN XMNORS             NO RESPONSE ERROR PROCESS
                          0013   28         EXTRN XMPLLX             POLL COMMAND PROCESS
                          0014   29         EXTRN XMPLNB             POLL UNTIL NOT BUSY
                          0015   30         EXTRN XMSEND             TRANSMIT ONE COMMAND
                          0016   31         EXTRN XMSHFT             SHIFT BITS ROUTINE
                          0017   32         EXTRN XMSM               SEND MANY
                          0018   33         EXTRN XMSTOO             LOCAL SATELLITE COMMAND PROCESSOR
                          0019   34         EXTRN XMS1RM             SEND ONE RECEIVE MANY
                          001A   35         EXTRN XMTMT              TRANSMIT ONE FRAME
                          001B   36         EXTRN XM5SML             FIVE SECOND MONITOR LINE
                          001C   37         EXTRN XXRRTN             SUPERVISORY RETURN ROUTINE
                          001D   38         EXTRN XXTREQ             INTERVAL TIMER REQUEST ROUTINE
                          001E   39         EXTRN XXTXCL             INTERVAL TIMER CANCEL ROUTINE
                          001F   40         EXTRN X0000              CONSTANT - X'0000'
                          0020   41         EXTRN X0001              CONSTANT - X'01'
                          0021   42         EXTRN X0002              CONSTANT - X'02'
                          0022   43         EXTRN XMNCON             COMMUNICATION TERMINATION ROUTINE
                                 44 *       SEQUM
                                 45+* * * * * * * * * * * * * * * * * * * * * * * * * * * * * * * * * * *
                                 46+*
                                 47+*  IMA LEVEL INTERRUPT
                                 48+*
                                 49+* * * * * * * * * * * * * * * * * * * * * * * * * * * * * * * * * * *
                          0004   50+IMALVL EQU    4                      IMA LEVEL INTERRUPT
                                 51+* * * * * * * * * * * * * * * * * * * * * * * * * * * * * * * * * * *
                                 52+*
                                 53+*  REGISTER DEFINITIONS
                                 54+*
                          0001   55+XR1     EQU   1                      INDEX REGISTER 1
                          0002   56+XR2     EQU   2                      INDEX REGISTER 2
                          0008   57+ARR     EQU   8                      ADDRESS REGISTER SET ON BRANCH
                          0010   58+IAR     EQU   X'10'                  INSTRUCTION ADDRESS REGISTER
                          000C   59+RCSCW   EQU   X'0C'                  CYCLE STEAL WORD
                          000D   60+RCSADR  EQU   X'0D'                  CYCLE STEAL ADDRESS
                          00FE   61+MASKR   EQU   X'FE'                  INTERRUPT MASK
                                 62+*
                                 63+*  BIT PATTERNS
                                 64+*
                          0000   65+OFF     EQU   X'00'
                          0080   66+BIT0    EQU   X'80'
                          0040   67+BIT1    EQU   X'40'
                          0020   68+BIT2    EQU   X'20'
                          0010   69+BIT3    EQU   X'10'
                          0008   70+BIT4    EQU   X'08'
                          0004   71+BIT5    EQU   X'04'
                          0002   72+BIT6    EQU   X'02'
                          0001   73+BIT7    EQU   X'01'
                                 74+*
                          007F   75+NBIT0   EQU   X'7F'
                          00BF   76+NBIT1   EQU   X'BF'
                          00DF   77+NBIT2   EQU   X'DF'
                          00EF   78+NBIT3   EQU   X'EF'
                          00F7   79+NBIT4   EQU   X'F7'
                          00FB   80+NBIT5   EQU   X'FB'
                          00FD   81+NBIT6   EQU   X'FD'
                          00FE   82+NBIT7   EQU   X'FE'
                          00FF   83+ON      EQU   X'FF'
                          00FF   84+ALL     EQU   ON
                          00FF   85+ANY     EQU   ON
                          0000   86+CLEAR   EQU   OFF
                          00C0   87+MSK01   EQU   BIT0+BIT1
                          0001   88+ONE     EQU   1                      EQUATE 1
                                 89+*
                                 90+*****************************************************************
                                 91+*
                                 92+*  XXPIA CONTROL BLOCK DEFINITIONS
                                 93+*
                                 94+***     FIELD LENGTHS
                                 95+*
                          0000   96+LF      EQU   0                      LINK FIRST - FIRST BYTE OF LINK
                          0001   97+LL      EQU   1                      LINK LAST BYTE OF TWO BYTE FIELD
                          0003   98+LTD     EQU   3                      LINK TIME DELTA
                          0005   99+LRA     EQU   5                      LINK RETURN ADDRESS
                          0000  100+LFIRST  EQU   0                      FIRST BYTE NO OFFSET
                          0001  101+LDID    EQU   1                      LENGTH OF DEVICE ID
                          0001  102+LCMND0  EQU   1                      LENGTH OF COMMAND 0
                          0001  103+LCMND1  EQU   1                      LENGTH OF COMMAND 1
                          0002  104+LDATAP  EQU   2                      LENGTH OF DATA POINTER
                          0001  105+LERROR  EQU   1                      LENGTH OF ERROR CODE
                          0001  106+LFAIL   EQU   1                      LENGTH OF FAILURE CODE
                          0001  107+LSTAT   EQU   1                      LENGTH OF STATION ADDRESS
                          0001  108+LPRESP  EQU   1                      LENGTH OF POLL RESPONSE
                          0001  109+LQUEUE  EQU   1                      LENGTH OF QUEUE FIELD
                          0001  110+LCMDMD  EQU   1                      LENGHT OF COMMAND MODIFIER FIELD
                          0002  111+LMAXBC  EQU   2                      LENGTH OF MAXIMUM BYTE COUNT
                          0002  112+LRECBC  EQU   2                      LENGTH OF RECEIVED BYTE COUNT
                                113+*
                                114+***     LOCATION OFFSETS
                                115+*
                          0000  116+DEVICE  EQU   LFIRST                 DEVICE ID AND CODES
                          0001  117+CMND0   EQU   DEVICE+LDID            COMMAND BYTE 0
                          0002  118+CMND1   EQU   CMND0+LCMND0           COMMAND BYTE 1
                          0004  119+DATAP   EQU   CMND1+LCMND1+LL        DATA BUFFER POINTER
                          0005  120+ERROR   EQU   DATAP+LL               ERROR BYTE
                          0006  121+FAIL    EQU   ERROR+LERROR           FAILURE CODES
                          0007  122+STAT    EQU   FAIL+LFAIL             STATION ADDRESS
                          0008  123+PRESP   EQU   STAT+LSTAT             POLL RESPONSE
                          0009  124+PIAQUE  EQU   PRESP+LPRESP           QUEUE TO PROCESS
                          000A  125+CMDMOD  EQU   PIAQUE+LQUEUE          COMMAND MODIFIER
                          000C  126+MAXBC   EQU   CMDMOD+LCMDMD+LL       MAXIMUM BYTE COUNT
                          000E  127+RECBC   EQU   MAXBC+LMAXBC           RECEIVED BYTE COUNT
                                128+*
                                129+***     FIELDS WITHIN XXPIA CONTROL BLOCK BYTES
                                130+*
                                131+** DEVICE ID AND CODES
                          00C0  132+DEVID   EQU   X'C0'                  PIA CONTROL BLOCK ID
                          0008  133+UC      EQU   BIT4                   UNIT CHECK
                          0004  134+SE      EQU   BIT5                   SATELLITE EXCEPTION
                          0002  135+DE      EQU   BIT6                   DEVICE END
                          0001  136+UE      EQU   BIT7                   UNIT EXCEPTION
                          000A  137+UCDE    EQU   UC+DE                  UNIT CHECK AND DEVICE END
                          0003  138+UEDE    EQU   UE+DE                  UNIT EXCEPTION AND DEVICE END
                          000F  139+NDEVID  EQU   X'0F'                  RESET CONDITION CODES
                                140+*
                                141+** COMMAND BYTE 0
                                142+*
                          0001  143+CSETM   EQU   X'01'                  CODE FOR SET MODE
                          0002  144+CSETA   EQU   X'02'                  CODE FOR SET ADDRESS
                          0003  145+CRST    EQU   X'03'                  CODE FOR RESET
                          0004  146+CRDID   EQU   X'04'                  CODE FOR READ ID
                          0005  147+CRDIB   EQU   X'05'                  CODE FOR READ IOB
                          0006  148+CRDBF   EQU   X'06'                  CODE FOR READ BUFFER
```

```
       XXPIA - PRIMARY INTERMACHINE ADAPTER ROUTINE
ERR LOC  OBJECT CODE      ADDR STMT SOURCE STATEMENT
                          0007  149+CWTIB   EQU   X'07'            CODE FOR WRITE BUFFER
                          0008  150+CWTBF   EQU   X'08'            CODE FOR WRITE BUFFER
                          0009  151+CPOLL   EQU   X'09'            CODE FOR POLL
                          000A  152+CPRPE   EQU   X'0A'            CODE FOR POLL RESET PARITY ERROR
                          000B  153+CPACK   EQU   X'0B'            CODE FOR POLL ACKNOWLEDGE
                          000C  154+CCLR    EQU   X'0C'            CODE FOR CLEAR QUEUE
                          000D  155+CLNAC   EQU   X'0D'            CODE FOR LINE ACTIVATE
                          000E  156+CRSTI   EQU   X'0E'            CODE FOR RESET IMA
                          000F  157+CMNLN   EQU   X'0F'            CODE FOR MONITOR LINE
                          0000  158+ERPROC  EQU   X'00'            ERROR PROCESS
                                159+*
                                160+** XXPIA ERROR CODES
                                161+*
                          0092  162+MAXBCE  EQU   X'92'            MAXIMUM BYTE COUNT EXCEEDED
                          0093  163+LINEPE  EQU   X'93'            LINE PARITY ERROR
                          0094  164+CMDINV  EQU   X'94'            COMMAND INVALID
                          0095  165+HDWECK  EQU   X'95'            IMA HARDWARE CHECK
                          0002  166+LINEAC  EQU   BIT6             LINE ACTIVE
                          0001  167+NRESP   EQU   BIT7             NO RESPONSE
                                168+*
                                169+** STATION ADDRESS
                                170+*
                          0018  171+PORT    EQU   BIT3+BIT4        PORT SELECTION
                          00E7  172+NPORT   EQU   ALL-PORT         ALL EXCEPT PORT BITS
                          0007  173+STATN   EQU   BIT5+BIT6+BIT7   STATION ADDRESSED
                          00F8  174+NSTATN  EQU   ALL-STATN        ALL EXCEPT STATION BITS
                          001F  175+ADDR    EQU   PORT+STATN       PORT AND STATION ADDRESS
                          001F  176+LSATAD  EQU   ADDR             LOCAL SATELLITE ADDRESS
                                177+*
                                178+** POLL RESPONSE STATUS BYTE
                                179+*
                          0080  180+BUSY    EQU   BIT0             BUSY STATUS
                          0040  181+LPE     EQU   BIT1             LINE PARITY ERROR
                                182+*
                          004E  183+EXSTAT  EQU   BIT1+BIT4+BIT5+BIT6  EXCEPTION CONDITIONS
                          0000  184+CES     EQU   0                CLEAR EXCEPTION STATUS
                          00F1  185+NEX     EQU   X'F1'            NO EXCEPTION STATUS
                          0002  186+ATL     EQU   BIT6             ACTIVATE LOST
                          0004  187+INA     EQU   BIT5             INVALID ACTIVATE
                          0006  188+RES     EQU   BIT5+BIT6        RESERVED
                          0008  189+INC     EQU   BIT4             INVALID COMMAND
                          000A  190+STY     EQU   BIT4+BIT6        STORAGE OVERRUN
                          000C  191+QUE     EQU   BIT4+BIT5        QUEUE EMPTY
                          000E  192+POT     EQU   BIT4+BIT5+BIT6   POWER ON TRANSITION
                          0001  193+EVNODD  EQU   BIT7             EVEN ODD RESPONSE
                          0008  194+AMM     EQU   INC              ADDRESS MISMATCH
                          000E  195+UESTB   EQU   BIT4+BIT5+BIT6   UNIT EXCEPTION STATUS BITS
                                196+*
                                197+** STATION QUEUE
                                198+*
                          00E0  199+STQUE   EQU   BIT0+BIT1+BIT2   STATION QUEUE
                          001F  200+NSTQUE  EQU   ALL-STQUE        NOT STATION QUEUE
                                201+*
                                202+*       SYSTEM FLAG EQUATES (SYSFG2)
                                203+*
                          0080  204+PRO     EQU   BIT0             CONTROL BLOCK PROCESSING FLAG
                          0040  205+SIAENB  EQU   BIT1             YYSIAM ENABLE FLAG
                          0020  206+POLRSP  EQU   BIT2             POLL RESPONSE FLAG
                          0010  207+CSD     EQU   BIT3             CYCLE STEAL DIRECTION (1=XMIT)
                                208+*
                                209+*****************************************************************
                                210+*       SYSTEM FLAG EQUATES FOR SYSFLG
                                211+*****************************************************************
                          0002  212+MEDACT  EQU   BIT6             MEDIA ACTIVITY FLAG
                                213+*
                                214+*** XXVSIA FLAGS
                                215+*
                          0040  216+SIAPOR  EQU   BIT1             POWER ON RESET
                                217+*
                                218+*** FAILURE CODES
                                219+*
                          0004  220+BUSYTO  EQU   BIT5             BUSY TIMEOUT
                                221+*
                                222+*       COMMAND DELAYS
                                223+*
                          0014  224+POLDEL  EQU   20               DELAY FOR POLL RESPONSE
                          0014  225+SETADY  EQU   20               DELAY FOR SETTING ADDRESS
                          002F  226+MINCMD  EQU   X'2F'            DELAY FOR COMMAND PROCESSING
                                227+*
                                228+*       COMMAND TABLE EQUATES
                                229+*
                          0004  230+CTINCR  EQU   4                COMMAND TABLE INCREMENT
                          0003  231+LCMDAD  EQU   3                LINK COMMAND ADDRESS
                          0001  232+LCMD    EQU   1                LINK COMMAND
                          0003  233+LSCINC  EQU   3                LOCAL SATELLITE COMMAND INCREMEN
                                234+*
                                235+*       MEDIA STATE EQUATES
                                236+*
                          0000  237+MXST0   EQU   0                STATE 0 - NULL
                          0002  238+MXST1   EQU   2                STATE 0 - READ
                          0004  239+MXST2   EQU   4                STATE 0 - WRITE
                                240+*
                                241+*
                          00FF  242+LASTRY  EQU   X'FF'            MAXIMUM NUMBER OF POLLS TRIED
                                243+*
                                244+*****************************************************************
                                245+*
                                246+** XXSIA CONTROL BLOCK OFFSETS
                                247+*
                          0002  248+LCB     EQU   2                LINK CONTROL BITS
                          0004  249+ENBS    EQU   4                SIA CONTROL BITS
                          0006  250+LDAS    EQU   6                LINK DATA ADDRESS
                          0007  251+LERS    EQU   7                ERROR CODE BYTE
                          000A  252+LIA     EQU   10               LINK IOB ADDRESS
                          000B  253+LIL     EQU   11               LINK IOB LENGTH
                          000C  254+LRL     EQU   12               NUMBER OF XMITS
                          000E  255+LTBS    EQU   14               XMIT BLOCK SIZE
                                256+*
                                257+*  XXSIA ERROR CODES
                                258+*
                          0073  259+CLRQUE  EQU   X'73'            CLEAR QUEUE ERROR CODE
                          0079  260+INVMDE  EQU   X'79'            INVALID MODE (YYSIAM)
                                261+*
                                262+** COMMAND BYTE 2  (XXSIA CONTROL BLOCK)
                                263+*
                          0080  264+ENB     EQU   BIT0             SIA INITIALIZATION COMMAND
                          0040  265+DISABL  EQU   BIT1             DISABLE YYSIAM COMMAND
                                266+*
                                267+*****************************************************************
                                268+*
                                269+*
                                270+*       GPOST COMMANDS
                                271+*
                          0000  272+ACTR    EQU   X'00'            ACTIVATE READ
                          0001  273+ACTW    EQU   X'01'            ACTIVATE WRITE
                          0002  274+RESET   EQU   X'02'            RESET
                          0004  275+SETADD  EQU   X'04'            SET ADDRESS
                          0008  276+READI   EQU   X'08'            READ IOB
                          000C  277+READDI  EQU   X'0C'            READ DEVICE ID
                          000E  278+WRITEI  EQU   X'0E'            WRITE IOB
                          0010  279+POLL    EQU   X'10'            POLL
                          0022  280+RSTIMA  EQU   X'22'            RESET IMA
                          0050  281+POLLR   EQU   X'50'            POLL WITH RESET PARITY
                          0030  282+POLLA   EQU   X'30'            POLL WITH ACKNOWLEDGE
                          0012  283+CLER    EQU   X'12'            CLEAR QUEUE
                          0013  284+SETMOD  EQU   X'13'            SET MODE
                          0018  285+READB   EQU   X'18'            READ BUFFER
                          001E  286+WRITEB  EQU   X'1E'            WRITE BUFFER
                                287+*
                                288+*       SHORTENED MNEMONICS
                                289+*
                          0000  290+AR      EQU   ACTR             ACTIVATE READ
                          0001  291+AW      EQU   ACTW             ACTIVATE WRITE
                          0060  292+MRACT   EQU   X'60'            MEDIA READ ACTIVATE
```

```
      XXPIA - PRIMARY INTERMACHINE ADAPTER ROUTINE
ERR LOC  OBJECT CODE       ADDR STMT SOURCE STATEMENT
                           0040 293+MWACT   EQU   X'40'                  MEDIA WRITE ACTIVATE
                                294+*
                                295+*       NON COMMAND BITS
                                296+*
                           00E0 297+NCMND   EQU   X'E0'                  NON COMMAND BITS
                                298+*
                                299+**************************************************************
                                300+*
                                301+*       I/O REGISTER DEFINITIONS
                                302+*
                           0029 303+RLED    EQU   X'29'                  MEDIA AVAILABLE LED REGISTER
                           0060 304+RCYST   EQU   X'60'                  CYCLE STEAL REGISTER
                           0060 305+RFRAME  EQU   X'60'                  FRAME BUFFER
                           0061 306+RTWST   EQU   X'61'                  TWINAX STATUS REGISTER
                           0062 307+RCNTR   EQU   X'62'                  CONTROL REGISTER
                           0063 308+RBSST   EQU   X'63'                  BASE STATUS REGISTER
                           0064 309+RQUES   EQU   X'64'                  QUEUE STATUS REGISTER
                           0065 310+RCMDB   EQU   X'65'                  COMMAND BUFFER
                                311+*
                                312+*       TWINAX STATUS REGISTER X'61' BIT DEFINITIONS (RTWST)
                                313+*
                           0080 314+PD      EQU   BIT0                   LINE PARITY DISPLAY
                           0040 315+PE      EQU   BIT1                   PARITY ERROR INTERRUPT
                           0020 316+LM      EQU   BIT2                   LINE MESSAGE MONITOR
                           0010 317+AM      EQU   BIT3                   ADDRESS MISMATCH
                           0008 318+CQ      EQU   BIT4                   COMMAND QUEUED
                           0008 319+SI      EQU   BIT4                   SEND ONE
                           0004 320+TM      EQU   BIT5                   TRANSMISSION MONITOR
                           0002 321+DT      EQU   BIT6                   DATA STREAM TERMINATION DELIMITE
                           0001 322+CS      EQU   BIT7                   CYCLE STEAL
                           0041 323+PECS    EQU   PE+CS                  PARITY ERROR AND CYCLE STEAL
                           0003 324+CD      EQU   CS+DT                  CYCLE STEAL AND DSTD
                           007F 325+RPD     EQU   ALL-PD                 RESET PARITY DISPLAY
                           00BF 326+RPE     EQU   ALL-PE                 RESET PARITY ERROR
                           00DF 327+RLM     EQU   ALL-LM                 RESET LINE MONITOR
                           00EF 328+RAM     EQU   ALL-AM                 RESET ADDRESS MISMATCH
                           00F7 329+RCQ     EQU   ALL-CQ                 RESET COMMAND QUEUED
                           00F7 330+RSI     EQU   ALL-SI                 RESET SEND ONE
                           00FB 331+RTM     EQU   ALL-TM                 RESET TRANSMISSION MONITOR
                           00FD 332+RDT     EQU   ALL-DT                 RESET DSTD
                           00FE 333+RCS     EQU   ALL-CS                 RESET CYCLE STEAL
                           00FC 334+RCD     EQU   ALL-CD                 RESET CYCLE STEAL AND DSTD
                           00F3 335+RCTM    EQU   ALL-CQ-TM              RESET CMND QUEUED AND TRIT MONIT
                           00A4 336+RSTINT  EQU   ALL-PE-AM-SI-DT-CS     RESET ALL INTERRUPT BITS
                                337+*
                                338+*       CONTROL REGISTER X'62' BIT DEFINITIONS (RCNTR)
                                339+*
                           001F 340+NULL    EQU   X'1F'                  NULL
                           0020 341+SONE    EQU   X'20'                  SEND ONE COMMAND FOR CONTROL REG
                           0020 342+SEND1   EQU   X'20'                  SEND ONE FRAME
                           0040 343+WRTCMD  EQU   X'40'                  WRITE COMMAND
                           0060 344+RDCMD   EQU   X'60'                  READ COMMAND
                           0080 345+POTB    EQU   X'80'                  POWER ON TRANSITION
                           00A0 346+TBPR    EQU   X'A0'                  TWO BYTE POLL RESPONSE
                           00C0 347+RACT    EQU   X'C0'                  READ ACTIVATE
                           00E0 348+WACT    EQU   X'E0'                  WRITE ACTIVATE
                           0008 349+PORT1   EQU   BIT4                   PORT ONE
                           0007 350+ADDR7   EQU   X'07'                  ADDRESS 7 IN CONTROL REGISTER
                           00A7 351+TBPR7   EQU   TBPR+ADDR7             TWO BYTE POLL RESPONSE AND ADDR
                           0088 352+CNTR    EQU   POTB+PORT1             POWER ON TRANSITION AND PORT 1
                           008F 353+CNTR7   EQU   CNTR+7                 INITIALIZATION STATE OF REGISTER
                                354+*
                                355+*  DIAGNOSTIC ROUTINE INTERRUPT LEVEL BIT
                                356+*
                           00FF 357+DEVMSK  EQU   X'FF'                  I/O DEVICE INTERRUPT MASK
                           00FB 358+IMAOFF  EQU   X'FB'                  IMA TURN OFF MASK
                                359+************  IMA HARDWARE ERROR  ************************************
                           0000 360+RRESET  EQU   X'00'                  IMA MODE SELECT
                                361+************  IMA HARDWARE ERROR  ************************************
                                362           PRINT ON
                           0000 364 PIA000  EQU   *                      DO UNTIL
0000 39 80 000A                 365         TBF   SYSFG2,PRO             --END OF PROCESS
0004 C0 90 0000                 366         BF    PIA000                 END DO UNTIL
0008 3A 80 000A                 367         SBN   SYSFG2,PRO             SET PROCESSING FLAG
000C 34 01 0001                 368         ST    CBPROC,XR1             SAVE POINTER TO CONTROL BLOCK
0010 3B 02 0009                 369         SBF   SYSFLG,MEDACT          RESET NO MEDIA ACTIVITY FLAG
                                370 *                                    ALLOW MAXIMUM TIME FOR PROCESSING
0014 C2 01 0003                 371         LA    CMOPTB,XR1             (SET REFERENCE POINTER TO CB)
0018 C0 87 001E                 372         B     XXTXCL                 CANCEL ENTRY FROM QUEUE
001C C2 01 0003                 373         LA    CMOPTB,XR1             (SET REFERENCE POINTER TO CB)
0020 4C 03 05 0208              374         MVC   LRA(4,XR1),CPEPAD      (LOAD RETURN ADDRESS)
0025 C0 87 001D                 375         B     XXTREQ                 (QUEUE REQUEST)
0029 35 01 0001                 376         L     CBPROC,XR1             RESTORE CONTROL BLOCK POINTER
002D 7B 0F 00                   377         SBF   DEVICE(,XR1),NDEVID    CLEAR CONTROL BITS
0030 4C 01 06 001F              378         MVC   FAIL(2,XR1),X0000      CLEAR ERROR CODE AND FAILURE BITS
0035 4C 01 09 001F              379         MVC   PIAQUE(2,XR1),X0000    CLEAR POLL RESPONSE
003A 79 1F 07                   380         TBF   STAT(,XR1),LSATAD      IF ADDRESSING LOCAL SATELLITE
003D F2 90 08                   381         JF    PIA200                 * ***
0040 C0 87 0018                 382         B     XMST00                 * PROCESS LOCAL SATELLITE
0044 C0 87 0201                 383         B     PIA999                 * ***
                           0048 384 PIA200  EQU   *                      ELSE,
0048 38 40 000A                 385         TBN   SYSFG2,SIAENB          * IF SECONDARY MODE
004C C0 10 01F6                 386         BT    PIA997                 * * TERMINATE
                                387 *                                    * ELSE,
0050 C0 87 0022                 388         B     XMNCOM                 * * BRANCH TO RESET COMMUNICATIONS
                                389 *                                    * * MASK OFF IMA INTERRUPT
                           0054 390 TEST    EQU   *                      * * DO UNTIL ALL INTERRUPTS ARE OFF
                                391 *       XFR   R1-MASKR,I2-OFF        * * * MASK OFF INTERRUPTS
0054 F6                    0054 392+        DC    IL1'246'               +
0055 FE                    0055 393+        DC    AL1(MASKR)             +
0056 00                    0056 394+        DC    AL1(OFF)               +
                                395 *       BNEQ  R1-MASKR,I2-OFF,ADD-TEST  * END DO
0057 CA                    0057 396+        DC    IL1'202'               +
0058 FF                    0058 397+        DC    AL1(MASKR)             +
0059 00                    0059 398+        DC    AL1(OFF)               +
005A 0054                  005B 399+        DC    AL2(TEST)              +
005C 3B 04 0006                 400         SBF   IMASK,IMALVL           * * (SET INT MASK TO DISABLE IMA)
                                401 *       LR    R1-MASKR,ADD-IMASK     * * (DISABLE IMA INTERRUPT)
0060 33                    0060 402+        DC    IL1'51'                +
0061 FE                    0061 403+        DC    AL1(MASKR)             +
0062 0006                  0063 404+        DC    AL2(IMASK)             +
                                405 *       LR    R1-DEVMSK,ADD-IMASK    * * (MASK OFF ALL INTERRUPTS)
0064 33                    0064 406+        DC    IL1'51'                +
0065 FF                    0065 407+        DC    AL1(DEVMSK)            +
0066 0006                  0067 408+        DC    AL2(IMASK)             +
0068 7B E0 07                   409         SBF   STAT(,XR1),NCMND       * * CLEAR NON-COMMAND MODIFIER BITS
                                410 *       LR    R1-RCNTR,B-1,DISP-STAT * * LOAD NEW ADDRESS
006B 73                    006B 411+        DC    IL1'115'               +
006C 62                    006C 412+        DC    AL1(RCNTR)             +
006D 07                    006D 413+        DC    AL1(STAT)              +
006E 35 01 0001                 414         L     CBPROC,XR1             * * RESTORE POINTER TO CONTROL BLOCK
0072 35 02 0005                 415         L     CMDTBA,XR2             * * SET REF PTR TO COMND TABLE ADDR
                           0076 416 PIA300  EQU   *                      * * DO WHILE
0076 90 00 00 01                417         CLC   0(1,XR2),CMND0(,XR1)   * * --COMMAND OR
007A F2 81 00                   418         JE    PIA400                 * * * ***
0070 80 00 00                   419         CLI   0(,XR2),ERPROC         * * --END OF TABLE NOT FOUND
0080 F2 81 07                   420         JE    PIA400                 * * * ***
0083 F2 02 04                   421         LA    CTINCR(,XR2),XR2       * * * MOVE TO NEXT TABLE ENTRY
0086 C0 87 0076                 422         B     PIA300                 * * * ***
                           008A 423 PIA400  EQU   *                      * * END DO WHILE
008A 2C 00 0002 01              424         MVC   CMDPIA,LCMD(1,XR2)     * * LOAD COMMAND GLOBAL VARIABLE
008F B5 10 03                   425         L     LCMDAD(,XR2),IAR       * * CASE - PROCESS CMD - COMMAND=
                           0092 427 XMSETM  EQU   *                      * * CASE 1 - SET MODE - CMD='01'
0092 1C 01 000E 04              428         MVC   TMPADD,DATAP(2,XR1)    * * LOAD CYCLE STEAL TEMPORARY ADD
0097 0C 01 000F 0020            429         MVC   TMPLEN(2),X0001        * * LOAD CYCLE STEAL TEMPORARY LGTH
009D C0 87 0017                 430         B     XMSM                   * * SEND MULTIPLE FRAMES
                           00A1 431 SETMIO  EQU   *                      * * DO WHILE
                                432 *       JOB   R1-RTWST,I2-CS,ADD-SETM20 * * --NOT CYCLE STEAL INTERRUPT OR
00A1 D4                    00A1 433+        DC    IL1'212'               +
00A2 61                    00A2 434+        DC    AL1(RTWST)             +
00A3 01                    00A3 435+        DC    AL1(CS)                +
00A4 08                    00A4 436+        DC    AL1(SETM20-1-*)        +
```

```
        XXPIA - PRIMARY INTERMACHINE ADAPTER ROUTINE
ERR LOC  OBJECT CODE        ADDR STMT SOURCE STATEMENT

    00A5 39 80 000A               437          TBF    SYSFG2,PRO                  * * --NOT END OF PROCESS
    00A9 F2 10 04                 438          JT     SETM20                      * * * ***
    00AC C0 87 00A1               439          B      SETM10                      * * * WAIT
                           00B0   440 SETM20   EQU    *                           * * END DO UNTIL
    00B0 C0 87 0022               441          B      XMNCOM                      * * CALL COMM TERMINATION ROUTINE
                                  442 *        SWAIT  TIME-MINCMD                 * * PAUSE
    00B4 0D 2E 0200 0200          443+         CLC    512(MINCMD),512
    00BA C0 87 0014               444          B      XMPLNB                      * * POLL UNTIL NOT BUSY
    00BE C0 87 01FD               445          B      PIA998                      * * SET DEVICE END & END CASE 2

                           00C2   447 XMSETA   EQU    *                           * * CASE 2 - SET ADDRESS - CMD='02'
                           00C2   448 SETA10   EQU    *                           * * DO UNTIL ADDRESS IS SET OR EOP
    00C2 3C 04 0002               449          MVI    CMDPIA,SETADD               * * * LOAD SET ADD CMD IN GBL VAR
    00C6 1E 00 0002 0A            450          ALC    CMDPIA,CMDMOD(1,XR1)        * * * SET ADDRESS IN GLOBAL VARIABLE
    00CB C0 87 001A               451          B      XMTMT                       * * * TRANSMIT ONE
                                  452 *        SWAIT  TIME-MINCMD                 * * * DELAY FOR SETTING OF ADDRESS
    00CF 0D 2E 0200 0200          453+         CLC    512(MINCMD),512
                                  454 *                                           * * * SET ADDRESSING TO NEW ADDRESS
    00D5 C0 87 0016               455          B      XMSHFT                      * * * (SHIFT COMMAND MODIFIER BITS)
    00D9 C2 01 0000               456          LA     TCMNDF,XR1                  * * * (SET REFERENCE POINTER)
                                  457 *        STR    R1-RCNTR,B-1,DISP-0         * * * (SAVE NON-ADDRESS BITS)
    00DD 72                00DD   458+         DC     IL1'114'                    +
    00DE 62                00DE   459+         DC     AL1(RCNTR)                  +
    00DF 00                00DF   460+         DC     AL1(0)                      +
    00E0 78 07 00                 461          SBF    0(,XR1),STATN               * * * (CLEAR STATION ADDRESS)
    00E3 5E 00 00 01              462          ALC    0(1,XR1),1(,XR1)            * * * (LOAD NEW STATION ADDRESS)
                                  463 *        LR     R1-RCNTR,B-1,DISP-0         * * * (LOAD NEW ADDRESS IN HARDWARE)
    00E7 73                00E7   464+         DC     IL1'115'                    +
    00E8 62                00E8   465+         DC     AL1(RCNTR)                  +
    00E9 00                00E9   466+         DC     AL1(0)                      +
    00EA C0 87 0014               467          B      XMPLNB                      * * * POLL UNTIL NOT BUSY
    00EE 35 01 0001               468          L      CBPROC,XR1                  * * * RESTORE POINTER TO CONTROL BLK
    00F2 70 93 05                 469          CLI    ERROR(,XR1),LINEPE          * * * IF PARITY ERROR OR
    00F5 F2 81 07                 470          JE     SETA15                      * * * ***
    00F8 38 20 000A               471          TBN    SYSFG2,POLRSP               * * * --NO RESPONSE
    00FC F2 10 0C                 472          JT     SETA20                      * * * * ***
                           00FF   473 SETA15   EQU    *                           * * * * ***
    00FF 3C 22 0002               474          MVI    CMDPIA,RSTIMA               * * * * LOAD RESET IMA IN GBL VAR
    0103 C0 87 001A               475          B      XMTMT                       * * * * TRANSMIT ONE FRAME
    0107 3B 20 000A               476          SBF    SYSFG2,POLRSP               * * * * RESET POLL RESPONSE FLAG
                           0108   477 SETA20   EQU    *                           * * * ELSE, CONTINUE
                                  478 *        BOB    R1-RTWST,I2-PE,ADD-SETA10   * * --CHECK PARITY ERROR
    010B C4                010B   479+         DC     IL1'196'                    +
    010C 61                010C   480+         DC     AL1(RTWST)                  +
    010D 40                010D   481+         DC     AL1(PE)                     +
    010E 00C2              010F   482+         DC     AL2(SETA10)                 +
    0110 38 20 000A               483          TBN    SYSFG2,POLRSP               * * --CHECK END OF PROCESS
    0114 F2 90 11                 484          JF     SETA30                      * * * ***
    0117 39 80 000A               485          TBF    SYSFG2,PRO                  * * * ***
    011B F2 90 0A                 486          JF     SETA30                      * * * ***
    011E 7C C0 00                 487          MVI    DEVICE(,XR1),DEVIO          * * * CLEAR CONTROL BITS
    0121 7C 00 06                 488          MVI    FAIL(,XR1),CLEAR            * * * CLEAR FAILURE BITS
    0124 C0 87 00C2               489          B      SETA10                      * * * ***
                           0128   490 SETA30   EQU    *                           * * END DO UNTIL
    0128 38 80 000A               491          TBN    SYSFG2,PRO                  * * IF END OF PROCESS
    012C F2 10 06                 492          JT     SETA40                      * * * ***
    012F 7C 95 05                 493          MVI    ERROR(,XR1),HDWECK          * * * SET IMA HARDWARE CHECK
    0132 F2 87 C1                 494          J      PIA997                      * * * SET UNIT CK & DEVICE END
                           0135   495 SETA40   EQU    *                           * * ELSE, CONTINUE
    0135 C0 87 0022               496          B      XMNCOM                      * * BRANCH TO RESET COMM
    0139 C0 87 01F0               497          B      PIA998                      * * SET DEVICE END & END CASE 2

                           013D   499 XMRST    EQU    *                           * * CASE 3 - RESET - CMD='03'
                           013D   500 XMRSTI   EQU    *                           * * CASE 14 - RESET IMA - CMD='0E'
    013D C0 87 0015               501          B      XMSEND                      * * SEND ONE FRAME
    0141 C0 87 01FD               502          B      PIA998                      * * SET DEVICE END & END CASE 3,14
                                  503 ****************************************************************
                                  504 ****************************************************************
                           0145   505 XMLNAC   EQU    *                           * * CASE 13 - LINE ACTIVATE - CMD='D'
    0145 C0 87 001A               506          B      XMTMT                       * * TRANSMIT ONE FRAME
    0149 C0 87 01FD               507          B      PIA998                      * * SET DEVICE END & END CASE 13
                                  508 ****************************************************************
                                  509 ****************************************************************
                           014D   510 XMRDID   EQU    *                           * * CASE 4 - READ ID - CMD='04'
                           014D   511 XMRDIB   EQU    *                           * * CASE 5 - READ IOB - CMD='05'
                           014D   512 XMRDBF   EQU    *                           * * CASE 6 - READ BUFFER - CMD='06'
    014D 3B 10 000A               513          SBF    SYSFG2,CSD                  * * SET CYCLE STEAL 'IN' FLAG
    0151 F2 87 04                 514          J      RDWT00                      * * ***
                           0154   515 XMWTIB   EQU    *                           * * CASE 7 - WRITE IOB - CMD='07'
                           0154   516 XMWTBF   EQU    *                           * * CASE 8 - WRITE BUFFER - CMD='08'
    0154 3A 10 000A               517          SBN    SYSFG2,CSD                  * * SET CYCLE STEAL 'OUT' FLAG
                           0158   518 RDWT00   EQU    *                           * * ***
    0158 1E 00 0002 0A            519          ALC    CMDPIA,CMDMOD(1,XR1)        * * IDENTIFY QUEUE
    015D C0 87 0015               520          B      XMSEND                      * * SEND WRITE COMMAND
    0161 39 80 000A               521          TBF    SYSFG2,PRO                  * * IF NOT END OF PROCESS
    0165 35 01 0001               522          L      CBPROC,XR1                  * * RESTORE POINTER TO CONTROL BLOCK
    0169 F2 10 39                 523          JT     RDWT20                      * * * ***
                                  524 *        SWAIT  TIME-MINCMD                 * * * WAIT
    016C 0D 2E 0200 0200          525+         CLC    512(MINCMD),512
    0172 C0 87 0007               526          B      INTON                       * * * TURN ON INTERRUPTS
    0176 1C 01 000E 04            527          MVC    TMPADD,DATAP(2,XR1)         * * * LOAD CYCLE STEAL TEMP ADDRESS
    017B 1C 01 000F 0C            528          MVC    TMPLEN,MAXBC(2,XR1)         * * * LOAD CYCLE STEAL TEMP LENGTH
    0180 38 10 000A               529          TBN    SYSFG2,CSD                  * * * IF READ OPERATION
    0184 F2 10 0F                 530          JT     RDWT10                      * * * * ***
    0187 3C 02 0008               531          MVI    STATE,MXST1                 * * * * CHANGE TO READ STATE
    018B 3C 00 0002               532          MVI    CMDPIA,ACTR                 * * * * SET FIRST CMD TO SATELLITE
    018F C0 87 0019               533          B      XMSIRM                      * * * * SEND ONE, RECEIVE MANY FRAMES
    0193 F2 87 15                 534          J      RDWT30                      * * * * ***
                           0196   535 RDWT10   EQU    *                           * * * ELSE,
    0196 3C 04 0008               536          MVI    STATE,MXST2                 * * * * CHANGE TO WRITE STATE
    019A 3C 01 0002               537          MVI    CMDPIA,ACTW                 * * * * SET FIRST CMD TO SATELLITE
    019E C0 87 0017               538          B      XMSM                        * * * * SEND MULTIPLE FRAMES
    01A2 F2 87 06                 539          J      RDWT30                      * * * * ***
                                  540 *                                           * * * END IF
                           01A5   541 RDWT20   EQU    *                           * * ELSE,
    01A5 7C 95 05                 542          MVI    ERROR(,XR1),HDWECK          * * * SET IMA HARDWARE CHECK ERROR
    01A8 F2 87 48                 543          J      PIA997                      * * * SET UNIT CK & DEVICE END & END
                           01AB   544 RDWT30   EQU    *                           * * END IF
    01AB F2 87 53                 545          J      PIA999                      * * END CASE 7 OR 8
                           01AE   547 XMPOLL   EQU    *                           * * CASE 9 - POLL - CMD='09'
    01AE C0 87 0014               548          B      XMPLNB                      * * POLL UNTIL NOT BUSY
    01B2 F2 87 48                 549          J      PIA998                      * * SET DEVICE END & END CASE 9
                                  550 ****************************************************************
                                  551 ****************************************************************
                           01B5   552 XMPRPE   EQU    *                           * * CASE 10 - POLL RST PARITY - CMD=A
                           01B5   553 XMPACK   EQU    *                           * * CASE 11 - POLL ACK -CMD='0B'
    01B5 C0 87 0013               554          B      XMPLLX                      * * POLL
                                  555 *        SWAIT  TIME-MINCMD                 * * WAIT FOR POLL RESPONSE
    01B9 0D 2E 0200 0200          556+         CLC    512(MINCMD),512
    01BF C0 87 0014               557          B      XMPLNB                      * * POLL UNTIL NOT BUSY
    01C3 F2 87 37                 558          J      PIA998                      * * SET DEVICE END & END CASE A OR B
                                  559 ****************************************************************
                                  560 ****************************************************************
                           01C6   561 XMCLR    EQU    *                           * * CASE 12 - CLR QUEUE - CMD='0C'
    01C6 1E 00 0002 0A            562          ALC    CMDPIA,CMDMOD(1,XR1)        * * IDENTIFY QUEUE
    01CB C0 87 0015               563          B      XMSEND                      * * SEND ONE FRAME
    01CF F2 87 28                 564          J      PIA998                      * * SET DEVICE END & END CASE 12
                                  565 ****************************************************************
                                  566 ****************************************************************
                           01D2   567 XMMNLN   EQU    *                           * * CASE 15 - MONITOR LINE - CMD='0F'
    01D2 C2 01 0003               568          LA     CMDPTB,XR1                  * * CANCEL EOP MONITOR
    01D6 C0 87 001E               569          B      XXTXCL                      * * ***
                                  570 *                                           * * QUEUE 5 SEC DELAY
    01DA C2 01 0003               571          LA     CMDPTB,XR1                  * * (POINT TO CONTROL BLOCK)
    01DE 4C 03 05 020C            572          MVC    LRA(4,XR1),FVSAD            * * (LOAD RETURN ADD AND TIME DELTA)
                                  573 *        OR     R1-RCNTR,I2-TBPR7           * TURN ON CONTROL REGISTER
    01E3 FA                01E3   574+         DC     IL1'250'                    +
    01E4 62                01E4   575+         DC     AL1(RCNTR)                  +
    01E5 A7                01E5   576+         DC     AL1(TBPR7)                  +
                                  577 *        AND    R1-RTWST,I2-RLM             * * (RESET LINE MONITOR)
    01E6 F8                01E6   578+         DC     IL1'248'                    +
    01E7 61                01E7   579+         DC     AL1(RTWST)                  +
    01E8 DF                01E8   580+         DC     AL1(RLM)                    +
    01E9 C0 87 001D               581          B      XXTREQ                      * * QUEUE REQUEST
    01ED F2 87 11                 582          J      PIA999                      * * END CASE 15
                                  583 ****************************************************************
                                  584 ****************************************************************
                           01F0   585 XMERR    EQU    *                           * * CASE 0 - ERROR - CMD ='01'-'0F'
    01F0 7C 94 05                 586          MVI    ERROR(,XR1),CMDINV          * * SET INVALID COMMAND ERROR
    01F3 F2 87 00                 587          J      PIA997                      * * SET UNIT CHK & DEVICE END AND END
```

```
        XXPIA - PRIMARY INTERNACHINE ADAPTER ROUTINE
ERR LOC  OBJECT CODE      ADDR STMT SOURCE STATEMENT
                          01F6  589 PIA997 EQU   *
    01F6 35 01 0001             590        L     CBPROC,XR1              * SET POINTER TO CONTROL BLOCK
    01FA 7A 08 00               591        SBN   DEVICE(,XR1),UC         * SET UNIT CHECK
                          01FD  592 PIA998 EQU   *
    01FD C0 87 0010             593        B     XMDE                    * SET DEVICE END
                          0201  594 PIA999 EQU   *                       END CASE
    0201 C0 87 001C             595        B     XXRRTN                  RESTORE REGISTERS AND RETURN
                                596 *
    0205 00A5             0206  597        DC    XL2'0A5'                * COMMAND PROCESS MAX TIME DELAY
    0207 0011             0208  598 CPEPAD DC    AL2(XMEOP)              ADDRESS OF EOP ROUTINE
                                599 *
    0209 0113             020A  600 DLY5SC DC    XL2'0113'               * MAX TIME TO PROCESS A CONTROL BLOCK
    020B 001B             020C  601 FVSAD  DC    AL2(XM5SML)             ADDRESS OF 5 SECOND MONITOR LINE
                                602 *
                          020D  603 CMDTBL EQU   *
    020D 01               020D  604        DC    AL1(CSETM)              SET MODE MODE CODE
    020E 13               020E  605        DC    AL1(SETMOD)             SET MODE COMMAND
    020F 0092             0210  606        DC    AL2(XMSETM)             SET MODE ROUTINE ADDRESS
    0211 02               0211  607        DC    AL1(CSETA)              SET ADDRESS CODE
    0212 04               0212  608        DC    AL1(SETADD)             SET ADDRESS COMMAND
    0213 00C2             0214  609        DC    AL2(XMSETA)             SET ADDRESS ROUTINE ADDRESS
    0215 03               0215  610        DC    AL1(CRST)               RESET CODE
    0216 02               0216  611        DC    AL1(RESET)              RESET COMMAND
    0217 013D             0218  612        DC    AL2(XMRST)              RESET ROUTINE ADDRESS
    0219 04               0219  613        DC    AL1(CRDID)              READ DEVICE ID CODE
    021A 0C               021A  614        DC    AL1(READDI)             READ DEVICE ID COMMAND
    021B 014D             021C  615        DC    AL2(XMRDID)             READ DEVICE ID ROUTINE ADDRESS
    021D 05               021D  616        DC    AL1(CRDIB)              READ IDB CODE
    021E 08               021E  617        DC    AL1(READI)              READ IDB COMMAND
    021F 014D             0220  618        DC    AL2(XMRDIB)             READ IDB ROUTINE ADDRESS
    0221 06               0221  619        DC    AL1(CRDBF)              READ BUFFER CODE
    0222 18               0222  620        DC    AL1(READB)              READ BUFFER COMMAND
    0223 014D             0224  621        DC    AL2(XMRDBF)             READ BUFFER ROUTINE ADDRESS
    0225 07               0225  622        DC    AL1(CWTIB)              WRITE IDB CODE
    0226 0E               0226  623        DC    AL1(WRITEI)             WRITE IDB COMMAND
    0227 0154             0228  624        DC    AL2(XMWTIB)             WRITE IDB ROUTINE ADDRESS
    0229 08               0229  625        DC    AL1(CWTBF)              WRITE BUFFER CODE
    022A 1E               022A  626        DC    AL1(WRITEB)             WRITE BUFFER COMMAND
    022B 0154             022C  627        DC    AL2(XMWTBF)             WRITE BUFFER ROUTINE ADDRESS
    022D 09               022D  628        DC    AL1(CPOLL)              POLL CODE
    022E 10               022E  629        DC    AL1(POLL)               POLL COMMAND
    022F 01AE             0230  630        DC    AL2(XMPOLL)             POLL ROUTINE ADDRESS
    0231 0A               0231  631        DC    AL1(CPRPE)              POLL RESET PARITY CODE
    0232 50               0232  632        DC    AL1(POLLR)              POLL RESET PARITY COMMAND
    0233 01B5             0234  633        DC    AL2(XMPRPE)             POLL RESET PARITY ROUTINE ADDRESS
    0235 0B               0235  634        DC    AL1(CPACK)              POLL ACKNOWLEDGE CODE
    0236 30               0236  635        DC    AL1(POLLA)              POLL ACKNOWLEDGE COMMAND
    0237 01B5             0238  636        DC    AL2(XMPACK)             POLL ACKNOWLEDGE ROUTINE ADDRESS
    0239 0C               0239  637        DC    AL1(CCLR)               CLEAR QUEUE CODE
    023A 12               023A  638        DC    AL1(CLER)               CLEAR QUEUE COMMAND
    023B 01C6             023C  639        DC    AL2(XMCLR)              CLEAR QUEUE ROUTINE ADDRESS
    023D 0D               023D  640        DC    AL1(CLNAC)              LINE ACTIVATE CODE
    023E 10               023E  641        DC    AL1(POLL)               LINE ACTIVATE COMMAND
    023F 0145             0240  642        DC    AL2(XMLNAC)             LINE ACTIVATE ROUTINE ADDRESS
    0241 0E               0241  643        DC    AL1(CRSTI)              RESET IMA CODE
    0242 22               0242  644        DC    AL1(RSTIMA)             RESET IMA COMMAND
    0243 0130             0244  645        DC    AL2(XMRSTI)             RESET IMA ROUTINE ADDRESS
    0245 0F               0245  646        DC    AL1(CMNLN)              MONITOR LINE CODE
    0246 10               0246  647        DC    AL1(POLL)               MONITOR LINE COMMAND
    0247 0102             0248  648        DC    AL2(XMMNLN)             MONITOR LINE ROUTINE ADDRESS
    0249 00               0249  649        DC    AL1(ERPROC)             ERROR CODE
    024A 10               024A  650        DC    AL1(POLL)               ERROR COMMAND  (FILL)
    024B 01F0             024C  651        DC    AL2(XMERR)              ERROR ROUTINE ADDRESS
                          0000  652        END   XXPIA                   END OF MODULE
TOTAL STATEMENTS IN ERROR IN THIS ASSEMBLY =     0

        XXSIA - SECONDARY INTERMACHINE ADAPTER QUEUEING ROUTINE     D. MAY
ERR LOC  OBJECT CODE      ADDR STMT SOURCE STATEMENT
    0000                          2 XXSIA  START
                                  3 *
                                  4 *
                          008F    5        ENTRY STXMAD                  ADDRESS OF XXSTXM
                                  6 *
                          0001    7        EXTRN SYSFLG                  SYSTEM FLAG
                          0002    8        EXTRN SIAQTB                  SIA QUEUE TABLE
                          0003    9        EXTRN SIASR                   SIA SAVE REGISTER
                          0004   10        EXTRN SIAT2F                  STORAGE AREA, FIRST BYTE
                          0005   11        EXTRN SIATP2                  SIA TEMPORARY VARIABLE - 2 BYTES
                          0006   12        EXTRN SIAINX                  SIA INDEX
                          0007   13        EXTRN SIATMP                  SIA TEMPORARY VARIABLE
                          0008   14        EXTRN X0000                   CONSTANT - X'0000'
                          0009   15        EXTRN X0001                   CONSTANT - X'0001'
                          000A   16        EXTRN XSSTXM                  TIME BOMB PROCESSING
                          000B   17        EXTRN XSQOF                   QUEUE BITS OFF ROUTINE
                          000C   18        EXTRN XXCONS                  ROS CONSTANTS
                          000D   19        EXTRN XXRRTN                  SVC RETURN ROUTINE
                          000E   20        EXTRN XXTREQ                  QUEUING ROUTINE
                                 21 *
                                 22 *      SEQU
                                 23+*
                                 24+*  REGISTER DEFINITION
                                 25+*
                          0001   26+XR1    EQU   1                       INDEX REGISTER 1
                          0002   27+XR2    EQU   2                       INDEX REGISTER 2
                          0008   28+ARR    EQU   8                       ADDRESS REGISTER SET ON BRANCH
                          0010   29+IAR    EQU   X'10'                   INSTRUCTION ADDRESS REGISTER
                          000C   30+RCSCW  EQU   X'0C'                   CYCLE STEAL WORD
                          000D   31+RCSADR EQU   X'0D'                   CYCLE STEAL ADDRESS
                          00FE   32+MASKR  EQU   X'FE'                   INTERRUPT MASK REGISTER
                                 33+*
                                 34+*  BIT PATTERNS
                                 35+*
                          0000   36+OFF    EQU   X'00'
                          0080   37+BIT0   EQU   X'80'
                          0040   38+BIT1   EQU   X'40'
                          0020   39+BIT2   EQU   X'20'
                          0010   40+BIT3   EQU   X'10'
                          0008   41+BIT4   EQU   X'08'
                          0004   42+BIT5   EQU   X'04'
                          0002   43+BIT6   EQU   X'02'
                          0001   44+BIT7   EQU   X'01'
                          007F   45+NBIT0  EQU   X'7F'
                          00BF   46+NBIT1  EQU   X'BF'
                          00DF   47+NBIT2  EQU   X'DF'
                          00EF   48+NBIT3  EQU   X'EF'
                          00F7   49+NBIT4  EQU   X'F7'
                          00FB   50+NBIT5  EQU   X'FB'
                          00FD   51+NBIT6  EQU   X'FD'
                          00FE   52+NBIT7  EQU   X'FE'
                          00FF   53+ON     EQU   X'FF'
                                 54+*
                                 55+*  IMMEDIATE FIELDS
                                 56+*
                          0000   57+LAST   EQU   OFF                     LAST QUEUE ENTRY
                          0080   58+DPSET  EQU   BIT0                    SET DISPATCH PROCESS
                          0000   59+SIACBF EQU   X'00'                   SIA CONTROL BLOCK FILL
                          0000   60+CLEAR  EQU   OFF                     ZERO FILL
                          0010   61+SIAILF EQU   X'10'                   SIA I/O BUFFER LENGTH FILL
                          0008   62+MASK8  EQU   BIT4                    MASK 8'S DIGIT
                          0007   63+MSK421 EQU   X'07'                   MASK DIGITS 4,2,1
                          00F8   64+NBT421 EQU   X'F8'                   MASK ALL DIGITS BUT 4,2,1
                          0001   65+MASK1  EQU   BIT7                    MASK 1'S DIGIT
                          0010   66+MSK16  EQU   BIT3                    MASK 16TH'S DIGIT
                          00F8   67+MAXTD  EQU   X'F8'                   MAXIMUM TIME DELTA
                          00E0   68+CPROCD EQU   X'F0'                   CLEAR QUEUE PROCESSING DONE
                                 69+*
                                 70+*  QUEUE ENTRY OFFSETS
                                 71+*
```

```
    XXSIA - SECONDARY INTERMACHINE ADAPTER QUEUEING ROUTINE
ERR LOC  OBJECT CODE      ADDR STMT SOURCE STATEMENT

                          0000   72+LF      EQU   0                       LINK FIRST BYTE
                          0001   73+LL      EQU   1                       LINK LAST BYTE
                          0003   74+TD      EQU   3                       TIME DELTA
                          0005   75+RT      EQU   5                       RETURN ADDRESS
                                 76+*
                                 77+*  LENGTHS OF QUEUE ENTRIES
                                 78+*
                          0002   79+LKL     EQU   LL+1                    LINK LENGTH
                          0002   80+TDL     EQU   TD-LL                   TIME DELTA LENGTH
                          0002   81+RTL     EQU   RT-TD                   RETURN LENGTH
                                 82+*
                                 83+*  QUEUE HEAD CONTROL BLOCK LENGTH
                                 84+*
                          0002   85+DS      EQU   2                       DISPATCH POINTER LENGTH
                          0002   86+DC      EQU   2                       DECREMENT POINTER LENGTH
                          0001   87+EQU     EQU   1                       INDEX BYTE LENGTH
                                 88+*
                                 89+*  STACK OFFSETS
                                 90+*
                          0001   91+AKE     EQU   1                       ADDRESS ENTRY IN STACK
                          0003   92+TDE     EQU   3                       RJC3 TIME DELTA OFFSET
                          0003   93+LSR     EQU   3                       LINK SAVE REGISTER
                                 94+*
                                 95+*  CONTROL BLOCK OFFSETS
                                 96+*
                          0009   97+LLR     EQU   9                       LINK NUMBER OF LOGICAL RECORDS
                          0002   98+LCB     EQU   2                       LINK CONTROL BITS
                          0007   99+LERS    EQU   7                       SIA CONTROL BLOCK ERROR CODE
                          0003  100+LQUE    EQU   3                       LINK QUEUE CODE OF SIA CB
                          0005  101+LRA     EQU   5                       LINK RETURN ADDRESS
                          0003  102+LTD     EQU   3                       LINK TIME DELTA
                          0008  103+LTDS    EQU   8                       LINK TIME DELTA SAVE
                          000A  104+LTA     EQU   10                      LINK IOB ADDRESS IN SIA CB
                          000B  105+LIL     EQU   11                      LINK IOB LENGTH IN SIA CB
                          0006  106+LDAS    EQU   6                       LINK DATA ADDRESS IN SIA CB
                          000E  107+LTBS    EQU   14                      LINK TWIT BLOCK SIZE IN SIA CB
                          000C  108+LRL     EQU   12                      LINK NUMBER OF TWITS IN SIA CB
                          0010  109+LWB     EQU   16                      IOB RECEIVE BUFFER ADDRESS
                          0011  110+LTL     EQU   X'11'                   LINK TIME BOMB LINK
                          0016  111+LTRA    EQU   X'16'                   LINK TIME BOMB RETURN ADDRESS
                                112+*
                                113+*  STATE EQUATES
                                114+*
                          0000  115+XST0    EQU   0                       STATE 0  - INITIALIZATION
                          0002  116+XST1    EQU   2                       STATE 1  - ADDRESSING
                          0004  117+XST2    EQU   4                       STATE 2  - MODE
                          0006  118+XST3    EQU   6                       STATE 3  - COMMAND ACCEPTANCE
                          0008  119+XST4    EQU   8                       STATE 4A - READ IOB
                          000A  120+XST5A   EQU   10                      STATE 5A - WRITE IOB
                          000C  121+XST5B   EQU   12                      STATE 5B - WRITE BUFFER
                                122+*
                                123+*       BUSY2 EQUATES
                                124+*
                          0080  125+FILEBY  EQU   BIT0                    FILE IS BUSY
                          0040  126+IMABSY  EQU   BIT1                    IMA IS BUSY
                                127+*
                                128+*  I/O REGISTER SYMBOLS
                                129+*
                          0029  130+RLED    EQU   X'29'                   MEDIA AVAILABLE LED REGISTER
                          0060  131+RCYST   EQU   X'60'                   CYCLE STEAL
                          0060  132+RFRAME  EQU   X'60'                   FRAME BUFFER
                          0061  133+RTWST   EQU   X'61'                   TWINAX STATUS REGISTER
                                134+*******************************************************************
                                135+*******************************************************************
                          0062  136+RCNTR   EQU   X'62'                   CONTROL REGISTER
                          0063  137+RBSST   EQU   X'63'                   BASE STATUS
                          0064  138+RQUES   EQU   X'64'                   QUEUE STATUS
                          0065  139+RCMDB   EQU   X'65'                   COMMAND BUFFER
                                140+*
                                141+*   MEDIA AVAILABLE LED
                                142+*
                          0004  143+MAL     EQU   BIT5                    MEDIA AVAILABLE LED BIT
                          00FB  144+RMA     EQU   NBIT5                   RESET MEDIA AVAILABLE LED BIT
                                145+*
                                146+*        CONTROL REGISTER X'62' BIT DEFINITIONS
                                147+*
                          0080  148+POTB    EQU   BIT0                    POWER ON TRANSITION
                          00A0  149+TBPR    EQU   X'A0'                   2 BYTE POLL RESPONSE
                          00C0  150+RACT    EQU   X'C0'                   READ ACTIVATE
                          00E0  151+WACT    EQU   X'E0'                   WRITE ACTIVATE
                          0020  152+SONE    EQU   X'20'                   SEND ONE COMMAND FOR CONTROL REG
                          001F  153+NULL    EQU   X'1F'                   NULL
                          001F  154+BRST    EQU   X'1F'                   BIT RESET OF BITS 0,1,2
                          0008  155+PORT1   EQU   BIT4                    I/O PORT 1
                          008F  156+ONEBP   EQU   POTB+PORT1+7            1 BYTE POLL RESPONSE,PORT1,STAT7
                                157+* * * * * * * **  IMA HARDWARE REQUIRES TWO BYTE POLL RESP * * * * * * *
                          00A8  158+CNTR    EQU   TBPR+PORT1              PWR ON TRANSITION AND PORT 1
                                159+* * * * * * * **  IMA HARDWARE REQUIRES TWO BYTE POLL RESP * * * * * * *
                          00AF  160+CNTR7   EQU   CNTR+7                  P.O.T., PORT 1, ADDR. 7
                                161+*
                          008F  162+POT17   EQU   POTB+PORT1+7            P.O.T.,ADDR7,PORT 1
                                163+*  CYCLE STEAL COMBINATION FLAGS
                                164+*
                          00FF  165+ALL     EQU   ON                      CYCLE STEAL BITS IN SIA REQUEST
                          00FF  166+ANY     EQU   ON                      BITS SET IN 'FILE' C/S REQUEST
                                167+*
                                168+*  TWINAX STATUS REGISTER X'61' BIT DEFINITIONS
                                169+*
                          0080  170+PD      EQU   BIT0                    LINE PARITY DISPLAY
                          0040  171+PE      EQU   BIT1                    PARITY ERROR
                          0020  172+LM      EQU   BIT2                    LINE MESSAGE MONITOR
                          0010  173+AM      EQU   BIT3                    ADDRESS MISMATCH
                          0008  174+CQ      EQU   BIT4                    COMMAND QUEUED
                          0004  175+TM      EQU   BIT5                    TRANSMISSION MONITOR
                          0002  176+DT      EQU   BIT6                    DATA STREAM TERMINATION DELIMITE
                          0001  177+CS      EQU   BIT7                    CYCLE STEAL
                          0008  178+SI      EQU   BIT4                    SEND ONE IN TWINAX STATUS REG.
                          0041  179+PECS    EQU   PE+CS                   PARITY ERROR OR CYCLE STEAL
                          0003  180+CD      EQU   CS+DT                   CYCLE STEAL AND DSTD
                          007F  181+RPD     EQU   NBIT0                   RESET LINE PARITY DISPLAY
                          00BF  182+RPE     EQU   NBIT1                   RESET PARITY ERROR
                          00DF  183+RLM     EQU   NBIT2                   RESET LINE MESSAGE MONITOR
                          00EF  184+RAM     EQU   NBIT3                   RESET ADDRESS MISMATCH
                          00F7  185+RCQ     EQU   NBIT4                   RESET COMMAND QUEUED
                          00FB  186+RTM     EQU   NBIT5                   RESET TRANSMISSION MONITOR
                          00FD  187+RDS     EQU   NBIT6                   RESET DATA STREAM TERMINATION DE
                          00FE  188+RCS     EQU   NBIT7                   RESET CYCLE STEAL
                          00FC  189+RCD     EQU   ON-CS-DT                RESET CYCLE STEAL AND DSTD
                          00F3  190+RCTM    EQU   ON-CQ-TM                RESET QUEUED - XMITTION MONITOR
                          00A4  191+RALI    EQU   ALL-PE-CS-DT-AM-CQ      RESET ALL INTERRUPT BITS
                          00F5  192+RQD     EQU   ON-CQ-DT                RESET CMND QUEUED + DSTD
                                193+*
                                194+*  GPOST COMMANDS
                                195+*
                          0000  196+ACTR    EQU   X'00'                   ACTIVATE READ
                          0001  197+ACTW    EQU   X'01'                   ACTIVATE WRITE
                          0002  198+RESET   EQU   X'02'                   RESET
                          0004  199+SETADD  EQU   X'04'                   SET ADDRESS
                          0008  200+READI   EQU   X'08'                   READ IOB
                          000C  201+READDI  EQU   X'0C'                   READ DEVICE ID
                          000E  202+WRITEI  EQU   X'0E'                   WRITE IOB
                          0010  203+POLL    EQU   X'10'                   POLL
                          0022  204+RSTIMA  EQU   X'22'                   RESET IMA
                          0030  205+POLLA   EQU   X'30'                   POLL WITH ACKNOWLEDGE
                          0050  206+POLLR   EQU   X'50'                   POLL WITH RESET PARITY
                          0012  207+CLER    EQU   X'12'                   CLEAR QUEUE
                          0013  208+SETMOD  EQU   X'13'                   SET MODE
                          0018  209+READB   EQU   X'18'                   READ BUFFER
                          001E  210+WRITEB  EQU   X'1E'                   WRITE BUFFER
                                211+*
                                212+*  COMMAND MNEMONICS FOR EXCEPTION STATUS PROCESSING
                                213+*
```

```
XXSIA - SECONDARY INTERMACHINE ADAPTER QUEUEING ROUTINE
ERR LOC  OBJECT CODE       ADDR STMT SOURCE STATEMENT
                           0000 214+AR      EQU   ACTR                         ACTIVATE READ
                           0001 215+AW      EQU   ACTW                         ACTIVATE WRITE
                                216+*
                                217+*  MASK FOR MASKING OFF COMMAND MODIFIER BITS
                                218+*
                           00E0 219+NCMND   EQU   X'E0'                        NON COMMAND BITS
                                220+*
                                221+*  CYCLE STEAL CONTROL BITS
                                222+*
                           00C0 223+READCS  EQU   X'C0'                        CYCLE STEAL READ/ENABLE
                           0040 224+WRTECS  EQU   X'40'                        CYCLE STEAL WRITE/ENABLE
                                225+*
                                226+*
                                227+*  EXCEPTION STATUS FOR THE BASE STATUS REGISTER X'63'
                                228+*
                           0000 229+CES     EQU   X'00'                        CLEAR EXCEPTION STATUS
                           00F1 230+NEX     EQU   X'F1'                        NO EXCEPTION
                           0002 231+ATL     EQU   X'02'                        ACTIVATTE LOST
                           0004 232+INA     EQU   X'04'                        INVALID ACTIVATE
                           0006 233+RES     EQU   X'06'                        RESERVED
                           0008 234+INC     EQU   X'08'                        INVALID COMMAND
                           000A 235+STV     EQU   X'0A'                        STORAGE OVERRUN
                           000C 236+QUE     EQU   X'0C'                        QUEUE EMPTY
                           000E 237+POT     EQU   X'0E'                        POWER ON TRANSITION
                           00F1 238+CLR     EQU   X'F1'                        CLEAR MASK
                           0001 239+EVNODD  EQU   BIT7                         EVEN/ODD POLL RESPONSE
                           0008 240+ANM     EQU   INC                          ADDR MISMATCH = AN INVALID COMMA
                           000E 241+UESTBT  EQU   BIT4+BIT5+BIT6               UNIT EXCEPTION STATUS BITS
                                242+*
                                243+*
                                244+*  PARAMETER LIST DELIMITER
                                245+*
                           0000 246+END     EQU   OFF                          END OF PARAMETER LIST
                                247+*
                                248+*
                                249+*  ERROR OFFSETS INTO QUEUED SIA CONTROL BLOCKS
                                250+*
                           0002 251+SCB     EQU   2                            ID AND CONTROL BITS
                           0007 252+SER     EQU   7                            SIA ERROR BYTE
                                253+*
                                254+*  SYSTEM FLAG EQUATES
                                255+*
                           0080 256+DPF     EQU   BIT0                         DISPATCH PROCESSING FLAG
                           0040 257+UEF     EQU   BIT1                         UNIT EXCEPTION FLAG FOR CONTROL
                           0020 258+EXST    EQU   BIT2                         EXCEPTION STAUS FLAG
                           0010 259+RSTDEL  EQU   BIT3                         RANDOM DELAY COMPLETION FLAG
                           0008 260+MEDAV   EQU   BIT4                         MEDIA AVAILABLE FLAG
                           0002 261+MEDACT  EQU   BIT6                         MEDIA ACTIVITY FLAG
                           0001 262+CSF     EQU   BIT7                         CYCLE STEAL FLAG
                                263+*
                                264+*  SIA ERROR CODES
                                265+*
                           0071 266+HDWECK  EQU   X'71'                        IMA HARDWARE CHECK
                           0072 267+MSUNAV  EQU   X'72'                        MEDIA STATION UNAVAILABLE
                           0073 268+CLRQUE  EQU   X'73'                        CLEAR QUEUE
                           0077 269+SERTEX  EQU   X'77'                        SERVICE TIMEOUT EXCEEDED
                           0078 270+LENERR  EQU   X'78'                        LENGTH ERROR
                           0079 271+INVCMD  EQU   X'79'                        INVALID COMMAND
                                272+*
                                273+*  SIA CONTROL BLOCK 'CONTROL BIT' DEFINITIONS
                                274+*
                           0001 275+UE      EQU   BIT7                         UNIT EXCEPTION
                           0002 276+DE      EQU   BIT6                         DEVICE END
                           0008 277+UC      EQU   BIT4                         UNIT CHECK
                           000A 278+UCDE    EQU   UC+DE                        UNIT CHECK AND DEVICE END
                                279+*
                                280+*  NEW COMMAND EQUATES FOR SUBROUTINE LINKAGE
                                281+*
                           0022 282+MURST   EQU   RESET+BIT2                   MEDIA STATION UNAVAILABLE RESET
                           0022 283+STRST   EQU   RESET+BIT2                   SERVICE TIMEOUT UNAVAILABLE
                           0022 284+IMRST   EQU   RESET+BIT2                   IMA RESET COMMAND
                                285+*
                                286+*  COMMON DISPLACEMENTS USED FOR REGISTER DISPLACEMENTS ONLY
                                287+*
                           0001 288+ONE     EQU   1                            EQUATE 1
                           0002 289+TWO     EQU   2                            EQUATE 2
                           0003 290+THREE   EQU   3                            EQUATE THREE
                                291+*
                                292+*
                                293+*      QUEUE CONTROL BIT DEFINITION
                                294+*
                           0080 295+QBTFLG  EQU   BIT0                         QUEUE BITS FLAG
                                296+*
                                297+*  DIAGNOSTIC ROUTINE INTERRUPT LEVEL BIT
                                298+*
                           0004 299+IMALVL  EQU   BIT5                         IMA LEVEL INTERRUPT
                           00FB 300+NIMALV  EQU   NBIT5                        NOT IMA LEVEL INTERRUPT
                           00FB 301+IMAOFF  EQU   X'FB'                        IMA TURN OFF MASK
                           00FF 302+DEVMSK  EQU   X'FF'                        I/O DEVICE INTERRUPT MASK
                                303+*
                                304+*  COMMAND DELAYS
                                305+*
                           002F 306+MINCMD  EQU   X'2F'                        DELAY FOR COMMAND PROCESSING
                                307+*
                                308+*************  IMA HARDWARE ERROR  *************************************
                           0000 309+RRESET  EQU   X'00'                        IMA MODE SELECT
                                310+*************  IMA HARDWARE ERROR  *************************************
                                311           PRINT ON
0000 37 09 0001                 313           TBF   SYSFLG,MEDAV               IF MEDIA AVAILABLE
0004 F2 90 70                   314           JF    SIA400                     * ***
0007 34 01 0003                 315           ST    SIASR,XR1                  * SAVE POINTER TO RQCB
000B 4C 01 01 0006              316           MVC   LL(2,XR1),X0000            * SET FORWARD LINK OF RQCB
                           0010 317 SIA100  EQU   *                            * DO UNTIL INDEX REMAINS UNCHANGED
0010 0C 00 0007 0006            318           MVC   SIATMP(1),SIAINX           * * SAVE INDEX
0016 7C 00 02                   319           MVI   LCB(,XR1),SIACBF           * * CLEAR CONTROL BITS
0019 7C 00 07                   320           MVI   LERS(,XR1),CLEAR           * * CLEAR ERROR CODE
                                321 *                                          * * FIND PROPER QUEUE
001C C2 02 0002                 322           LA    SIAQTB,XR2                 * * (POINT TO TOP OF TABLE)
0020 78 F8 03                   323           SBF   LQUE(,XR1),NBT421          * * (INSURE VALID CODE)
0023 3C 00 0004                 324           MVI   SIAT2F,CLEAR               * * (CLEAR WORK AREA)
0027 1C 00 0005 03              325           MVC   SIATP2,LQUE(1,XR1)         * * (LOAD VALUE OF QUEUE)
002C 36 02 0005                 326           A     SIATP2,XR2                 * * (MOVE POINTER QUEUE X 1)
0030 36 02 0005                 327           A     SIATP2,XR2                 * * (MOVE POINTER QUEUE X 2)
                           0034 328 SIA200  EQU   *                            * * DO WHILE
0034 0D 00 00                   329           CLT   LF(,XR2),LAST              * * --NOT LAST ENTRY OR
0037 F2 81 0F                   330           JE    SIA300                     * * * ***
003A 2D 01 0003 01              331           CLC   SIASR,LL(2,XR2)            * * --NOT SAME ENTRY
003F F2 81 07                   332           JE    SIA300                     * * * ***
0042 85 02 01                   333           L     LL(,XR2),XR2               * * * MOVE ALONG LINK
0045 C0 87 0034                 334           B     SIA200                     * * * ***
                           0049 335 SIA300  EQU   *                            * * END DO WHILE
0049 84 01 01                   336           ST    LL(,XR2),XR1               * * CONCATENATE RQCB ONTO LINK
004C 0D 00 0007 0006            337           CLC   SIATMP(1),SIAINX           * * ***
0052 C0 01 0010                 338           BNE   SIA100                     * END DO UNTIL
0056 0E 00 0006 0009            339           ALC   SIAINX(1),X0001            * INCREMENT INDEX
005C 3C 00 0004                 340           MVI   SIAT2F,CLEAR               * CLEAR STORAGE AREA
0060 1C 00 0005 03              341           MVC   SIATP2,LQUE(1,XR1)         * LOAD STORAGE AREA WITH QUEUE
0065 3A 80 0005                 342           SBN   SIATP2,QBTFLG              * SET BITS ON FLAG
0069 35 01 0005                 343           L     SIATP2,XR1                 * LOAD VALUE OF QUEUE
006D C0 87 000B                 344           B     XSQBF                      * UPDATE QUEUE STATUS
0071 35 01 0003                 345           L     SIASR,XR1                  * RESTORE REGISTER
0075 4C 01 16 008F              346           MVC   LTRA(2,XR1),STXMAD         * LOAD RETURN ADDRESS
007A D2 01 11                   347           LA    LTL(,XR1),XR1              * SET POINTER TO RQCB
007D C0 87 000E                 348           B     XXIREQ                     * QUEUE REQUEST
0081 F2 87 06                   349           J     SIA500                     * ***
                           0084 350 SIA400  EQU   *                            ELSE,
0084 7A 0A 02                   351           SBN   LCB(,XR1),UCDE             * SET UNIT CHECK AND DEVICE END
0087 7C 72 07                   352           MVI   LERS(,XR1),MSUNAV          * SET MEDIA UNAVAILABLE ERROR
                           008A 353 SIA500  EQU   *                            END IF
                           008A 354 SIA999  EQU   *
008A C0 87 0000                 355           B     XXRRTN                     RESTORE REGISTERS AND RETURN
                                356 *
008E 000A                  008F 357 STXMAD  DC    AL2(XSSTXM)                ADDRESS OF XSSTXM
                           0000 358           END   XXSIA                      END OF MODULE

TOTAL STATEMENTS IN ERROR IN THIS ASSEMBLY =     0
```

```
      YYSTAM - SATELLITE CONTROLLED SECONDARY MODE
ERR LOC  OBJECT CODE       ADDR STMT SOURCE STATEMENT
    0000                      2 YYSTAM START
                              3 *
                              4 * CHANGED BRANCH TO PUR TO BRANCH TO XSC2TB
                              5 *
                              6 *
                              7 *
                              8 * CHANGE MASK FOR SETTING INTERRUPTS OFF
                              9 *
                             10 * YYSTAM - SATELLITE CONTROLLED SECONDARY MODE
                             11 ****************************************************************************
                             12 ****************************************************************************
                             13 *
                      00AA   14          ENTRY BUSYZ                    CYCLE STEAL FLAG
                      00AB   15          ENTRY FLAGR
                      00AC   16          ENTRY FLAGR2
                      00AE   17          ENTRY BUSADD                   BUS TABLE ADDRESS SAVE
                      00B0   18          ENTRY STATSV                   STATE TABLE ADDRESS SAVE
                             19 *
                      0001   20          EXTRN CB15SC                   15 SECOND CONTROL BLOCK
                      0002   21          EXTRN DEVIDA                   DEVICE ID TABLE
                      0003   22          EXTRN INTOFF                   INTERRUPT OFF ROUTINE
                      0004   23          EXTRN XSC2TB                   2 SEC TIME BOMB CANCEL
                      0005   24          EXTRN XSIMAI                   YYSIAM INITIALIZED ROUTINE
                      0006   25          EXTRN XXSIA                    SIA QUEUEING ROUTINE FOR YYSIAM
                      0007   26          EXTRN XXTXCL                   TIMER CANCEL ROUTINE
                             27 *
                             28 *        SEQY
                      0001   29+SM999    EQU    1                       INTERRUPT LEVEL RETURN LABEL
                      0003   30+YYSTAT   EQU    3                       IMA STATE TABLE
                      0005   31+YYSIAS   EQU    5                       IMA STATE VALUE
                      0007   32+TREQ     EQU    7                       OFFSET VALUE FOR XXTREQ
                      0009   33+TXCL     EQU    9                       OFFSET VALUE FOR XXTXCL
                      000B   34+RESTR    EQU    11                      OFFSET VALUE FOR RESTORE
                      000D   35+IMAIN    EQU    13                      OFFSET VALUE FOR INTON
                      000F   36+CSRF     EQU    15                      OFFSET VALUE FOR XSCSR
                      0011   37+CSWF     EQU    17                      OFFSET VALUE FOR XSCSW
                      0013   38+CSREQ    EQU    19                      OFFSET VALUE FOR BUSY2
                      0015   39+CSAD     EQU    21                      OFFSET VALUE FOR TMPADD
                      0017   40+CSCWO    EQU    23                      OFFSET VALUE FOR TMPLEN
                      0019   41+SYSFG    EQU    25                      OFFSET VALUE FOR SYSFG2
                      001B   42+IMAIF    EQU    27                      OFFSET VALUE FOR INTOFF
                             43+*
                      0000   44+XST0     EQU    0                       STATE 0 EQUATE
                      0002   45+XST1     EQU    2                       STATE 1 EQUATE
                      0003   46+XXRSTB   EQU    X'03'                   REQUEST CODE FOR XXRSTB
                             47          PRINT  ON
                             48 *
                             49 *        SEQUM
                             50+* * * * * * * * * * * * * * * * * * * * * * * * * * * * * * * * * * *
                             51+*
                             52+*  IMA LEVEL INTERRUPT
                             53+*
                             54+* * * * * * * * * * * * * * * * * * * * * * * * * * * * * * * * * * *
                      0004   55+IMALVL EQU  4                           IMA LEVEL INTERRUPT
                             56+* * * * * * * * * * * * * * * * * * * * * * * * * * * * * * * * * * *
                             57+*
                             58+*  REGISTER DEFINITIONS
                             59+*
                      0001   60+XR1      EQU    1                       INDEX REGISTER 1
                      0002   61+XR2      EQU    2                       INDEX REGISTER 2
                      0008   62+ARR      EQU    8                       ADDRESS REGISTER SET ON BRANCH
                      0010   63+IAR      EQU    X'10'                   INSTRUCTION ADDRESS REGISTER
                      000C   64+RCSCW    EQU    X'0C'                   CYCLE STEAL WORD
                      000D   65+RCSADR   EQU    X'0D'                   CYCLE STEAL ADDRESS
                      00FE   66+MASKR    EQU    X'FE'                   INTERRUPT MASK
                             67+*
                             68+*  BIT PATTERNS
                             69+*
                      0000   70+OFF      EQU    X'00'
                      0080   71+BIT0     EQU    X'80'
                      0040   72+BIT1     EQU    X'40'
                      0020   73+BIT2     EQU    X'20'
                      0010   74+BIT3     EQU    X'10'
                      0008   75+BIT4     EQU    X'08'
                      0004   76+BIT5     EQU    X'04'
                      0002   77+BIT6     EQU    X'02'
                      0001   78+BIT7     EQU    X'01'
                             79+*
      YYSTAM - SATELLITE CONTROLLED SECONDARY MODE
ERR LOC  OBJECT CODE       ADDR STMT SOURCE STATEMENT
                      007F   80+NBIT0    EQU    X'7F'
                      00BF   81+NBIT1    EQU    X'BF'
                      00DF   82+NBIT2    EQU    X'DF'
                      00EF   83+NBIT3    EQU    X'EF'
                      00F7   84+NBIT4    EQU    X'F7'
                      00FB   85+NBIT5    EQU    X'FB'
                      00FD   86+NBIT6    EQU    X'FD'
                      00FE   87+NBIT7    EQU    X'FE'
                      00FF   88+ON       EQU    X'FF'
                      00FF   89+ALL      EQU    ON
                      00FF   90+ANY      EQU    ON
                      0000   91+CLEAR    EQU    OFF
                      00C0   92+MSK01    EQU    BIT0+BIT1
                      0001   93+ONE      EQU    1                       EQUATE 1
                             94+*
                             95+****************************************************************************
                             96+*
                             97+*  XXPIA CONTROL BLOCK DEFINITIONS
                             98+*
                             99+***    FIELD LENGTHS
                            100+*
                      0000  101+LF       EQU    0                       LINK FIRST - FIRST BYTE OF LINK
                      0001  102+LL       EQU    1                       LINK LAST BYTE OF TWO BYTE FIELD
                      0003  103+LTD      EQU    3                       LINK TIME DELTA
                      0005  104+LRA      EQU    5                       LINK RETURN ADDRESS
                      0000  105+LFIRST   EQU    0                       FIRST BYTE NO OFFSET
                      0001  106+LDID     EQU    1                       LENGTH OF DEVICE ID
                      0001  107+LCMND0   EQU    1                       LENGTH OF COMMAND 0
                      0001  108+LCMND1   EQU    1                       LENGTH OF COMMAND 1
                      0002  109+LDATAP   EQU    2                       LENGTH OF DATA POINTER
                      0001  110+LERROR   EQU    1                       LENGTH OF ERROR CODE
                      0001  111+LFAIL    EQU    1                       LENGTH OF FAILURE CODE
                      0001  112+LSTAT    EQU    1                       LENGTH OF STATION ADDRESS
                      0001  113+LPRESP   EQU    1                       LENGTH OF POLL RESPONSE
                      0001  114+LQUEUE   EQU    1                       LENGTH OF QUEUE FIELD
                      0001  115+LCMDMD   EQU    1                       LENGHT OF COMMAND MODIFIER FIELD
                      0002  116+LMAXBC   EQU    2                       LENGTH OF MAXIMUM BYTE COUNT
                      0002  117+LRECBC   EQU    2                       LENGTH OF RECEIVED BYTE COUNT
                            118+*
                            119+***    LOCATION OFFSETS
                            120+*
                      0000  121+DEVICE   EQU    LFIRST                  DEVICE ID AND CODES
                      0001  122+CMND0    EQU    DEVICE+LDID             COMMAND BYTE 0
                      0002  123+CMND1    EQU    CMND0+LCMND0            COMMAND BYTE 1
                      0004  124+DATAP    EQU    CMND1+LCMND1+LL         DATA BUFFER POINTER
                      0005  125+ERROR    EQU    DATAP+LL                ERROR BYTE
                      0006  126+FAIL     EQU    ERROR+LERROR            FAILURE CODES
                      0007  127+STAT     EQU    FAIL+LFAIL              STATION ADDRESS
                      0008  128+PRESP    EQU    STAT+LSTAT              POLL RESPONSE
                      0009  129+PIAQUE   EQU    PRESP+LPRESP            QUEUE TO PROCESS
                      000A  130+CMDMOD   EQU    PIAQUE+LQUEUE           COMMAND MODIFIER
                      000C  131+MAXBC    EQU    CMDMOD+LCMDMD+LL        MAXIMUM BYTE COUNT
                      000E  132+RECBC    EQU    MAXBC+LMAXBC            RECEIVED BYTE COUNT
                            133+*
                            134+*        BUSY2 EQUATES
                            135+*
                      0080  136+FILEBY   EQU    BIT0                    FILE IS BUSY
                      0040  137+IMABSY   EQU    BIT1                    IMA IS BUSY
                            138+*
                            139+***    FIELDS WITHIN XXPIA CONTROL BLOCK BYTES
```

```
                            140+*
                            141+** DEVICE ID AND CODES
                       00C0 142+DEVID   EQU    X'C0'                PIA CONTROL BLOCK ID
                       0008 143+UC      EQU    BIT4                 UNIT CHECK
                       0004 144+SE      EQU    BIT5                 SATELLITE EXCEPTION
                       0002 145+DE      EQU    BIT6                 DEVICE END
                       0001 146+UE      EQU    BIT7                 UNIT EXCEPTION
                       000A 147+UCDE    EQU    UC+DE                UNIT CHECK AND DEVICE END
                       0003 148+UEDE    EQU    UE+DE                UNIT EXCEPTION AND DEVICE END
                       000F 149+NDEVID  EQU    X'0F'                RESET CONDITION CODES
                            150+*
                            151+** COMMAND BYTE 0
                            152+*
                       0001 153+CSETM   EQU    X'01'                CODE FOR SET MODE
                       0002 154+CSETA   EQU    X'02'                CODE FOR SET ADDRESS
                       0003 155+CRST    EQU    X'03'                CODE FOR RESET
                       0004 156+CRDID   EQU    X'04'                CODE FOR READ ID
                       0005 157+CRDIB   EQU    X'05'                CODE FOR READ IOB
        YYSTAM - SATELLITE CONTROLLED SECONDARY MODE
ERR LOC  OBJECT CODE   ADDR STMT SOURCE STATEMENT
                       0006 158+CRDBF   EQU    X'06'                CODE FOR READ BUFFER
                       0007 159+CWTIB   EQU    X'07'                CODE FOR WRITE BUFFER
                       0008 160+CWTBF   EQU    X'08'                CODE FOR WRITE BUFFER
                       0009 161+CPOLL   EQU    X'09'                CODE FOR POLL
                       000A 162+CPRPE   EQU    X'0A'                CODE FOR POLL RESET PARITY ERROR
                       000B 163+CPACK   EQU    X'0B'                CODE FOR POLL ACKNOWLEDGE
                       000C 164+CCLR    EQU    X'0C'                CODE FOR CLEAR QUEUE
                       000D 165+CLNAC   EQU    X'0D'                CODE FOR LINE ACTIVATE
                       000E 166+CRSTI   EQU    X'0E'                CODE FOR RESET IMA
                       000F 167+CMNLN   EQU    X'0F'                CODE FOR MONITOR LINE
                       0000 168+ERPROC  EQU    X'00'                ERROR PROCESS
                            169+*
                            170+** XXPIA ERROR CODES
                            171+*
                       0092 172+MAXBCE  EQU    X'92'                MAXIMUM BYTE COUNT EXCEEDED
                       0093 173+LINEPE  EQU    X'93'                LINE PARITY ERROR
                       0094 174+CMDINV  EQU    X'94'                COMMAND INVALID
                       0095 175+HDWECK  EQU    X'95'                IMA HARDWARE CHECK
                       0002 176+LINEAC  EQU    BIT6                 LINE ACTIVE
                       0001 177+NRESP   EQU    BIT7                 NO RESPONSE
                            178+*
                            179+*** STATION ADDRESS
                            180+*
                       0018 181+PORT    EQU    BIT3+BIT4            PORT SELECTION
                       00E7 182+NPORT   EQU    ALL-PORT             ALL EXCEPT PORT BITS
                       0007 183+STATN   EQU    BIT5+BIT6+BIT7       STATION ADDRESSED
                       00F8 184+NSTATN  EQU    ALL-STATN            ALL EXCEPT STATION BITS
                       001F 185+ADDR    EQU    PORT+STATN           PORT AND STATION ADDRESS
                       001F 186+LSATAD  EQU    ADDR                 LOCAL SATELLITE ADDRESS
                            187+*
                            188+*** POLL RESPONSE STATUS BYTE
                            189+*
                       0080 190+BUSY    EQU    BIT0                 BUSY STATUS
                       0040 191+LPE     EQU    BIT1                 LINE PARITY ERROR
                            192+*
                       004E 193+EXSTAT  EQU    BIT1+BIT4+BIT5+BIT6  EXCEPTION CONDITIONS
                       0000 194+CES     EQU    0                    CLEAR EXCEPTION STATUS
                       00F1 195+NEX     EQU    X'F1'                NO EXCEPTION STATUS
                       0002 196+ATL     EQU    BIT6                 ACTIVATE LOST
                       0004 197+INA     EQU    BIT5                 INVALID ACTIVATE
                       0006 198+RES     EQU    BIT5+BIT6            RESERVED
                       0008 199+INC     EQU    BIT4                 INVALID COMMAND
                       000A 200+STV     EQU    BIT4+BIT6            STORAGE OVERRUN
                       000C 201+QUE     EQU    BIT4+BIT5            QUEUE EMPTY
                       000E 202+PDT     EQU    BIT4+BIT5+BIT6       POWER ON TRANSITION
                       0001 203+EVNODD  EQU    BIT7                 EVEN ODD RESPONSE
                       0008 204+AMM     EQU    INC                  ADDRESS MISMATCH
                       000E 205+UESTB   EQU    BIT4+BIT5+BIT6       UNIT EXCEPTION STATUS BITS
                            206+*
                            207+*** STATION QUEUE
                            208+*
                       00E0 209+STQUE   EQU    BIT0+BIT1+BIT2       STATION QUEUE
                       001F 210+NSTQUE  EQU    ALL-STQUE            NOT STATION QUEUE
                            211+*
                            212+*         SYSTEM FLAG EQUATES (SYSFG2)
                            213+*
                       0080 214+PRO     EQU    BIT0                 CONTROL BLOCK PROCESSING FLAG
                       0040 215+SIAENB  EQU    BIT1                 YYSIAM ENABLE FLAG
                       0020 216+POLRSP  EQU    BIT2                 POLL RESPONSE FLAG
                       0010 217+CSD     EQU    BIT3                 CYCLE SYEAL DIRECTION (1=XMIT)
                            218+*
                            219+*****************************************************************
                            220+*         SYSTEM FLAG EQUATES FOR SYSFLG
                            221+*****************************************************************
                       0002 222+MEDACT  EQU    BIT6                 MEDIA ACTIVITY FLAG
                            223+*
                            224+**** XXVSIA FLAGS
                            225+*
                       0040 226+STAPOR  EQU    BIT1                 POWER ON RESET
                            227+*
                            228+*** FAILURE CODES
                            229+*
                       0004 230+BUSYTO  EQU    BIT5                 BUSY TIMEOUT
                            231+*
                            232+*         COMMAND DELAYS
                            233+*
                       0014 234+POLDEL  EQU    20                   DELAY FOR POLL RESPONSE
                       0014 235+SETADY  EQU    20                   DELAY FOR SETTING ADDRESS
        YYSTAM - SATELLITE CONTROLLED SECONDARY MODE
ERR LOC  OBJECT CODE   ADDR STMT SOURCE STATEMENT
                       002F 236+MINCMD  EQU    X'2F'                DELAY FOR COMMAND PROCESSING
                            237+*
                            238+*         COMMAND TABLE EQUATES
                            239+*
                       0004 240+CTINCR  EQU    4                    COMMAND TABLE INCREMENT
                       0003 241+LCMDAD  EQU    3                    LINK COMMAND ADDRESS
                       0001 242+LCMD    EQU    1                    LINK COMMAND
                       0003 243+LSCINC  EQU    3                    LOCAL SATELLITE COMMAND INCREMEN
                            244+*
                            245+*         MEDIA STATE EQUATES
                            246+*
                       0000 247+MXST0   EQU    0                    STATE 0 - NULL
                       0002 248+MXST1   EQU    2                    STATE 0 - READ
                       0004 249+MXST2   EQU    4                    STATE 0 - WRITE
                            250+*
                            251+*
                       00FF 252+LASTRY  EQU    X'FF'                MAXIMUM NUMBER OF POLLS TRIED
                            253+*
                            254+*****************************************************************
                            255+*
                            256+** XXSIA CONTROL BLOCK OFFSETS
                            257+*
                       0002 258+LCB     EQU    2                    LINK CONTROL BITS
                       0004 259+ENBS    EQU    4                    SIA CONTROL BITS
                       0006 260+LDAS    EQU    6                    LINK DATA ADDRESS
                       0007 261+LERS    EQU    7                    ERROR CODE BYTE
                       000A 262+LIA     EQU    10                   LINK IOB ADDRESS
                       000B 263+LIL     EQU    11                   LINK IOB LENGTH
                       000C 264+LRL     EQU    12                   NUMBER OF XMITS
                       000E 265+LTBS    EQU    14                   XMIT BLOCK SIZE
                            266+*
                            267+*  XXSIA ERROR CODES
                            268+*
                       0073 269+CLRQUE  EQU    X'73'                CLEAR QUEUE ERROR CODE
                       0079 270+INVMDE  EQU    X'79'                INVALID MODE (YYSIAM)
                            271+*
                            272+** COMMAND BYTE 2  (XXSIA CONTROL BLOCK)
                            273+*
                       0080 274+ENB     EQU    BIT0                 SIA INITIALIZATION COMMAND
                       0040 275+DISABL  EQU    BIT1                 DISABLE YYSIAM COMMAND
                            276+*
                            277+*****************************************************************
```

```
                  278+*
                  279+*
                  280+*       GPOST COMMANDS
                  281+*
          0000    282+ACTR    EQU   X'00'                ACTIVATE READ
          0001    283+ACTW    EQU   X'01'                ACTIVATE WRITE
          0002    284+RESET   EQU   X'02'                RESET
          0004    285+SETADD  EQU   X'04'                SET ADDRESS
          0008    286+READI   EQU   X'08'                READ IOB
          000C    287+READUI  EQU   X'0C'                READ DEVICE ID
          000E    288+WRITEI  EQU   X'0E'                WRITE IOB
          0010    289+POLL    EQU   X'10'                POLL
          0022    290+RSTIMA  EQU   X'22'                RESET IMA
          0050    291+POLLR   EQU   X'50'                POLL WITH RESET PARITY
          0030    292+POLLA   EQU   X'30'                POLL WITH ACKNOWLEDGE
          0012    293+CLER    EQU   X'12'                CLEAR QUEUE
          0013    294+SETMOD  EQU   X'13'                SET MODE
          0018    295+READB   EQU   X'18'                READ BUFFER
          001E    296+WRITEB  EQU   X'1E'                WRITE BUFFER
                  297+*
                  298+*       SHORTENED MNEMONICS
                  299+*
          0000    300+AR      EQU   ACTR                 ACTIVATE READ
          0001    301+AW      EQU   ACTW                 ACTIVATE WRITE
          0060    302+MRACT   EQU   X'60'                MEDIA READ ACTIVATE
          0040    303+MWACT   EQU   X'40'                MEDIA WRITE ACTIVATE
                  304+*
                  305+*       NON COMMAND BITS
                  306+*
          00E0    307+NCMND   EQU   X'E0'                NON COMMAND BITS
                  308+*
                  309+**********************************************************************
                  310+*
                  311+*       I/O REGISTER DEFINITIONS
                  312+*
          0029    313+RLED    EQU   X'29'                MEDIA AVAILABLE LED REGISTER
         YYSTAM - SATELLITE CONTROLLED SECONDARY MODE
ERR LOC  OBJECT CODE      ADDR STMT SOURCE STATEMENT
          0060    314+RCYST   EQU   X'60'                CYCLE STEAL REGISTER
          0060    315+RFRAME  EQU   X'60'                FRAME BUFFER
          0061    316+RTWST   EQU   X'61'                TWINAX STATUS REGISTER
          0062    317+RCNTR   EQU   X'62'                CONTROL REGISTER
          0063    318+RBSST   EQU   X'63'                BASE STATUS REGISTER
          0064    319+RQUES   EQU   X'64'                QUEUE STATUS REGISTER
          0065    320+RCMDB   EQU   X'65'                COMMAND BUFFER
                  321+*
                  322+*       TWINAX STATUS REGISTER X'61' BIT DEFINITIONS (RTWST)
                  323+*
          0080    324+PD      EQU   BIT0                 LINE PARITY DISPLAY
          0040    325+PE      EQU   BIT1                 PARITY ERROR INTERRUPT
          0020    326+LM      EQU   BIT2                 LINE MESSAGE MONITOR
          0010    327+AM      EQU   BIT3                 ADDRESS MISMATCH
          0008    328+CQ      EQU   BIT4                 COMMAND QUEUED
          0008    329+SI      EQU   BIT4                 SEND ONE
          0004    330+TM      EQU   BIT5                 TRANSMISSION MONITOR
          0002    331+DT      EQU   BIT6                 DATA STREAM TERMINATION DELIMITE
          0001    332+CS      EQU   BIT7                 CYCLE STEAL
          0041    333+PECS    EQU   PE+CS                PARITY ERROR AND CYCLE STEAL
          0003    334+CD      EQU   CS+DT                CYCLE STEAL AND DSTD
          007F    335+RPD     EQU   ALL-PD               RESET PARITY DISPLAY
          00BF    336+RPE     EQU   ALL-PE               RESET PARITY ERROR
          00DF    337+RLM     EQU   ALL-LM               RESET LINE MONITOR
          00EF    338+RAM     EQU   ALL-AM               RESET ADDRESS MISMATCH
          00F7    339+RCQ     EQU   ALL-CQ               RESET COMMAND QUEUED
          00F7    340+RSI     EQU   ALL-SI               RESET SEND ONE
          00FB    341+RTM     EQU   ALL-TM               RESET TRANSMISSION MONITOR
          00FD    342+RDT     EQU   ALL-DT               RESET DSTD
          00FE    343+RCS     EQU   ALL-CS               RESET CYCLE STEAL
          00FC    344+RCD     EQU   ALL-CD               RESET CYCLE STEAL AND DSTD
          00F3    345+RCTM    EQU   ALL-CQ-TM            RESET CMND QUEUED AND TMIT MONIT
          00A4    346+RSTINT  EQU   ALL-PE-AM-SI-DT-CS   RESET ALL INTERRUPT BITS
                  347+*
                  348+*       CONTROL REGISTER X'62' BIT DEFINITIONS (RCNTR)
                  349+*
          001F    350+NULL    EQU   X'1F'                NULL
          0020    351+SONE    EQU   X'20'                SEND ONE COMMAND FOR CONTROL REG
          0020    352+SEND1   EQU   X'20'                SEND ONE FRAME
          0040    353+WRTCMD  EQU   X'40'                WRITE COMMAND
          0060    354+RDCMD   EQU   X'60'                READ COMMAND
          0080    355+POT0    EQU   X'80'                POWER ON TRANSITION
          00A0    356+TBPR    EQU   X'A0'                TWO BYTE POLL RESPONSE
          00C0    357+RACT    EQU   X'C0'                READ ACTIVATE
          00E0    358+WACT    EQU   X'E0'                WRITE ACTIVATE
          0008    359+PORT1   EQU   BIT4                 PORT ONE
          0007    360+ADDR7   EQU   X'07'                ADDRESS 7 IN CONTROL REGISTER
          00A7    361+TBPR7   EQU   TBPR+ADDR7           TWO BYTE POLL RESPONSE AND ADDR
          0088    362+CNTR    EQU   POT0+PORT1           POWER ON TRANSITION AND PORT 1
          008F    363+CNTR7   EQU   CNTR+7               INITIALIZATION STATE OF REGISTER
                  364+*
                  365+*   DIAGNOSTIC ROUTINE INTERRUPT LEVEL BIT
                  366+*
          00FF    367+DEVMSK  EQU   X'FF'                I/O DEVICE INTERRUPT MASK
          00FB    368+IMAOFF  EQU   X'FB'                IMA TURN OFF MASK
                  369+*************** IMA HARDWARE ERROR **********************************
          0000    370+RRESET  EQU   X'00'                IMA MODE SELECT
                  371+*************** IMA HARDWARE ERROR **********************************
0000 34 01 0082    372          ST    X1SAVE,XR1           SAVE INDEX REGISTER ONE
0004 34 02 0084    373          ST    X2SAVE,XR2           SAVE INDEX REGISTER TWO
0008 34 08 0086    374          ST    YYSAVE,ARR           SAVE RETURN LINK
                   375 *        SVC                        SAVE RUS TABLE ADDRESS
000C F5      000C  376+         DC    XL1'F5'              ***
000D 03      000D  377          DC    AL1(XXRSTB)          ***
000E 34 02 00AE    378          ST    ROSADD,XR2           ***
0012 B5 02 19      379          L     SYSFG(,XR2),XR2      IF YYSTAM IS NOT ENABLED
0015 B8 40 00      380          TBN   0(,XR2),STAENB       * ***
0018 F2 10 28      381          JT    SM200                * IF THIS IS NOT ENB YYSTAM REQ
001B 78 80 04      382          TBN   ENBS(,XR1),ENB       * * ***
001E F2 10 39      383          JT    SM100                * * SET UC/OE
0021 7A 0A 02      384          SBN   LCB(,XR1),UCOE       * * SET ERROR TO INVALID MODE
0024 7C 79 07      385          MVI   LERS(,XR1),INVMDE    * * ***
0027 F2 87 73      386          J     SM990                * ELSE,
             002A  387 SM100    EQU   *                    * * CALL INITIALIZATION ROUTINE
002A C0 87 0005    388          B     XSIMAI               * * SET YYSTAM ENABLED FLAG
002E 35 02 00AE    389          L     ROSADD,XR2           * * ***
0032 B5 02 19      390          L     SYSFG(,XR2),XR2      * * ***
0035 8A 40 00      391          SBN   0(,XR2),STAENB
         YYSTAM - SATELLITE CONTROLLED SECONDARY MODE
ERR LOC  OBJECT CODE      ADDR STMT SOURCE STATEMENT
0038 35 01 0082    392          L     X1SAVE,XR1           * * SET POINTER TO CONTROL BLOCK
003C 75 01 06      393          L     6(,XR1),XR1          * * SET DEVICE ID TABLE POINTER
003F 34 01 0002    394          ST    DEVIDA,XR1           * * ***
0043 F2 87 57      395          J     SM990                ELSE,
             0046  396 SM200    EQU   *                    * IF THIS IS NOT A DISABLE REQ
0046 78 40 04      397          TBN   ENBS(,XR1),DISABL    * * ***
0049 F2 10 07      398          JT    SM300                * * IMA TRANS QUEUE REQUEST
004C C0 87 0006    399          B     XXSIA                * * ***
0050 F2 87 4A      400          J     SM990                * ELSE,
             0053  401 SM300    EQU   *                    DO UNTIL ALL INTRPTS MASKED OFF
             0053  402 D01      EQU   *                    * MASK OFF INTERRUPTS
                   403 *        XFER  R1-MASKR,I2-OFF      OP CODE
0053 F6      0053  404+         DC    IL1'246'             R1
0054 FE      0054  405+         DC    AL1(MASKR)           IMM
0055 00      0055  406+         DC    AL1(OFF)             END DO
                   407 *        BNEQ  R1-MASKR,I2-OFF,ADD-D01  OP CODE
0056 CA      0056  408+         DC    IL1'202'             R1
0057 FE      0057  409+         DC    AL1(MASKR)           IMM
0058 00      0058  410+         DC    AL1(OFF)             ADDRESS
0059 0053    005A  411+         DC    AL2(D01)             TURN OFF IMA LEVEL MASK
005B 3A 04 4059    412          SBN   X'4059',IMALVL       RESTORE DEVICE MASK
                   413 *        LR    R1-DEVMSK,ADD-X'4059'
```

```
005F 33                005F  414+        DC    IL1'51'                  OP CODE
0060 FE                0060  415+        DC    AL1(DEVMSK)              R1
0061 4059              0062  416+        DC    AL2(X'4059')             ADDRESS
                             417 *       LR    R1-MASKR,ADD-X'4059'     REENABLE INTERRUPTS
0063 33                0063  418+        DC    IL1'51'                  OP CODE
0064 FE                0064  419+        DC    AL1(MASKR)               R1
0065 4059              0066  420+        DC    AL2(X'4059')             ADDRESS
0067 C2 01 0001              421         LA    CB15SC,XR1               * * CANCEL 15 SEC TIME BOMB
006B C0 87 0007              422         B     XXTXCL                   * * ***
006F C0 87 0004              423         B     XSC2TB                   * * CLEAR QUEUES
0073 35 02 00AE              424         L     ROSADD,XR2               * * RESET YYSTAM ENABLE FLAG
0077 B5 02 19                425         L     SYSFG(,XR2),XR2          * * ***
007A BB 40 00                426         SBF   0(,XR2),STAENB           * * ***
007D 35 02 00AE              427         L     ROSADD,XR2               * * CLEAR IMA CYCLE STEAL FLAG
0081 B5 02 13                428         L     CSREQT(,XR2),XR2         * * ***
0084 BB 40 00                429         SBF   0(,XR2),IMABSY           * * ***
0087 35 02 00AE              430         L     ROSADD,XR2               * * RESTORE STATE TABLE ADDRESS
008B B5 02 03                431         L     YYSTAT(,XR2),XR2         * * ***
008E 8C 01 00 00B0           432         MVC   0(2,XR2),STATSV          * * ***
0093 35 02 00AE              433         L     ROSADD,XR2               * * CLEAR STATE TABLE OFFSET
0097 B5 02 05                434         L     YYSTAS(,XR2),XR2         * * ***
009A 8C 00 00                435         MVI   0(,XR2),OFF              * * ***
                       009D  436 SM990   EQU   *                        END IF
009D 35 01 00B2              437         L     X1SAVE,XR1               RESTORE INDEX REGISTER ONE
00A1 35 02 00B4              438         L     X2SAVE,XR2               RESTORE INDEX REGISTER TWO
00A5 35 10 00B6              439         L     YYSAVE,IAR               RETURN THROUGH SAVED LINK
                             440 *
00A9                   00AA  441 BUSY2   DS    XL2
00AB                   00AB  442 FLAGR   DS    XL1                      CYCLE STEAL FLAG
00AC                   00AC  443 FLAGR2  DS    XL1
00AD                   00AE  444 ROSADD  DS    XL2                      ROS TABLE ADDRESS SAVE
00AF                   00B0  445 STATSV  DS    XL2                      STA STATE TABLE ADDRESS SAVE
00B1                   00B2  446 X1SAVE  DS    XL2                      INDEX REGISTER SAVE AREA
00B3                   00B4  447 X2SAVE  DS    XL2                      INDEX REGISTER SAVE AREA
00B5                   00B6  448 YYSAVE  DS    XL2                      RETURN LINK A SAVE AREA
                       0000  449         END   YYSTAM
TOTAL STATEMENTS IN ERROR IN THIS ASSEMBLY =     0
```

Whereas the present invention has been described with respect to a specific embodiment thereof, it will be understood that various changes and modifications will be suggested to one skilled in the art, and it is intended to encompass such changes and modifications as fall within the scope of the appended claims.

What is claimed is:

1. A reconfigurable clustered system of data-entry terminals comprising:

a plurality of physically separate data-entry terminals each having entry and display means for communicating data between an operator and said terminal and each further including processing means for operating upon data input to said terminal, a communications link coupled between said terminals to form a data-entry cluster, one of said terminals being designated as a primary terminal and including means for controlling the flow of data via said communications link and means for providing central storage for data input to all said terminals in said data-entry cluster, processing programs being stored in said primary terminal and including means for selectively transferring the processing programs to ones of said terminals for implementation, and means responsive to operation of said entry means of one of said terminals to convert that terminal to said primary terminal while maintaining the physical configuration of said data-entry cluster.

2. The reconfigurable clustered system defined in claim 1 wherein said communications link comprises a twin axial cable.

3. A reconfigurable clustered system of data-entry terminals comprising:

a plurality of physically separate data-entry terminals each having entry and display means for communicating data between an operator and said terminal and each further including processing means for operating upon data input to said terminal, a communications link coupled between said terminals to form a data-entry cluster, one of said terminals being designated as a primary terminal and including means for controlling the flow of data via said communications link and means for providing central storage of data input to all said terminals in said data-entry cluster, said means for providing central storage including a storage medium which is removable from said terminal and means responsive to operation of said entry means of one of said terminals to convert that terminal to said primary terminal while maintaining the physical configuration of said data-entry cluster.

4. The reconfigurable clustered system defined in claim 3 wherein said storage medium may be removed from one designated primary terminal and inserted into a subsequently designated primary terminal in order to continue operation of said clustered system.

5. The reconfigurable clustered system defined in claim 3 wherein only a first subset of said terminals may be operated as primary terminals and a second subset of said terminals may only be operated as secondary terminals which transmit data to a primary terminal and receive programs from a primary terminal.

6. A reconfigurable clustered system of data-entry terminals comprising:

a communications link, a plurality of physically separate data-entry terminals all coupled to said communications link in a cluster, each of said terminals having programmable processing means for transferring data and programs over said communications link and each further including entry means for communicating information between an operator and said processing means, at least two of said terminals being media terminals each further having storage means for containing both data from said terminals and program instructions for all of said terminals in said cluster, and selection means for designating any one of said media terminals in said cluster as a primary media terminal, such that all other terminals in said cluster, including others of said media terminals, exchange both data and program instructions with said primary media terminal, said selection means operable to designate different ones of said media terminals as said primary media terminal without any physical reconfiguration of said cluster.

7. The reconfigurable clustered system defined in claim 6 wherein said primary media terminal transmits programs to the remaining terminals in said cluster for storage in said storage means.

8. The reconfigurable clustered system defined in claim 6 wherein each of said storage means includes a removable storage medium for containing data and programs for all of said terminals in said cluster.

9. The reconfigurable clustered system defined in claim 8 wherein said removable storage medium comprises a magnetic diskette.

10. The reconfigurable clustered system defined in claim 6 wherein said communications link comprises a twin coaxial cable.

11. The configurable clustered system defined in claim 6 wherein said programmable processing means comprises a digital microprocessor and associated storage circuits.

12. The reconfigurable clustered system defined in claim 6 wherein said entry means comprises a keyboard.

13. The reconfigurable clustered system defined in claim 12 wherein said selection means is responsive to operation of said keyboard for designating any one of said media terminals as a primary media terminal.

14. The reconfigurable clustered system defined in claim 6 wherein each of said media terminals comprises:

additional programmable processing means for controlling the operation of said storage means, said additional programmable processing means rendered active by said selection means when said media terminal is designated as a primary media terminal.

15. The reconfigurable clustered system defined in claim 14 wherein said programmable processing means and said additional programmable processing means store data in a common storage.

16. The reconfigurable clustered system defined in claim 15 and further comprising:

means in said primary media terminal for periodically polling each of the remaining terminals in said cluster, said terminals when polled transmitting available data to said primary media terminal for storage in said storage means.

17. A method of data-entry through a plurality of physically separate data-entry terminals comprising:

coupling said data-entry terminals in a cluster configuration with a communications link, receiving data at each of said data-entry terminals through data-entry means, transferring said data over said communications link to a designated primary terminal for central storage of said data, storing function program instructions at said primary terminal, transmitting said program instructions via said communications link to any terminal requesting said program instructions, operating on said data at said terminals with said program instructions, and changing the designated primary terminal by operation of said data-entry means while maintaining the physical configuration of said cluster.

18. The method of data-entry defined in claim 17 wherein said step of transferring data comprises:

periodically polling said terminals from said primary terminal, and transmitting available data from said terminal in response to said polling.

19. A method of data-entry through a plurality of data-entry terminals comprising:

communicating data between an operator and said terminals, performing arithmetic operations upon data input to said terminals according to stored processing programs, coupling said terminals together through a communications link to form a data-entry cluster, operating a first one of said terminals as a primary terminal including controlling the flow of data via said communications link and storing data input to all said terminals in said data-entry cluster, exchanging data and processing programs between said primary terminal and the remaining terminals via said communications link, and designating a second one of said terminals as a primary terminal while maintaining the physical configuration of said data-entry cluster.

20. A method of reconfiguring a clustered system of data-entry terminals comprising:

connecting a plurality of physically separate data-entry terminals through a communications link in a cluster, communicating information between an operator and said terminals, exchanging data and program instructions over said communications link between said terminals, designating at least two of said terminals as media terminals, designating any one of said media terminals in said cluster as a primary media terminal such that all other terminals in said cluster, including others of said media terminals, exchange both data and program instructions with said primary media terminal, such that different ones of said media terminals may be designated said primary media terminal without any physical reconfiguration of said cluster.

21. The method of claim 20 and further comprising transmitting processing program instructions from said primary media terminal to the remaining terminals in said cluster and receiving data from the remaining terminals in said cluster for storage in a removable storage medium.

* * * * *